US008950283B2

(12) United States Patent
Watanabe et al.

(10) Patent No.: US 8,950,283 B2

(45) Date of Patent: Feb. 10, 2015

(54) METHOD FOR MANUFACTURING NUT FOR BALL SCREW AND BALL SCREW

(75) Inventors: Atsushi Watanabe, Fujisawa (JP); Toru Harada, Fujisawa (JP); Shouji Yokoyama, Hanyu (JP); Kiyoshi Ootsuka, Fujisawa (JP); Koji Hashimoto, Fujisawa (JP); Kazuto Kobayashi, Fujisawa (JP); Toshio Nakamura, Fujisawa (JP); Shinobu Mogi, Fujisawa (JP); Shingo Saitou, Fujisawa (JP); Tomofumi Yamashita, Fujisawa (JP)

(73) Assignee: NSK Ltd., Tokyo (JP)

( * ) Notice: Subject to any disclaimer, the term of this patent is extended or adjusted under 35 U.S.C. 154(b) by 332 days.

(21) Appl. No.: 13/581,258

(22) PCT Filed: Mar. 31, 2011

(86) PCT No.: PCT/JP2011/001972

§ 371 (c)(1), (2), (4) Date: Aug. 24, 2012

(87) PCT Pub. No.: WO2011/122053

PCT Pub. Date: Oct. 6, 2011

(65) Prior Publication Data

US 2013/0008275 A1 Jan. 10, 2013

(30) Foreign Application Priority Data

Mar. 31, 2010 (JP) ................................ 2010-083058
Apr. 5, 2010 (JP) ................................ 2010-087070
Apr. 5, 2010 (JP) ................................ 2010-087071
Nov. 15, 2010 (JP) ................................ 2010-255390
Nov. 16, 2010 (JP) ................................ 2010-256268
Nov. 30, 2010 (JP) ................................ 2010-266374
Dec. 10, 2010 (JP) ................................ 2010-275703
Dec. 10, 2010 (JP) ................................ 2010-275704
Dec. 10, 2010 (JP) ................................ 2010-275705
Dec. 10, 2010 (JP) ................................ 2010-275706
Jan. 7, 2011 (JP) ................................ 2011-001885
Jan. 17, 2011 (JP) ................................ 2011-007141
Feb. 3, 2011 (JE) ................................ 2011-021642
Feb. 25, 2011 (JP) ................................ 2011-040568

(51) Int. Cl.

*F16H 25/22* (2006.01)
*B21K 1/70* (2006.01)
*B21J 5/12* (2006.01)
*B21K 1/04* (2006.01)
*B21K 21/12* (2006.01)
*B21K 21/16* (2006.01)
*B21K 23/00* (2006.01)
*B21J 13/02* (2006.01)

(52) U.S. Cl.

CPC ... *B21K 1/70* (2013.01); *B21J 5/12* (2013.01); *B21K 1/04* (2013.01); *B21K 21/12* (2013.01); *B21K 21/16* (2013.01); *B21K 23/00* (2013.01); *B21J 13/025* (2013.01); *B21J 2025/2481* (2013.01); *F16H 25/2223* (2013.01)

USPC .................. 74/424.86; 74/424.87; 74/424.82

(58) Field of Classification Search

CPC .................... F16H 2025/2481; F16H 25/2223; B21K 23/00; B21K 21/12; B21K 1/70

USPC ............... 74/424.86, 424.81, 424.82, 424.87, 74/424.71

See application file for complete search history.

(56) References Cited

U.S. PATENT DOCUMENTS 3,053,105 A * 9/1962 Cole .......................... 74/424.86
3,393,575 A 7/1968 Irwin
3,393,576 A 7/1968 Carlson
3,512,426 A * 5/1970 Dabringhaus ............. 74/424.87
3,673,886 A * 7/1972 Tomita et al. ............. 74/424.75
3,902,377 A 9/1975 Lemor
4,070,921 A * 1/1978 Arnold ...................... 74/424.75
4,226,137 A * 10/1980 Sharp ........................ 74/424.86
4,612,817 A * 9/1986 Neff .......................... 74/424.75
4,680,982 A * 7/1987 Wilke et al. ............... 74/424.75
5,555,770 A * 9/1996 Dolata et al. .............. 74/424.86

| | | | | |
|---|---|---|---|---|
| 5,582,072 | A | 12/1996 | Yamaguchi et al. | |
| 6,464,034 | B1 | 10/2002 | Toda et al. | |
| 6,813,969 | B2 * | 11/2004 | Huang | 74/424.83 |
| 6,851,330 | B2 * | 2/2005 | Buchanan et al. | 74/424.78 |
| 7,017,437 | B1 * | 3/2006 | Zernickel et al. | 74/89.42 |
| 7,107,805 | B2 | 9/2006 | Osterlaenger et al. | |
| 7,228,751 | B2 | 6/2007 | Nagai et al. | |
| 7,305,902 | B2 | 12/2007 | Inoue et al. | |
| 7,530,282 | B2 * | 5/2009 | Saitou et al. | 74/424.75 |
| 7,713,467 | B2 * | 5/2010 | Becker et al. | 419/6 |
| 8,783,409 | B2 * | 7/2014 | Lee et al. | 180/444 |
| 2001/0018850 | A1 * | 9/2001 | Walton | 74/89.44 |
| 2003/0192388 | A1 | 10/2003 | Nagai et al. | |
| 2004/0083840 | A1 | 5/2004 | King et al. | |
| 2004/0237685 | A1 | 12/2004 | Inoue et al. | |
| 2007/0209465 | A1 | 9/2007 | Shirai et al. | |
| 2009/0064811 | A1 | 3/2009 | Shirai | |
| 2010/0101348 | A1 | 4/2010 | Teramachi et al. | |
| 2010/0242652 | A1 | 9/2010 | Shirai et al. | |
| 2011/0100143 | A1 | 5/2011 | Borza | |
| 2013/0220047 | A1 | 8/2013 | Yokoyama et al. | |

FOREIGN PATENT DOCUMENTS

| | | | |
|---|---|---|---|
| EP | 1 500 572 | A2 | 1/2005 |
| JP | 55-40080 | A | 3/1980 |
| JP | 64-11466 | U | 1/1989 |
| JP | 8-57563 | A | 3/1996 |
| JP | 11-210859 | A | 8/1999 |
| JP | 2000-297854 | A | 10/2000 |
| JP | 2002-250426 | A | 9/2002 |
| JP | 2003-166616 | A | 6/2003 |
| JP | 2003-183735 | A | 7/2003 |
| JP | 2003-207015 | A | 7/2003 |
| JP | 2003-307263 | A | 10/2003 |
| JP | 2004-3631 | A | 1/2004 |
| JP | 2004-108538 | A | 4/2004 |
| JP | 2004-148385 | A | 5/2004 |
| JP | 2005-76844 | A | 3/2005 |
| JP | 2005-299754 | A | 10/2005 |
| JP | 2005-321059 | A | 11/2005 |
| JP | 2006-21307 | A | 1/2006 |
| JP | 2006-22848 | A | 1/2006 |
| JP | 2006-90437 | A | 4/2006 |
| JP | 2006-144873 | A | 6/2006 |
| JP | 2006-349058 | A | 12/2006 |
| JP | 2007-92968 | A | 4/2007 |
| JP | 2007-146874 | A | 6/2007 |
| JP | 2008-157374 | A | 7/2008 |
| JP | 2008-267523 | A | 11/2008 |
| JP | 2008-281063 | A | 11/2008 |
| JP | 2008-281064 | A | 11/2008 |
| JP | 2009-50871 | A | 3/2009 |
| JP | 2010-87071 | A | 4/2010 |
| JP | 2010-112430 | A | 5/2010 |
| JP | 2010-138951 | A | 6/2010 |
| JP | 2010-275706 | A | 12/2010 |
| WO | WO 01/11264 | A1 | 2/2001 |
| WO | WO 2007/013266 | A1 | 2/2007 |
| WO | WO 2007/046321 | A1 | 4/2007 |
| WO | WO 2009/100332 | A2 | 8/2009 |

OTHER PUBLICATIONS

Japanese Office Action dated Dec. 3, 2013 w/ English translation (six (6) pages).
Korean Office Action dated Jan. 7, 2014 w/ English translation (fourteen (14) pages).
Chinese Office Action dated May 5, 2014, including English translation (sixteen (16) pages).
Japanese Office Action with English translation dated Oct. 15, 2013 (4 pages).
English translation of document C2 (International Preliminary Report on Patentability) previously filed on Aug. 24, 2012 (six (6) pages).
U.S. Appl. No. 13/879,752, filed Apr. 16, 2013.
International Search Report dated Jul. 5, 2011 of copending PCT International Application No. PCT/JP2011/001973 (U.S. Appl. No. 13/879,752), including English translation (four (4) pages).
International Preliminary Report on Patentability (PCT/IPEA/409) dated Feb. 8, 2013 of copending PCT International Application No. PCT/JP2011/001973 (U.S. Appl. No. 13/879,752), including English translation (nine (9) pages).
International Search Report dated Jul. 5, 2011 with English translation (seven (7) pages).
Japanese language International Preliminary Report on Patentability (PCT/IPEA/409) dated Jul. 19, 2012 (four (4) pages).
Japanese language Written Opinion (PCT/ISA/237) dated Jul. 5, 2012 (four (4) pages).

* cited by examiner

*Primary Examiner* — David M Fenstermacher
(74) *Attorney, Agent, or Firm* — Crowell & Moring LLP

(57) ABSTRACT

A method forms a concave constituting a ball return passage directly on an inner circumferential surface of a nut blank by plastic working without damaging a die. Letter S shaped concaves are formed on an inner circumferential surface of a nut blank, by pressing by use of a die having a blank holder, a cam driver, cam sliders, and a cylindrical member. The cam driver has inclined surfaces having the same angle of inclination as the cam sliders. The cam sliders have letter S shaped convexes corresponding to the letter S shaped concaves, and are held by through holes, respectively. When the cam driver is pressed from the top thereof, the cam sliders move outwardly in the radial direction, respectively, and the letter S shaped convexes push the inner circumferential surface of the nut blank for plastic deformation.

27 Claims, 62 Drawing Sheets

F I G. 1A
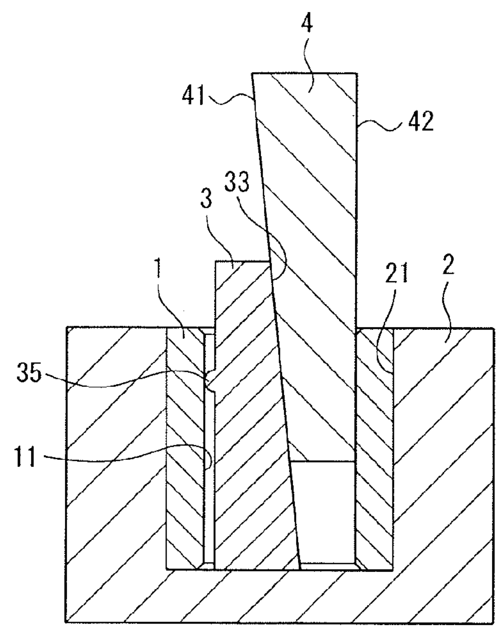
F I G. 1B
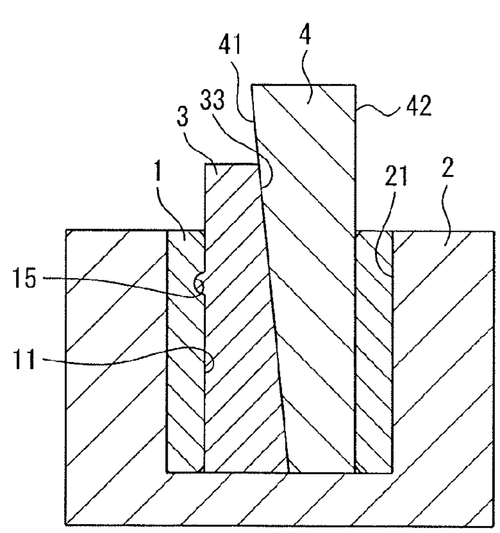
F I G. 2A
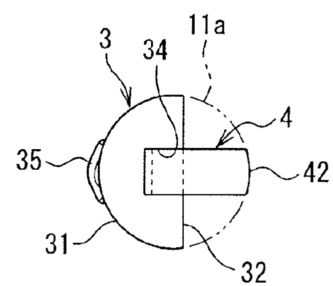
F I G. 2B
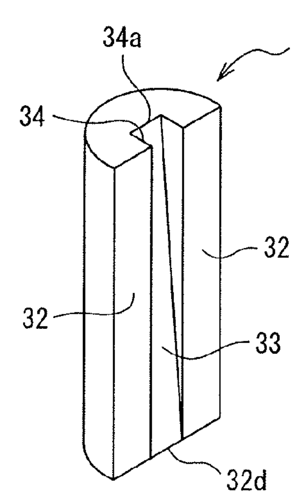
F I G. 2C
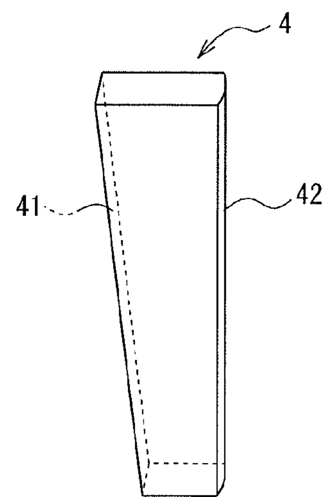

F I G. 4A
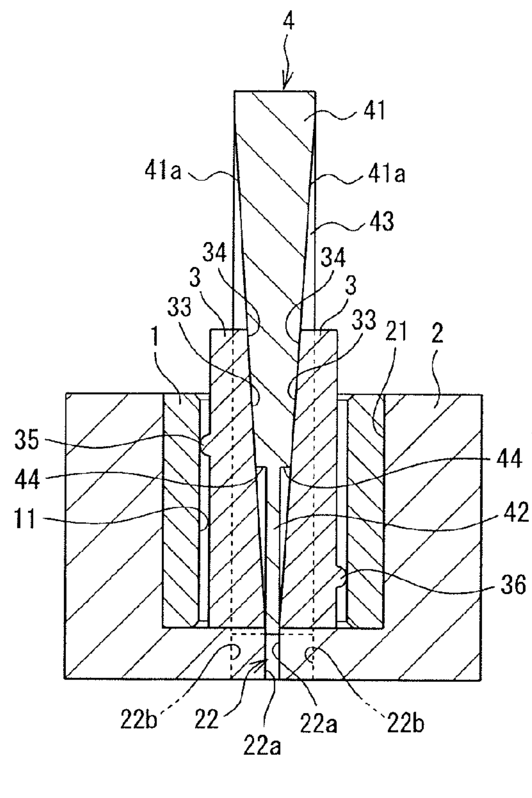
F I G. 4B
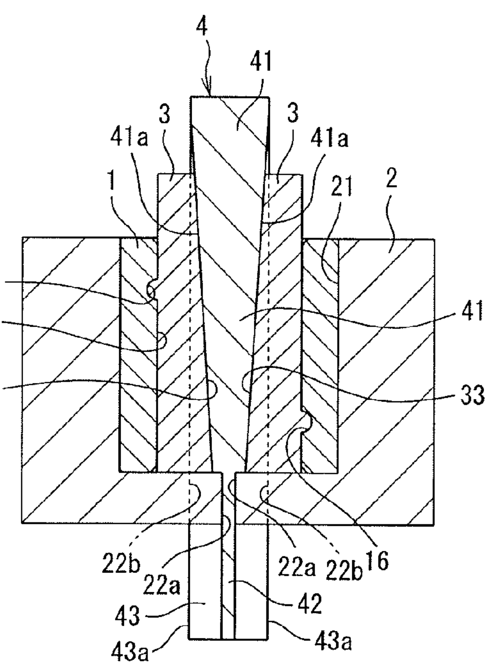
F I G. 5A
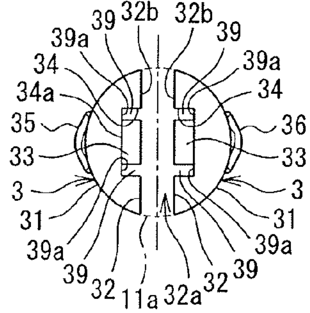
F I G. 5B
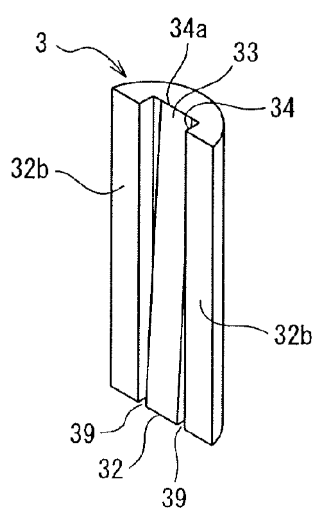
F I G. 5C
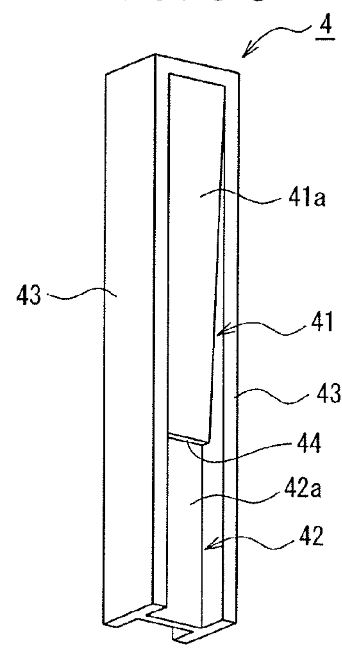

F I G. 7A
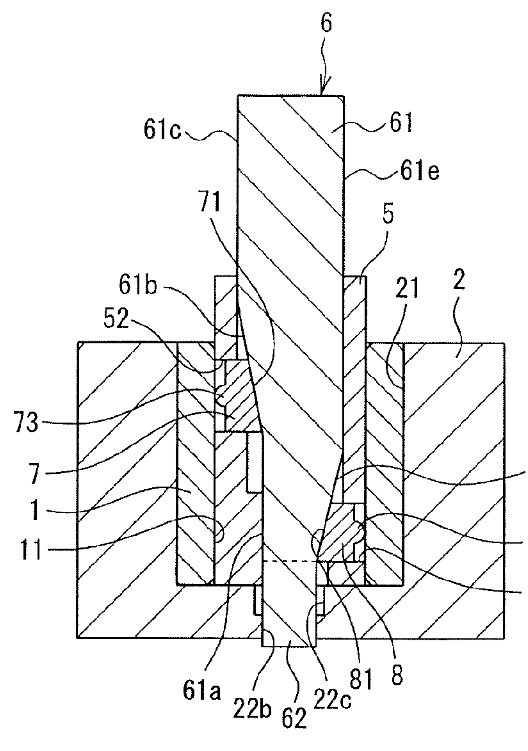
F I G. 7B
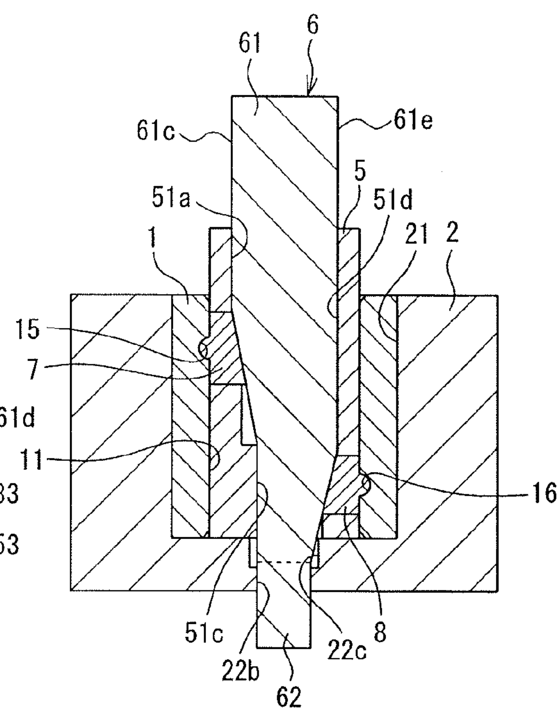
F I G. 8
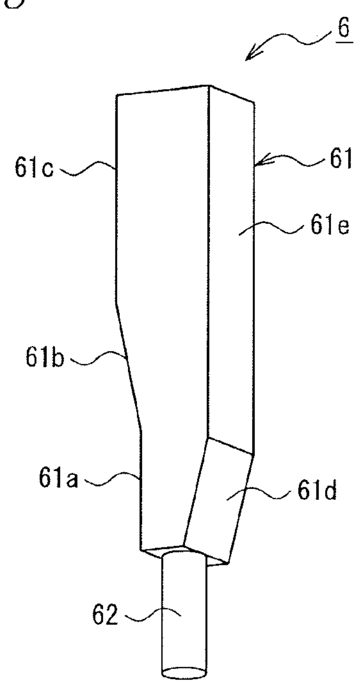

F I G. 9A
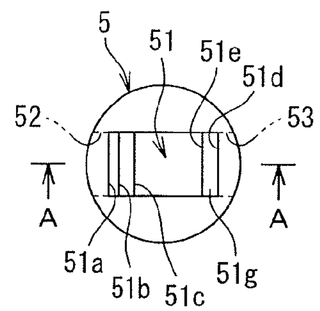
F I G. 9B
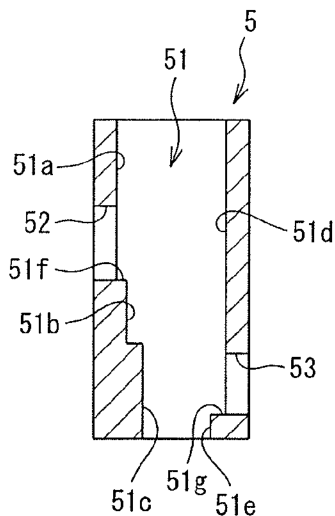
F I G. 9C
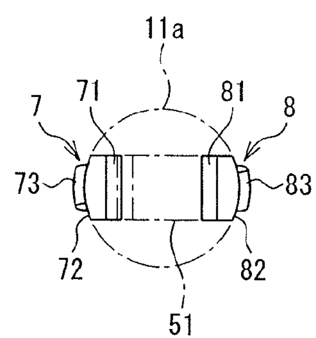
F I G. 10A
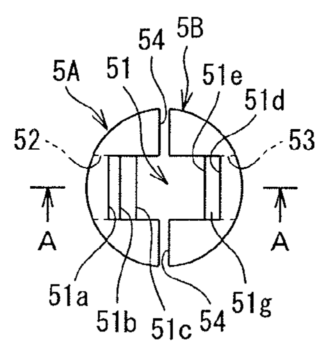
F I G. 10B
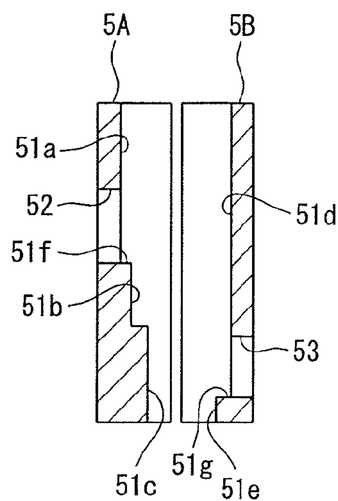

F I G. 1 7 A
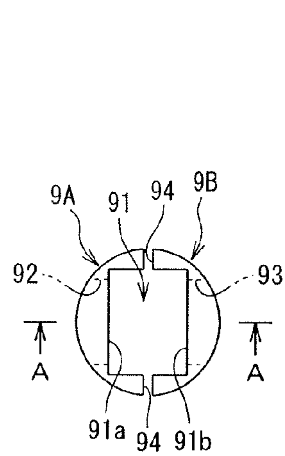
F I G. 1 7 B
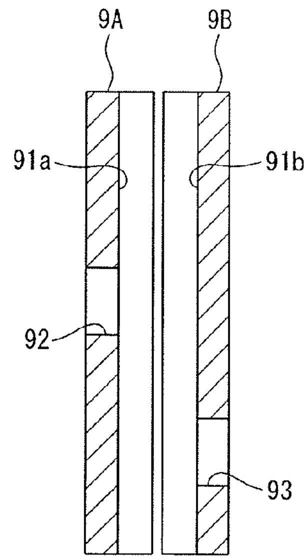
F I G. 1 8 A
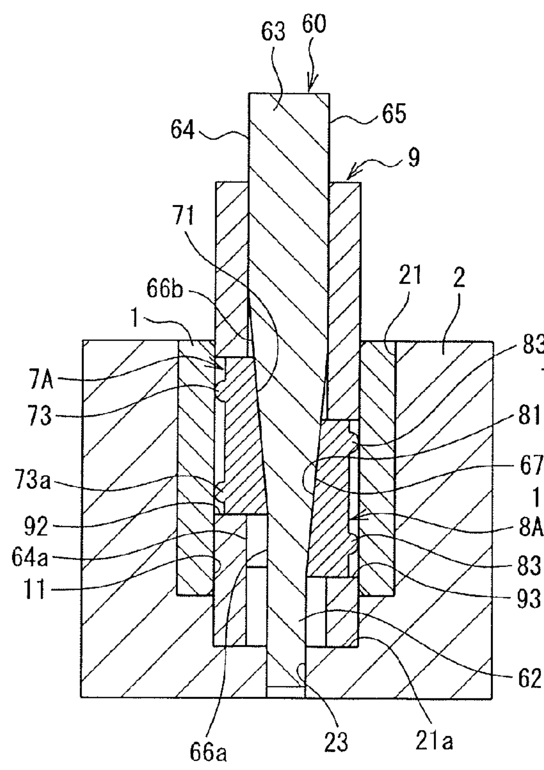
F I G. 1 8 B
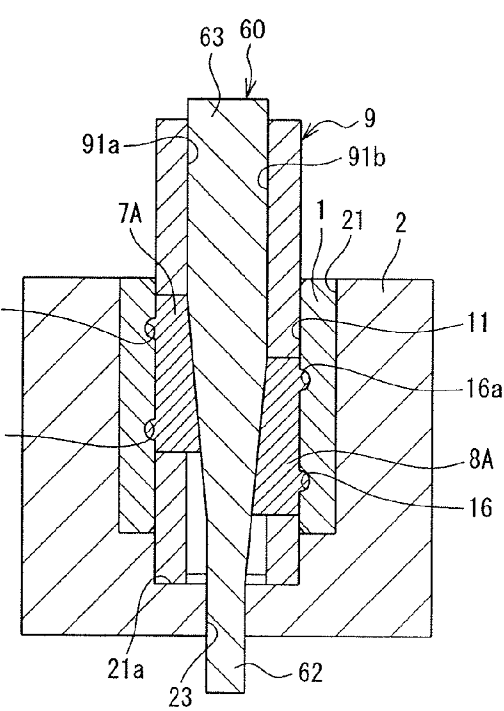

F I G. 2 0 A
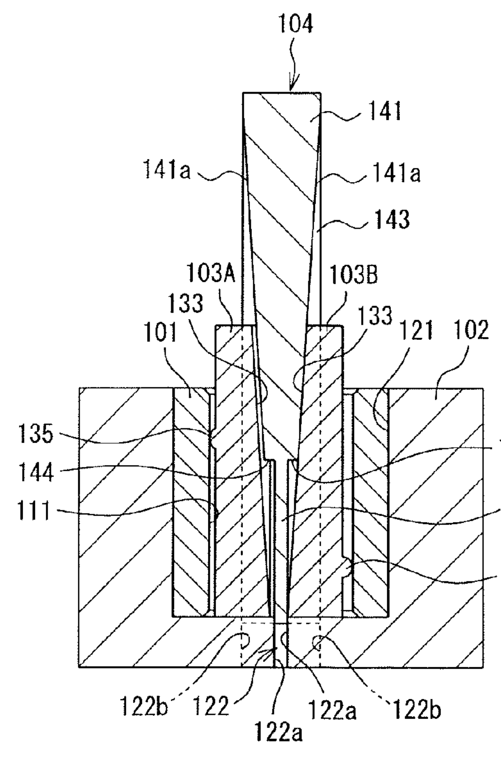
F I G. 2 0 B
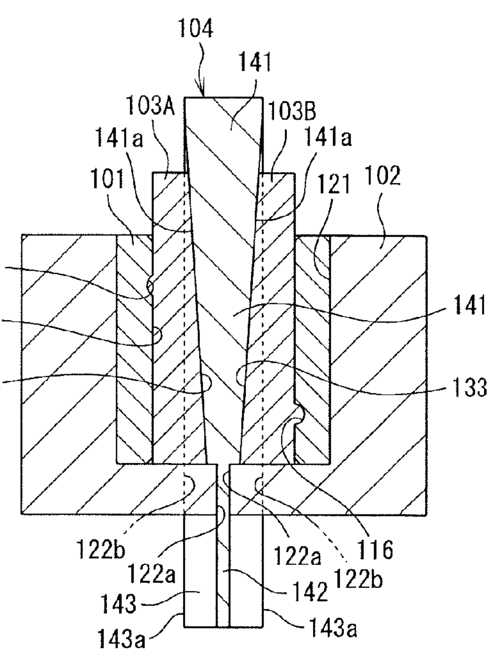
F I G. 2 1 A
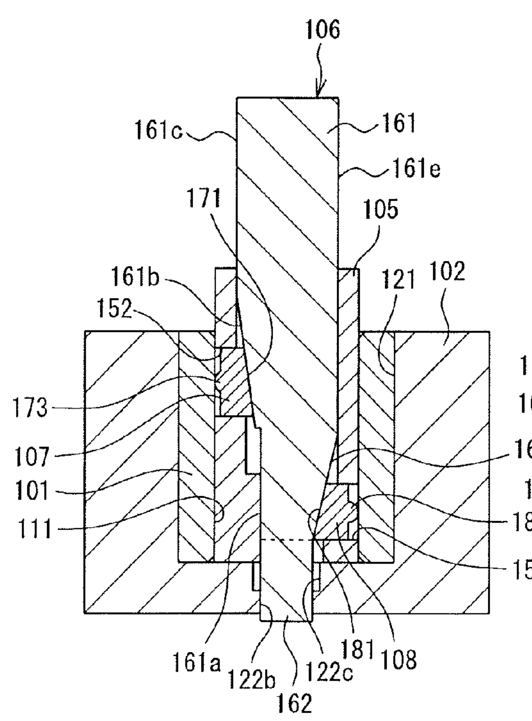
F I G. 2 1 B
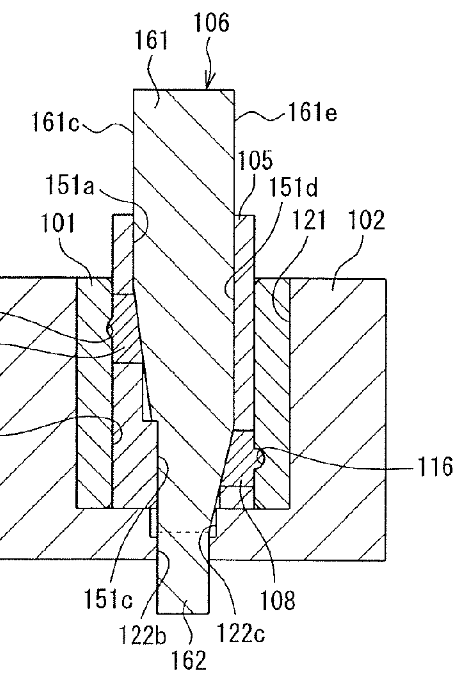

*F I G. 2 6*
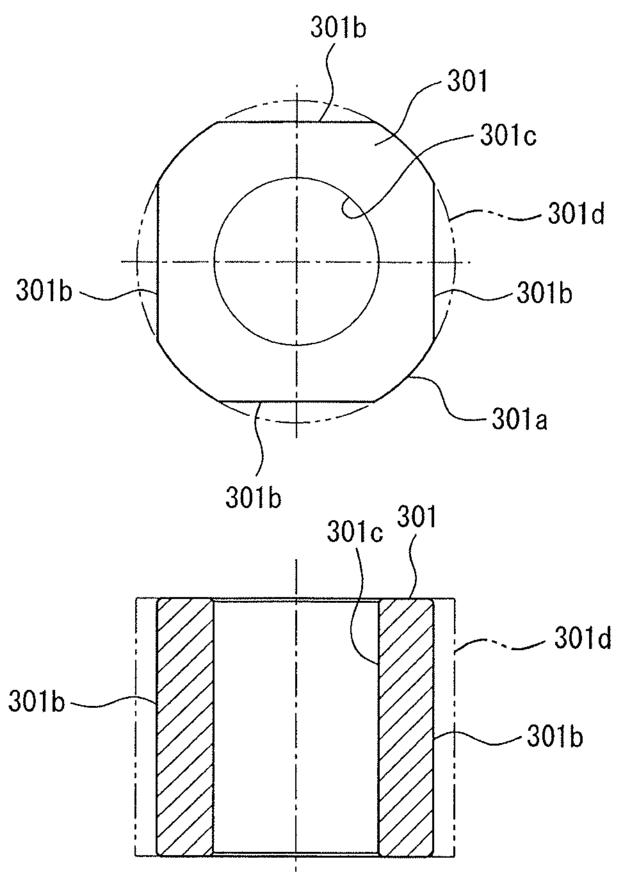

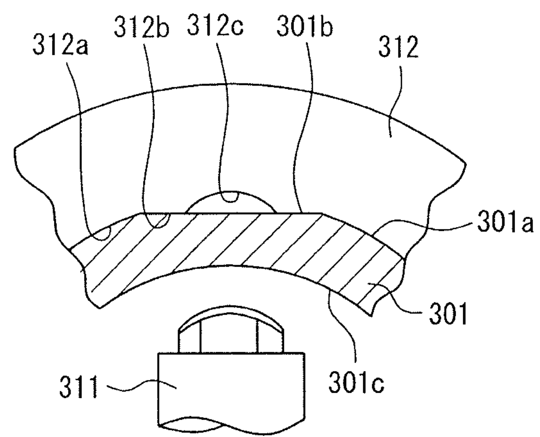
F I G. 2 7A
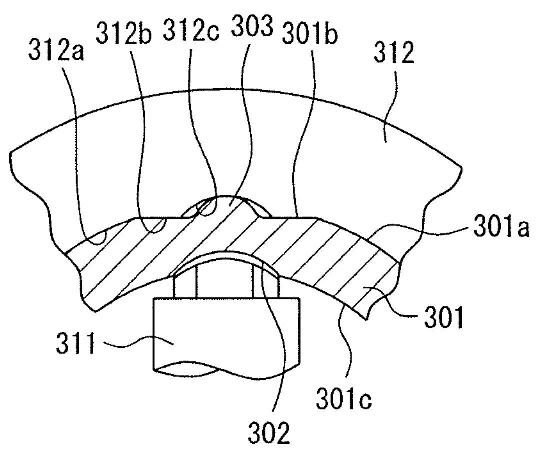
F I G. 2 7B

F I G. 3 7
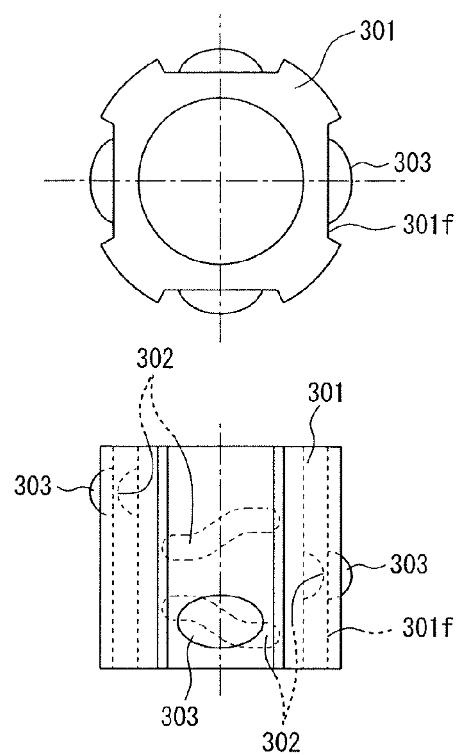
F I G. 3 8
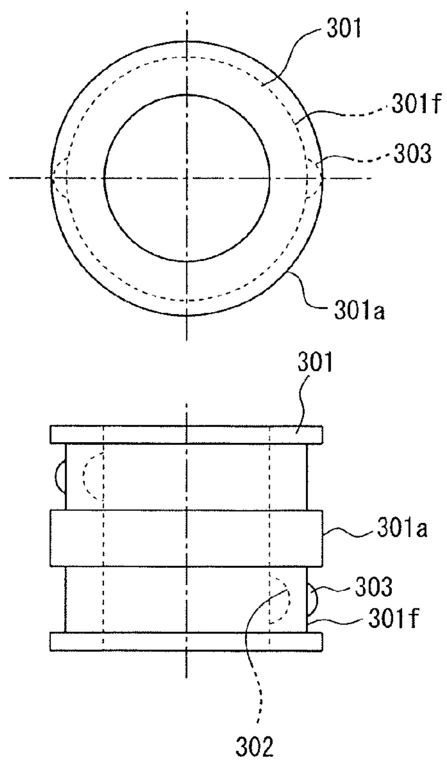

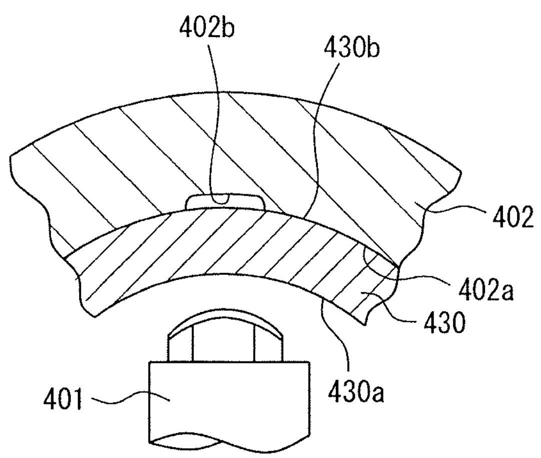
F I G. 3 9 A
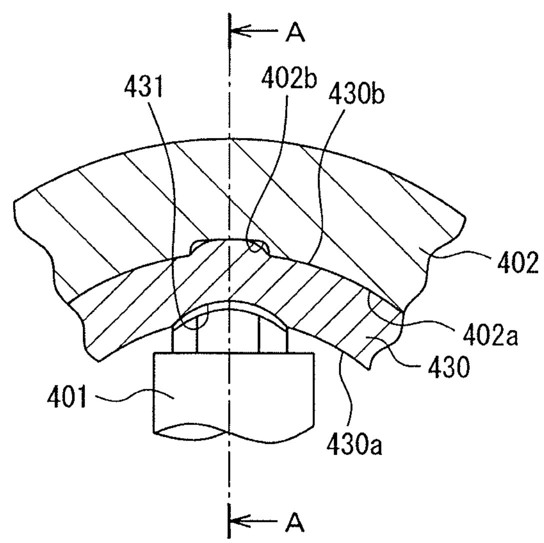
F I G. 3 9 B

*F I G. 4 0*
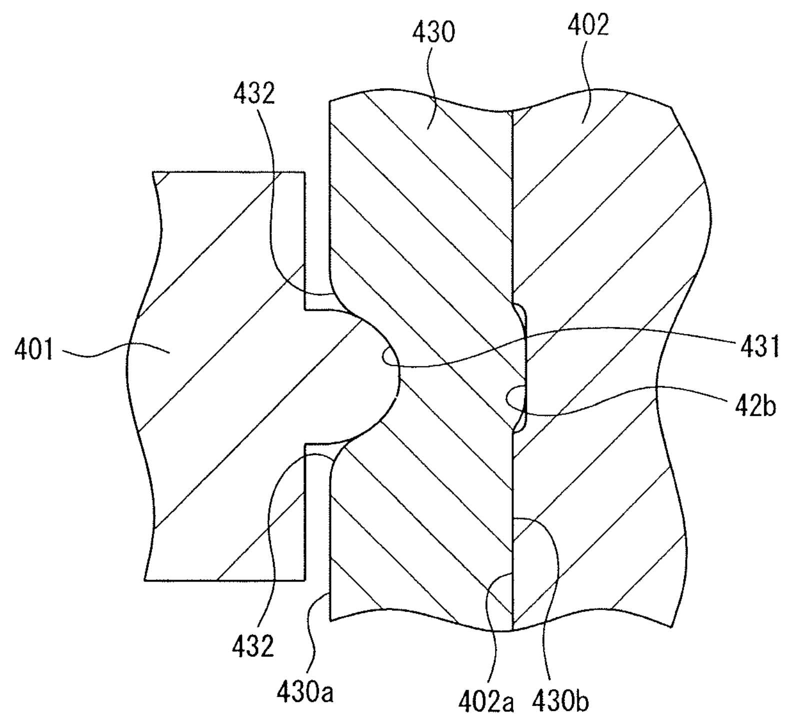
*F I G. 4 1*
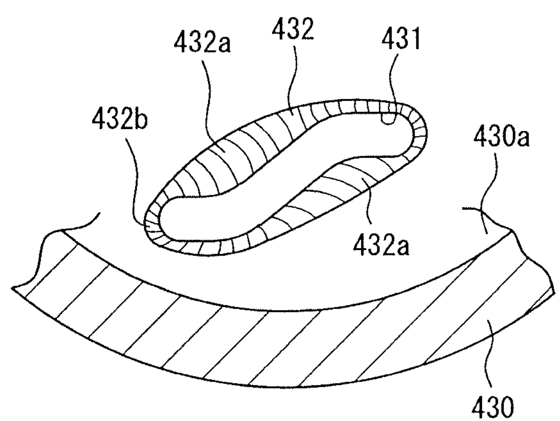

*F I G. 4 2*
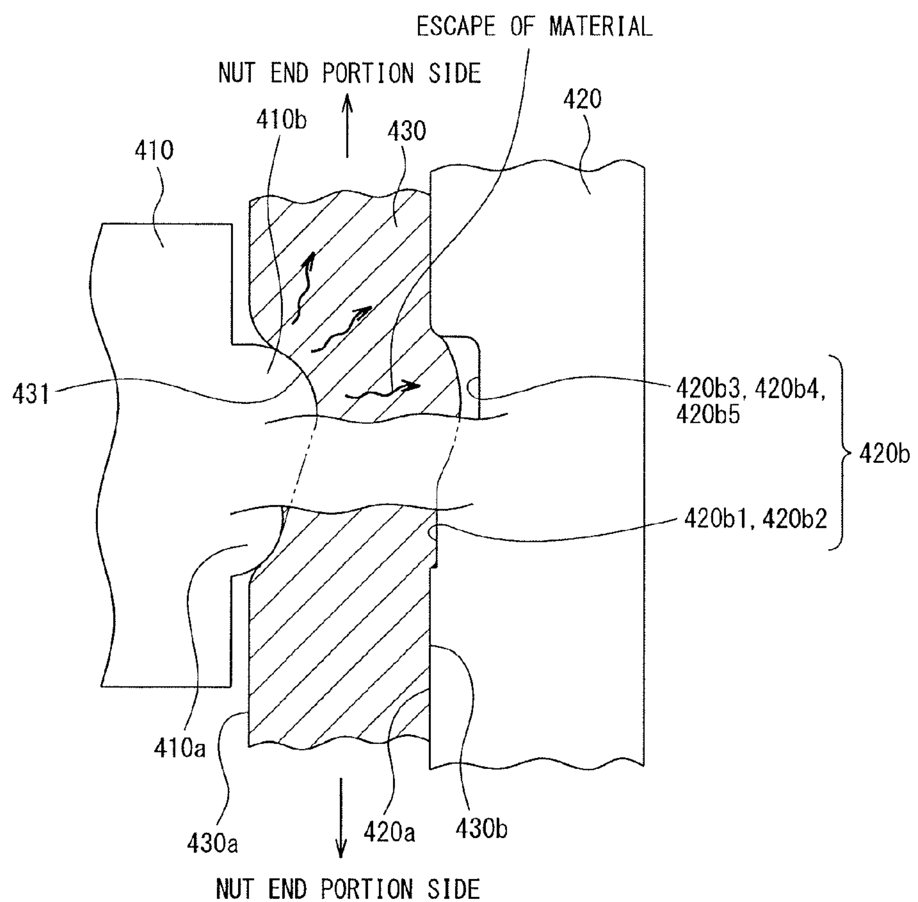
*F I G. 4 3*
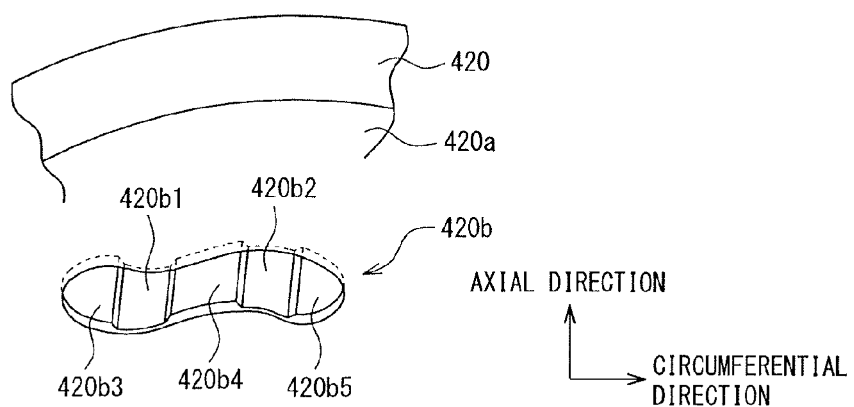

F I G. 4 6
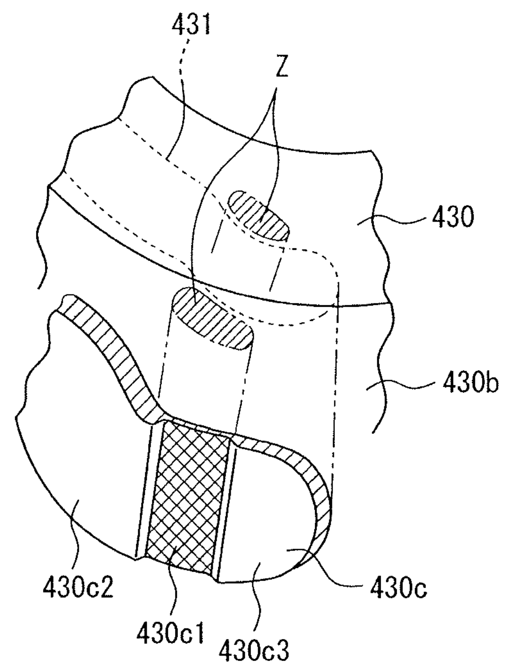
F I G. 4 7
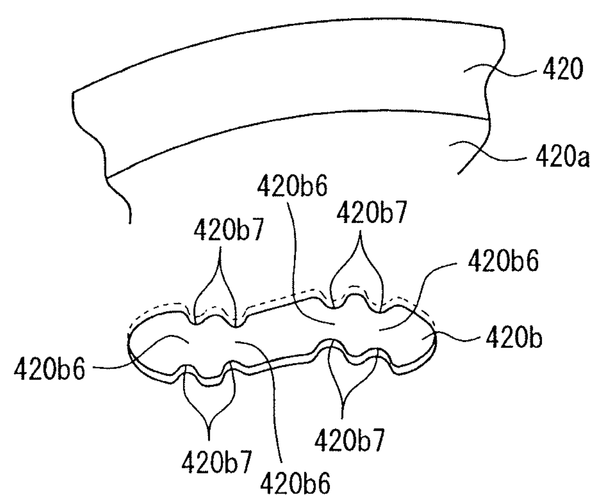

F I G. 6 1
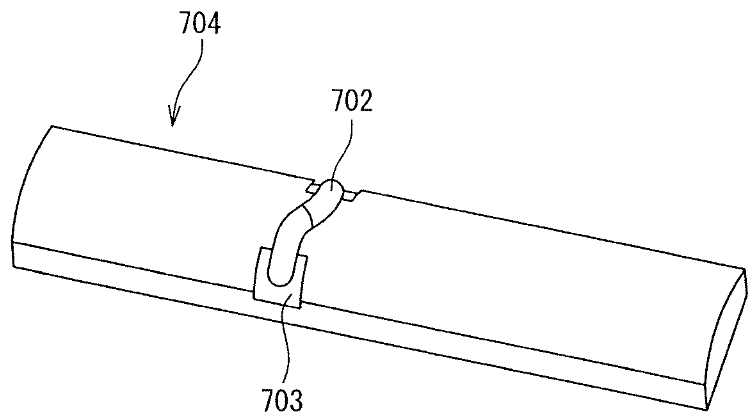
F I G. 6 2
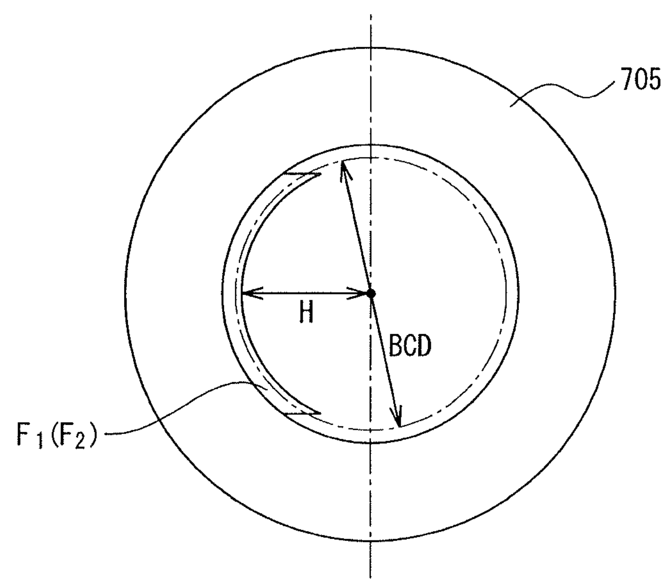

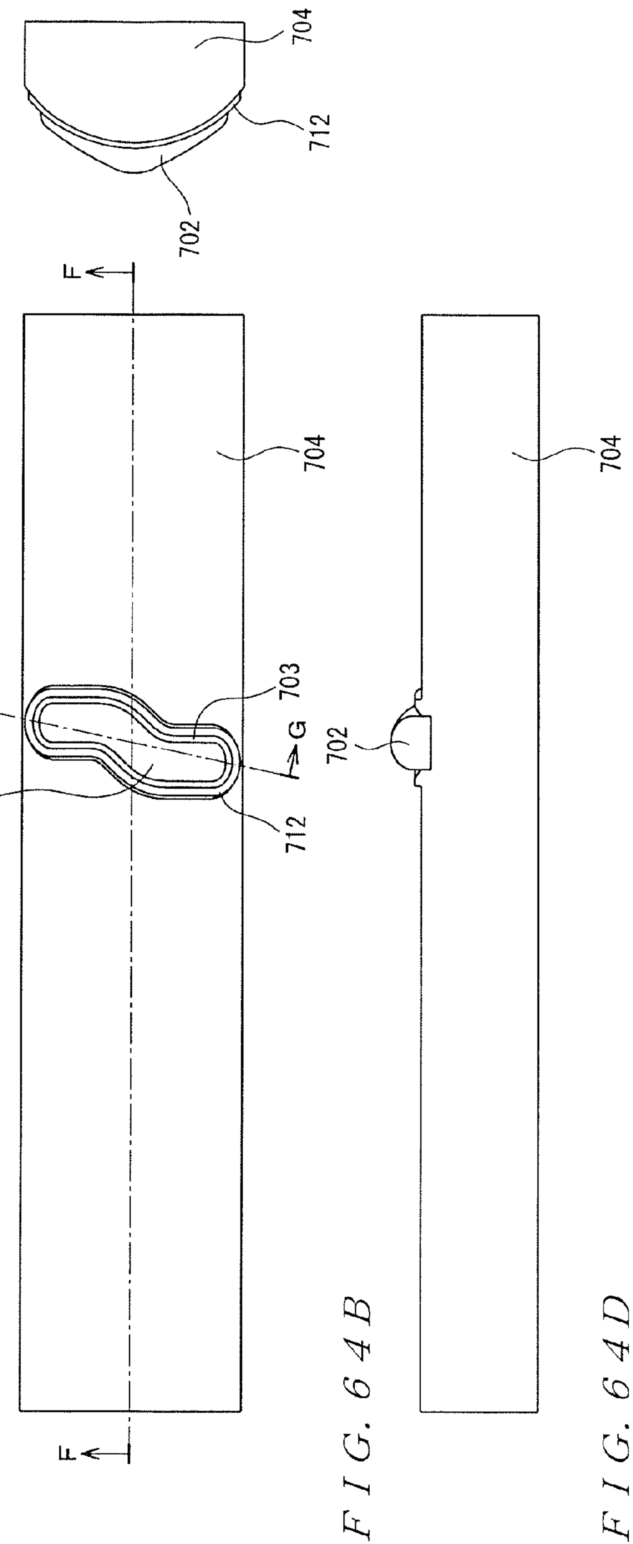
F I G. 6 4 C
704
712
702
F
F
704
G
G
703
702
712
F I G. 6 4 A
704
702
F I G. 6 4 B
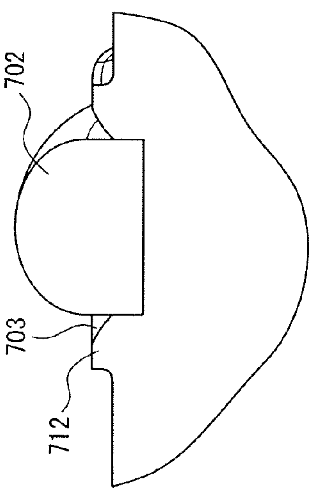
702
703
712
F I G. 6 4 D

*F I G. 6 7*
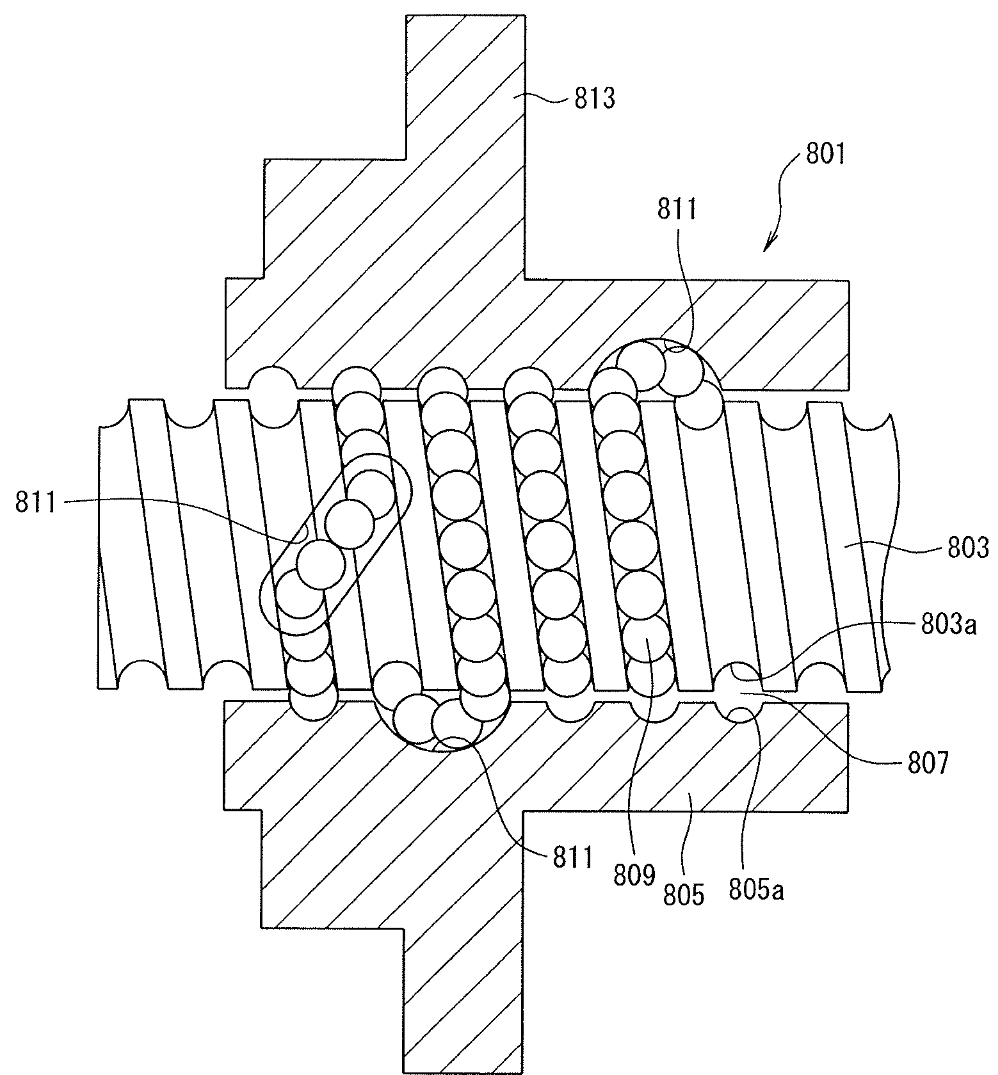

F I G. 7 4
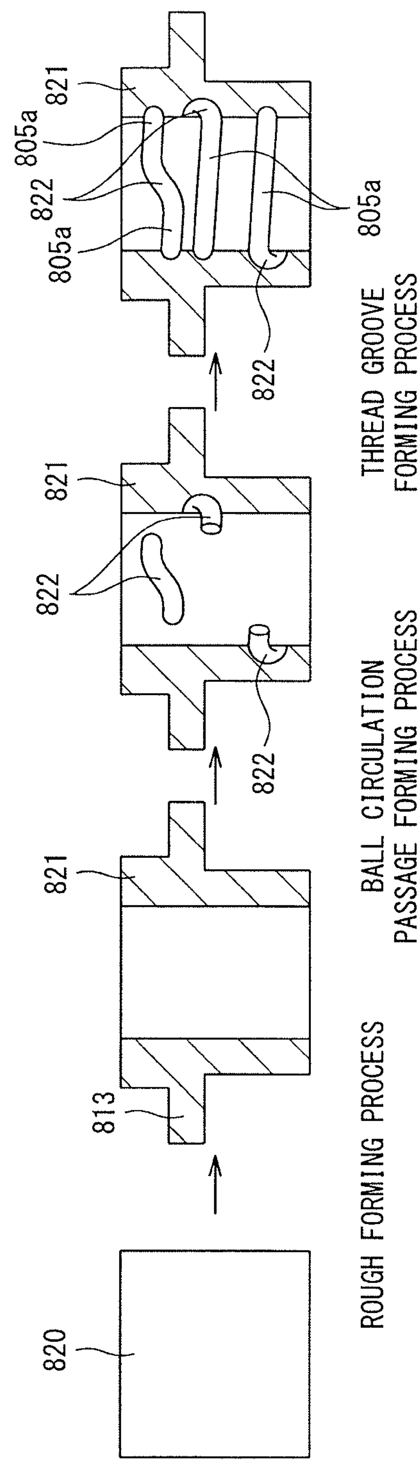

F I G. 7 5
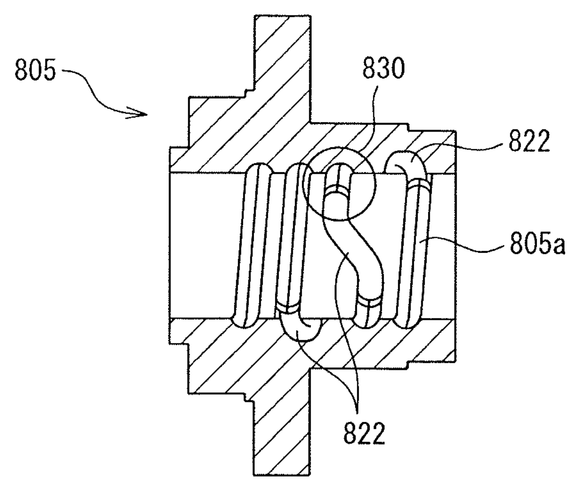

F I G. 7 6
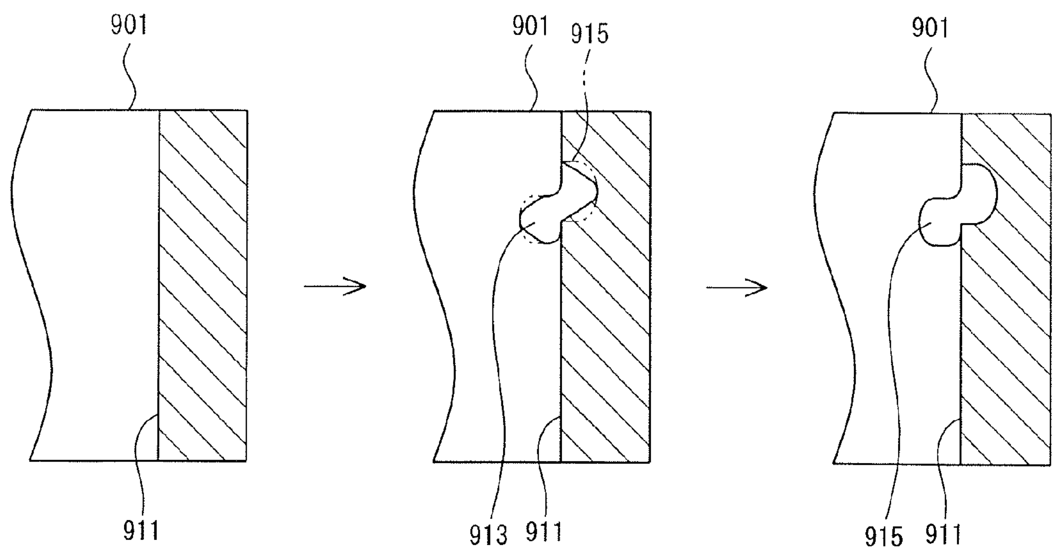
F I G. 7 7
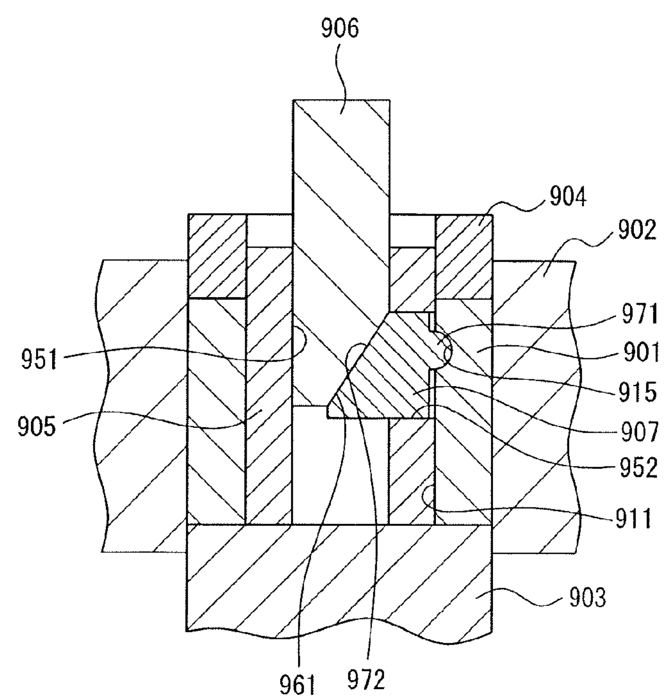

*F I G. 8 4*
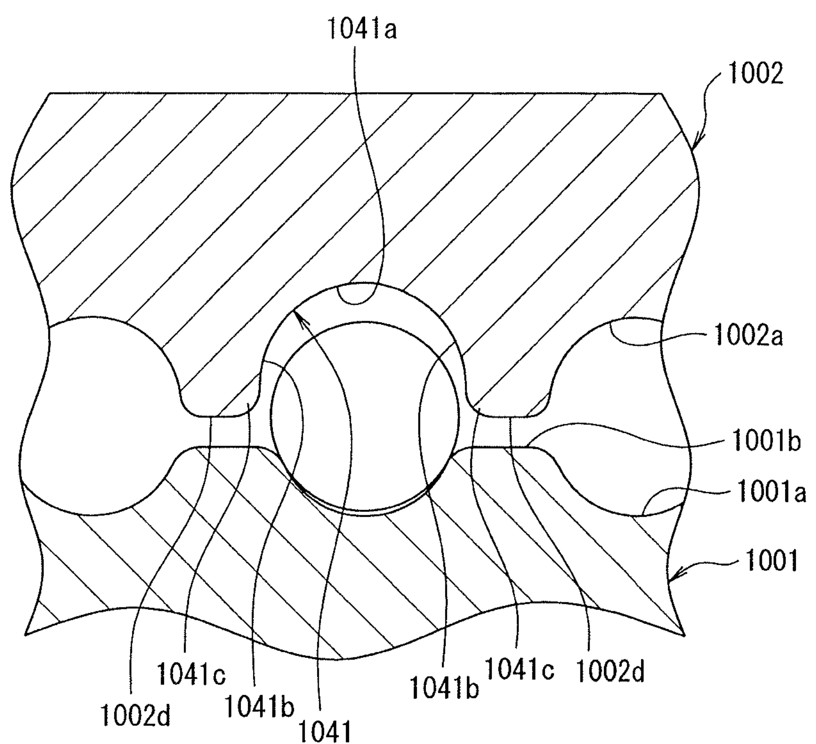

F I G. 8 5 A
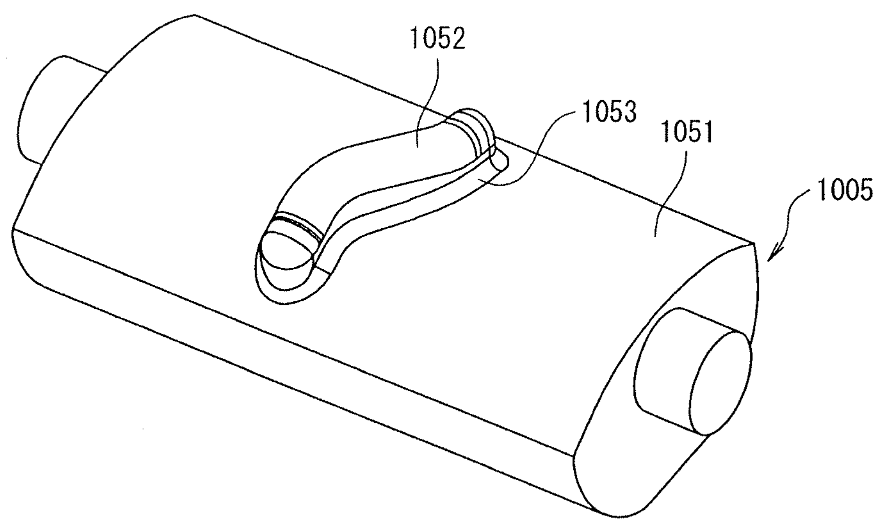
F I G. 8 5 B
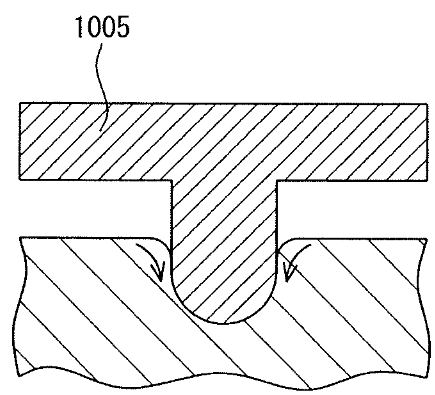

F I G. 8 8
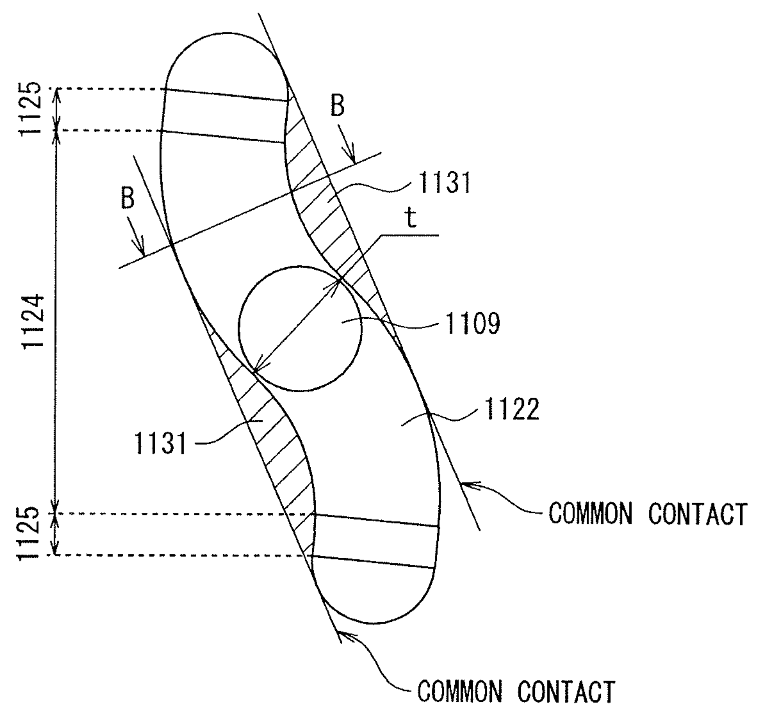
F I G. 8 9
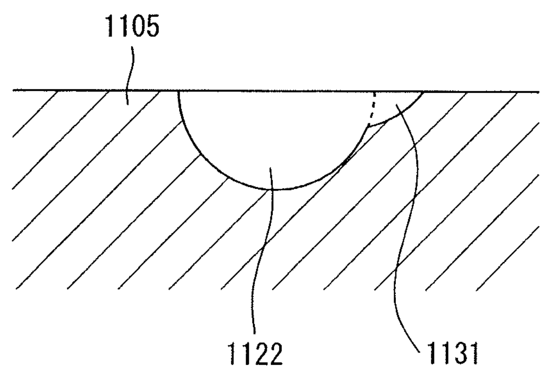

F I G. 9 1
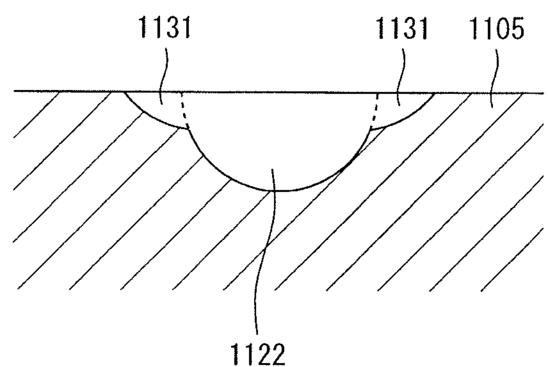
F I G. 9 2
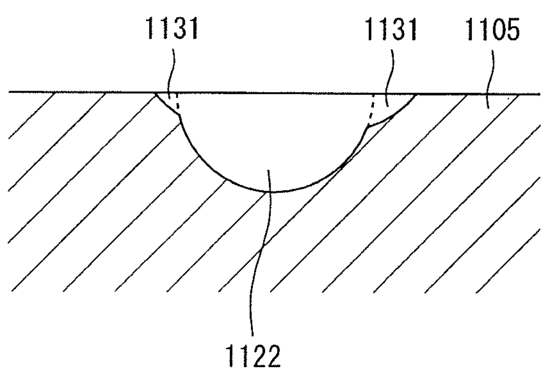

F I G. 9 4
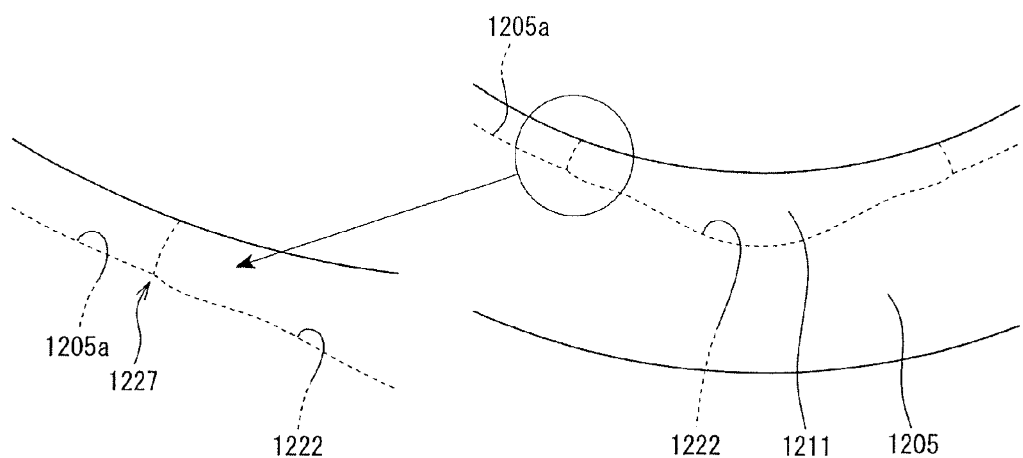
F I G. 9 5
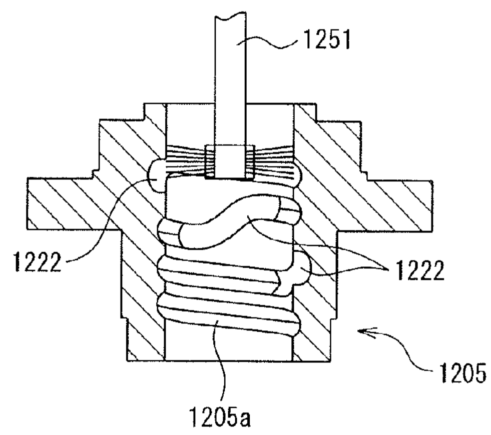

METHOD FOR MANUFACTURING NUT FOR BALL SCREW AND BALL SCREW

TECHNICAL FIELD

The present invention relates to a method for manufacturing a nut constituting a ball screw. The present invention also relates to a ball screw.

BACKGROUND ART

A ball screw is provided with: a nut having an inner circumferential surface on which a spiral groove is formed; a threaded shaft having an outer circumferential surface on which a spiral groove is formed; balls loaded in a raceway between the spiral groove of the nut and that of the threaded shaft; and a ball return passage for returning the balls from an end point of the raceway to a start point thereof. The ball screw is a device such that the balls are rolling in the raceway to make the nut relatively move with respect to the threaded shaft.

Such ball screws are used in not only positioning devices of general industrial machinery but also electrical actuators mounted on vehicles such as automobiles, motorcycles, or vessels.

As to the ball return passage in the ball screw, there are a circulation tube type of the ball return passage and a deflector type thereof. In the case of the deflector type, a deflector having a concave constituting the ball return passage is fit in a through hole of the nut. In contrast, Patent Document 1 listed below describes that the concave (circulation groove) constituting the ball return passage is directly arranged on the inner circumferential surface of the nut blank by plastic working. The method for forming it will be described with reference to FIG. 19.

Firstly, prepared is a died provided with a cylindrical working head 30 having convexes 37 and 38 each having a letter S shape to correspond to the shape of a circulation groove. Then, a nut blank 1 is disposed on a table 200 with its axial direction set to the horizontal, the working head 30 is disposed inside the nut blank 1, the convexes 37 and 38 are faced upwardly, and a base end portion 30*a* and a front end portion 30*b* are secured. Next, in this state, pressure is applied onto a top member 20 of the die to press it down. The convexes 37 and 38 are pressed against an inner circumferential surface 11 of the nut blank 1 to plastically deform the inner circumferential surface 11 of the nut blank 1.

PRIOR ART DOCUMENTS

Patent Documents

Patent Document 1: JP 2008-281063 A
Patent Document 2: JP 2010-87071 A
Patent Document 3: JP 2010-275706 A
Patent Document 4: JP 2003-307263 A
Patent Document 5: JP 2000-297854 A
Patent Document 6: JP 2005-321059 A
Patent Document 7: JP 2008-267523 A
Patent Document 8: JP 2007-146874 A
Patent Document 9: JP 2004-108538 A
Patent Document 10: JP 2003-166616 A
Patent Document 11: JP 2004-3631 A
Patent Document 12: JP 2008-281064 A

SUMMARY OF THE INVENTION

Problem to be Solved

It is to be noted, however, that the method described in Patent Document 1 has a problem in that when the axial dimension of the nut is long and the inner diameter is small, the working head of the die is elongated and the strength is insufficient and it is easily damaged.

An object of the present invention is to provide a method of forming the concave without damaging a die, and a ball screw provided with a nut obtained by the method, as a method for forming a concave constituting a ball return passage directly on an inner circumferential surface of a nut blank by plastic working, even in a case where a nut having a long axial dimension and a small diameter is manufactured.

Solution to the Problem

In order to solve the above problems, embodiments of the present invention have the following configurations. That is, according to an aspect of the present invention, there is provided a method for manufacturing a nut for a ball screw, the ball screw comprising: the nut having an inner circumferential surface on which a spiral groove is formed; a threaded shaft having an outer circumferential surface on which a spiral groove is formed; balls loaded in a raceway between the spiral groove of the nut and that of the threaded shaft; and a ball return passage arranged as a concave on the inner circumferential surface of the nut for returning the balls from an end point of the raceway to a start point of the raceway, the balls being rolling in the raceway to make the nut relatively move with respect to the threaded shaft, wherein the concave is formed on the inner circumferential surface of the nut blank by plastic working in a pressing method by use of a die of a cam mechanism, the cam mechanism comprising: a cam driver inserted into a cylindrical nut blank and moving in an axial direction of the nut blank at the time of processing; and a cam slider disposed between the nut blank and the cam driver and provided with a convex corresponding to the concave, a movement of the cam driver causing the convex to move in a radial direction of the nut.

In the method for manufacturing the nut for the ball screw according to an aspect of the present invention, preferably, a plurality of the concaves are formed on the inner circumferential surface of the nut, and at least one of a plurality of the convexes corresponding to the plurality of the concaves is formed on the cam slider.

In addition, preferably, as the die, the cam driver includes a load receiving surface parallel to the axial direction of the nut, and pressing is performed by use of the die having another member, other than the cam driver, provided with a load receiving surface to be in contact with the load receiving surface. In this situation, more preferably, as the die, the cam slider is held by a holding member, disposed between the cam driver and the nut blank, and pressing is performed by use of the die in which the holding member is provided with the load receiving surface.

Furthermore, according to an aspect of the present invention, in the method for manufacturing the nut for the ball screw, the plurality of the concaves are formed in a uniform manner by changing a movement amount of the plurality of the convexes, formed on a plurality of the cam sliders, moving outwardly in the radial direction of the nut blank.

Moreover, according to an aspect of the present invention, in the method for manufacturing the nut for the ball screw, by pressing method by use of the die of the cam mechanism including the cam driver, the cam slider, and a restraining member for restraining both end surfaces in the axial direction and an outer circumferential surface of the nut blank and having a depressed portion to correspond to the convex on an inner circumferential surface that receives the outer circumferential surface, the concave is formed on the inner circumferential surface of the nut blank by pressing the inner circumferential surface of the nut blank with the convex to protrude the outer circumferential portion of the nut into the depressed portion of the restraining member. In the nut manufactured in the above method, a projection may be arranged at a position corresponding to the concave of the outer circumferential surface of the nut. It is possible to produce a screw with the use of the above nut.

In addition, according to an aspect of the present invention, preferably, in the method for manufacturing the nut for the ball screw, a part of an outer circumferential surface of the nut is formed at a position having a distance from a central axis of the nut to be shorter than a radius of another part having a circular shape on the outer circumferential surface of the nut, the convex is pressed into the inner circumferential surface of the nut blank to form a concave so as to form a projection projecting on the outer circumferential of the nut on the part of the outer circumferential surface of the nut, and in the part of the outer circumferential surface, the projection is arranged such that the distance from the central axis of the nut to be shorter than a radius of said another part having a circular shape.

Furthermore, preferably, forming of the concave permits a material in the nut to flow and flowing of the material is adjusted in accordance with a shape of the concave. In this situation, preferably, the flowing of the material to an outer circumference side or flowing of the material to an end portion side in the axial direction of the nut is adjusted in accordance with the shape of the concave.

Moreover, according to an aspect of the present invention, preferably, in the method for manufacturing the nut for the ball screw, the convex is pressed into the inner circumferential surface of the nut blank to form the concave, and a concave for shear droop for reducing the shear droop in the concave generated by plastic working with the convex is formed around the concave in the inner circumferential surface of the nut. In this situation, preferably, the concave for shear droop is formed adjacent to a part where the concave curves. Additionally, preferably, a shape and a depth of the concave for shear droop are determined in accordance with an amount of the shear droop.

Furthermore, according to an aspect of the present invention, preferably, in the method for manufacturing the nut for the ball screw, an excess material portion for reducing shear droop of the concave is provided to protrude from the inner circumferential surface having a circular shape of the nut blank, and the convex is pressed into the excess material portion to form the concave. In this situation, preferably, the excess material portion has a shape corresponding to that of the concave.

Moreover, according to an aspect of the present invention, after a base concave to be included in a cross-sectional arc of the concave is formed at a position where the concave is to be formed on the inner circumferential surface of the cylindrical nut blank, the cam slider inserted into the nut blank is moved outwardly in the radial direction of the nut with restraining the outer circumferential surface and an end surface in the axial direction of the nut blank to form the concave.

In addition, according to an aspect of the present invention, preferably, there is provided a method for manufacturing the nut for the ball screw, the method comprising: a ball return passage forming process of forming the concave in the method as described above; a spiral groove forming process of forming the spiral groove to be in contact with an end portion of the concave on the inner circumferential surface of the nut; and a burr removing process of removing burr by performing at least one of brushing and blasting at a boundary portion between the concave and the spiral groove.

Furthermore, according to another aspect of the present invention, there is provided a first ball screw comprising: a nut having an inner circumferential surface on which a spiral groove is formed; a threaded shaft having an outer circumferential surface on which a spiral groove is formed; balls loaded in a raceway between the spiral groove of the nut and that of the threaded shaft; and a ball circulation groove for returning the balls from an endpoint of the raceway to a start point of the raceway, the balls being rolling in the raceway to make the nut relatively move with respect to the threaded shaft, wherein the nut may be manufactured in the method for manufacturing the nut according to one aspect of the present invention, and wherein at least one of corner portions defined by both of side surfaces of the ball circulation passage and a surface axially extending and continuous with each of the side surfaces is rounded.

Moreover, according to another aspect of the present invention, there is provided a second ball screw comprising: a threaded shaft having an outer circumferential surface on which a spiral groove is formed; a nut having an inner circumferential surface on which a spiral groove opposing the spiral groove of the threaded shaft is formed; a plurality of balls rotatably loaded in a ball rolling passage having a spiral shape provided by both of the spiral grooves; and a ball circulation passage for returning the balls from an endpoint of the ball rolling passage to a start point of the ball rolling passage, wherein the nut may be manufactured in the method for manufacturing the nut according to one aspect of the present invention, wherein the ball circulation passage includes a concaved groove formed by concaving a groove on a part of the inner circumferential surface of the nut, and a lubricant reservoir capable of holding a lubricant, and wherein the lubricant reservoir is made of a dented portion by concaving a groove on a part of an inner surface of the concaved groove.

In the second ball screw according to another aspect of the present invention, preferably, the ball circulation passage includes both of end portions that are connecting portions with the ball rolling passage and a middle portion between both of the end portions, and wherein as to a cross-sectional area of the lubricant reservoir cut along a plane perpendicular to a lengthwise direction of the ball circulation passage, the cross-sectional area of a part adjacent to the middle portion is larger than that of a part adjacent to each of the end portions.

In addition, preferably, the ball circulation passage is curved, and as to a cross-sectional area of the lubricant reservoir cut along a plane perpendicular to a lengthwise direction of the ball circulation passage, the cross-sectional area of the lubricant reservoir arranged on the inside in a radial direction of a curve of the ball circulation passage is larger than that of the lubricant reservoir arranged on the outside in the radial direction of the curve of the ball circulation passage.

Furthermore, preferably, the concaved groove constituting the ball circulation passage and the dented portion constituting the lubricant reservoir are formed at the same time by forging.

Moreover, according to another aspect of the present invention, there is provided a third ball screw comprising the nut manufactured in the method for manufacturing the nut for the ball screw as described above, wherein at least apart of a lengthwise direction of the ball return passage has a substantially letter V shaped cross-section, when the ball return passage is cut along a plane perpendicular to the lengthwise direction.

Furthermore, according to another aspect of the present invention, there is provided a fourth ball screw comprising the nut manufactured in the method for manufacturing the nut for the ball screw as described above, wherein a flange protruding inwardly in the radial direction from a marginal edge portion of the concave at a connecting part of the spiral groove of the nut and the concave is provided.

In the fourth ball screw according to another aspect of the present invention, preferably, both end portions of the concave that is a connecting part with the spiral groove of the nut constitutes a straight shaped ball entering portion, and the flange is arranged at least at a marginal edge portion of the straight shaped ball entering portion.

Additionally, preferably, a distance H between an end of the flange and a radial center of the nut is equal to or smaller than ½ of ball circle diameter (BCD), and the flange is arranged not to be in contact with the outer circumferential surface of the threaded shaft.

Advantageous Effects of the Invention

According to a method of the present invention, it is possible to form a concave without damaging a die, even in a case where a nut having a long axial dimension and a small diameter is manufactured, as a method of directly forming a ball return passage directly on an inner circumferential surface of a nut blank by plastic working.

BRIEF DESCRIPTION OF THE DRAWINGS

FIG. 1 is a view illustrative of a first example of a first embodiment of the present invention;

FIG. 2A is a plan view illustrative of a fitting state of a cam slider and a cam driver used in the first example of the first embodiment; FIG. 2B is a perspective view illustrative of the cam slider; and FIG. 2C is a perspective view illustrative of the cam driver;

FIG. 4 is a view illustrative of a second example of the first embodiment of the present invention;

FIG. 5A is a plan view illustrative of a cam slider used in the second example of the first embodiment; FIG. 5B is a perspective view illustrative of the cam slider; and FIG. 5C is a perspective view illustrative of the cam driver;

FIG. 7 is a view illustrative of a third example of the first embodiment of the present invention;

FIG. 8 is a perspective view illustrative of a cam driver used in the third example of the first embodiment;

FIG. 9A is a plan view illustrative of a cylindrical member used in the third example of the first embodiment; FIG. 9B is a cross-sectional view taken along line A-A; and FIG. 9C is a plan view illustrative of the cam slider;

FIG. 10A is a view illustrative of a first modification of the third example of the first embodiment; FIG. 10B is a plan view illustrative of a holding member of the cam slider;

FIG. 17 is a view illustrative of a modification of the fourth example of the first embodiment; FIG. 17A is a plan view illustrative of a holding member of the cam slider; and FIG. 17B is a cross-sectional view taken along line A-A;

FIG. 18 is a view illustrative of a modification of the fourth example of the first embodiment of the present invention;

FIG. 20 is a view illustrative of a first example of a second embodiment of the present invention;

FIG. 21 is a view illustrative of a second example of the second embodiment of the present invention;

FIG. 26 is a view illustrative of a shape of a nut blank constituting a S groove in the method for manufacturing the ball screw nut in the fourth embodiment;

FIG. 27 is a view illustrative of the method of manufacturing the ball screw nut in the fourth embodiment, that is a method of forming a letter S shaped circulation groove on an inner circumferential surface of the nut blank by plastic working with a punch;

FIG. 37 is a front view and a longitudinal cross-sectional view illustrative of the shape of the nut blank in which the letter S shaped groove has been formed in another modification of the method for manufacturing the ball screw nut in the fourth embodiment;

FIG. 38 is a front view and a longitudinal cross-sectional view illustrative of the shape of the nut blank in which the letter S shaped groove has been formed in another modification of the method for manufacturing the ball screw nut in the fourth embodiment;

FIG. 39 is a view illustrative of the method of manufacturing the letter S shaped circulation groove on the inner circumferential surface of the nut by plastic working with a punch;

FIG. 40 is a view illustrative of a mechanism of generating shear droop;

FIG. 41 is another view illustrative of a mechanism of generating the shear droop;

FIG. 42 is a view illustrative of a configuration of realizing the method of manufacturing the ball screw nut in a fifth embodiment;

FIG. 43 is a view illustrative of a material flowing portion arranged on an inner circumferential surface of a restraining block;

FIG. 46 is a view illustrative of operations and effects of the fifth embodiment;

FIG. 47 is a view illustrative of a modification of the fifth embodiment;

FIG. 61 is a perspective view illustrative of a jig for forming a letter S shaped circulation passage in the ball screw in the second example of the eighth embodiment;

FIG. 62 is a side view illustrative of a relationship between a height of a flange and BCD in the ball screw in the third example of the eighth embodiment;

FIG. 64A is a top view illustrative of a jig constituting the letter S shaped circulation passage in the ball screw in a fifth example of the eighth embodiment; FIG. 64B is a cross-sectional view taken along line F-F in FIG. 64A; and FIG. 64C is an enlarged cross-sectional view of substantial parts in FIG. 64B;

FIG. 67 is a cross-sectional view illustrative of a configuration of a ball screw in accordance with a ninth embodiment;

FIG. 74 is a process drawing illustrative of a process for manufacturing the ball screw;

FIG. 75 is a cross-sectional view of a nut illustrative of a boundary portion between the ball circulation passage and the ball rolling passage;

FIG. 76 is a view illustrative of a first method in a tenth embodiment;

FIG. 77 is a view illustrative of the method of forming a single ball circulation groove in a method of forging with a punch, employed in the first method in the tenth embodiment;

FIG. 84 is a cross-sectional view taken along line A-A of FIG. 83;

FIG. 85 is a perspective view illustrative of components of a die used in an example of the method for manufacturing the nut of FIG. 84;

FIG. 88 is a view illustrative of a configuration of a ball screw in a first example of a twelfth embodiment, and is an enlarged view when a concaved groove and a concave are viewed in arrow A of FIG. 68;

FIG. 89 is a cross-sectional view taken along line B-B of the concaved groove of FIG. 88;

FIG. 91 is a cross-sectional view taken along line C-C of the concaved groove and the concave of FIG. 90;

FIG. 92 is a cross-sectional view taken along line D-D of the concaved groove and the concave of FIG. 90;

FIG. 94 is a view illustrative of a configuration of a ball screw in a thirteenth embodiment, and is an enlarged view of the nut illustrative of a boundary from which burr has been removed;

FIG. 95 is a view illustrative of a burr removing process by brushing;

DESCRIPTION OF EMBODIMENTS

Figure 3A:
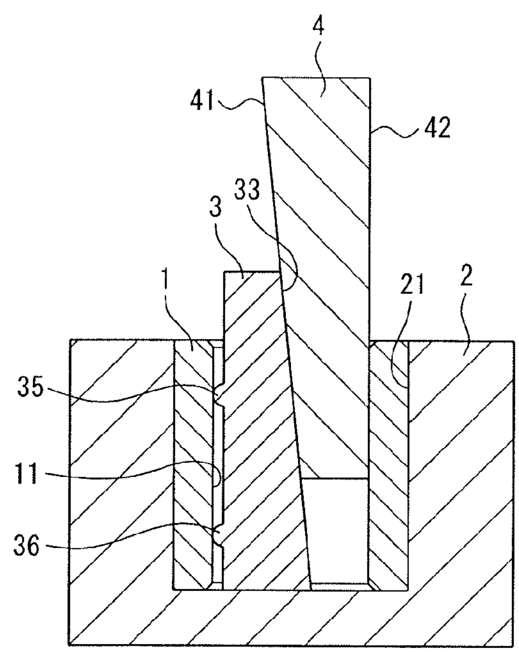
FIG. 3 is a view illustrative of a modification of the first example of the first embodiment of the present invention.

Embodiments of method of manufacturing a nut for a ball screw and those of the ball screw will be described in detail with reference to drawings.

(First Embodiment)

(First Example)

The die described in a first example is, referring to FIG. 1, provided with: a blank holder 2 having a concave 21 for holding a nut blank 1; and a cam slider 3 and a cam driver 4 disposed at the inside of the nut blank 1.

Referring now to FIG. 2A and FIG. 2B, the cam slider 3 is a substantially semicircular column shaped member having an outer circumferential surface 31 and a plane 32 parallel to the axial direction. The diameter of a circle constituted with the outer circumferential surface 31 is slightly smaller than that of a circle 11*a* constituted with an inner circumferential surface 11 of the nut blank 1. There is provided an inclined surface 33, extending in the axial direction at the midpoint of the radial direction, at the plane 32 of the cam slider 3. The inclined surface 33 corresponds to a plane connecting a bottom surface line 34*a* of a concave 34 at one end (upper end) in the axial direction with a line 32*d* forming a lower end of the plane 32. Additionally, a letter S shaped convex 35 corresponding to the letter S shaped concave constituting the ball return passage is arranged on the outer circumferential surface 31 of cam slider 3.

Referring now to FIG. 2C, the cam driver 4 is a long plate shaped member having one side surface 41 that is an inclined surface having the same inclination with that of the inclined surface 33 of cam slider 3. The other side surface 42 is a circumferential surface along the circle 11*a* forming the inner circumferential surface 11 of the nut blank 1. The axial dimension of the cam driver 4 is greater than that of cam slider 3. Additionally, the cam driver 4 is slightly thinner than the thickness corresponding to an opening width (size between both side surfaces of the inclined surface 33) of the concave 34 of cam slider 3.

The inclined surface 31 of the cam slider 3 and the inclined surface 41 of the cam driver 4 constitute a cam mechanism of the die.

By using this die, the letter S shaped concave constituting the ball return passage is formed on the inner surface of the nut blank 1 in the following method.

Firstly, the nut blank 1 is disposed in the concave 21 of the blank holder 2, and the cam slider 3 is inserted into the inner circumferential surface 11 of the nut blank 1 with the concave 34 facing upwardly and the letter S shaped convex 35 facing the inner circumferential surface 11. Next, the cam driver 4 is inserted between the cam slider 3 and the nut blank 1. On this occasion, the side surface 41 of the cam driver 4 is fit into the concave 34 of the cam slider 3, so that the inclined surface 33 of the cam slider 3 and the inclined side surface 41 of the cam driver 4 are brought into contact with each other. FIG. 1A illustrates this state.

Then, the cam driver 4 is pressed under pressure from the top thereof, a force is transmitted from the inclined side surface 41 of the cam driver 4 to the inclined surface 33 of the cam slider 3. In accordance with this, a downward force of the cam driver 4 is transformed into a force of moving the cam slider 3 outwardly in the radial direction, and then the letter S shaped convex 35 arranged in the cam slider 3 pushes the inner circumferential surface 11 of the nut blank 1 for plastic deformation. FIG. 1B illustrates this state.

Thus, a letter S shaped concave 15 constituting the ball return passage is formed on the inner circumferential surface 11 of the nut blank 1.

Therefore, according to the method of the present embodiment, it is possible to arrange the letter S shaped concave 15 without breaking the cam driver 4, even when a nut that has a long axial dimension and a small diameter.

Further, when two letter S shaped concaves are arranged on the inner circumferential surface 11 of the nut blank 1, one letter S shaped concave 15 is arranged in the above-described method. Then, after the cam driver 4 and the cam slider 3 are pulled out, another cam slider 3 having the letter S shaped convex 35 arranged at a different position in the axial direction is used, the cam driver 4 is inserted again, and the above-described method is performed. This will be repeated in a case where three or more letter S shaped concaves are arranged. Thus, multiple letter S shaped concaves are arranged at different positions in the axial direction of the nut blank 1 and in the circumferential direction of the inner circumferential surface 11.

Figure 3B:
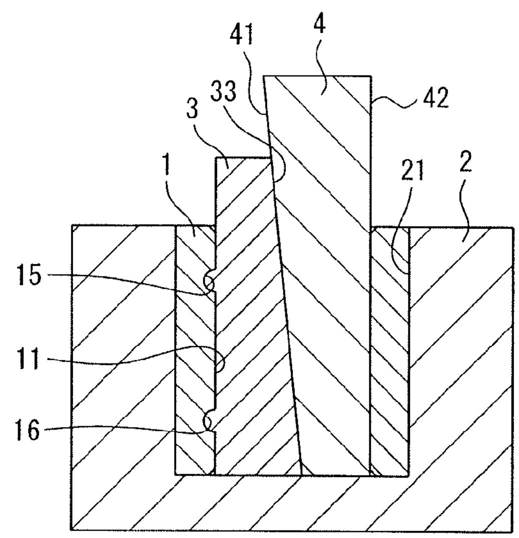

In addition, the provision of multiple letter S shaped convexes on the outer circumferential surface of the cam slider 3 enables the formation of multiple letter S shaped concaves by performing a one-time operation of pressing the cam driver 4 from the top thereof. In the example of FIG. 3, two letter S shaped convexes 35 and 36 are provided on the outer circumferential surface of the cam slider 3 so that they are different in the axial direction of the nut blank 1 and are same in the circumferential direction of the inner circumferential surface 11. Thus, two letter S shaped concaves 15 and 16 are formed at different positions in the axial direction of the inner circumferential surface 11 of the nut blank 1 and at same positions in the circumferential direction thereof.

(Second Example)

The die described in a second example is, referring to FIG. 4, provided with: the blank holder 2 having the concave 21 for holding the nut blank 1; a pair of cam sliders 3 disposed at the inside of the nut blank 1; and the cam driver 4 interposed between both of the cam sliders 3.

Each cam slider 3, referring now to FIG. 5A and FIG. 5B, is a substantially semicircular column shaped member having the outer circumferential surface 31 with a diameter slightly smaller than an inner diameter of the nut blank 1, and a line 32 forming an opposite surface of the outer circumferential surface 31 is smaller than the inner diameter of the nut blank 1. Accordingly, as illustrated in FIG. 5A, when the outer circumferential surfaces 31 of both of the cam sliders 3 are arranged to correspond to a circle 11*a* forming the inner circumferential surface 11 of the nut blank 1, a gap 32*a* is generated between the lines 32 of both of the cam sliders 3.

There is provided the inclined surface 33 extending in the axial direction, at the middle of the line 32, on opposing surfaces 32*b* (surfaces along the lines 32) of both of the cam sliders 3. Grooves 39 extending in the axial direction are arranged on both sides of the inclined surface 33. The inclined surface 33 corresponds to a plane connecting the bottom surface line 34*a* of the concave 34 at one end (upper end) in the axial direction and the line 32 at the lower end. Additionally, the letter S shaped convexes 35 and 36 respectively corresponding to the letter S shaped concaves of the two ball return passages are respectively arranged on the outer circumferential surfaces 31 of the cam sliders 3, respectively.

Referring now to FIG. 5C, the cam driver 4 has a shape such that an inclined surface 41*a* inclined in the axial direction and a parallel surface 42*a* parallel in the axial direction are formed to have a concave shape at a pair of side surfaces parallel to each other of a long square pole, and side plate portions 43 each having a plate shape remain on both sides in the width direction of the inclined surface 41*a* and the parallel surface 42*a*. The inclined surface 41*a* of the cam driver 4 has an inclination and a width same with those of the cam slider 3. The plate thickness of the side plate portion 43 is slightly smaller than the width of the groove 39 in the cam slider 3.

That is, the cam driver 4 includes: a wedge shaped portion 41 composed of a pair of the inclined surfaces 41*a*; a plate shaped portion 42 composed of a pair of the parallel surfaces 42*a*; and a pair of the side plate portions 43. Since the thickness of the end portions on the plate shaped portion 42 side of the wedge shaped portion 41 (the size between the inclined surfaces 41*a*) is larger than that of the plate shaped portion 42, a step surface 44 exists at the boundary of the both. The end portion of the cam driver 4 has a letter H shape due to the plate shaped portion 42 and the side plate portions 43 on the both sides thereof.

The inclined surface 33 of the cam slider 3 and the inclined surface 41*a* of the cam driver 4 constitute a cam mechanism of the die.

There is arranged a through hole 22 having a letter H shape into which the letter H shaped end portion of the cam driver 4 is inserted at the middle of the bottom plate portion of the blank holder 2. In the letter H shaped through hole 22, the plate shaped portion 42 at the end portion of the cam driver 4 is inserted between wall surfaces 22*a* corresponding the lateral bar of the letter H, and the side plate portion 43 of the cam driver 4 is inserted between wall surfaces 22*b* corresponding to longitudinal bars of the letter H.

By using the above-described die, the letter S shaped concave of the ball return passage on the inner surface of the nut blank 1 will be formed in the following method.

Firstly, the nut blank 1 is arranged at the concave 21 of the blank holder 2, and the pair of cam sliders 3 are inserted into the nut blank 1 so that both of the inclined surfaces 33 are opposed to each other. Next, the cam driver 4 is inserted between the concaves 34 of both of the cam sliders 3 from the plate shaped portion 42 side so as to insert the end of the plate shaped portion 42 into the through hole 22. FIG. 4A illustrates this state.

Subsequently, when the cam driver 4 is pushed under pressure from the top thereof, a force is transmitted from the inclined surface 41*a* of the cam driver 4 to the inclined surface 33 of the cam slider 3. In accordance with this, a downward force of the cam driver 4 is converted into a force of moving each cam slider 3 outwardly in the radial direction, and the letter S shaped convexes 35 and 36 respectively provided on the cam sliders 3 pushes the inner circumferential surface 11 of the nut blank 1 for plastic deformation. FIG. 4B illustrates this state.

Thus, the letter S shaped concaves 15 and 16 of two ball return passages are provided on the inner circumferential surface 11 of the nut blank 1. In such a situation, the letter H shaped end portion of the cam driver 4 is guided to the letter H shaped through hole 22 of the blank holder 2. In addition, the reactive force of the force in the radial direction transmitted to the cam slider 3 is received by the contact between the wall surfaces 22*a* of the blank holder 2 and the parallel surface 42*a* of the plate shaped portion 42, the contact between the wall surfaces 22*b* of the blank holder 2 and an end surface 43*a* of the plate width direction of the side plate portion 43, and the contact between a groove bottom portion 39*a* of the groove 39 in the cam slider 3 and the end surface 43*a* of the plate width direction of the side plate portion 43 in the cam driver 4 (received by surfaces vertical to the reactive force). Thus, the reactive force is received by an extension of the reactive force and in the vicinity in the axial direction thereof, thereby making a bending moment received by the cam driver 4 smaller. Furthermore, the reactive force of the force in the radial direction transmitted to the cam slider 3 does not work on the nut blank 1.

Therefore, according to the method in the second example, even when the nut having a long axial dimension and a small diameter is produced, the two letter S shaped concaves 15 and 16 can be formed at the same time without damaging the cam driver 4.

Figure 6A:
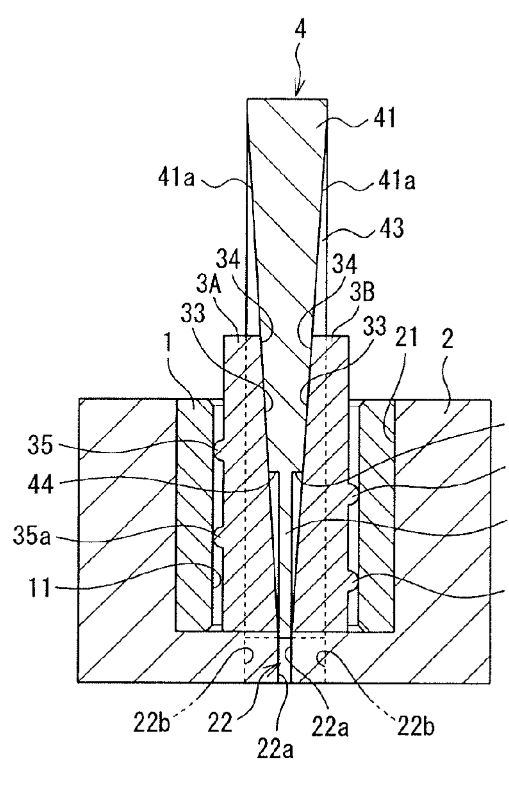
FIG. 6 is a view illustrative of a modification of the second example of the first embodiment of the present invention.
Figure 6B:
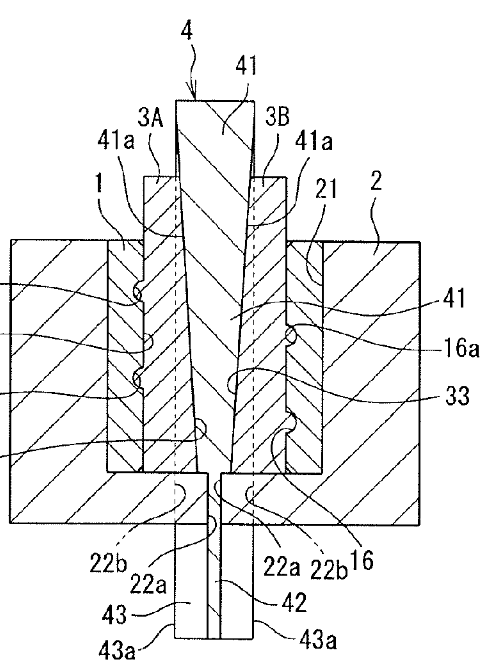

Moreover, since the structure of the die is simple and robust, it is suitable as a method for producing a large volume of the same products. Specifically, in the second example, a single letter S shaped convex 35 or 36 is arranged on the outer circumferential surface of each of the pair of the cam sliders 3. However, plural letter S shaped convexes may be arranged. In the example of FIG. 6, two letter S shaped convexes 35 and 35*a* are arranged on the outer circumferential surface of one cam slider 3A, whereas two letter S shaped convexes 36 and 36*a* are arranged on the outer circumferential surface of the other cam slider 3B.

The arrangements of the two letter S shaped convexes 35 and 35*a* of the cam slider 3A are different in the axial direction the nut blank 1, but are same in the circumferential direction of the inner circumferential surface 11. The arrangements of the two letter S shaped convexes 36 and 36*a* of the cam slider 3B are different in the axial direction the nut blank 1, but are same in the circumferential direction of the inner circumferential surface 11. Additionally, the arrangements of the four letter S shaped convexes 35, 35*a*, 36, and 36*a* are all different in the axial direction of the nut blank 1.

Thus, it is made possible to form four letter S shaped concaves 15, 15*a*, 16, and 16*a* on the inner circumferential surface 11 of the nut blank 1, by a one-time operation of pushing the cam driver 4 from the top thereof. In this example, the arranged positions of the four letter S shaped concaves 15, 15*a*, 16, and 16*a* are all different in the axial direction of the nut blank 1, but every two of them are same in the circumferential direction of the inner circumferential surface 11.

(Third Example)

The die described in a third example is, referring to FIG. 7, provided with: the blank holder 2 having the concave 21 for holding the nut blank 1; a cylindrical member 5 (holding member of the cam slider) inserted into the nut blank 1; a cam driver 6 inserted into a center hole 51 of the cylindrical member 5; and cam sliders 7 and 8 arranged in through holes 52 and 53, respectively.

Referring now to FIG. 8, the cam driver 6 includes: a main body 61 formed to have a long plate shape; and a column shaped end portion 62. One side surface of the main body 61 is composed of, sequentially arranged from the end portion 62 side, a first parallel surface 61*a* parallel to the axial direction, an inclined surface 61*b* inclined with respect to the axial direction, and a second parallel surface 61*c*. The other side surface of the main body 61 is composed of, sequentially arranged from the end portion 62 side, an inclined surface 61*d* inclined with respect to the axial direction and a parallel surface 61*e* parallel to the axial direction. The boundary between the inclined surface 61*d* and the parallel surface 61*e* of the other side surface lies slightly on the end portion 62 side from the boundary between the parallel surface 61*a* and the inclined surface 61*b* of one side surface. The diameter of the column forming the end portion 62 is same as the width of the lower end (on the end portion 62 side) of the main body 61.

The cylindrical member 5 has an outer circumferential surface slightly smaller than the inner circumferential surface of the nut blank 1. As illustrated in FIG. 9A and FIG. 9B, the center hole 51 of the cylindrical member 5 has a rectangular cross-section changing its shape in the axial direction. As surfaces forming the center hole 51, there are provided parallel surfaces 51*a* to 51*e* parallel to the axial direction.

The parallel surfaces 51*a* to 51*c* are surfaces on which one side surface of the cam driver 6 is arranged, and a step portion 51*f* is provided between the parallel surface 51*a* and the parallel surface 51*b*. The through hole 52 penetrates through in the radial direction of the cylindrical member 5 with the step portion 51*f* set as the lower end. The parallel surfaces 51*d* and 51*e* are surfaces on which the other side surface of the cam driver 6 is arranged, and the through hole 53 that penetrates through in the radial direction of the cylindrical member 5 is provided at a position opposing the parallel surface 51*c* of the parallel surface 51*d*. A step portion 51*g* forming the boundary between the parallel surface 51*d* and the parallel surface 51*e* is the lower end of the through hole 53.

The cam sliders 7 and 8 are members each having a trapezoid column shape, and have inclined surfaces 71 and 81 corresponding to the inclined surfaces 61*b* and 61*d* of the cam driver 6. The opposite sides of the inclined surfaces 71 and 81 are, as illustrated in FIG. 9C, circumferential surfaces 72 and 82, respectively, corresponding to the circle 11*a* of the inner circumferential surface 11 in the nut blank 1. On the circumferential surfaces 72 and 82, arranged are letter S shaped convexes 73 and 83, respectively, corresponding to the letter S shaped concaves of the ball return passage.

The axial dimension of the main body 61 of the cam driver 6 is longer than the axial dimension of the cylindrical member 5.

The inclined surface 71 of the cam slider 7 and the inclined surface 61*b* of the cam driver 6, and the inclined surface 81 of the cam slider 8 and the inclined surface 61*d* of the cam driver 6 constitute a cam mechanism of the die.

The parallel surface 61*c* of the cam driver 6 and the parallel surface 51*a* of the cylindrical member 5, the parallel surface 61*a* of the cam driver 6 and the parallel surface 51*c* of the cylindrical member 5, and the parallel surface 61*e* of the cam driver 6 and the parallel surface 51*d* of the cylindrical member 5 are load receiving surfaces in contact with each other.

At the middle of the bottom plate portion, there are provided with: a circular hole 22*b* into which the end portion 62 of the cam driver 6 is inserted; and a rectangular hole 22*c* into which the end portion 62 side of the main body 61 in the cam driver 6 is inserted, which are arranged to be continuous through holes.

By using this die, the letter S shaped concave of the ball return passage on the inner surface of the nut blank 1 in the following method.

Firstly, after the nut blank 1 is disposed in the concave 21 of the blank holder 2, the cylindrical member 5 is inserted into the nut blank 1 such that the cam sliders 7 and 8 are held in the through holes 52 and 53 with the letter S shaped convexes 73 and 83 facing outward. Then, the cam driver 6 is inserted into the center hole 51 of the cylindrical member 5 from the end portion 62 side, and the end portion 62 of the cam driver 6 is inserted into the through holes 22*b* and 22*c* of the blank holder 2. FIG. 7A illustrates this state.

Subsequently, when the cam driver 6 is pressed from the top thereof under pressure, a force is respectively transmitted from the inclined surface 61*b* of the cam driver 6 to the inclined surface 71 of the cam slider 7, and from the inclined surface 61*d* of the cam driver 6 to the inclined surface 81 of the cam slider 8. In accordance with this, the downward force of the cam driver 6 is converted into the force to move the cam sliders 7 and 8 outwardly in the radial direction. The letter S shaped convexes 73 and 83 formed on the cam sliders 7 and 8, respectively, push the inner circumferential surface 11 of the nut blank 1 for plastic deformation. FIG. 7B illustrates this state.

Thus, the letter S shaped concaves 15 and 16 forming the two ball return passages, respectively, are formed on the inner circumferential surface 11 of the nut blank 1. In this situation, the end portion 62 of the cam driver 6 is guided to the through hole 22*b* of the bottom member 22 in the blank holder 2. In addition, the reactive force of the force in the radial direction transmitted to the cam slider 7 is received by the parallel surface 51*d* of the cylindrical member 5 and the parallel surface 61*e* of the cam driver 6 brought into contact with each other (received by a surface perpendicular to the reactive force on the extension thereof). Furthermore, the reactive force of the force in the radial direction transmitted to the cam slider 8 is received by the contact between the parallel surface 51*c* of the cylindrical member 5 and the first parallel surface 61*a* of the cam driver 6, and the contact between the parallel surface 51*a* of the cylindrical member 5 and the parallel surface 61*c* of the cam driver 6 (received by a surface perpendicular to the reactive force on the extension thereof). It is therefore possible to make smaller the bending moment received by the cam driver 6.

Therefore, according to the method of the third example, even when a nut having a long axial dimension and a small inner diameter, the two letter S shaped concaves 15 and 16 can be formed at the same time without damaging the cam driver 6. In addition, if the nut blank 1 has the same diameter, the cylindrical member 5 and the cam driver 6 can be used as common parts. The preparation of the cam sliders 7 and 8 having different letter S shaped convexes 73 and 83, respectively, enables various types of the letter S shaped concaves having different shapes. This is suitable as a method of producing various types of parts in small amounts. Furthermore, only the cam sliders 7 and 8 can be replaced for replacing the letter S shaped convexes most likely subject to abrasion or deformation. This is an advantage of maintenance.

Moreover, in the third example, the cylindrical member 5 illustrated in FIG. 9A and FIG. 9B is used as a holding member of the cam slider. However, in order to alleviate the force extending outwardly in the radial direction, applied to the cylindrical member 5, when the cam sliders 7 and 8 are pushed out, it is preferable to provide an incision that reaches the center hole 51 from the outer circumference of the cylindrical member 5 and extends in the entire axial direction.

In the example of FIG. 10, two incisions 54 are provided in parallel to the parallel surface 51*a* to parallel surface 51*e* along the diameter of the outer circumference of the cylindrical member 5. That is, the holding member of the cam slider illustrated in FIG. 10A and FIG. 10B is composed of divided bodies 5A and 5B, which are divided into two parts by a surface along the diameter of the outer circumference. By use of such a member including the divided bodies 5A and 5B, as a holding member of the cam slider, it is made possible to be hardly damaged, as compared to a case of using the cylindrical member 5.

In addition, in the third example, as illustrated in FIG. 7, there are provided the cam sliders 7 and 8, each having a letter S shaped convex 73 or 83, respectively, at the outer circumference. However, the cam slider having plural letter S shaped convexes at the outer circumference may be employed, or three or more cam sliders each having one letter S shaped convex may be employed.

Figure 11A:
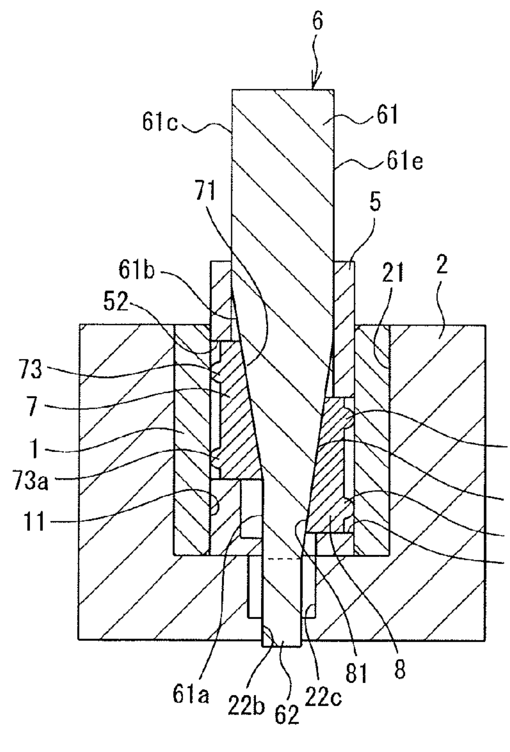
FIG. 11 is a view illustrative of a second modification of the third example of the first embodiment.
Figure 11B:
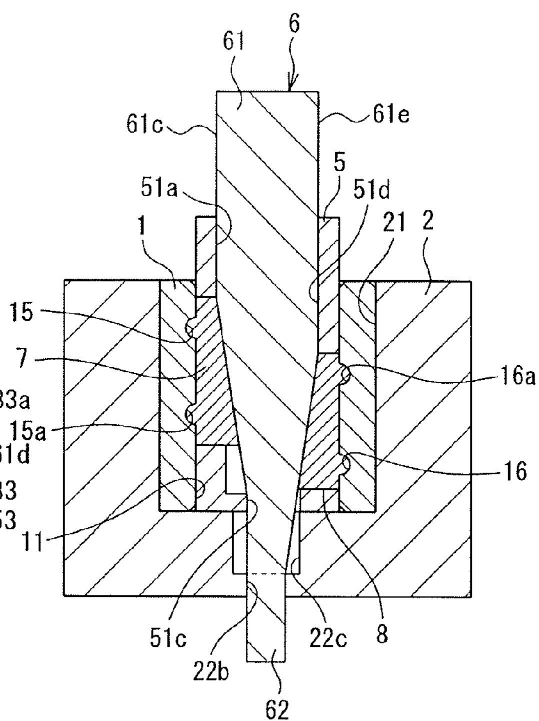

In the example of FIG. 11, two letter S shaped convexes 73 and 73*a* are provided at the outer circumference of one cam slider 7, whereas two letter S shaped convexes 83 and 83*a* are provided at the outer circumference of the other cam slider 8. The axial dimension of the cam sliders 7 and 8 are longer than those illustrated in FIG. 7, so that through holes 52 and 53 of the cylindrical member 5 are arranged to correspond to the above sizes. Furthermore, inclined surfaces 61*b* and 61*d* of the cam driver 6 are arranged to correspond to the inclined surfaces 71 and 81 of the cam sliders 7 and 8, respectively.

The dispositions of two letter S shaped convexes 73 and 73*a* in the cam slider 7 are different in the axial direction of the nut blank 1 and same in the circumferential direction of the inner circumferential surface 11. The dispositions of two letter S shaped convexes 83 and 83*a* in the cam slider 8 are different in the axial direction of the nut blank 1 and same in the circumferential direction of the inner circumferential surface 11. Then, the dispositions of the four letter S shaped convexes 73, 73*a*, 83, and 83*a* are all different in the axial direction of the nut blank 1.

Thus, in the example of FIG. 11, it is made possible to form four letter S shaped concaves 15, 15*a*, 16, and 16*a* on the inner circumferential surface 11 of the nut blank 1, by a one-time operation of pushing the cam driver 6 from the top thereof. In this example, the arranged positions of the four letter S shaped concaves 15, 15*a*, 16, and 16*a* are all different in the axial direction of the nut blank 1, whereas two of them are same in the circumferential direction of the inner circumferential surface 11, respectively.

Moreover, in the example of FIG. 11, the reactive force of the force in the radial direction transmitted to the cam slider 7 is received, by the parallel surface 51*d* of the cylindrical member 5 and the parallel surface 61*e* of the cam driver 6 brought into contact with each other, at the position of the letter S shaped convex 73 in the axial direction (received by a surface perpendicular to the reactive force on the extension thereof). The reactive force of the force in the radial direction applied to the letter S shaped convex 73*a* is received by the two letter S shaped convexes 83 and 83*a* of the cam slider 8 and a contact point with the inner circumferential surface 11 of the nut blank 1.

The reactive force of the force in the radial direction transmitted to the cam slider 8 and then applied to the letter S shaped convex 83*a* is received by the two letter S shaped convexes 73 and 73*a* of the cam slider 7 and a contact point with the inner circumferential surface 11 of the nut blank 1. The reactive force of the force in the radial direction applied to the letter S shaped convex 83 is received by the parallel surface 51*c* of the cylindrical member 5 and the first parallel surface 61*a* of the cam driver 6 brought into contact with each other (received by a surface perpendicular to the reactive force in the vicinity in the axial direction on the extension thereof). Therefore, a bending moment received by the cam driver 6 can be made smaller.

Figure 12A:
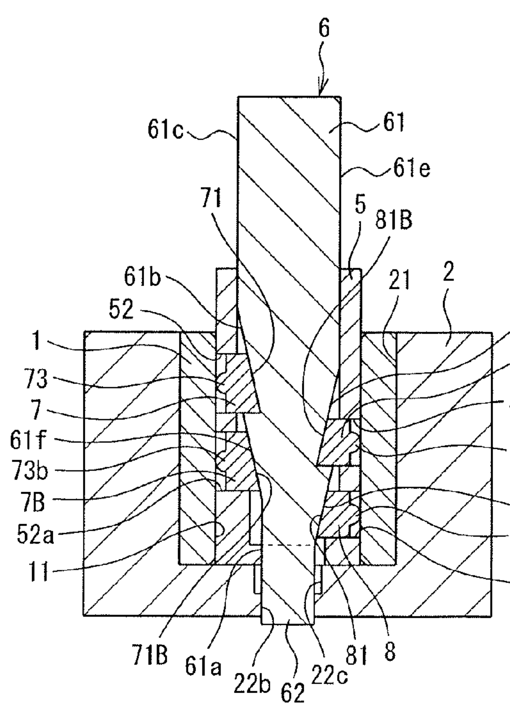
FIG. 12 is a view illustrative of a third modification of the third example of the first embodiment.
Figure 12B:
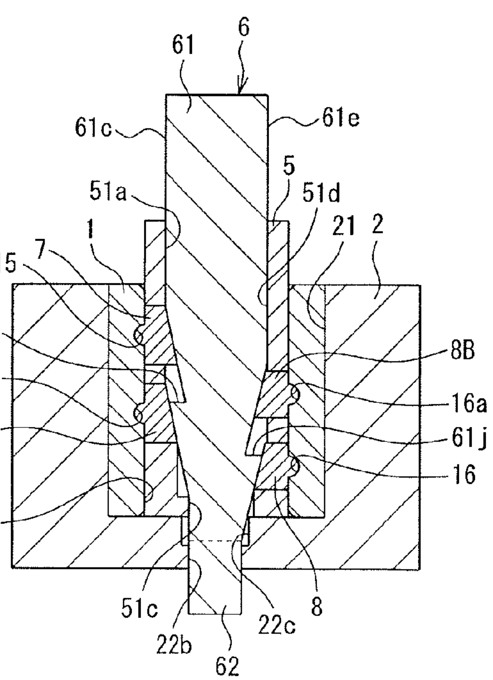

In the example of FIG. 12, four cam sliders, each having one letter S shaped convex, are used. Specifically, a cam slider 7B is disposed at the same position in the circumferential direction as that of the cam slider of FIG. 7 but at a different portion in the axial direction from that of the cam slider 7 of FIG. 7, and a cam slider 8B is disposed at the same position in the circumferential direction as that of the cam slider 8 but at a different portion in the axial direction from that of the cam slider 8.

In addition to the inclined surfaces 61*b* and 61*d* corresponding to the inclined surfaces 71 and 81 of the cam sliders 7 and 8, respectively, the cam driver 6 is provided with inclined surfaces 61*f* and 61*g* corresponding to inclined surfaces 71B and 81B of the cam sliders 7B and 8B, respectively. In addition to the through holes 52 and 53 for arranging the cam sliders 7 and 8, the cylindrical member 5 is provided with through holes 52*a* and 53*a* for arranging the cam sliders 7B and 8B.

The die of FIG. 12 is provided with step surfaces 61*i* and 61*j* between the inclined surfaces 61*b* and 61*f* and the inclined surfaces 61*g* and 61*d* of the cam driver 6. Therefore, it is necessary to assemble the cam driver 6 and all the cam sliders into the cylindrical member 5 and then insert the cam driver 6 into the nut blank 1.

The arrangements of the letter S shaped convexes 73, 83, 73*b*, and 83*b* arranged at the four cam sliders 7, 8, 7B, and 8B are all different in the axial direction of the nut blank 1, and the arrangements of two of them are same respectively in the circumferential direction of the inner circumferential surface 11.

Accordingly, in the example of FIG. 12, it is possible to form the four letter S shaped concaves 15, 15*a*, 16, and 16*a* on the inner circumferential surface 11 of the nut blank 1, by performing a one-time operation of pressing the cam driver 6 from the top thereof. In this example, the formed positions of the four letter S shaped concaves 15, 15*a*, 16, and 16*a* are all different in the axial direction of the nut blank 1, and two of them are same respectively in the circumferential direction of the inner circumferential surface 11.

Figure 13A:
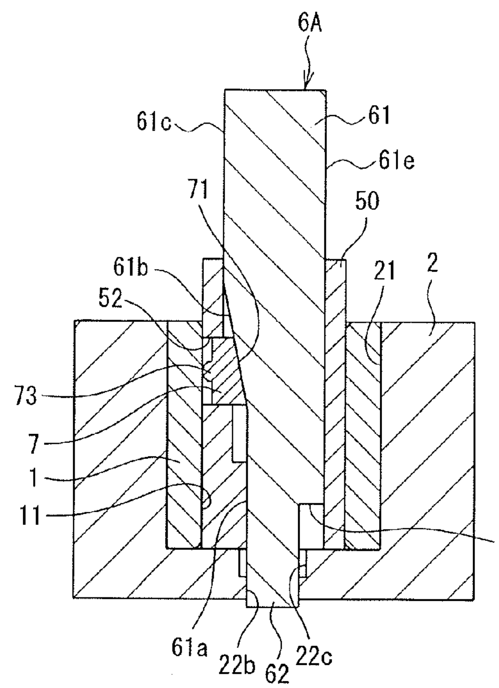
FIG. 13 is a view illustrative of a fourth modification of the third example of the first embodiment.
Figure 13B:
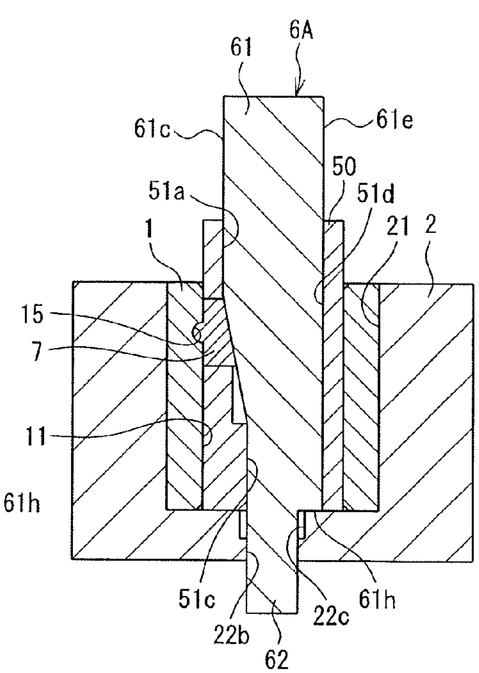

Moreover, FIG. 13 illustrates an example of forming one letter S shaped concave 15 by use of a die with a cylindrical member (holding member of cam slider) 50 similar to the cylindrical member 5 of FIG. 7 and one cam slider 7.

In the example of FIG. 13, one cam slider 7 is held by the cylindrical member 50 and the through hole 52 is arranged in the cylindrical member 50, but the through hole 53 is not arranged. The cam driver 6 does not include the inclined surface 61*d*, but the parallel surface (load receiving surface) 61*e* extends near the end portion 62 and includes a step surface 61*h*. Additionally, the parallel surface (load receiving surface) 51*d* in contact with the parallel surface 61*e* of the cam driver 6 is provided in the cylindrical member 50.

Therefore, when the cam driver 6A is pushed from the top thereof to transmit the force from the inclined surface 61*b* of the cam driver 6A to the inclined surface 71 of the cam slider 7 and move the cam slider 7 outwardly in the radial direction, the reactive force of the force in the radial direction transmitted to the cam slider 7 is received by the parallel surface 51*d* of the cylindrical member 50 and the parallel surface 61*e* of the cam driver 6A brought into contact (received by a surface perpendicular to the reactive force on the extension thereof). Specifically, in the first embodiment, the inner circumferential surface 11 of the nut blank 1 is the surface perpendicular to the reactive force on the extension thereof.

In the example of FIG. 13, as compared to the case where the cylindrical member 50 is not provided as in the first example, the cylindrical member 50 and the cam driver 6A can be used as a common part if the inner diameter of the nut blank 1 is same. Since the preparation of the cam slider 7 having a different letter S shaped convex 73 enables various types of the letter S shaped concaves having different shapes, this is suitable as a method of producing various types of parts in small amounts. Furthermore, only the cam slider 7 can be replaced for replacing the letter S shaped convex most likely subject to abrasion or deformation. This is an advantage in the maintenance.

Also in the examples FIG. 11 to FIG. 13, a member including the divided bodies 5A and 5B is used as a cam slider holding member instead of the cylindrical members 5 and 50, it is made possible to be hardly damaged. In a case where the cam sliders are arranged at plural positions in the circumferential direction, it is preferable to provide an incision 54 to separate the portions (the through holes 52 and 53 in FIG. 10) where the sliders are arranged from each other. That is, for example, in a case where the cam sliders arranged at three parts in the circumferential direction, it is preferable to use a divided body having a shape of three divisions.

(Fourth Example)

The die used in the fourth example is, as illustrated in FIG. 14, provided with: a blank holder 2 having a concave 21 for holding the nut blank 1; a cylindrical member (holding member of cam slider) 9 inserted into the nut blank 1; a cam driver 60 inserted into a center hole 91 of the cylindrical member 9; and cam sliders 7A and 8A provided at through holes 92 and 93 of the cylindrical member 9, respectively. There is provided a concave 21*a* for holding an end portion of the cylindrical member 9 at the middle of the concave 21 of the blank holder 2.

Figure 15A:
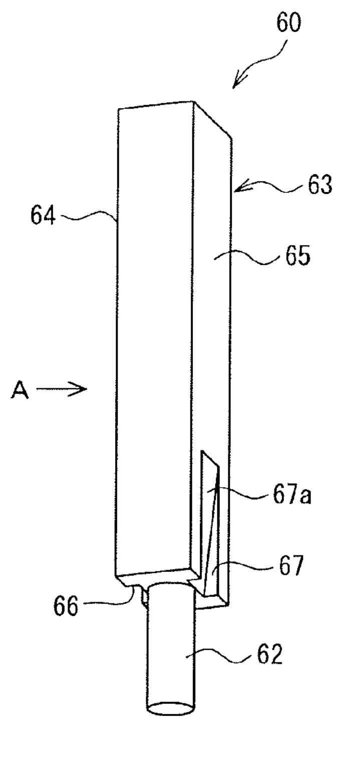
FIG. 15A is a perspective view illustrative of a cam driver used in the fourth example of the first embodiment.
Figure 15B:
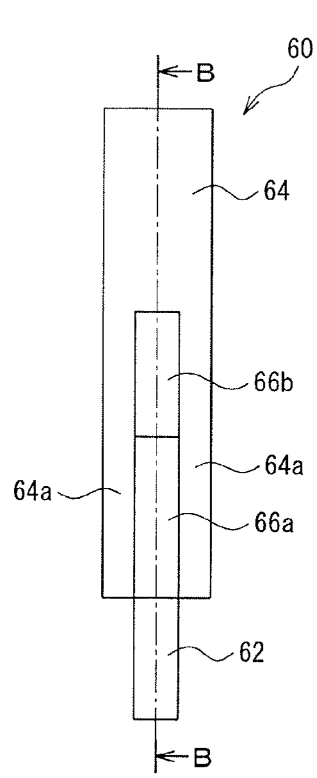
FIG. 15B is a view when viewed in arrow A.
Figure 15C:
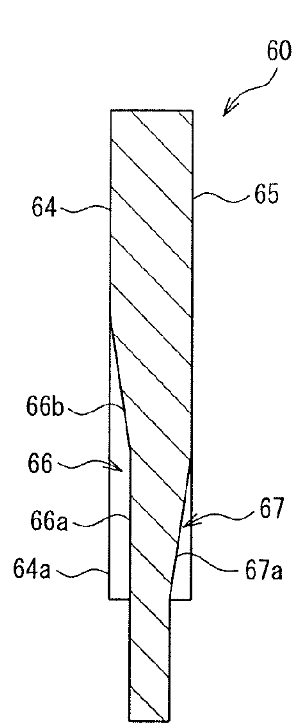
FIG. 15C is a cross-sectional view taken along line B-B.

Referring to FIG. 15, the cam driver 60 is provided with: a main body 63 shaped in a long square pole; and a column shaped end portion 62. Recess portions 66 and 67 are formed at the column shaped end portion 62 side of both side surfaces 64 and 65 of the main body 63, respectively. There are provided, from the column shaped end portion 62 side, a parallel surface 66*a* parallel to the axial direction and an inclined surface 66*b* inclined in the axial direction, at the concave 66 of one side surface 64. There is provided an inclined surface 67*a* inclined in the axial direction, at the concave 67 of the other side surface 65.

The start position of the concave 67 (the boundary between the side surface 65 and the inclined surface 67*a*) of the other side surface 65 is arranged slightly on the column shaped end portion 62 side from the boundary between the parallel surface 66*a* and the inclined surface 66*b* of one side surface. The diameter of the column forming the column shaped end portion 62 is same as a gap between the bottom surface of the concave 66 and the bottom surface of the concave 67 (on the column shaped end portion 62 side) at the lower end of the side surface 63. These arrangements are not essential, but such arrangements enhance the strength of the column shaped end portion 62 and a part in the vicinity of the column shaped end portion 62 of the side surface 63.

Figure 16A:
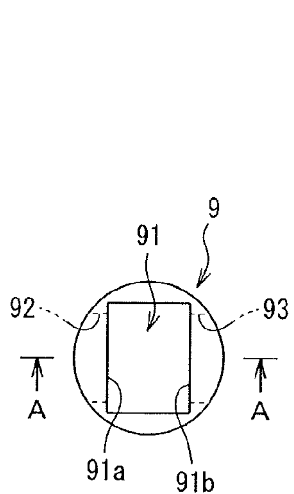
FIG. 16A is a plan view illustrative of a cylindrical member used in the fourth example of the first embodiment.
Figure 16B:
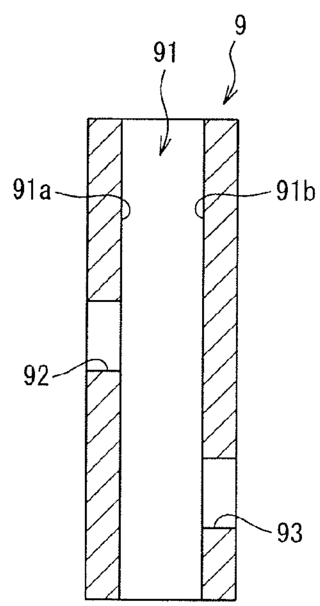
FIG. 16B is a cross-sectional view taken along line A-A.

The cylindrical member 9 has an outer circumferential surface slightly smaller than the inner circumferential surface of the nut blank 1. Referring to FIG. 16A and FIG. 16B, a center hole 91 of the cylindrical member 9 has a cross-sectional shape corresponding to the main body 63 of the cam driver 60. Parallel surfaces 91*a* and 91*b* parallel to the axial direction in which the center hole 91 is arranged are the surfaces (load receiving surfaces) of receiving the side surfaces 64 and 65 parallel to the axial direction of the cam driver 60.

Figure 16C:
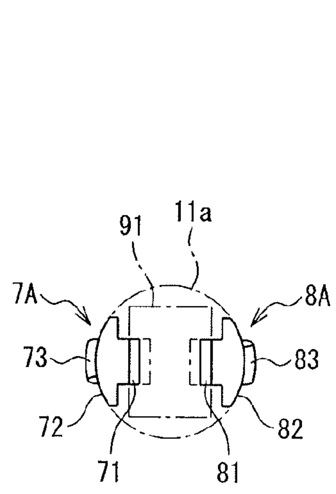
FIG. 16C is a plan view illustrative of the cam slider.

Referring to FIG. 16C, the cam sliders 7A and 8A are members, each having an arched column shaped portion, with the circumferential surfaces 72 and 82, on the outside of a substantially trapezoidal column shaped portion provided with inclined surfaces 71 and 81, respectively. Letter S shaped convexes 73 and 83, corresponding to the letter S shaped concaves constituting the ball return passages, are provided at the circumferential surfaces 72 and 82. The inclined surfaces 71 and 81 have the same inclination with the inclined surfaces 66*b* and 67*a* of the cam driver 60, respectively, and the circumferential surfaces 72 and 82 are almost the same with the inner circumferential surface 11, of the nut blank 1, as indicated by the circle 11*a*.

The axial dimension of the main body 63 of the cam driver 60 is longer than that of the cylindrical member 9.

The inclined surface 71 of the cam slider 7A and the inclined surface 66*b* of the cam driver 60, and the inclined surface 81 of the cam slider 8A and the inclined surface 67*a* of the cam driver 60 constitute a cam mechanism of the die. There is provided a circular through hole 23 into which the column shaped end portion 62 of the cam driver 60 is inserted, at the middle of the bottom plate portion of the blank holder 2.

By use of this die, the letter S shaped concave of the ball return passage is provided on the inner surface of the nut blank 1 in the following method.

Figure 14A:
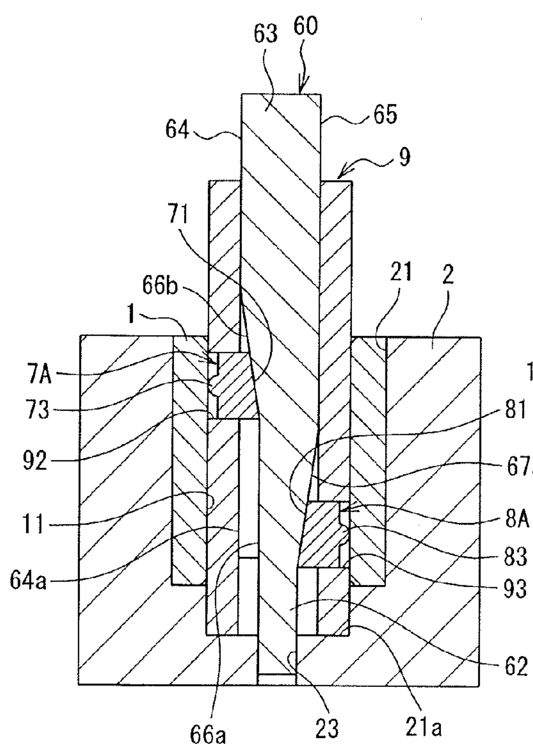
FIG. 14 is a view illustrative of a fourth example of the first embodiment of the present invention.

Firstly, after the nut blank 1 is arranged at the concave 21 of the blank holder 2, the cam sliders 7A and 8A insert the cylindrical member 9 held by the through holes 92 and 93 with the letter S shaped convex 73 and the letter S shaped convex 83 facing outwardly, so that its end portion is disposed at the concave 21*a*. Next, the cam driver 60 is inserted into the center hole 91 of the cylindrical member 9 from the column shaped end portion 62 side to insert the column shaped end portion 62 of the cam driver 60 into the circular through hole 23 of the blank holder 2. FIG. 14A illustrates this state.

Figure 14B:
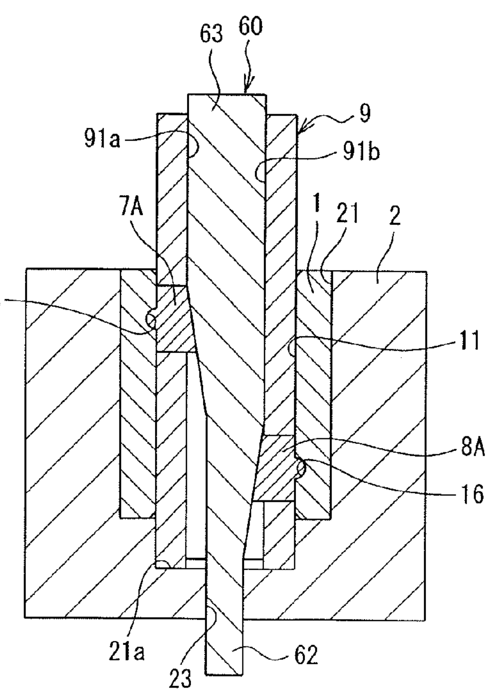

Subsequently, when the cam driver 60 is pressed under pressure from the top thereof, forces are transmitted from the inclined surface 66*b* of the cam driver 60 to the inclined surface 71 of the cam slider 7A, and from the inclined surface 67*a* of the cam driver 60 to the inclined surface 81 of the cam slider 8A, respectively. In accordance therewith, the downward force of the cam driver 60 is converted to the forces of moving the cam sliders 7A and 8A outwardly in the radial direction, and then the letter S shaped convexes 73 and 83 formed at the cam sliders 7A and 8A push the inner circumferential surface 11 of the nut blank 1 for plastic deformation. FIG. 14B illustrates this state.

Thus, the letter S shaped concaves 15 and 16 of the two ball return passages are formed on the inner circumferential surface 11 of the nut blank 1. In such a situation, the column shaped end portion 62 of the cam driver 60 is guided to the circular through hole 23 of the blank holder 2. In addition, the reactive force of the force in the radial direction transmitted to the cam slider 7A is received by the parallel surface 91*b* of the cylindrical member 9 and the side surface 65 of the cam driver 60 brought into contact with each other (received by a surface perpendicular to the reactive force on the extension thereof). Furthermore, the reactive force of the force in the radial direction transmitted to the cam slider 8A is received by the parallel surface 91*a* of the cylindrical member 9 and the parallel surface 66*a* of the side surface 64 brought into contact with each other (received, at the same position in the axial direction with the reactive force, in the vicinity of the extension of the reactive force and by a surface perpendicular to the reactive force). Thus, it is made possible to make smaller the bending moment received by the cam driver 60.

Therefore, according to the method in the fourth example, even in a case where a nut having a long axial dimension and a small diameter, the two letter S shaped concaves 15 and 16 can be formed at the same time without damaging the cam driver 60. In addition, since the cam driver 60 and the cylindrical member 9 used in the method of the fourth example has a larger area of the load receiving surface than that of the cam driver 6 and the holding member 5 used in the third example, the cam driver is hardly damaged as compared to the method of the third example.

Furthermore, the load receiving surface (the parallel surfaces 91*a* and 91*b* of the cylindrical member 9 and the side surfaces 63 and 64 of the cam driver 60) is arranged on the entire axial direction. Even if the gap is narrow in the axial direction of the two letter S shaped concaves 15 and 16 provided in the nut blank 1, it is possible to sufficiently receive the reactive force of the force in the radial direction transmitted to the cam sliders.

Moreover, when the inner diameter of the nut blank 1 is same, the cylindrical member 9 and the cam driver 60 can be used as a common part. The preparation of the cam sliders 7A and 8A having the letter S shaped convexes 73 and 83, different from each other, enables various types of the letter S shaped concaves having different shapes. This is suitable as a method of producing various types of parts in small amounts. Additionally, only the cam sliders 7A and 8A can be replaced for replacing the letter S shaped convexes most likely subject to abrasion or deformation. This is an advantage of maintenance.

Moreover, in the fourth example, the cylindrical member 9 illustrated in FIG. 16A and FIG. 16B is used as a holding member of cam slider. However, in order to alleviate the force of extending outwardly in the radial direction applied to the cylindrical member 9 when the cam sliders 7A and 8A are pushed out, it is preferable to provide an incision that reaches the center hole 91 from the outer circumference of the cylindrical member 9 and extends in the entire axial direction.

In the example of FIG. 17, two incisions 94 are provided in parallel with the parallel surfaces 91*a* and 91*b* along the diameter of the outer circumference of the cylindrical member 9. That is, the holding member of cam slider illustrated in FIG. 17A and FIG. 17B is composed of divided bodies 9A and 9B, each having a shape where the cylindrical member 9 is divided into two parts by a surface along the diameter of the outer circumference. By use of such a member including the divided bodies 9A and 9B, as a holding member of cam slider, it is made possible to be hardly damaged, as compared to a case of using the cylindrical member 9.

In addition, in the fourth example, as illustrated in FIG. 14, there are provided the cam sliders 7A and 8A, each having a letter S shaped convex 73 or 83, respectively, at the outer circumference. However, the cam slider having plural letter S shaped convexes at the outer circumference may be employed, or three or more cam sliders each having one letter S shaped convex may be employed.

In the example of FIG. 18, two letter S shaped convexes 73 and 73*a* are provided at the outer circumference of one cam slider 7A, whereas two letter S shaped convexes 83 and 83*a* are provided at the outer circumference of the other cam slider 8A. The axial dimension of the cam sliders 7A and 8A are longer than those illustrated in FIG. 14, so that through holes 92 and 93 of the cylindrical member 9 are arranged to correspond to the above dimensions. Furthermore, inclined surfaces 66*b* and 67*a* of the cam driver 60 are arranged to correspond to the inclined surfaces 71 and 81 of the cam sliders 7A and 8A, respectively.

The arrangements of two letter S shaped convexes 73 and 73*a* in the cam slider 7A are different in the axial direction of the nut blank 1 and same in the circumferential direction of the inner circumferential surface 11. The arrangements of two letter S shaped convexes 83 and 83*a* in the cam slider 8A are different in the axial direction of the nut blank 1 and same in the circumferential direction of the inner circumferential surface 11. Then, the arrangements of the four letter S shaped convexes 73, 73*a*, 83, and 83*a* are all different in the axial direction of the nut blank 1.

Accordingly, in the example of FIG. 18, it is made possible to form four letter S shaped concaves 15, 15*a*, 16, and 16*a* on the inner circumferential surface 11 of the nut blank 1, by a one-time operation of pushing the cam driver 60 from the top thereof. In this example, the arranged positions of the four letter S shaped concaves 15, 15*a*, 16, and 16*a* are all different in the axial direction of the nut blank 1, whereas two of them are same in the circumferential direction of the inner circumferential surface 11, respectively.

Moreover, in the example of FIG. 18, the reactive force of the force in the radial direction transmitted to the cam slider 7A is received, by the parallel surface 91*b* of the cylindrical member 9 and the side surface 65 of the cam driver 60 brought into contact with each other, at any position of the letter S shaped convexes 73 and 73*a* (received by a surface perpendicular to the reactive force on the extension thereof). Furthermore, the reactive force of the force in the radial direction transmitted to the cam slider 8A is received by the parallel surface 91*a* of the cylindrical member 9 and a both side part of the parallel surface 66*a* in the side surface 64 of the cam driver 60 brought into contact with each other, at any position of the letter S shaped convexes 83 and 83*a* (received, at the same position in the axial direction with the reactive force, in the vicinity of the extension of the reactive force and by a surface perpendicular to the reactive force). Thus, it is made possible to make smaller the bending moment received by the cam driver 60.

Additionally, when the example of FIG. 11 and the example of FIG. 18 are compared, the example of FIG. 11 has an advantage in the simpler structure of the die than that in the example of FIG. 18, whereas the example of FIG. 18 has an advantage in the smaller bending moment received by the cam driver than that in the example of FIG. 11.

(Second Embodiment)

A second embodiment relates to a method for manufacturing a nut included in a ball screw.

The ball screw is provided with: a nut having an inner circumferential surface on which a spiral groove is formed; a threaded shaft having an outer circumferential surface on which a spiral groove is formed; balls loaded in a raceway between the spiral groove of the nut and that of the threaded shaft; and a ball return passage for returning the balls from an end point of the raceway to a start point thereof. The ball screw is a device such that the balls are rolling in the raceway to make the nut relatively move with respect to the threaded shaft.

Such ball screws are used in not only positioning devices of general industrial machinery but also in electrical actuators mounted on vehicles such as automobiles, motorcycles, or vessels.

As to the ball return passage in the ball screw, there are a circulation tube type of the ball return passage and a deflector type thereof. In the case of the deflector type, a deflector having a concave included in the ball return passage is fitted in a through hole of the nut. In contrast, Patent Document 1 describes that the concave (circulation groove) of the ball return passage is directly arranged on the inner circumferential surface of the nut blank by plastic working. The method for arranging it has been described with reference to FIG. 19. Hence, the description thereof is omitted here.

In the method described in Patent Document 1, when the axial dimension of the nut is long and the inner diameter is small, the working head of the die is elongated. This causes a problem that the strength is insufficient and easily damaged.

An object of the second embodiment is to provide a method of forming multiple concaves without damaging a die, as a method of forming multiple ball return passages directly on the inner circumferential surface of the nut blank by plastic working, even in a case where the nut having a long axial dimension and a small inner diameter.

In order to achieve the above object, in the second embodiment, there is provided a method of manufacturing a nut for a ball screw, ball screw comprising having an inner circumferential surface on which a spiral groove is formed; a threaded shaft having an outer circumferential surface on which a spiral groove is formed; balls loaded in a raceway between the spiral groove of the nut and that of the threaded shaft; and plural ball return passages, for returning the balls from an end point of the raceway to a start point thereof, formed as plural concaves on the inner circumferential surface of the nut, wherein the nut of the ball screw is that the balls are rolling in the raceway to make the nut relatively move with respect to the threaded shaft. With a pressing method by use of a die of a cam mechanism including: a cam driver inserted into the nut blank having a cylindrical shape and moving in its axial direction; and plural cam sliders arranged between the nut blank member and the cam driver, at least one of plural convexes corresponding to the plural concaves, and the convexes moving in the radial direction of the nut due to the movement of the cam driver, whereby the plural concaves are formed at the same time on the inner circumferential surface of the nut blank by plastic working.

According to the method in the second embodiment, in the pressing method by use of the die, the movement in the axial direction of the cam driver on the inclined surface forming the cam mechanism changes the direction to the radial direction to be transmitted to plural cam sliders. The plural convexes formed on the plural cam sliders push the inner circumferential surface of the nut blank for plastic deformation, so that the plural concaves are arranged on the inner circumferential surface of the nut blank. Then, even in a case where a nut having a long axial dimension and a small inner diameter is manufactured, the die is hardly damaged as compared to the method described in Patent Document 1.

In the method according to the second embodiment, it is possible to operate the press working, as the die, the cam driver has a load receiving surface in parallel to the axial direction of the nut blank, whereas a load receiving surface, at another member other than the cam driver (an example is the bottom of a nut blank holding member or a cam slider holding member), to be in contact with the above-described load receiving surface. This enables the reactive force of the force in the radial direction transmitted to the cam slider to be received by both of the load receiving surfaces to be in contact with each other (received by the surface perpendicular to the reactive force). Accordingly, even if the cam driver has an elongated shape, the bending moment received by the cam driver can be made smaller.

According to the method in the second embodiment, as the die, it is possible to perform the press working by use of the die having the plural cam sliders held by the holding member disposed between the cam driver and the nut blank, the holding member having the load receiving surface.

In the method according to the second embodiment, the movement amount (pushing amount), outwardly on the radial direction of the nut blank, of the convexes formed at the plural cam sliders, is changed to correspond to the difference in the plastic flow of the portion where the plural concaves of the nut blank are formed (the pushing amount of the portion easily subject to the plastic flow is reduced, whereas the pushing amount of the portion hardly subject to the plastic flow). This enables the shapes and dimensions of the plural concaves to be uniform.

By changing the angles of inclination of plural inclined surfaces where the plural cam sliders and the cam drivers are in contact with each other, it is possible to change the movement amount outwardly in the radial direction of the nut blank of the convex arranged at each cam slider.

According to the method in the second embodiment, as a method of forming plural ball return passages directly on the inner circumferential surface of the nut blank as plural concaves by the plastic working, even in a case of producing a nut having a long axial dimension and a small inner diameter, it is possible to form the plural concaves without damaging the die.

(First Example)

In the method of the second example of the first embodiment, as illustrated in FIG. 4, by use of the pair of cam sliders 3 having the same angles of inclination of the inclined surface 33 and having the same protruding dimensions in the radial direction of the convexes 35 and 36, the timings when the convexes 35 and 36 start to push the inner circumferential surface 11 of the nut blank 1 are made to be the same. This forms the letter S shaped concaves 15 and 16 with the same pushing amounts (the movement amount in the radial direction of the nut blank 1) against the convexes 35 and 36.

In a case where the blank holder 2 is used, as a restraining block of the nut blank 1, for restraining the lower end surface in the axial direction and the outer circumferential surface of the nut blank 1, since the lower portion in the axial direction of the nut blank 1 close to an end surface restrained by a concave 21 of the blank holder 2, plastic flow hardly occurs as compared to the upper portion in the axial direction of the nut blank 1 is close to an end surface not restrained by the concave 21. Accordingly, as the method according to the first embodiment, when the pushing amounts of the convexes 35 and 36 are same, it is difficult to form the upper letter S shaped concave 15 and the lower letter S shaped concave 16 in a uniform shape and dimension.

In contrast, according to the first example in the second embodiment, referring to FIG. 20, cam sliders 103A and 103B are employed such that the angles of inclination of inclined surfaces are same but protruding dimensions in the radial direction of convexes 135 and 136 are different (the convex 135 forming an upper letter S shaped concave 115 is smaller than the convex 136 forming a lower letter S shaped concave 116).

Except for the above aspect, the die used in the first example of the second embodiment is same with that used in the second example of the first embodiment.

For that reason, as illustrated in FIG. 20, in a state where outer end portions in the radial direction of the convexes 135 and 136 of the cam sliders 103A and 103B are in contact with an inner circumferential surface of a nut blank 101, and an inclined surface 133 of the cam slider 103B is in contact with an inclined surface 141*a* of the cam driver, that is, in a state immediately before the convex 136 of the cam slider 103B is pushed into the inner circumferential surface 111 of the nut blank 101, the inclined surface 141*a* of the cam driver 104, the inclined surface 141*a* of the cam driver 104 and the inclined surface 133 of the cam slider 103A oppose each other with a gap. Accordingly, when the cam driver 104 is pushed from the top thereof in this state, the cam slider 103B having the convex 136 moves outwardly in the radial direction earlier than the cam slider 103A having the convex 135 moves, and the convex 136 starts pushing the inner circumferential surface 111 of the nut blank 101 earlier than the convex 135 pushes.

Then, after the inclined surface 141*a* of the cam driver 104 and the inclined surface 133 of the cam slider 103A are in contact with each other in accordance with the movement of the cam driver 104, the cam sliders 103A and 103B respectively move outwardly in the radial direction. At this point of time, since the angles of inclination of the inclined surfaces 133 of the cam sliders 103A and 103B (the pair of the inclined surfaces 141*a* of the cam driver 104) are same, the movement amount outwardly in the radial direction of the convex 135 is smaller than that of the convex 136, which is later in the timing of starting pushing the inner circumferential surface 111 of the nut blank 101. The difference in the protruding dimension in the radial direction between the convexes 135 and 136 corresponds to the difference in the movement amount.

As described heretofore, according to the first method of the second embodiment, by changing the timings when the convexes 135 and 136 start to push the inner circumferential surface 111 of the nut blank 101 to change the pushing amounts of the convexes 135 and 136 into the inner circumferential surface 111 of the nut blank 101, it is made easier to form the upper letter S shaped concave 115 and the lower letter S shaped concave 116 in a uniform shape and dimension than the second method of the first embodiment.

Specifically, in FIG. 20B, the upper letter S shaped concave 115 and the lower letter S shaped concave 116 seem to have different depths corresponding to the protruding dimensions of the corresponding convexes 135 and 136, respectively. However, the drawing is merely an explanatory one. In the implementation of the first method of the second embodiment, in reality, the upper letter S shaped concave 115 and the lower letter S shaped concave 116 are formed in a uniform shape and dimension.

Additionally, the first method of the second embodiment (that is the method of varying the pushing amount of each convex by changing the timings when a pair of cam sliders start to push the inner circumferential surface of the nut blank) is applicable to the third and fourth examples of the first embodiment.

(Second Example)

In a second example of the second embodiment, referring to FIG. 21, the same die of FIG. 7, used in the third example of the first embodiment is used except for the following points. That is, as to the die used in the second example, the convex dimension in the radial direction of a convex 173 of a cam slider 107 having an upper letter S shaped concave 115 is smaller than a convex 183 of a cam slider 108 having a lower letter S shaped concave 116. The angle of inclination of an inclined surface 171 of the cam slider 107 is smaller than that of an inclined surface 181 of the cam slider 108. To correspond to this, the angle of inclination of an inclined surface 161*b* in the cam driver 106 is smaller than that of the inclined surface 161*d*.

For that reason, when pushing the cam driver 106 from the top thereof, the cam sliders 107 and 108 move outwardly in the radial direction of the nut blank 101 at the same time, and then the convexes 173 and 183 start pushing the inner circumferential surface of the nut blank 101. Subsequently, the cam sliders 107 and 108 are moving outwardly in the radial direction in accordance with the movement of the cam driver 106, respectively. Since the angle of inclination of the inclined surface 171 in the cam slider 107 is smaller than that of the inclined surface 181 of the cam slider 108, the movement amount of the cam slider 107 outwardly in the radial direction is smaller than that of the cam slider 108. The difference in the convex dimension in the radial direction between the convexes 173 and 183 corresponds to the difference in the movement amount.

As described above, according to the second example of the second embodiment, although the timings when the convexes 173 and 183 start pushing the inner circumferential surface 111 of the nut blank 101 are same, the pushing amounts of the convexes 173 and 183 into the inner circumferential surface 111 of the nut blank 101 are varied by changing the angles of inclination of the inclined surfaces 171 and 181 where the cam driver 106 is in contact with the cam sliders 107 and 108, respectively. Thus, it is made possible to form the letter S shaped concaves 115 and 116 in a uniform shape and dimension more easily than the method in the third example of the first embodiment.

Specifically, in FIG. 21B, the upper letter S shaped concave 115 and the lower letter S shaped concave 116 seem to be formed to have different depths to correspond to the protruding dimensions of the convexes 173 and 183, respectively. However, this drawing is merely provided for description. In the implementation of the method according to the second example in the second embodiment, in fact, the letter S shaped concaves 115 and 116 are formed in a uniform shape and dimension.

In addition, in the method of the second example of the second embodiment, the pushing amounts of the convexes 173 and 183 into the inner circumferential surface 111 of the nut blank 101 may be changed in combination the fact that the angles of inclination of the inclined surfaces 171 and 181 where the cam driver 106 is in contact with the cam sliders 107 and 108 are made different and the fact that the timings when the convexes 173 and 183 start pushing the inner circumferential surface 111 of the nut blank 101 (the fourth example of the first embodiment).

Furthermore, in the first example and second example of the second embodiment, in order to form the letter S shaped concaves 115 and 116 to have a uniform shape and dimension, the pushing amounts of the pair of cam sliders are varied to correspond to the difference in the plastic flow of the nut blank 101 due to the difference in the restraint state. Other than the example in which there is a difference in the plastic flow in accordance with the difference in the restraint state of the nut blank, even in a case where a flange is provided at the outer circumference of the nut blank, it is possible to easily form plural concaves in a uniform manner by changing the pushing amount, of the convexes of the plural cam sliders, into the inner circumferential surface of the nut blank.

Moreover, in the first example of the second embodiment and the second example of the second embodiment, the pushing amount of the upper convex is larger than that of the lower convex. However, the pushing amount of the upper convex may be larger than that of the lower convex in accordance with the restraint state or the outer circumferential shape of the nut blank.

Additionally, in the second example, the third example, and the fourth example of the first embodiment, the first example and the second example of the second embodiment, the description has been given of case where two letter S shaped concaves (concaves forming the ball return passage) 15 (115) and 16 (116) are arranged on inner circumferential surface 11 (111) of the nut blank 1 (101). However, it is to be understood that the method of the second embodiment may be applicable to a case where three or more concaves forming the ball return passage are may be arranged on the circumferential surface of the nut blank.

(Third Embodiment)

A third embodiment relates to a method for manufacturing a ball screw and a ball screw manufactured by the method.

A ball screw is provided with: a nut having an inner circumferential surface on which a spiral groove is formed; a threaded shaft having an outer circumferential surface on which a spiral groove is formed; balls loaded in a raceway between the spiral groove of the nut and that of the threaded shaft; and a ball return passage for returning the balls from an end point of the raceway to a start point thereof. The ball screw is a device such that the balls are rolling in the raceway to make the nut relatively move with respect to the threaded shaft.

Such ball screws are used in not only positioning devices of general industrial machinery but also electrical actuators mounted on vehicles such as automobiles, motorcycles, or vessels.

As to the ball return passage in the ball screw, there are a circulation tube type of the ball return passage and a deflector type thereof. In the case of the deflector type, a deflector having a concave of the ball return passage is fitted in a through hole of the nut. In contrast, Patent Document 1 describes that the concave (circulation groove) of the ball return passage is directly formed on the inner circumferential surface of the nut blank by plastic working. The method of forming it has been described with reference to FIG. 19. Therefore, the description thereof is omitted here.

It is to be noted, however, that the method described in Patent Document 1 has a problem in that when the axial dimension of the nut is long and the inner diameter is small, the working head of the die is elongated and the strength is insufficient and it is easily broken. Besides, the flow of the material in accordance with the formation of the concave cannot be controlled. Since the material flows towards the axial direction of the nut blank, both end surfaces in the axial direction of the nut blank deform to have a convex shape. The end surface in the axial direction of the nut blank is a reference surface for working in the next process of forming a spiral groove. If the convex shape is formed and remains, there is a problem that the accuracy in the forming process of the spiral groove is degraded.

An object of the third embodiment is to provide a method of forming the concave without damaging the die and suppressing deformation of both end surfaces in the axial direction of the nut blank, as a method of directly forming the concave, of the ball return passage, on the inner circumferential surface of the nut blank, even in a case where the nut having a long axial dimension and a small inner diameter.

In order to achieve the above object, in the third embodiment, there are provided a method of manufacturing a nut for a ball screw, the ball screw comprising: the nut having an inner circumferential surface on which a spiral groove is formed; a threaded shaft having an outer circumferential surface on which a spiral groove is formed; balls loaded in a raceway between the spiral groove of the nut and that of the threaded shaft; and ball return passages, for returning the balls from an end point of the raceway to a start point thereof, formed as concaves on the inner circumferential surface of the nut, wherein the ball screw is that the balls are rolling in the raceway to make the nut relatively move with respect to the threaded shaft. The die of cam mechanism comprising: a cam driver inserted into a cylindrical nut blank and moving in an axial direction of the nut blank; a cam slider disposed between the nut blank and the cam driver and provided with a convex corresponding to the concave, a movement of the cam driver causing the convex to move in a radial direction of the nut; and a restraining member, for restraining both end surfaces in the axial direction and an outer circumferential surface of the nut blank, provided with a depressed portion corresponding to the convex, at the inner circumferential surface for receiving the outer circumferential surface. The concave is formed on the inner circumferential surface of the nut, by pressing the inner circumferential surface of the nut blank with the convex, in a pressing method by use of a die of the cam mechanism, so as to protrude the outer circumferential surface of the nut blank into the depressed portion of the restraining member.

According to the method of the third embodiment, by use of the pressing method with the die, the movement of the cam driver in the axial direction on an inclined surface of the cam mechanism is changed to the movement in the radial direction and transmitted to the cam sliders. The convex arranged on the cam sliders pushes the inner circumferential surface of the nut blank for plastic deformation, whereby the concave is formed on the inner circumferential surface of the nut blank. Then, even in a case where a nut having a long axial dimension and a small inner diameter is manufactured, the die is hardly damaged as compared to the method described in Patent Document 1.

In addition, the restraining member restrains both end surfaces in the axial direction and the outer circumferential surface of the nut blank, and the outer circumference portion of the nut blank protrudes in a depressed portion of the restraining member. Hence, the material is prevented from flowing in the axial direction of the nut blank in accordance with the formation of the concave. Accordingly, both end surfaces in the axial direction of the nut blank are hardly deformed at the time of forming the concave. Since the end surface in the axial direction of the nut blank serves as the reference surface for working in the next process of forming the spiral groove, the accuracy in the forming process of the spiral groove is improved when they are used without change.

The ball screw manufactured in the method of the third embodiment is provided with a projection at a position corresponding to the concave on the outer circumferential surface of the nut.

According to the method in the third embodiment, it is made possible to form the concave without damaging the die and suppress deformation of both end surfaces in the axial direction of the nut blank, as a method of directly forming the concave, of the ball return passage, on the inner circumferential surface of the nut blank, even in a case where the nut having a long axial dimension and a small inner diameter.

Hereinafter, the third embodiment will be described. The die used in the present embodiment is provided with, referring to FIG. 22 to FIG. 24: a cam driver 202 inserted into a nut blank 201; cam sliders 203A to 203D disposed between the nut blank 201 and the cam driver 202; a stand 204 having a top surface with the midpoint where a concave 241 having an inner diameter same with that of the nut blank 201; a restraining member 205 for restraining an upper end surface and an outer circumferential surface of the nut blank 201; and an outside member 206 for regulating the movement of the restraining member 205 outwardly.

Figures 23A, 23B, 23C:
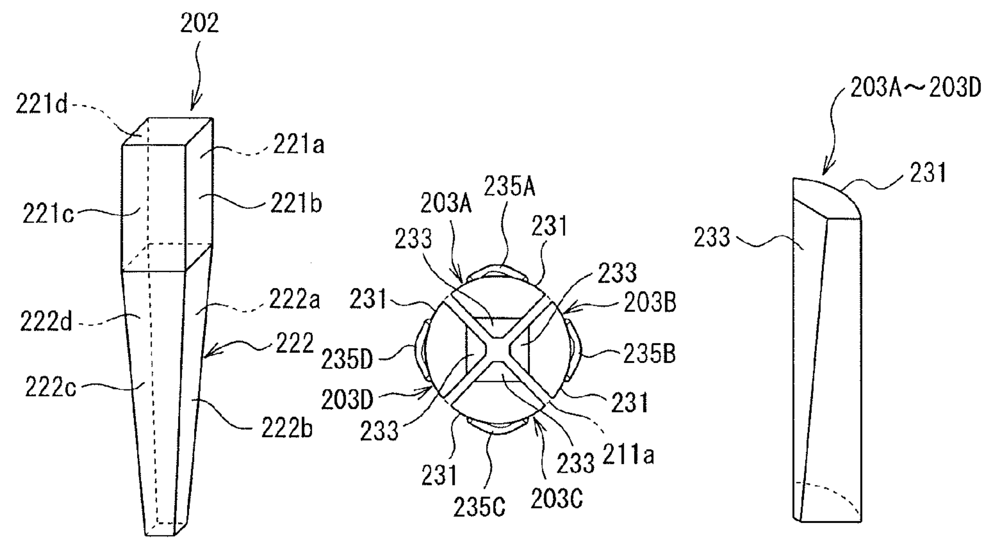
FIG. 23A is a perspective view illustrative of a cam driver used in the third embodiment.
FIG. 23B is a plan view illustrative of the cam slider.
FIG. 23C is a perspective view.

Referring to FIG. 23A, the cam driver 202 is a rod shaped member having a square cross-section, and is provided with: a base end portion 221 having a square cross-section that does not change in the axial direction; and a main body portion 222 having a square cross-section that becomes smaller as getting closer to an end. In other words, four side surfaces 221*a* to 221*d* of the base end portion 221 each are parallel to each other in the front and back and in the left and right, and four side surfaces 222*a* to 222*d* of the main body portion 222 each have the same angle of inclination.

Referring to FIG. 23B and FIG. 23C, the cam sliders 203A to 203D are members each having a shape in which a cylinder, having an outer circumferential surface 231 with a diameter slightly smaller than the inner diameter of the nut blank 201, is divided into four parts in the circumferential direction. On the opposite side of the outer circumferential surface 231, there are provided inclined surfaces 233 having the same angles of inclination with those of the four side surfaces 222*a* to 222*d* of the cam driver 202. When the cam sliders 203A to 203D are disposed so that the outer circumferential surface 231 matches a circle 211*a* constituting an inner circumferential surface 211 of the nut blank 201, a space is arranged by the four inclined surfaces 233 of the circle 211*a* so that the cam driver 202 is inserted thereinto. In addition, four letter S shaped convexes 235A to 235D are provided to correspond to the four letter S shaped concaves of the ball return passage, on the outer circumferential surfaces 231 of the cam sliders 203A to 203D, respectively.

The side surfaces 222*a* to 222*d* of the cam driver 202 and the inclined surface 233 of the cam slider 203 constitute the cam mechanism of the die.

Figures 24A, 24B:
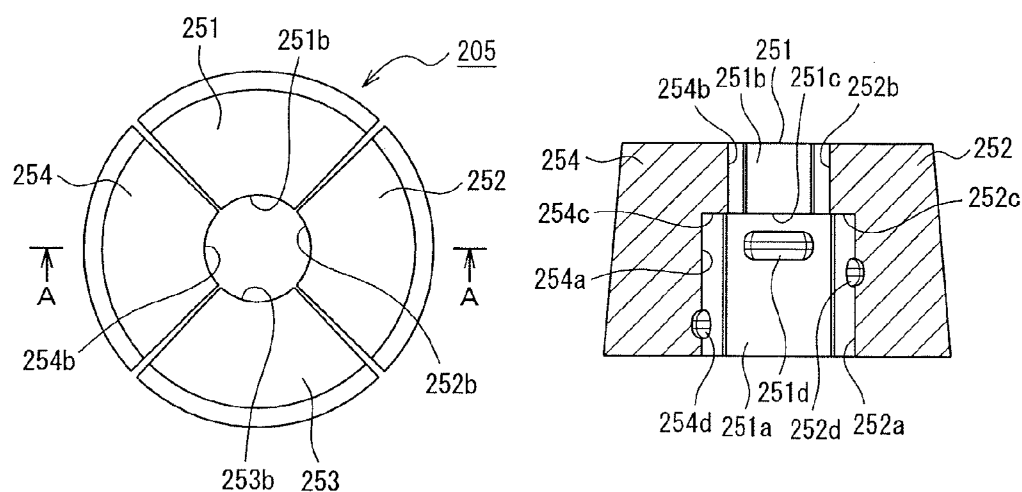
FIG. 24A is a plan view illustrative of a divided body constituting a restraining member used in the third embodiment.
FIG. 24B is a perspective view taken along line A-A.
Figure 25A:
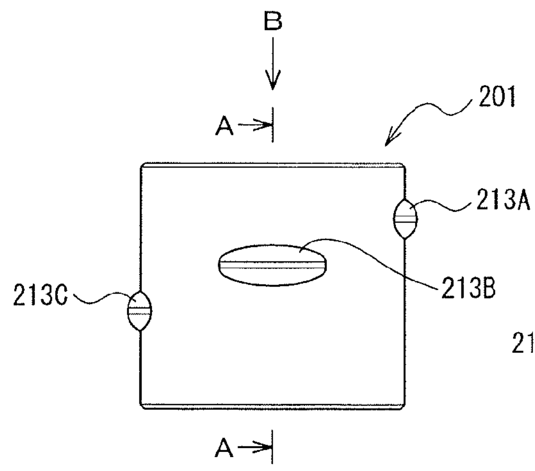
FIG. 25A is a front view illustrative of a nut blank in which a letter S shaped concave and projection are provided in a method of the third embodiment.
Figure 25B:
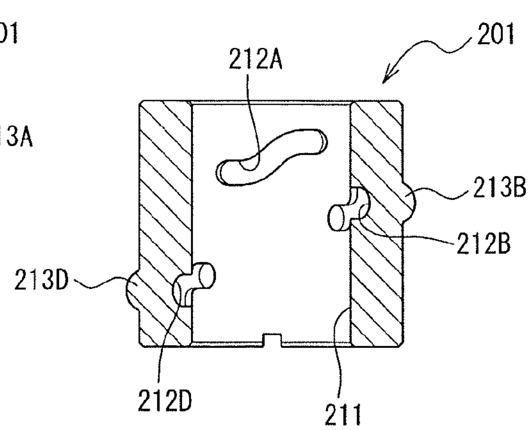
FIG. 25B is a cross-sectional view taken along line A-A.
Figure 25C:
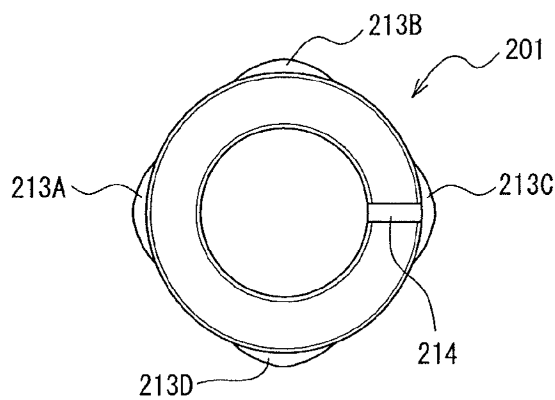
FIG. 25C is a view when viewed in arrow B.
Figure 25D:
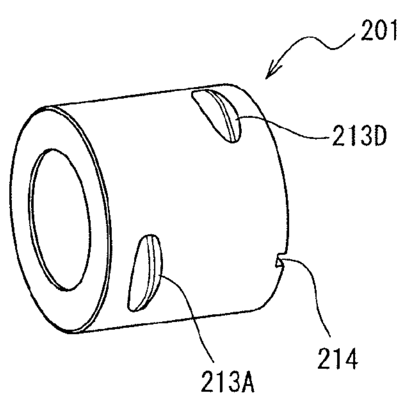
FIG. 25D is a perspective view.

Referring to FIG. 24A, the restraining member 205 is provided with divided bodies 251 to 254, in which a cylindrical body having an outer circumferential circle changing in a tapered shape in the axial direction is divided into four parts in the circumferential direction. Referring to FIG. 24B, the inner circumferential surfaces of the divided bodies 251 to 254 are formed to have large diameter portions 251*a* to 254*a* to correspond to the outer diameters of the nut blank 201, respectively, on the large diameter side of the outer circumferential surface. The inner circumferential surfaces of the divided bodies 251 to 254 are formed to have small diameter portions 251*b* to 254*b* slightly larger than the inner diameters (but smaller than the outer diameters) of the nut blank 201, respectively, on the small diameter side of the outer circumferential surface.

Thus, restraining surfaces 251*c* to 254*c* to be in contact with a top end surface of the nut blank 201 are provided at the boundaries between the large diameter portions 251*a* to 254*a* and the small diameter portions 251*b* to 254*b*, respectively. Additionally, depressed portions 251*d* to 254*d* corresponding to the letter S shaped convexes 235A to 235D of the cam slider 203 are provided at the large diameter portions 251*a* to 254*a* of the inner circumferential surfaces of the divided bodies 251 to 254, respectively. The large diameter portions 251*a* to 254*a* of the inner circumferential surfaces of the divided bodies 251 to 254 respectively correspond to the inner circumferential surfaces for receiving the outer circumferential surface of the nut blank 201.

The outside member 206 is a cylindrical body having an inner circumferential surface 261 corresponding to the tapered outer circumferential surface of the restraining member 205, and the same outer surface with the outer surface shape of the stand 204.

By using this die, the letter S shaped concaves of the four ball return passages on the inner surface of the nut blank 201 are formed in the following method.

Firstly, the nut blank 201 is disposed at the center of the stand 204 so that the inner circumferential surface of the nut blank 201 matches the inner circumferential surface of the concave 241. Next, the divided bodies 251 to 254 of the restraining member 205 are disposed on the stand 204 so that the large diameter portions 251*a* to 254*a* of the inner circumferential surface are brought into contact with the outer circumferential surface of the nut blank 201 and the restraining surfaces 251*c* to 254*c* are brought into contact with the upper end surface of the nut blank 201. Then, the outside member 206 is disposed on the stand 204 so that the inner circumferential surface 261 is brought into contact with the tapered outer circumferential surface of the restraining member 205.

In this state, the outside member 206 is secured to the stand 204.

Thus, the movements of the divided bodies 251 to 254 forming the restraining member 205 outwardly in the radial direction are regulated at the outside member 206, and both end surfaces in the axial direction and the outer circumferential surface of the nut blank 201 are brought into the restraining state at the restraining member 205 and the stand 204.

Figure 22A:
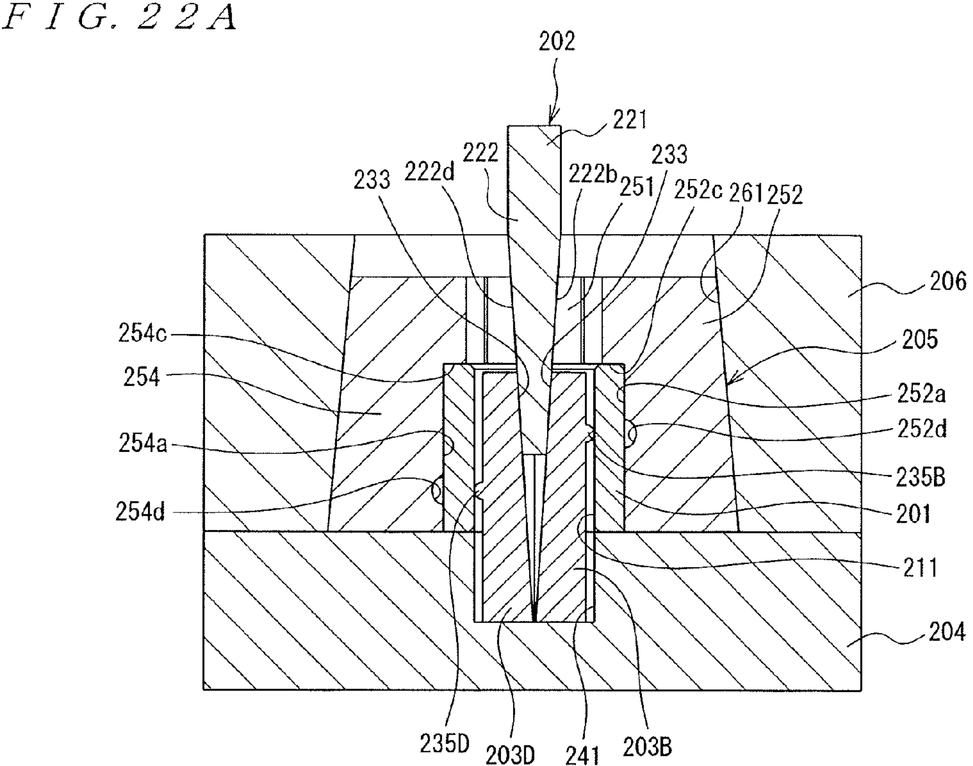
FIG. 22 is a view illustrative of an example of a third embodiment of the present invention.

Subsequently, the cam sliders 203A to 203D are inserted into the nut blank 201 with the outer circumferential surfaces 231 facing the inner circumferential surface of the nut blank 201. Thus, a space is formed by the four inclined surfaces 233 of the cam sliders 203A to 203D so that the cam driver 202 is inserted thereinto. Then, an end of the main body portion 222 of the cam driver 202 is inserted into this space. FIG. 22A illustrates this state.

Figure 22B:
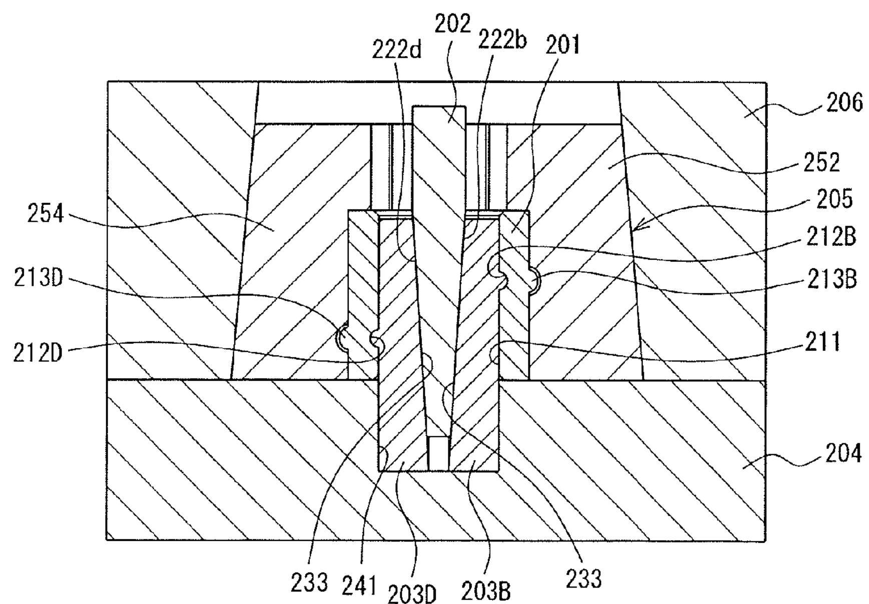

Next, the cam driver 202 is pressed from the top thereof under pressure, a force is transmitted from the inclined side surfaces 222*a* to 222*d* of the cam driver 202 to the inclined surfaces 233 of the cam sliders 203A to 203D. In accordance with this, a downward force of the cam driver 202 is converted into forces of moving the cam sliders 203A to 203D outwardly in the radial direction, and then the letter S shaped convexes 235A to 235D arranged in the cam sliders 203A to 203D push the inner circumferential surface 211 of the nut blank 201 for plastic deformation, respectively. In accordance with this, the material existing in the outer circumferential portion of the nut blank 201 is pushed into the depressed portions 251*d* to 254*d* of the divided bodies 251 to 254 constituting the restraining member 205. FIG. 22B illustrates this state.

Thus, the letter S shaped concaves 212A to 212D of the four ball return passages are formed on the inner circumferential surface 211 of the nut blank 201, respectively. Additionally, the outer circumferential portion of the nut blank 201 protrudes into the depressed portions 251*d* to 254*d* of the divided bodies 251 to 254 constituting the restraining member 205, and projections 213A to 213D are formed.

FIG. 25 illustrates the nut blank 201 where the letter S shaped concaves 212A to 212D and the projections 213A to 213D are provided in this method. FIG. 25A is a front view, FIG. 25B is a cross-sectional view taken along line A-A; FIG. 25C is a view when viewed in arrow B, and FIG. 25D is a perspective view. The nut of the ball screw is manufactured by arranging a spiral groove and a seal attaching groove in the nut blank 201.

According to the method of the present embodiment, it is possible to arrange the four letter S shaped concaves 212A to 212D on the nut blank 201 without damaging the cam driver 202, even when a nut that has a long axial dimension and a small diameter is manufactured.

Moreover, the material of the nut blank 201 pushed by the letter S shaped convexes 235A to 235D outwardly in the radial direction moves to the depressed portions 251*d* to 254*d*. This suppresses the material from moving toward an end surface in the axial direction, whereby both end surfaces in the axial direction of the nut blank 201 hardly deform. The end surface in the axial direction of the nut blank 201 is a reference surface for working in the next process of forming a spiral groove. Therefore, even if the end surface is used without change, the working accuracy is satisfactory.

Specifically, the end surface in the axial direction of the nut blank 201 is beforehand provided with a cutout 214 before the working in the above method. The cutout 214 is used for positioning of the nut blank at the time of forging or cutting in the manufacturing process of the nut illustrated in FIG. 74, for example, as will be described later in detail. In the working with the above method, care needs to be taken so that metal is not flown into the cutout 214. In addition, working is performed with a convex, not illustrated, provided on the die to be fit in the cutout 214 in order to position the nut blank 201.

(Fourth Embodiment)

A fourth embodiment relates to a method for manufacturing a ball screw and a nut for the ball screw.

A ball screw is provided with: a threaded shaft having an outer circumferential surface on which a spiral groove is formed; a nut having an inner circumferential surface on which a spiral groove is formed; and rollable balls loaded in a raceway between the spiral groove of the nut and that of the threaded shaft. The ball screw is a device such that the balls are rolling in the raceway to make the nut relatively move with respect to the threaded shaft.

Such ball screws are used in not only positioning devices of general industrial machinery but also electrical actuators mounted on vehicles such as automobiles, motorcycles, or vessels.

Additionally, there are some ball screws each having a ball return passage achieved by a letter S shaped circulation groove on the inner circumferential surface of the nut (See Patent Documents 4 to 6, for example).

As a method of forming such a letter S shaped circulation groove, there is a method of forming it directly on the inner circumferential surface of the nut (nut blank) by use of plastic working of punching (See Patent Document 1, for example).

In this process, it is effective of the material to flow in the outer circumferential direction of the nut at the time of forming the letter S shaped circulation groove, in order to improve the accuracy of pitch, depth, and phase in the letter S shaped groove by reducing the deformation in the shaped product or reducing the material flow, or to extend the life by reducing the surface pressure of forming the punch.

FIG. 30 illustrates the nut blank in which a letter S shaped circulation groove is arranged. FIG. 30A is a front view, FIG. 30B is a cross-sectional view taken along line A-A; FIG. 30C is a view when viewed in arrow B, and FIG. 30D is a perspective view.

As illustrated in FIG. 30, there are provided letter S shaped circulation grooves 352*a* to 352*d* on an inner circumferential surface 351 of a nut blank 350. In addition, the nut blank 350 is provided, with projections 354*a* to 354*d* projecting from an outer circumferential surface 353 to correspond to the letter S shaped circulation grooves 352*a* to 352*d*, by the material flowing at the time of forming the letter S shaped circulation grooves 352*a* to 352*d*.

However, any projection projecting from a part of the outer circumferential surface of the nut (nut material) by flowing the material is such a manner should be removed, in some cases, by the removing process of intermittent cutting or the like, in consideration of handling the ball screw or its appearance. Then, the manufacturing costs of the nuts are increased by undergoing such a removing process, leaving room for improvement.

An object of the fourth embodiment is to enable the removing process of a projection to be omitted.

According to the fourth embodiment, there is provided a method for manufacturing a ball screw, the ball screw comprising: a threaded shaft having an outer circumferential surface on which a rolling element rolling groove is formed; a nut having an inner circumferential surface on which a rolling element rolling groove opposing the rolling element rolling groove of the threaded shaft and at least one line of a letter S shaped circulation groove for connecting both end portions of the rolling element rolling grooves are formed; and balls rotatably loaded in a space defined between the rolling element rolling groove of the threaded shaft and that of the nut and the letter S shaped circulation groove. A part of the outer circumferential surface of the nut is formed to be shorter than a radius of a circular portion that is another part on the outer circumferential surface of the nut. By pressing the punch into the inner circumferential surface of the nut, the letter S shaped circulation groove is formed so that a projection projecting on the outer circumferential surface of the nut is formed on one part of the outer circumferential surface. The part of the outer circumferential surface is located such that the projection is arranged at a distance shorter than the radius of the circular portion.

In addition, the nut for the ball screw according to the fourth embodiment is provided with: a rolling element rolling groove on the inner circumferential surface to oppose a rolling element rolling groove provided on the outer circumferential surface of the threaded shaft; at least one line of a letter S shaped circulation groove for connecting both end portions of the rolling element rolling grooves is formed; and holds balls rotatably loaded in a space defined between the rolling element rolling groove of the threaded shaft and that of the nut and the letter S shaped circulation groove. By pressing the punch into the inner circumferential surface of the nut, the letter S shaped circulation groove is formed so that a projection projecting on the outer circumferential surface of the nut is formed on one part of the outer circumferential surface. The projection is located to be shorter than the radius of the circular portion of the projection.

According to the fourth embodiment, the projection is formed to be shorter than the radius of the circular portion on the outer circumferential surface of the nut, thereby eliminating the projection removing process.

Hereinafter, a method for manufacturing a ball screw nut according to the fourth embodiment will be described.

(Configurations)

FIG. 26 illustrates a shape of a nut blank 301 for forming a letter S shaped circulation groove (hereinafter, referred to as S groove) in the manufacturing method of the ball screw nut according to the fourth embodiment. The upper drawing of FIG. 26 is a front view, and the lower drawing of FIG. 26 is a longitudinal cross-sectional view in the axial direction.

As illustrated in FIG. 26, the nut blank 301 has a cylindrical shape. Then, parts of an outer circumferential surface 301*a* of the nut blank 301 are plane surface portions 301*b* each arranged at positions having distances from the central axis of the nut shorter than radiuss of other parts each having a circular shape (vertical surfaces 301*d* indicated by chain double-dashed lines). That is, the nut blank 301 has a shape in which the outer circumferential surface 301*a* having a circular shape is partially cut away on a plane. The plane surface portion 301*b* is formed to extend in the axial direction of the nut blank 301.

As will be described later, the provision of the S groove on an inner circumferential surface 301*c* of the nut blank 301 makes a projection on the plane surface portion 301*b* in the outer circumferential surface 301*a* of the nut blank 301. For such a reason, the plane surface portion 301*b* is provided so that the projection generated on the plane surface portion 301*b* should not extend outwardly from the radius positions of the circular shaped portions (the vertical surfaces 301*d* indicated by chain double-dashed lines). Moreover, the four plane surface portions 301*b* are arranged at intervals of 90 degrees circumferentially of the nut blank 301 in the fourth embodiment to correspond to the S groove arranged on the inner circumferential surface 301*c* of the nut blank 301.

For example, the plane surface portions 301*b* are arranged on the outer circumferential surface 301*a* of the nut blank 301 by press working, cutting, or the like.

FIG. 27 illustrates a method of forming an S groove 302 on the inner circumferential surface 301*c* of the nut blank 301 by plastic working with a punch 311, as a manufacturing method of a ball screw nut according to the fourth embodiment.

As illustrated in FIG. 27A and FIG. 27B, in this method, the nut blank 301 having a cylindrical shape is restrained by a restraining block 312 and the punch 311 is pushed into the inner circumferential surface 301*c* of the restrained nut blank 301.

The restraining block 312 has an inner circumferential surface 312*a* having a shape corresponding to the outer circumferential surface 301*a* of the nut blank 301 so that the inner circumferential surface 312*a* restrains the nut blank 301. In this situation, a plane surface portion 312*b* protruding inwardly is provided at the inner circumferential surface 312*a* of the restraining block 312 to correspond to a position of pushing the punch 311 onto the inner circumferential surface of the nut blank 301. Additionally, a material flowing portion 312*c* having a concaved groove shape is arranged on the plane surface portion 312*b*. For example, the material flowing portion 312*c* has a substantially letter S shape in planar view.

The punch 311 has a shape capable of forming the S groove on the inner circumferential surface 301*c* of the nut blank 301. That is, for example, the punch 311 has a substantially letter S shape in planar view.

Hence, as illustrated in FIG. 27A (the drawing illustrative of the start of forming) to FIG. 27B (the drawing illustrative of the end of forming), in this method, the punch 311 is pushed onto the inner circumferential surface 301*c* of the nut blank 301 in which the outer circumferential surface 301*a* is restrained by the restraining block 312 to form the S groove 302.

Figure 28:
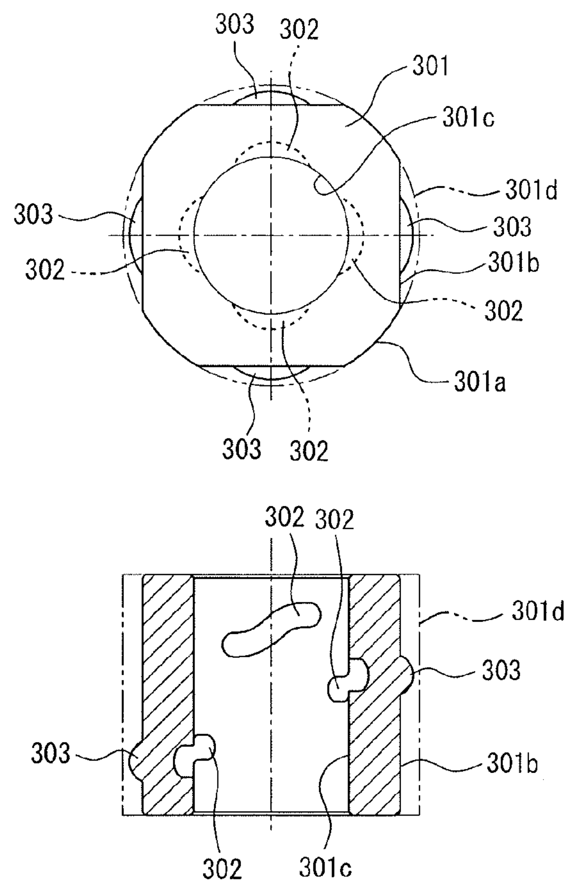
FIG. 28 is a view illustrative of a shape of the nut blank in the method for manufacturing the ball screw nut in the fourth embodiment.

FIG. 28 illustrates the shape of the nut blank 301 in which the S groove 302 is arranged by the manufacturing method of the ball screw nut according to the fourth embodiment. The upper drawing of FIG. 28 is a front view and the lower drawing of FIG. 28 is a longitudinal cross-sectional view in the axial direction.

As illustrated in FIG. 28, plural S grooves 302 are formed on the inner circumferential surface 301*c* of the nut blank 301. In addition, projections 303 are generated on the plane surface portions 301*b* in the outer circumferential surface 301*a* of the nut blank 301 to correspond to the S grooves 302 arranged on the inner circumferential surface 301*c*, respectively. Furthermore, the projections 303 are positioned on the inner side from the radius positions of the circular portions of the outer circumferential surface 301*a* in the nut blank 301.

Figure 29:
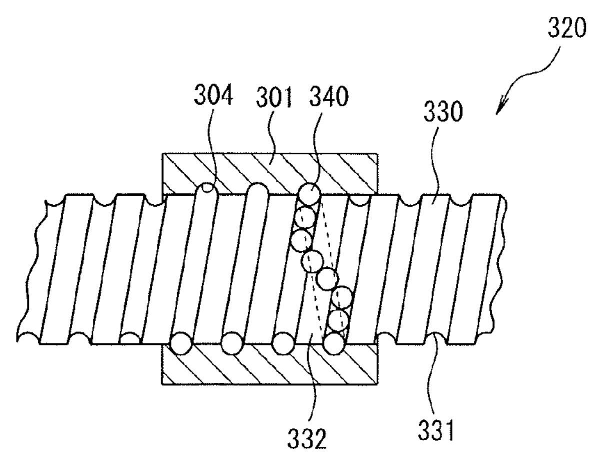
FIG. 29 is a cross-sectional view illustrative of the ball screw.
Figure 30A:
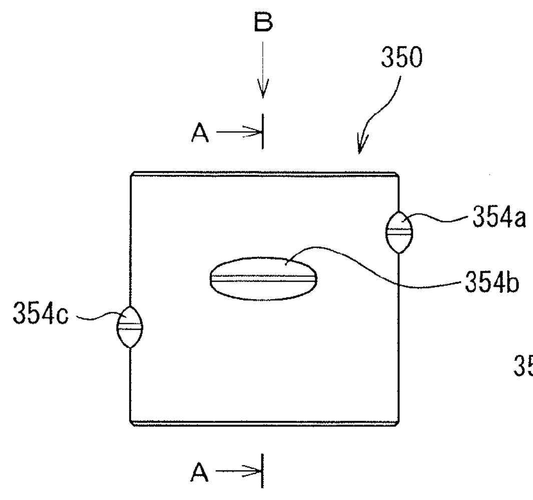
FIG. 30 is a view illustrative of a shape of the nut blank in which the letter S shaped circulation groove is formed.
Figure 30B:
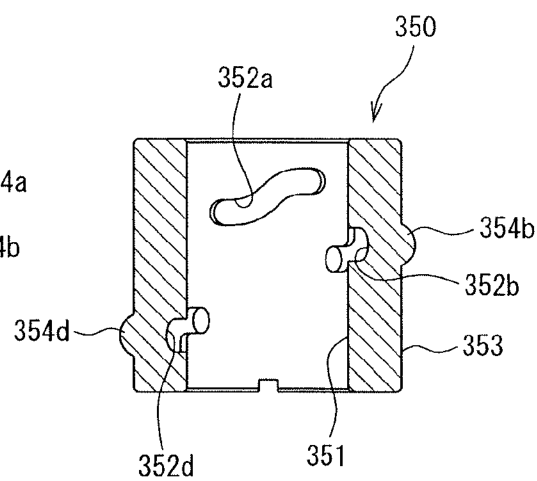
Figure 30C:
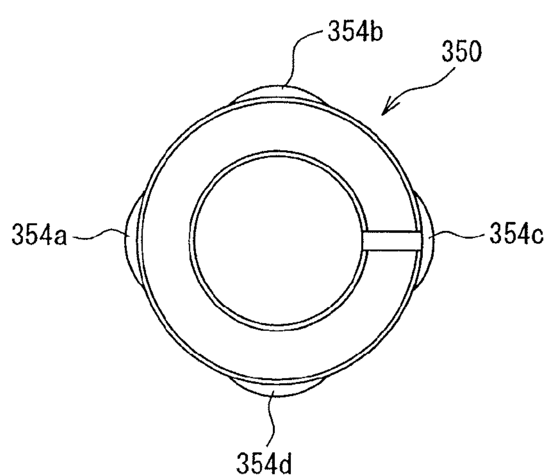
Figure 30D:
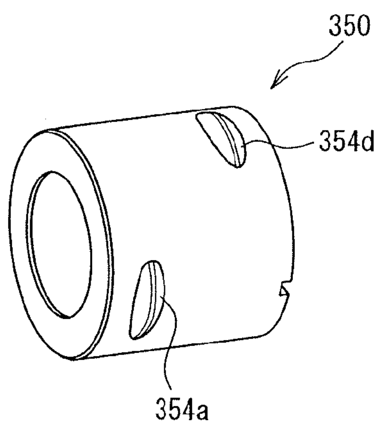

FIG. 29 illustrates a ball screw 320 provided with the nut (nut blank) 301 manufactured in the above manufacturing method.

As illustrated in FIG. 29, the ball screw 320 includes a threaded shaft 330 and balls 340, in addition to the nut blank 301. The threaded shaft 330 is provided with a male spiral groove 331 having an arc shaped cross-section on its outer circumferential surface.

In this ball screw 320, a number of balls 340 are disposed rotatably in a space defined by both of the spiral grooves 331 and 304 of the nut blank 301 and the threaded shaft 330, so that the balls 340 are capable of rolling along the spiral grooves 331 and 304 at the time of relative screw motion of the threaded shaft 330 and the nut blank 301.

On the inner circumferential surface of the nut blank 301, a circulation passage 302 having a part (protruding outwardly in the radial direction) deeper than the female spiral groove 304 smoothly connects both end portions of the female spiral groove 304. The balls 340 that move rolling along the male spiral groove 331 of the threaded shaft 330 are guided along a crest 332 separating the adjacent male spiral grooves 331 of the threaded shaft 330. The balls 340 are further guided to the S groove 302, and pass over the crest 332, and return to the adjacent (rolling) female spiral groove 331. In other words, the balls 340 are capable of circulating. Specifically, the example illustrated in FIG. 29 illustrates the balls guided by the S groove 302. In fact, the balls 340 exist in the space defined by both of the spiral grooves 331 and 304.

Moreover, in a case where the nut blank 301 is supported in a non-rotating state, the rotation of the threaded shaft 330 causes the balls 340 repeatedly circulate while rolling endlessly in each of the ball guiding passages (the spiral grooves 331 and 304 and the S groove 302), and also causes the nut blank 301 to do a translatory movement forwardly or backwardly in response to the rotating direction of the threaded shaft 330.

(Operations and Effects)

As described above, in the fourth embodiment, the provision of the plane surface portion 301*b* on the outer circumferential surface 301*a* of the nut blank 1 makes the projections 303 formed on the outer circumferential surface 301*a* at the time of forming the S groove 302 on the inner circumferential surface 301*c* of the nut blank 301 to be positioned on the inner side from the radius position of the circular portion in the outer circumferential surface 301*a* of the nut blank 301. That is, in the fourth embodiment, the projections 303 generated by the flown material at the time of forming the S groove is prevented from projecting from the outer diameter of the product.

Thus, in the fourth embodiment, the removing process of intermittent cutting process or the like for removing such projections can be omitted. Accordingly, in the fourth embodiment, it is possible to suppress the increased costs in manufacturing the nuts.

(Modification of Fourth Embodiment)

In the fourth embodiment, a part of the outer circumferential surface 301*a* of the nut blank 301 may have another shape instead of the plane surface portion (plane surface shape). For example, in the fourth embodiment, a substantially letter U shaped surface protruding toward the center direction of the nut blank 301 or a slot groove (elongated groove) may be provided.

In addition, in the fourth embodiment, the part of such a plane surface shape or the like formed on the outer circumferential surface 301*a* of the nut blank 301 may be arranged at a position only corresponding to the generated projection, instead of being arranged to extend in the axial direction of the nut blank 301. In this case, the parts each having such a plane surface shape or the like may be scattered on the outer circumferential surface 301*a* of the nut blank 301 to correspond to the positions where the S grooves 302 are formed on the inner circumferential surface 301*c*.

Furthermore, in the fourth embodiment, the number of the S grooves 302 is not limited to four, as illustrated in FIG. 28. At least one S groove 302 may be provided.

Moreover, in the fourth embodiment, a concave may be provided at a part corresponding to the position where the S groove 302 is arranged, on the outer circumferential surface 301*a* of the nut blank 301 before arranging the S groove 302. When the S groove 302 is formed on the nut blank 301 having such a concave, the projection 303 is not generated because of the provision of the concave on the outer circumferential surface side, even if the material is flown on the outer circumferential surface side of the nut blank 301 by forming the S groove 302 on the inner circumferential surface 301*c* of the nut blank 301.

Alternatively, even if the projection 303 is generated, the head of the projection 303 is to be positioned on the inner side from the radius position of the circular shaped part of the outer circumferential surface 301*a* of the nut blank 301. That is, the end of the projection 303 does not project outwardly from the outer diameter of the product. Thus, it is made possible to eliminate the removing process of intermittent cutting or the like for removing such projections. Accordingly, in the fourth embodiment, it is possible to suppress the increased costs in manufacturing the nuts.

Figure 31:
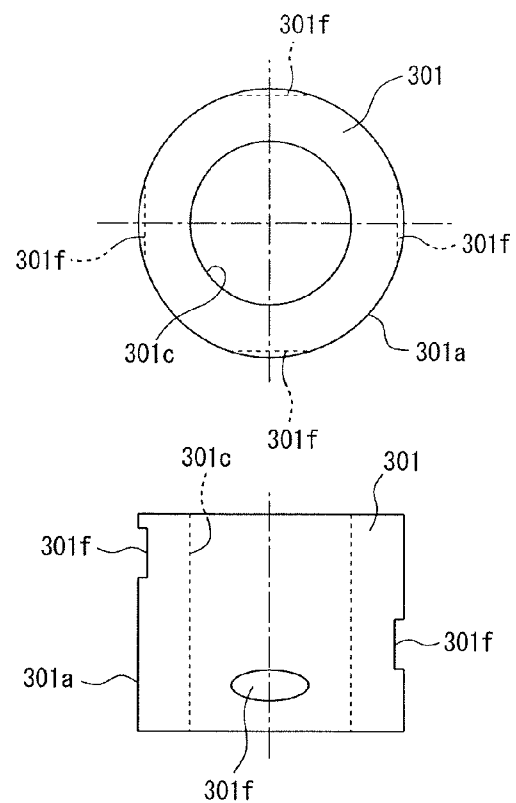
FIG. 31 is a front view and a longitudinal cross-sectional view illustrative of the shape of the nut blank in which the letter S shaped groove is formed in a modification of the method for manufacturing the ball screw nut in the fourth embodiment.

For example, in the example of FIG. 31, a concave 301*f* with an opening portion having a substantially elliptical shape is arranged on the outer circumferential surface 301*a* of the nut blank 301 before the S groove 302 is formed. The removed amount of the material by the concave 301*f* has a volume almost same as that of the inner circumferential surface 301*c* by the formation of the S groove 302. The forming method of the concave 301*f* is not limited to a special one. However, the cutting is conceivable. Additionally, the concave 301*f* may be formed when the nut blank 301 is manufactured by forging or casting.

Figure 32:
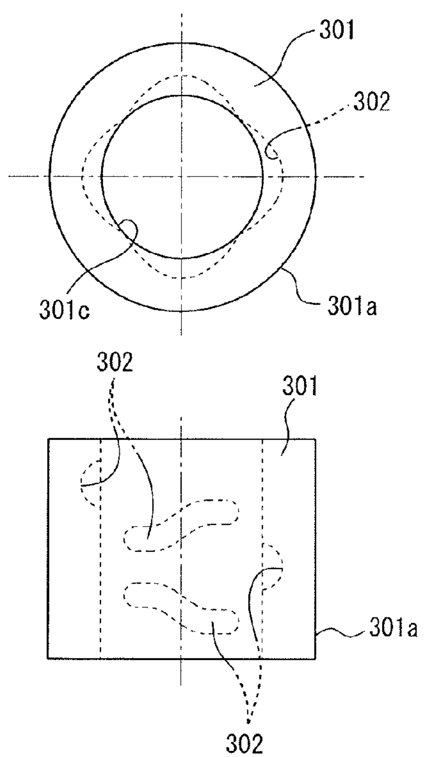
FIG. 32 is a front view and a longitudinal cross-sectional view illustrative of the shape of the nut blank in which the letter S shaped groove has been formed in a modification of the method for manufacturing the ball screw nut in the fourth embodiment.

The formation of the S groove 302 on the inner circumferential surface 301*c* of the nut blank 301 pushes the flown material outwardly in the radial direction, and the flown material extends along the inner circumferential surface 301*c* and almost fills the concave 301*f*. This results in that the outer circumferential surface 301*a* of the nut blank 301 has an almost cylindrical shape as illustrated in FIG. 32.

In a case where the concave 301*f* has a substantially elliptical shape, it is possible to form the concave 301*f* by merely moving the cutting tool in the radial direction of the nut blank 301. This makes it possible to form the concave 301*f* with ease.

Specifically, the shape of the concave 301*f* is not limited to a substantially elliptical shape.

Figure 33:
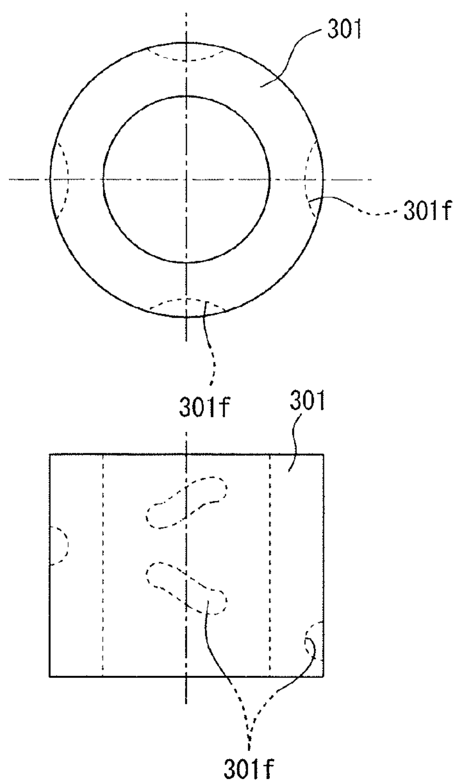
FIG. 33 is a front view and a longitudinal cross-sectional view illustrative of the shape of the nut blank in which the letter S shaped groove is formed in another modification of the method for manufacturing the ball screw nut in the fourth embodiment.

For example, the concave 301*f* may have a similar shape to that of the S groove 302, as illustrated in FIG. 33.

Figure 34:
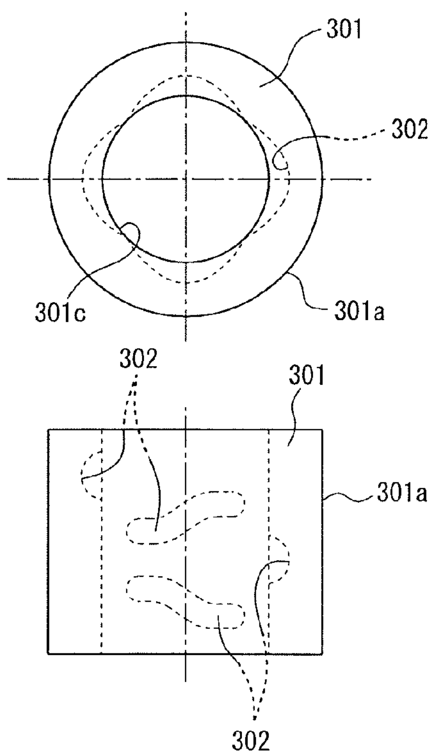
FIG. 34 is a front view and a longitudinal cross-sectional view illustrative of the shape of the nut blank in which the letter S shaped groove has been formed in another modification of the method for manufacturing the ball screw nut in the fourth embodiment.

In the case where the concave 301*f* has a similar shape to that of the S groove 302, the removed amount of the material can be made to the minimum. In the case of this shape, the outer circumferential surface 301*a* of the nut blank 301 has an almost cylindrical shape, as in the case of the substantially ellipse shape (See FIG. 34).

Figure 35:
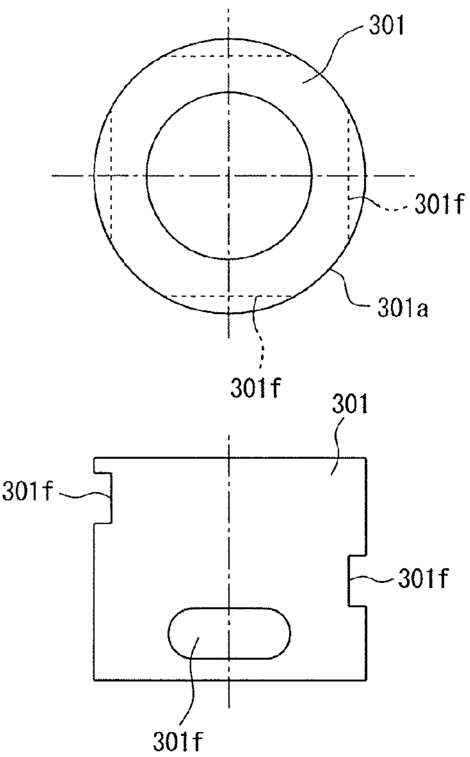
FIG. 35 is a front view and a longitudinal cross-sectional view illustrative of the shape of the nut blank in which the letter S shaped groove is formed in another modification of the method for manufacturing the ball screw nut in the fourth embodiment.
Figure 36:
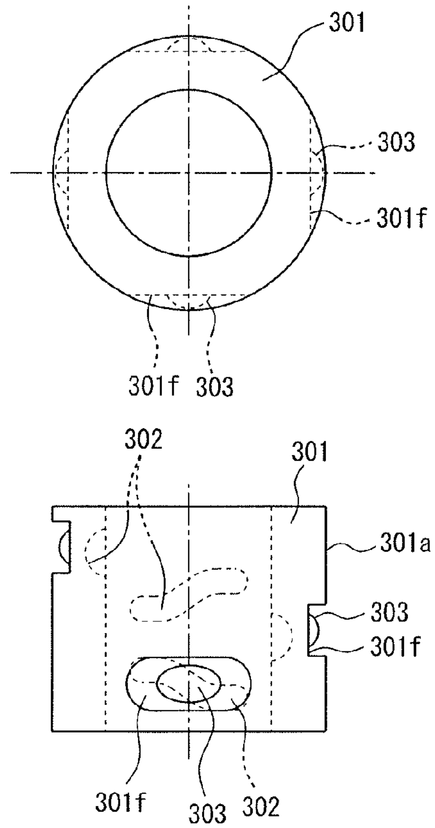
FIG. 36 is a front view and a longitudinal cross-sectional view illustrative of the shape of the nut blank in which the letter S shaped groove has been formed in another modification of the method for manufacturing the ball screw nut in the fourth embodiment.

Moreover, the removed amount of the material by the concave 301*f* may be more than that of the inner circumferential surface 301*c* by the formation of the S groove 302 (See FIG. 35). When the S groove 302 is formed on the inner circumferential surface 301*c* of the nut blank 301, the projection 303 is generated by the material flown into the concave 301*f* having a substantially rectangular opening. However, the head of the projection 303 is positioned on the inner side from the radius position of the circular shape part of the outer circumferential surface 301*a* of the nut blank 301 (See FIG. 36). Specifically, the projection 303 in FIG. 36 has a substantially elliptical shape, but may have a substantially same shape as that of the S groove 302.

In addition, referring to FIG. 37, the concave 301*f* extending in the axial direction of the nut blank 301 and reaching both end surfaces in the axial direction may be arranged. Furthermore, referring to FIG. 38, the concave 301*f* having a circular shape and extending in the circumferential direction of the nut blank 301 may be arranged. In the example of FIG. 38, two concaves 301*f* are arranged in the axial direction.

(Fifth Embodiment)

A fifth embodiment relates to a method for manufacturing a ball screw and a nut for the ball screw.

A ball screw is provided with: a threaded shaft having an outer circumferential surface on which a spiral groove is formed; a nut having an inner circumferential surface on which a spiral groove opposing the spiral groove of the threaded shaft is formed; and rollable balls loaded in a raceway between the spiral groove of the nut and that of the threaded shaft. The ball screw is a device such that the balls are rolling in the raceway to make the nut relatively move with respect to the threaded shaft.

Such ball screws are used in not only positioning devices of general industrial machinery but also electrical actuators mounted on vehicles such as automobiles, motorcycles, or vessels.

Additionally, there are some ball screws each having a ball return passage achieved by a letter S shaped circulation groove on the inner circumferential surface of the nut (See Patent Documents 4 to 6, for example).

Meanwhile, as a method of forming such a letter S shaped circulation groove, there is a method of forming it directly on the inner circumferential surface of the nut (nut blank) by use of plastic working of punching (See Patent Document 1, for example).

However, in such a plastic working, the outline shape of the letter S shaped circulation groove deforms, the degree of so-called shear droop is increased, in some cases. There is a possibility of degrading the operation performance of the ball screw or shortening the life of the circulation groove formed to have a letter S shape depending on the degree of the shear droop or the part having such shear droop occurs.

An object of the fifth embodiment is to suppress an occurrence of the shear droop and improve the operation performance of the ball screw or extend the life of the circulation groove, when the letter S shaped circulation groove is formed by plastic working with a punch.

In order to achieve the above object, according to the fifth embodiment, there is provided a method for manufacturing a ball screw, the ball screw comprising: a threaded shaft having an outer circumferential surface on which a rolling element rolling groove is formed; a nut having an inner circumferential surface on which a rolling element rolling groove opposing the rolling element rolling groove of the threaded shaft and at least one line of a letter S shaped circulation groove for connecting both end portions of the rolling element rolling grooves are formed; and balls rotatably loaded in a space defined between the rolling element rolling groove of the threaded shaft and that of the nut and the letter S shaped circulation groove. By pressing the punch into the inner circumferential surface of the nut to form the letter S shaped circulation groove, while forming of the circulation groove permitting a material in the nut to flow, flowing of the material is adjusted in accordance with a shape of the circulation groove.

In the method for manufacturing the ball screw, preferably, the flowing of the material to an outer circumference side is adjusted in accordance with the shape of the circulation groove. In addition, preferably, the flowing of the material to an end portion side in the axial direction of the nut is adjusted in accordance with the shape of the concave.

In the nut for the ball screw according to the fifth embodiment, a rolling element rolling groove on the inner circumferential surface is provided to oppose a rolling element rolling groove on the outer circumferential surface of the threaded shaft, and at least one line of a letter S shaped circulation groove for connecting both end portions of the rolling element rolling grooves is formed, so that balls are rotatably held in a space defined between the rolling element rolling groove and a rolling element rolling groove of the threaded shaft and in the letter S shaped circulation groove. By pressing the punch into the inner circumferential surface of the nut, the letter S shaped circulation groove is formed so that a projection amount, of projecting on the outer circumferential surface of the nut, on a part projecting corresponding to a curving portion of the groove is smaller than another part.

According to the fifth embodiment, it is made possible to suppress the generation of the shear droop by adjusting the flown material in accordance with the shape of a groove for circulation.

(Mechanism of Shear Droop Occurrence)

Firstly, the mechanism of shear droop occurrence will be described before the method for manufacturing the ball screw nut according to the fifth embodiment is described.

FIG. 39 illustrates a method for directly forming a letter S shaped circulation groove (hereinafter, referred to S groove) 431 on an inner circumferential surface 430*a* of a nut (nut blank) 430 by plastic working with a punch 401.

As illustrated in FIG. 39A and FIG. 39B, in this method, the nut 430 having a cylindrical shape is restrained by a restraining block 402 and the punch 401 is pushed into the inner circumferential surface 430*a* of the restrained nut 430.

The restraining block 402 has an inner circumferential surface 402*a* having a shape corresponding to the outer circumferential surface 430*b* of the nut 430 so that the inner circumferential surface 402*a* restrains the nut 430. In this situation, a material flowing portion 402*b* having a concaved groove shape is provided at the inner circumferential surface 402*a* of the restraining block 402 to correspond to a position of pushing the punch 401 onto the inner circumferential surface of the nut 430. For example, the material flowing portion 402*b* has a substantially letter S shape in planar view.

The punch 401 has a shape capable of forming the S groove 431 on the inner circumferential surface 430*a* of the nut 430. That is, for example, the punch 401 has a substantially letter S shape in planar view.

Hence, as illustrated in FIG. 39A (the drawing illustrative of the start of forming) to FIG. 39B (the drawing illustrative of the end of forming), in this method, the punch 401 is pushed onto the inner circumferential surface 430*a* of the nut 430 in which the outer circumferential surface 430*b* is restrained by the restraining block 402 to form the S groove 431.

In this process, it is effective of the material to flow in the outer circumference corresponding to the S groove on the inner circumferential surface, at the nut 430, at the time of forming the letter S shaped circulation groove, in order to improve the accuracy of pitch, depth, and phase in the letter S shaped groove by reducing the deformation in the shaped product or reducing the material flow, or to extend the life by reducing the surface pressure of the formed punch 401. For these reasons, the material flowing portion 402*b* is arranged at the restraining block 402.

FIG. 40 illustrates a cross-section taken along line A-A of FIG. 39B illustrative of the end of forming the S groove 431. Moreover, FIG. 41 illustrates the inner circumferential surface 430*a* of the nut 430 in which the S groove 431 is formed.

As illustrated in FIG. 40 and FIG. 41, the outline shape plastically deforms and collapses at the outer circumferential portion of the S groove 431 formed by the punch 401 pushed therein. In other words, so-called shear droop occurs (at the region indicated by hatching in FIG. 41). The degree of the shear droop 432 tends to increase, if the material flowing portion 402*b* is arranged at the restraining block 402 to flow the material to the outer circumference of the nut 430.

In addition, referring to FIG. 42, the amount (an example of width, depth, or the like) of the shear droop 432 is varied according to the position with respect to the S groove 431. For example, the amount is larger at a portion 432*a* located on the inside of the curving portion in the letter S shape (the region indicated by hatching is wider). Then, the amount is smaller at a longitudinal end portion 432*b* of the S groove 431. Furthermore, in a case where plural S grooves 431, each of which is same as that formed on the inner circumferential surface of the nut 430, are arranged in the axial direction of the nut 430, that is in a case where plural S grooves 431 are formed to correspond to plural spiral grooves (rolling element rolling groove) arranged on the nut 430, the amount of shear droop is varied depending on the position in the axial direction.

There is a possibility of degrading the operation performance of the ball screw or shorten the life of the S groove according to the amount of the shear droop or the part at which the shear droop occurs.

In the fifth embodiment, it is possible to prevent such degradation of the operation performance of the ball screw or shortening of the life of the S groove.

(Description of an Example of Fifth Embodiment)

(Structure)

Next, an example of a method for manufacturing a ball screw nut according to the fifth embodiment will be described. FIG. 42 illustrates a punch 410 and a restraining block 420 for realizing the method for manufacturing the ball screw nut. Specifically, FIG. 42 corresponds to the cross-section taken along line A-A of FIG. 39B illustrative of the end of forming the S groove as in FIG. 40.

The punch 410 has a shape capable of forming the S groove on the inner circumferential surface of the nut 430, in the same manner as described with reference to FIG. 39 and FIG. 40. That is, for example, the punch (hereinafter, referred to S groove forming punch) 410 has a substantially letter S shape in planar view. In addition, in the S groove forming punch 410, curving portions 410*a* (two portions having a large curvature) in the letter S shape has a protruding amount smaller than other parts (straight portion and portions having a small curvature) 410*b*.

The restraining block 420 has an inner circumferential surface 420*a* corresponding to an outer circumferential surface 430*b* of the nut 430, and restrains the nut 430 with the inner circumferential surface 420*a*. Then, the there is provided a material flowing portion 420*b* having a concaved groove shape on the inner circumferential surface 420*a* of the restraining block 420 to correspond to the position where the letter S groove forming punch 410 is pushed into the inner circumferential surface 430*a* of the nut 430.

FIG. 43 illustrates the material flowing portion 420*b* arranged on the inner circumferential surface 420*a* of the restraining block 420. As illustrated in FIG. 43, the material flowing portion 420*b* has a substantially letter S shape in planar view. The material flowing portion 420*b* is provided with material flowing suppressing portions 420*b*1 and 420*b*2. The material flowing suppressing portions 420*b*1 and 420*b*2 are arranged at the curving portions (two portions having a large curvature) in the letter S shape. That is, the material flowing suppressing portions 420*b*1 and 420*b*2 are provided in the circumferential direction of the inner circumferential surface 420*a* of the restraining block 420 with a predefined given width. The material flowing suppressing portions 420*b*1 and 420*b*2 are shallower than other parts (straight portion and portions having a small curvature) 420*b*3, 420*b*4, and 420*b*5. In this manner, the material flowing portion 420*b* has a shape partially varied to correspond to the change in the shape of the punch 410 or the S groove 431.

In the method for manufacturing the ball screw nut by use of the punch 410 and the restraining block 420 as described heretofore, the outer circumferential surface 430*b* of the nut 430 is restrained by the restraining block 420 and the S groove forming punch 410 is pushed into the inner circumferential surface 430*a* of the restrained nut 430. Thus, the S groove 431 is formed by the letter S groove forming punch 410.

Figure 44:
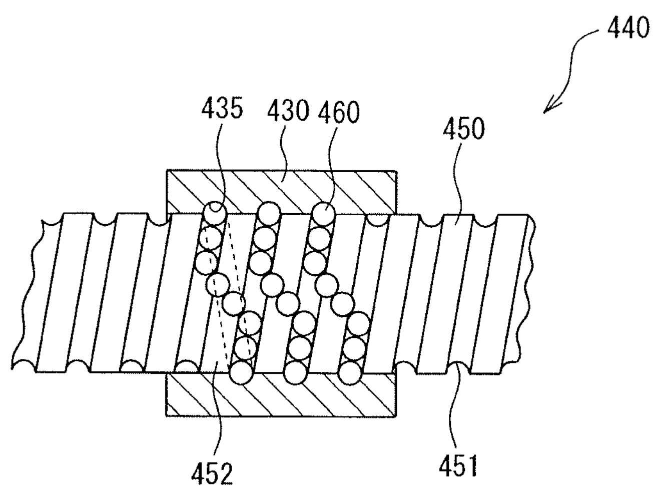
FIG. 44 is a cross-sectional view illustrative of a ball screw.

FIG. 44 illustrates a ball screw 440 provided with the nut 430 manufactured by the manufacturing method as described heretofore. As illustrated in FIG. 44, the ball screw 440 includes a threaded shaft 450 and balls (rolling elements) 460, in addition to the nut 430. The threaded shaft 450 is provided with a male spiral groove 451 having an arc shaped cross-section on its outer circumferential surface.

Figure 45:
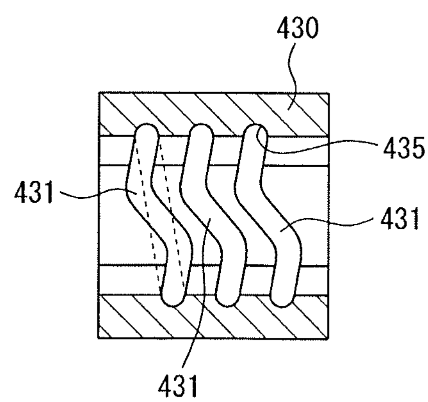
FIG. 45 is a cross-sectional view illustrative of a nut.

FIG. 45 illustrates a cross-sectional view of the nut 430. As illustrated in FIG. 45, the nut 430 includes an inner circumferential surface in close proximity to the outer circumferential surface of the threaded shaft 450. The inner circumferential surface is provided with a female spiral groove 435 facing the male spiral groove 451 of the threaded shaft 450. Then, three lines of female spiral grooves 435 provided at the nut 430 are arranged such that each of them is arranged in a spiral manner for only one circulation and its both ends are connected by the circulation passage (S groove) 431.

Referring back to FIG. 44, a number of balls 460 are disposed rotatably in a space defined by both of the spiral grooves 451 and 435 of the threaded shaft 450 and the nut 430, so that the balls 460 are capable of rolling along the spiral grooves 451 and 435 at the time of relative screw motion of the threaded shaft 450 and the nut 430.

On the inner circumferential surface of the nut 430, the circulation passage 431 having a portion (protruding outwardly in the radial direction) deeper than the female spiral groove 435 smoothly connects both end portions of the female spiral groove 435. The balls 460 that move rolling along the male spiral groove 451 of the threaded shaft 450 are guided along a crest 452 separating the adjacent male spiral grooves 451 of the threaded shaft 450. The balls 460 are further guided to the circulation passage 431, and move over the crest 452, and return to the adjacent (rolling) male spiral groove 451. In other words, the balls 460 are capable of circulating.

In a case where the nut 430 is supported in a non-rotating state, the rotation of the threaded shaft 450 causes the balls 460 repeatedly circulate while rolling endlessly in each of the three lines of the ball guiding passages (the spiral grooves 451 and 435 and the circulation passage 431), and also causes the nut 430 to do a translatory movement forwardly or backwardly in response to the rotating direction of the threaded shaft 450.

(Operations and Effects)

Operations and effects will be described with reference to FIG. 46. FIG. 46 illustrates the nut 430. As illustrated in FIG. 46, the outer circumferential surface 430*b* of the nut 430 has a shape corresponding to that of the inner circumferential surface of the restraining block 420. That is, a portion 430*c* is generated on the outer circumferential surface 430*b* of the nut 430 to protrude in a substantially letter S shape in the same manner to correspond to the S groove 431 formed on the inner circumferential surface 430*a* of the nut 430, namely to correspond to the material flowing portion 420*b* of the restraining block 420.

Then, in the projecting portion 430*c* of the outer circumferential surface 430*b* in the nut 430, a portion 430*c*1 corresponding to the material flowing suppressing portions 420*b*1 and 420*b*2 of the material flowing portion 420*b* has a protruding amount smaller than those of other portions 430*c*2 and 430*c*3. In other words, in the projecting portion 430*c*, the protruding amount of the portion 430*c*1 protruding to correspond to the curving portion of the S groove 431 is smaller than those of the other portions 430*c*2 and 430*c*3.

That is, the material is suppressed from flowing to the outer circumference side of the nut 430 by the material flowing suppressing portions 420*b*1 and 420*b*2 of the material flowing portion 420*b*. Hence, the shear droop at the outer circumference of the curving portion of the corresponding S groove is suppressed (a part indicated by a reference Z in FIG. 46 is a region where the shear droop is reduced).

That is to say, in the fifth embodiment, there are provided the material flowing suppressing portions 420*b*1 and 420*b*2 in accordance with the shape of the S groove 431, at the material flowing portion 420*b*. Therefore, the shear droop at the outer circumference of the curving portion of the S groove 431 is suppressed by adjusting the shape and depth of the flown material of the nut 430 to the outer circumference side in accordance with the shape of the S groove 431.

(Modification of Fifth Embodiment)

FIG. 47 illustrates a modification of the fifth embodiment. As illustrated in FIG. 47, in the fifth embodiment, a material flowing suppressing portion 420*b*6 may be provided for making its width (width in the axial direction) different, instead of making the depth at the material flowing portion 420*b* different. That is, as illustrated in FIG. 47, a cutout portion 420*b*7 in which its outer circumference is cutout, is provided in the material flowing portion 420*b* to form the material flowing suppressing portion 420*b*6.

In the modification of the fifth embodiment, in this manner, the width of the material flowing portion 420*b* is made to correspond to the shape of the S groove 431 and to adjust the flown material to an end portion side in the axial direction of the nut 430 in accordance with the shape of the S groove 431, so that the shear droop at the outer circumference at the curving portion of the S groove 431 is suppressed.

Additionally, in the fifth embodiment, it is made possible to change both of the above-described depth and width of the material flowing portion 420*b* in accordance with the shape of the S groove 431.

Furthermore, as another modification of the fifth embodiment, in order to reduce the punch stress or the flow of the material, parts of the material flowing suppressing portions 420*b*1 and 420*b*2 (fifth embodiment) or the cutout portion 420*b*7 may be received by an elastic body (an example is urethane).

That is to say, in FIG. 42, for example, the inner circumferential surface 420*a* of the restraining block 420 is substantially the same surface continuous with other parts at the material flowing suppressing portions 420*b*1 and 420*b*2. However, elastic bodies may be buried at the parts of the material flowing suppressing portions 420*b*1 and 420*b*2, or a portion for restraining the material (separated from the restraining block 420) may be supported by an elastic body such as a spring or the like.

(Sixth Embodiment)

A sixth embodiment relates to a method for manufacturing a ball screw and to a nut for the ball screw.

A ball screw is provided with: a threaded shaft having an outer circumferential surface on which a spiral groove is formed; a nut having an inner circumferential surface on which a spiral groove opposing the spiral groove of the threaded shaft is formed; and rollable balls in a space between the spiral groove of the threaded shaft and the spiral groove of the nut. The ball screw is a device such that the balls are rolling in the raceway to make the nut relatively move with respect to the threaded shaft.

Such ball screws are used in not only positioning devices of general industrial machinery but also electrical actuators mounted on vehicles such as automobiles, motorcycles, or vessels.

Additionally, there are some ball screws each having a ball return passage achieved by a letter S shaped circulation groove on the inner circumferential surface of the nut (nut blank) (See Patent Documents 4 to 6, for example).

Meanwhile, as a method of forming such a letter S shaped circulation groove, there is a method of forming it directly on the inner circumferential surface of the nut (nut blank) by use of plastic working of punching (See Patent Document 1, for example).

However, in such a plastic working, the outline shape of the letter S shaped circulation groove deforms, the degree of so-called shear droop is increased, in some cases. There is a possibility of degrading the operation performance of the ball screw or shortening the life of the circulation groove formed to have a letter S shape depending on the degree of the shear droop or the part having such shear droop occurs.

An object of the sixth embodiment is to suppress an occurrence of the shear droop and improve the operation performance of the ball screw or extend the life of the circulation groove, when the letter S shaped circulation groove is formed by plastic working with a punch.

According to the sixth embodiment, there is provided a method for manufacturing a ball screw, the ball screw comprising: a threaded shaft having an outer circumferential surface on which a rolling element rolling groove is formed; a nut having an inner circumferential surface on which a rolling element rolling groove opposing the rolling element rolling groove of the threaded shaft and at least one line of a letter S shaped circulation groove for connecting both end portions of the rolling element rolling grooves are formed; and balls rotatably loaded in a space defined between the rolling element rolling groove of the threaded shaft and that of the nut and the letter S shaped circulation groove. By pressing the punch into the inner circumferential surface of the nut to form the letter S shaped circulation groove, and to form a concave for reducing shear droop of the letter S shaped circulation groove produced by plastic working with the punch, on the inner circumferential surface of the nut and on the outer circumference of the letter S shaped circulation groove.

In the method for manufacturing the ball screw according to the sixth embodiment, preferably, the concave is arranged adjacent to a part where the concave curves. In addition, preferably, a shape and a depth of the concave for shear droop are determined in accordance with an amount of the shear droop.

In addition, the nut for the ball screw according to the sixth embodiment is provided with: a rolling element rolling groove on the inner circumferential surface to oppose a rolling element rolling groove provided on the outer circumferential surface of the threaded shaft; at least one line of a letter S shaped circulation groove, formed on the inner circumferential surface, for connecting both end portions of the rolling element rolling grooves; and a concave for reducing the shear droop in the letter S shaped circulation groove generated when the letter S shaped circulation groove is produced by plastic working with the punch.

In the nut for the ball screw according to the sixth embodiment, preferably, the concave is arranged adjacent to a part where the circulation groove curves. In addition, preferably, a depth of the concave for shear droop is determined in accordance with an amount of the shear droop. Furthermore, preferably, the concave has a cross-section of any one of a curved surface, a tapered surface, a surface in combination of a curved surface and a tapered surface, and a notch shape.

According to the sixth embodiment, when the letter S shaped circulation groove is formed by plastic working with a punch, the concave is formed on the inner circumferential surface of the nut and on the outer circumference of the letter S shaped circulation groove. It is therefore possible to suppress the generation of shear droop.

Next, an example of a method for manufacturing a ball screw nut according to the sixth embodiment will be described.

(Structure)

Figure 48:
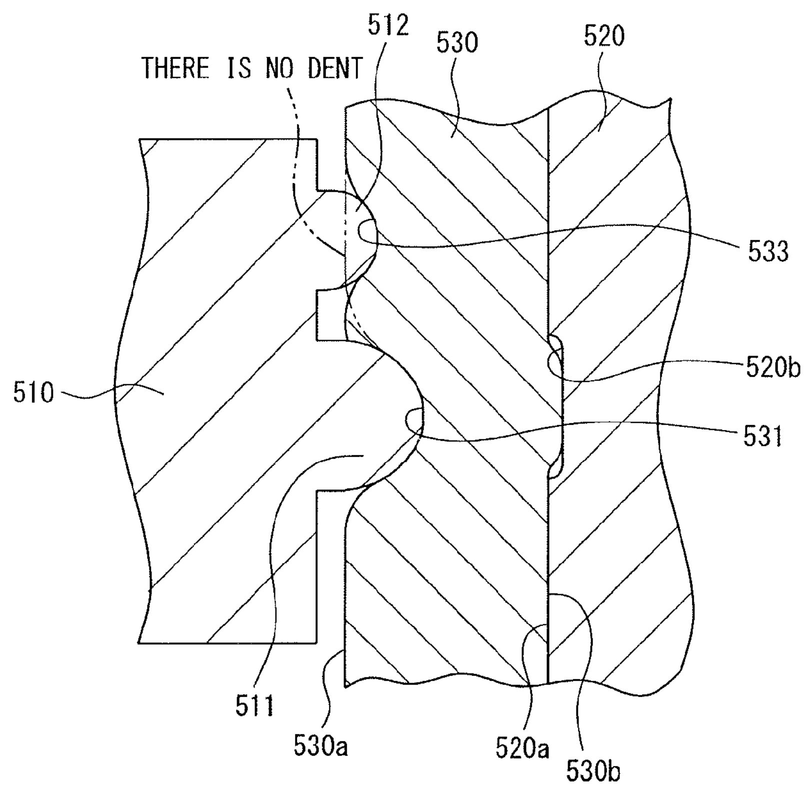
FIG. 48 is a view illustrative of a configuration of realizing the method of manufacturing the ball screw nut in a sixth embodiment.

FIG. 48 illustrates a punch 510 and a restraining block 520 for realizing the method for manufacturing the ball screw nut. Specifically, FIG. 48 corresponds to the cross-section taken along line A-A of FIG. 39B illustrative of the end of forming the S groove as in FIG. 40.

The punch 510 includes: an S groove forming punch 511 for forming an S groove 531; and a dent forming punch 512 for reducing the shear droop.

The letter S groove forming punch 511 has a shape capable of forming the S groove 531 on an inner circumferential surface 530*a* of a nut 530 in the same manner as described with reference to FIG. 39 and FIG. 40. That is, for example, the letter S groove forming punch 511 has a substantially letter S shape in planar view.

The dent forming punch 512 is provided to be adjacent to the S groove forming punch 511. The dent forming punch 512 is provided to surround the entire circumference of the S groove forming punch 511 or is partially provided instead of surrounding the entire circumference. For example, in a case where the dent forming punch 512 is partially provided, the dent forming punch 512 is at least provided to be located in the periphery of two curving portions of the S groove 531 formed by the S groove forming punch 511. That is, when the S groove forming punch 511 has a substantially letter S shape, the dent forming punch 512 is provided at the punch 510 to face or to be adjacent to the curving portion (part having a large curvature) of the letter S shape.

In addition, the outer circumferential surface of the dent forming punch 512 is similar to a curved surface shape, a tapered surface (inclined plane surface), or a surface shape in which a curved surface and a tapered surface are combined. Furthermore, the dent forming punch 512 may be a secured punch (punch secured and supported) in the same manner as the S groove forming punch 511, or may be supported by an elastic body (an example is a perfect elastic body).

The restraining block 520 has an inner circumferential surface 520*a* having a shape corresponding to an outer circumferential surface 530*b* of the nut 530, so that the inner circumferential surface 520*a* restrains the nut 530. Moreover, there is provided a material flowing portion 520*b* having a concaved groove shape at the inner circumferential surface 520*a* of the restraining block 520 to correspond to the position where the S groove forming punch 511 is pushed into the inner circumferential surface 530*a*. For example, the material flowing portion 520*b* has a substantially letter S shape in planar view.

In the method for manufacturing the ball screw nut by use of the punch 510 and the restraining block 520 as described heretofore, the outer circumferential surface 530*b* of the nut 530 is restrained by the restraining block 520 and the punch 510 is pushed into the inner circumferential surface 530*a* of the restrained nut 530. Thus, the S groove 531 is formed by the S groove forming punch 510, and in addition, a dent 533 (concave for shear droop) is formed at the outer circumference of the S groove 531 (concave) by the dent forming punch 512.

For example, the depth of the dent, namely the amount of pushing the dent forming punch 512 into the inner circumferential surface 530*a* of the nut 530 depends on the allowable amount of the shear droop. As an example, the dent becomes deeper as the allowable amount of shear droop is smaller.

FIG. 44 illustrates the ball screw 440 provided with the nut 530 (reference numeral is 430 in FIG. 44) manufactured in the manufacturing method as described heretofore. As illustrated in FIG. 44, the ball screw 440 includes the threaded shaft 450 and the balls (rolling elements) 460, in addition to the nut 430. The threaded shaft 450 is provided with the male spiral groove 451 having an arc shaped cross-section on its outer circumferential surface.

FIG. 45 illustrates a cross-sectional view of the nut 430. As illustrated in FIG. 45, the nut 430 includes an inner circumferential surface in close proximity to the outer circumferential surface of the threaded shaft 450. The inner circumferential surface is provided with a female spiral groove 435 facing the male spiral groove 451 of the threaded shaft 450. Then, three lines of female spiral grooves 435 provided at the nut 430 are arranged such that each of them is arranged in a spiral manner for only one circle and its both ends are connected by the circulation passage (S groove) 431.

Referring back to FIG. 44, a number of balls 460 are disposed rotatably in a space defined by both of the spiral grooves 451 and 435 of the threaded shaft 450 and the nut 430, so that the balls 460 are capable of rolling along the spiral grooves 451 and 435 at the time of relative screw motion of the threaded shaft 450 and the nut 430.

On the inner circumferential surface of the nut 430, the circulation passage 431 having a portion (protruding outwardly in the radial direction) deeper than the female spiral groove 435 smoothly connects both end portions of the female spiral groove 435. The balls 460 that move rolling along the male spiral groove 451 of the threaded shaft 450 are guided along a crest 452 separating the adjacent male spiral grooves 451 of the threaded shaft 450. The balls 460 are further guided to the circulation passage 431, and move over the crest 452, and return to the adjacent male spiral groove 451 that has been rolled. In other words, the balls 460 are capable of circulating.

In a case where the nut 430 is supported in a non-rotating state, the rotation of the threaded shaft 450 causes the balls 460 repeatedly circulate while rolling endlessly in each of the three lines of the ball guiding passages (the spiral grooves 451 and 435 and the circulation passage 431), and also causes the nut 430 to do a translatory movement forwardly or backwardly in response to the rotating direction of the threaded shaft 450.

(Operations and Effects)

Figure 49:
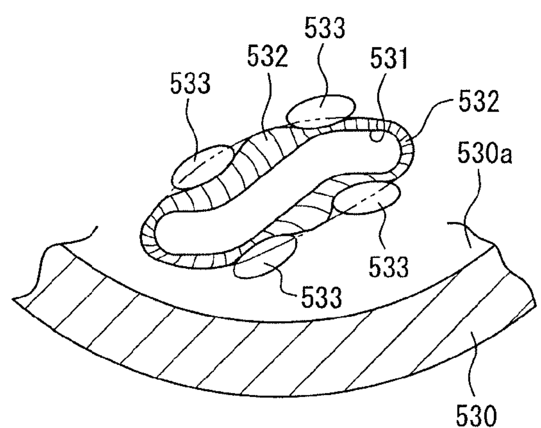
FIG. 49 is a view illustrative of an inner circumferential surface of the nut blank, in which a letter S shaped circulation groove and a dent are formed.

Operations and effects will be described with reference to FIG. 49 and FIG. 50. FIG. 49 illustrates the inner circumferential surface 530*a*, of the nut 530, on which the S groove 531 and the dent 533 are formed. Specifically, FIG. 49 illustrates an example of providing the dent forming punch 512 corresponding to (two) curving portions in the letter S shape of the S groove 531 and forming the dent 533. As illustrated in FIG. 49, the provision of the dent 533 at the outer circumference of the S groove 531 reduces the shear droop at the outer circumferential portion of the S groove 531 in which the dent 533 is arranged.

Figure 50:
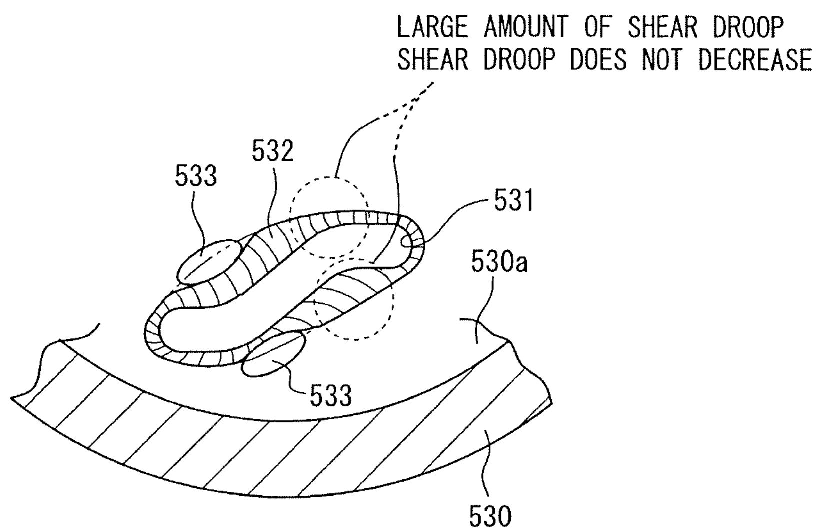
FIG. 50 is a view illustrative of functions and effects of the sixth embodiment.

FIG. 50 is an example for comparing with FIG. 49, in which the dent forming punch 512 is provided to correspond to one curving portion in the letter S shape of the S groove 531 to form the dent 533. Specifically, in FIG. 49 and FIG. 50, the chain double-dashed line in the drawing indicates the shear droop when the dent 533 is not provided.

As to FIG. 49 and FIG. 50, when comparing the outer circumferential portion of the letter S shaped curving portion of the S groove 531 in which a dent is not provided, as can be seen from FIG. 49 that the hatching region is narrower, the provision of the dent 533 reduces the shear droop at the outer circumferential portion of the S groove 531 in which the dent 533 is arranged (the hatching region is reduced).

Thus, in the sixth embodiment, it is possible to suppress the amount of the shear droop, thereby to improve the operation performance of the ball screw and extend the life of the circulation groove (S groove).

Additionally, in particular, the shear droop generated at the curving portion in the letter S shape of the S groove 531 significantly influences and degrades the operation performance of the ball screw or shorten the life of the S groove. However, the dent 533 is partially arranged to correspond to such parts to suppress the amount of the shear droop, whereby it is made possible to suppress the degradation of the operation performance of such a ball screw or shortening of the life of the S groove.

(Modification of Sixth Embodiment)

In the sixth embodiment, the dent forming punch 512 may have a shape such that the cross-section of the dent 533 has a notch shape of a triangular shape.

Figure 51:
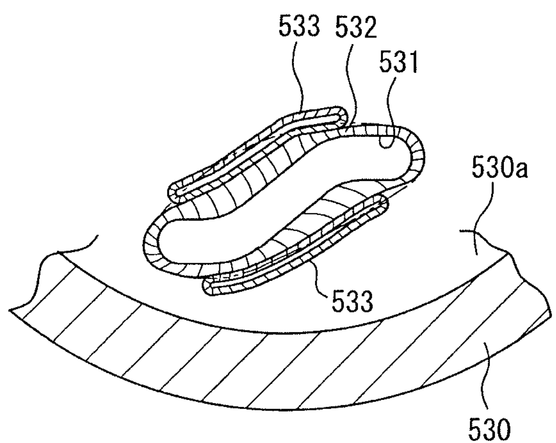
FIG. 51 is a view illustrative of a modification of the sixth embodiment.

FIG. 51 illustrates the inner circumferential surface 530*a*, of the nut 530, on which the dent 533 is formed by the above-described dent forming punch 512. As illustrated in FIG. 51, the dent 533 has a cross-section with a notch shape of a triangular shape.

In addition, in the sixth embodiment, the nut 530 may have any number of the S grooves other than that described in the above example.

Furthermore, in the sixth embodiment described heretofore, the S groove forming punch and the dent forming punch are arranged at an identical punch, but may be provided at different punches.

Moreover, the S groove and the dent may not be formed at the same time. After the S groove is formed, the dent may be formed.

(Seventh Embodiment)

A seventh embodiment relates to a method for manufacturing a ball screw and to a nut for the ball screw.

A ball screw is provided with: a threaded shaft having an outer circumferential surface on which a spiral groove is formed; a nut having an inner circumferential surface on which a spiral groove opposing the spiral groove of the threaded shaft is formed; and rollable balls loaded in a space defined by the spiral groove of the threaded shaft and the spiral groove of the nut. The ball screw is a device such that the balls are rolling in the raceway to make the nut relatively move with respect to the threaded shaft.

Such ball screws are used in not only positioning devices of general industrial machinery but also electrical actuators mounted on vehicles such as automobiles, motorcycles, or vessels.

Additionally, there are some ball screws each having a ball return passage achieved by a letter S shaped circulation groove on the inner circumferential surface of the nut (See Patent Documents 4 to 6, for example).

Meanwhile, as a method of forming such a letter S shaped circulation groove, there is a method of forming it directly on the inner circumferential surface of the nut (nut blank) by use of plastic working with a punch.

In such a plastic working, however, the outline shape of the letter S shaped circulation groove deforms, the degree of so-called shear droop is increased, in some cases. There is a possibility of degrading the operation performance of the ball screw or shortening the life of the circulation groove formed to have a letter S shape depending on the degree of the shear droop or the part having such shear droop occurs.

An object of the seventh embodiment is to suppress an occurrence of the shear droop and improve the operation performance of the ball screw or extend the life of the circulation groove, when the letter S shaped circulation groove is formed by plastic working with a punch.

According to the seventh embodiment, there is provided a method for manufacturing a ball screw, the ball screw comprising: a threaded shaft having an outer circumferential surface on which a rolling element rolling groove is formed; a nut having an inner circumferential surface on which a rolling element rolling groove opposing the rolling element rolling groove of the threaded shaft and at least one line of a letter S shaped circulation groove for connecting both end portions of the rolling element rolling grooves are formed; and balls rotatably loaded in a space defined between the rolling element rolling groove of the threaded shaft and that of the nut and the letter S shaped circulation groove. There is also provided with an excess material portion for reducing the shear droop of the letter S shaped circulation groove generated by plastic working with a punch, so as to protrude from the circular inner circumferential surface of the nut. The punch is pushed into the excess material portion to form the letter S shaped circulation groove.

In the method for manufacturing the ball screw according to the seventh embodiment, the excess material portion has a shape corresponding to the shape of the letter S shaped circulation groove.

In the nut for the ball screw according to the seventh embodiment, a rolling element rolling groove on the inner circumferential surface is provided to oppose a rolling element rolling groove provided on the outer circumferential surface of the threaded shaft, and at least one line of a letter S shaped circulation groove for connecting both end portions of the rolling element rolling grooves is formed, so that balls are rotatably held in a space defined by the rolling element rolling groove of the threaded shaft and the rolling element rolling groove of the nut and in the letter S shaped circulation groove. There is also provided with an excess material portion for reducing the shear droop of the letter S shaped circulation groove generated by plastic working with a punch, so as to protrude from the circular inner circumferential surface of the nut.

In the nut for the ball screw according to the seventh embodiment, preferably, the excess material portion has a shape corresponding to that of the circulation groove.

According to the seventh embodiment, there is provided the excess material portion for estimating the shear droop amount generated at the part on the inner circumferential surface of the nut where the groove is formed, when the letter S shaped circulation groove is formed by plastic working with a punch.

Figure 52A:
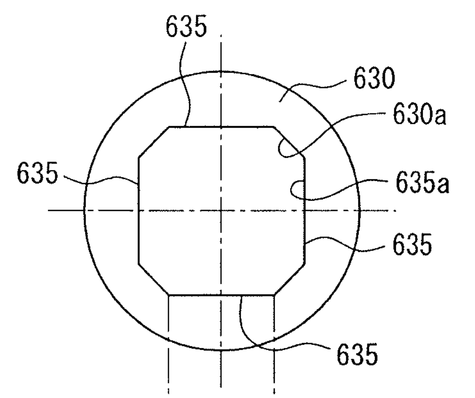
FIG. 52 is a view illustrative of a configuration of a nut blank constituting an S groove in the method of manufacturing the ball screw nut in a seventh embodiment.
Figure 52B:
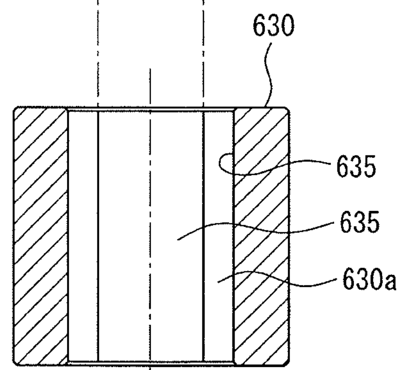

Next, an example of a method for manufacturing a ball screw nut according to the seventh embodiment will be described. FIG. 52 illustrates a nut blank 630 in which S grooves are formed in the method for manufacturing the ball screw nut according to the seventh embodiment. FIG. 52A is a front view, and FIG. 52B is a longitudinal cross-sectional view taken in the axial direction.

As illustrated in FIG. 52, the nut blank 630 has a cylindrical shape. Then, parts of an inner circumferential surface 630*a* of the nut blank 630 are provided with excess material portions 635, for absorbing shear droop, that protrude with an additional material further than other parts having a circular shape.

The excess material portion 635 for absorbing shear droop is formed to extend in the axial direction of the nut 630, and surfaces 635*a* inwardly facing the nut 630 each have a planar surface. For example, in the seventh embodiment, four excess material portions 635 for absorbing shear droop are arranged at intervals of 90 degrees in a circumferential direction of the nut 630 to correspond to the formed positions of the S grooves.

The excess material portion 635 for absorbing shear droop is formed to have a shape of estimating the shear droop amount generated (width and thickness of the formed region and the like) when the S grooves are formed on the inner circumferential surface 630*a* of the nut blank 630.

Figure 53A:
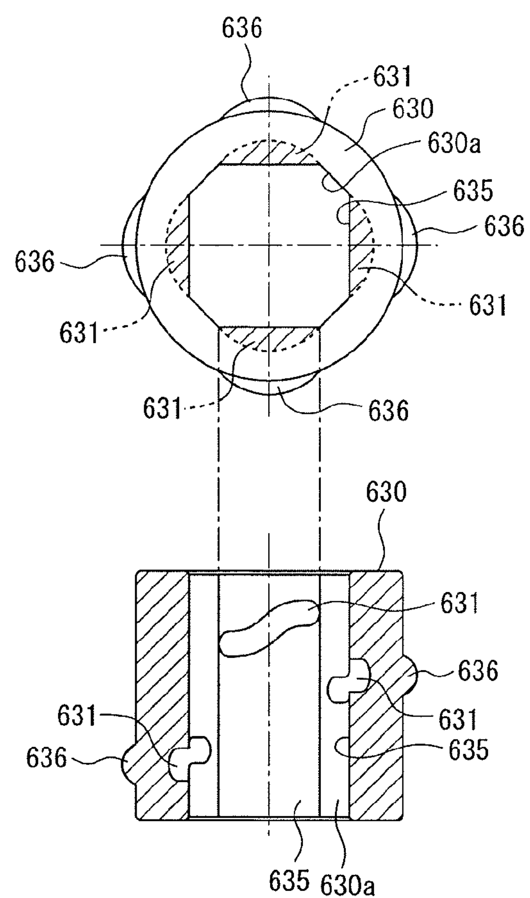
FIG. 53 is a view illustrative of a configuration of a nut blank constituting an S groove in the method of manufacturing the ball screw nut in the seventh embodiment.
Figure 53B:
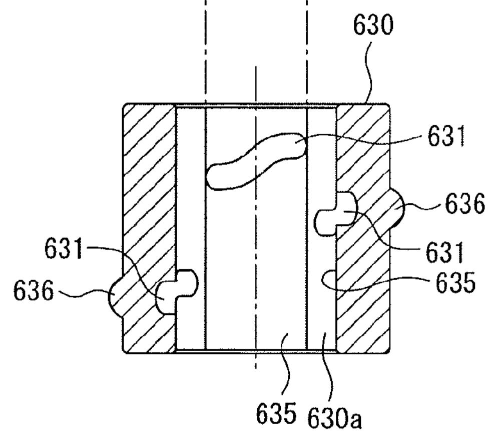

FIG. 53 illustrates the shape of the nut blank 630 in which S grooves 631 are arranged in the method for manufacturing the ball screw nut according to the seventh embodiment. FIG. 53A is a front view, and FIG. 53B is a longitudinal cross-sectional view taken in the axial direction.

As illustrated in FIG. 53, plural S grooves 631 are formed to correspond to the excess material portion 635 for absorbing shear droop, respectively, on the inner circumferential surface 630*a* of the nut blank 630. For example, in the method for manufacturing the ball screw nut according to the seventh embodiment, as illustrated in FIG. 39 and FIG. 40, the S groove 631 is formed at the excess material portion 635 for absorbing shear droop by use of the punch 401 and a restraining block 402. Specifically, the outer circumferential surface 430*b* of the nut blank 630 (numerical reference is 430 in FIG. 39) is restrained by the restraining block 402, and the punch 401 is pushed into excess material portion 635 for absorbing shear droop of the inner circumferential surface 630*a* in the restrained nut blank 630, so that the S groove 631 is provided in the excess material portion 635 for absorbing shear droop. Additionally, in this situation, projections (projecting portions generated by flowing the material) 636 are formed to correspond to the S grooves 631 arranged on the inner circumferential surface 630*a* of the nut blank 630, that is, to be located in a material flowing portion 402*b* of the restraining block 402.

Figure 54:
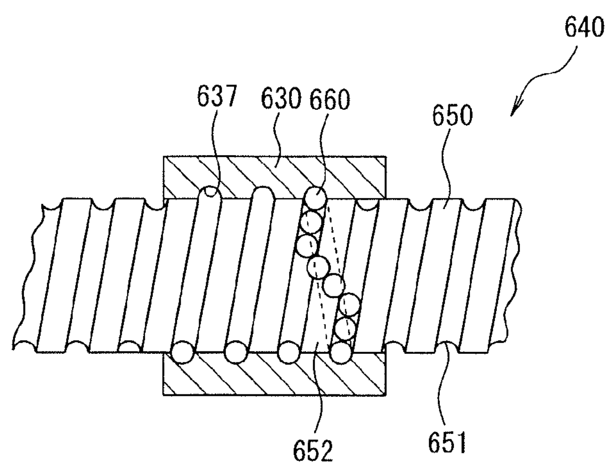
FIG. 54 is a cross-sectional view illustrative of a ball screw.

FIG. 54 illustrates a ball screw 640 provided with the nut (nut blank) 630 manufactured in the above-described manufacturing method. As illustrated in FIG. 54, the ball screw 640 also includes a threaded shaft 650 and balls 660, in addition to the nut 630. The threaded shaft 650 is provided with a male spiral groove 651 having an arc shaped cross-section on its outer circumferential surface.

In the ball screw 640, a number of balls 660 are disposed rotatably in a space defined by both of the spiral grooves 651 and 637 of the threaded shaft 650 and the nut 630, so that the balls 660 are capable of rolling along the spiral grooves 651 and 637 at the time of relative screw motion of the threaded shaft 650 and the nut 630.

On the inner circumferential surface of the nut 630, a circulation passage 631 having a part (protruding outwardly in the radial direction) deeper than the female spiral groove 637 smoothly connects both end portions of the female spiral groove 637. The balls 660 that move rolling along the male spiral groove 651 of the threaded shaft 650 are guided along a crest 652 separating the adjacent male spiral grooves 651 of the threaded shaft 650. The balls 660 are further guided to the circulation passage 631, pass over the crest 652, and return to the adjacent female spiral groove 651 (that has been rolled). In other words, the balls 460 are capable of circulating. In addition, the example of FIG. 54 illustrates the balls 660 guided by the circulation passage 631, and in fact, the balls 660 also exist in a space defined by both spiral grooves 651 and 637.

Furthermore, in a case where the nut 630 is supported in a non-rotating state, the rotation of the threaded shaft 650 causes the balls 660 repeatedly circulate while rolling endlessly in each of the ball guiding passages (the spiral grooves 651 and 637 and the circulation passage 631), and also causes the nut 630 to do a translatory movement forwardly or backwardly in response to the rotating direction of the threaded shaft 650.

(Operations and Effects)

As described above, in the seventh embodiment, the excess material portion 635 for absorbing shear droop is provided on the inner circumferential surface 630*a* of the nut blank 630 and the punch (an example of the punch 401 illustrated in FIG. 39 and FIG. 40) is pushed into the excess material portion 635 for absorbing shear droop so that the S groove 631 is formed.

Thus, in the seventh embodiment, the provision of the excess material portion 635 for absorbing shear droop of estimating the shear droop amount to be generated suppresses the generation of the shear droop amount to the minimum. Accordingly, in the seventh embodiment, it is possible to improve the operation performance of the ball screw and extend the life of the circulation groove.

(Modifications of Seventh Embodiment)

In the seventh embodiment, the excess material portion for absorbing shear droop is not limited to the above shape and may have another one.

Figures 55A, 55B:
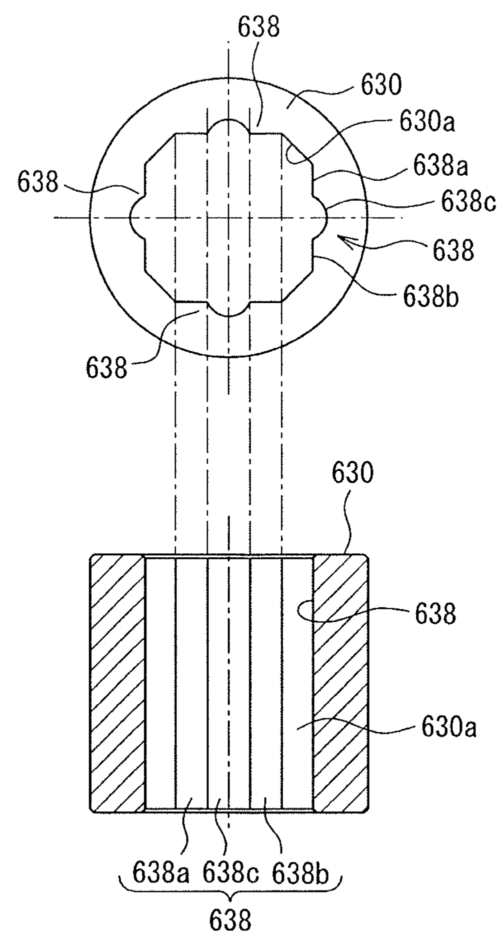
FIG. 55 is a view illustrative of a shape of a nut blank constituting the S groove to be formed in the method of manufacturing the ball screw nut in a modification of the seventh embodiment.

FIG. 55 illustrates a shape of the nut blank 630 in which excess material portions 638 for absorbing shear droop each having another shape are arranged. FIG. 55A is a front view, and FIG. 55B is a longitudinal cross-sectional view taken in the axial direction.

As illustrated in FIG. 55, in the excess material portion 638 for absorbing shear droop, the thickness of end portions 638*a* and 638*b* in the circumferential direction, that is, the thickness of portions 638*a* and 638*b* adjacent to circular shaped portions of the inner circumferential surface 630*a* in the nut blank 630 are greater than that of a central portion 638*c* in the circumferential direction.

Figures 56A, 56B:
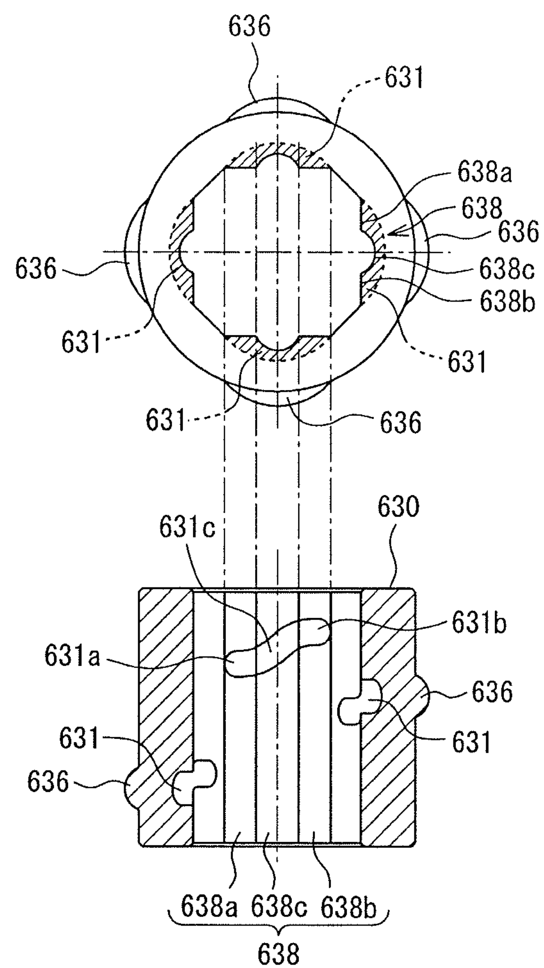
FIG. 56 is a view illustrative of a shape of a nut blank constituting the S groove that has been formed in the method of manufacturing the ball screw nut in a modification of the seventh embodiment.

FIG. 56 illustrates a shape of the nut 630 in which the S grooves 631 are arranged in the method for manufacturing the ball screw nut according to the seventh embodiment. FIG. 56A is a front view, and FIG. 56B is a longitudinal cross-sectional view taken in the axial direction.

As illustrated in FIG. 56, there are provided plural S grooves to correspond to the excess material portion 638 for absorbing shear droop, respectively, on the inner circumferential surface 630*a* of the nut blank 630. For example, in the modification of the seventh embodiment, as illustrated in FIG. 39 and FIG. 40, the S groove 631 is formed at the excess material portion 638 for absorbing shear droop by use of the punch 401 and the restraining block 402. Specifically, the outer circumferential surface 430*b* of the nut blank 630 (numerical reference is 430 in FIG. 39) is restrained by the restraining block 402, and the punch 401 is pushed into the excess material portion 638 for absorbing shear droop of the inner circumferential surface 630*a* in the restrained nut blank 630, so that the S groove 631 is provided in the excess material portion 638 for absorbing shear droop. Additionally, in this situation, projections (projecting portions generated by flowing the material) 636 are formed to respectively correspond to the S grooves 631 arranged on the inner circumferential surface 630*a* of the nut blank 630, that is, to be located in the material flowing portion 402*b* of the restraining block 402.

In this situation, the S groove 631 formed on the inner circumferential surface 630*a* of the nut blank 630 is arranged in the circumferential direction of the nut blank 630, so that a one-side curving portion (part having a large curvature) 631*a*, a substantially straight line portion (part having a small curvature) 631*c*, and a portion curving in another direction (part having a large curvature) 631*b* are arranged in this order in the circumferential direction of the inner circumferential surface 630*a* of the nut blank 630.

The excess material portion 638 for absorbing shear droop in the modification of the seventh embodiment corresponds to the location of such an S groove 631. Both of the end portions 638*a* and 638*b* that are thick are located on the curving portions 631*a* and 631*b* of both ends of the formed S groove 631, whereas the thin middle portion 638*c* is located at the substantially straight shaped portion 631*c* of the formed S groove 631.

As described heretofore, also in the modification of the seventh embodiment, the provision of the excess material portion 638 for absorbing shear droop of estimating the shear droop amount to be generated suppresses the generation of the shear droop at the minimum. In addition, in the modification of the seventh embodiment, it is made possible to intensively suppress the generation of the shear droop, at the curving portions 631*a* and 631*b* of the S groove 631.

Furthermore, in the seventh embodiment, as illustrated in FIG. 52, the number of the S grooves or that of excess material portions for absorbing shear droop is not limited to four. At least one S groove or at least one excess material portion for absorbing shear droop may be provided.

(Eighth Embodiment)

An eighth embodiment relates to a ball screw, a method for manufacturing the same, and a die used for manufacturing the ball screw.

In recent years, power saving in vehicles and the like is progressing. For instance, in the automobile industry, systems are being developed such that transmissions or parking brakes are operated by forces of electric motors instead of direct transmission of manual operation via gears or wires. In the electric actuator for use in such an application, a ball screw mechanism is employed, in some cases, so that the rotational movement transmitted from the electric motor is converted into axial movements at a high efficiency to drive each mechanism of an automobile.

In general, the ball screw mechanism includes: a threaded shaft; a nut; and balls rolling in the rolling passage formed therebetween. In a so-called deflector type of the ball screw mechanism that contributes to the demand of space saving in the outer diameter dimension of the ball screw mechanism, a deflector having a letter S shaped ball circulation passage therein for returning and circulating the balls from one end to the other end in the rolling passage is inserted and assembled into a given position of the nut.

In the conventional deflector type of the ball screw mechanism, however, since the deflector and the nut are separate members, a female thread groove of the nut in which the balls are rolling and the ball circulation passage formed in the deflector are different members. For that reason, the generation of a step at the boundary cannot be avoided. This results in a problem of generating a unusual noise or changing the operation torque that cannot be ignored, thereby leading to an increase in the maintenance cost due to a decrease in life.

As a related technique for solving the above problems, there is Patent Document 1. In Patent Document 1, the ball circulation passage is directly formed on the inner circumferential surface of the nut without the use of the deflector. Thus, there is no step formed between the ball circulation passage and the female thread groove, allowing smooth connection. When the balls pass between the ball circulation passage and the female thread groove, there is no unusual noise or no change in the operation torque, thereby to suppress shortening in its life.

In Patent Document 1, however, a convex shaped jig (die) corresponding to the shape of the ball circulation passage is pressed against the inner circumferential surface of the nut for pressing (plastic) deformation so as to form the ball circulation passage. In the working, there is no room for excessive metal in the ball circulation passage to move (flow). Hence, an expected deformation or crack occurs at the nut blank or the die, or a deformation occurs at the ball circulation passage or the rolling passage, in some cases. As a result, the accuracy is degraded and the productivity may be degraded for necessitating the operation for repair working.

For example, since the ball circulation passage is the deepest at its center portion and has excess material to move to another part, a projection large enough to interfere with the threaded shaft may be generated at the center portion of the ball circulation passage in the plastic working. When there is such a projection, it is necessary to remove it by machining process. In particular, among plural ball circulation passages, the ball circulation passage arranged at the center portion of the nut has a high tendency of this.

Figure 65A:
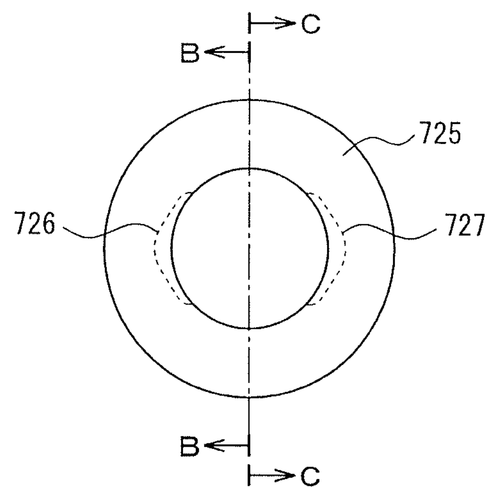
FIG. 65A is a front view illustrative of a nut provided with plural letter S shaped circulation passages in a conventional ball screw.
Figure 65B:
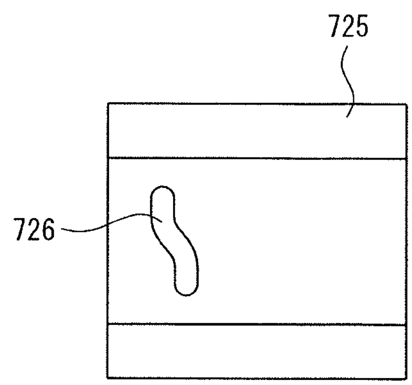
FIG. 65B is a cross-sectional view taken along line C-C in FIG. 65A.
Figure 65C:
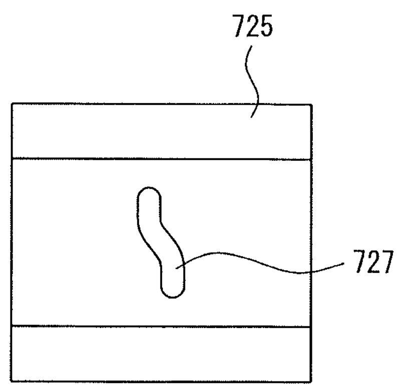
FIG. 65C is a cross-sectional view taken along line B-B in FIG. 65A.

In addition, referring now to FIG. 65A to FIG. 65C, even in a nut 725 having plural ball circulation passages 726 and 727, there is the same problem with that of Patent Document 1.

Figure 66A:
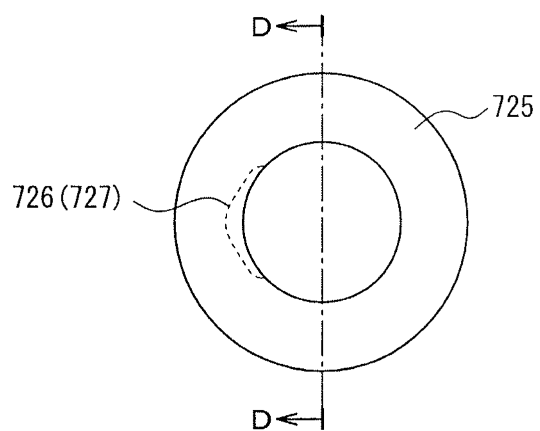
FIG. 66A is a front view illustrative of a nut provided with the letter S shaped circulation passages at an identical phase in a conventional ball screw.
Figure 66B:
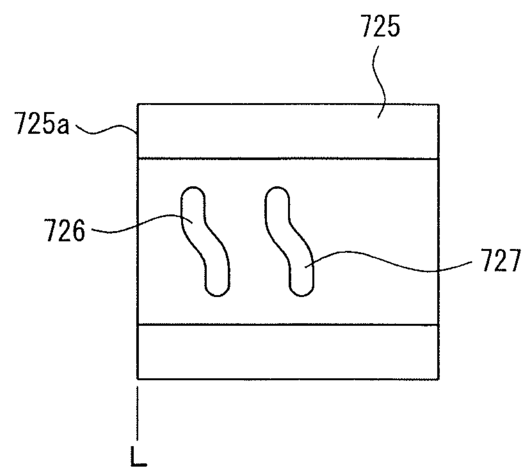
FIG. 66B is a cross-sectional view taken along line D-D in FIG. 66A.

Furthermore, as illustrated in FIG. 66A and FIG. 66B, in the conventional nut 725 in which the ball circulation passages are arranged at an identical phase, a end surface 725*a* of the nut deforms in the process of forming the first ball circulation passage 726 with a groove working jig. The end surface 725*a* of the nut serves as a reference surface L at the forming of the second ball circulation passage 727, subsequently. Therefore, an operation failure of the ball screw mechanism may occur, because the pitch of the thread groove of the threaded shaft and the pitch of the thread groove of the nut 725 becomes different. Besides, the excess material moves to the first ball circulation passage 726 in the process of forming the second ball circulation passage 727, and deforms the first ball circulation passage 726. This necessitates the operation for repairing process.

Hence, the eighth embodiment is provided to solve the above problems of the related technique, and has an object to provide a ball screw having a ball circulation passage with high accuracy and a long life, a method for manufacturing the same, and a die used for manufacturing the ball screw.

In order to achieve the above object, the eighth embodiment has a configuration as follows. That is, a ball screw according to the eighth embodiment comprising: a threaded shaft having an outer circumferential surface on which a male thread groove is formed; a nut disposed to surround the threaded shaft and having an inner circumferential surface on which a female thread groove is formed; plural balls rotatably loaded in a rolling passage between both of the opposing thread grooves; and a ball circulation passage for returning the balls from an end point of the raceway to a start point of the rolling passage. The ball circulation passage is composed of a concaved groove formed by concaving a grove on a part of the inner circumferential surface of the nut, and a flange is provided to protrude inwardly in the radial direction from the marginal edge of the ball circulation passage at the boundary between the rolling passage and the ball circulation passage.

In the ball screw according to the eighth embodiment, preferably, both end portions of the ball circulation passage that is a connecting portion with the rolling passage is a straight shaped entering portion of the balls, and the flange is arranged at least at a marginal edge portion of the straight shaped entering portion.

In addition, preferably, a distance H between an end of the flange and a radial center of the nut is equal to or smaller than ½ of ball circle diameter (BCD), and the flange is arranged not to be in contact with the outer circumferential surface of the threaded shaft.

Furthermore, the concaved groove constituting the ball circulation passage is formed by pressing for plastic working the convex protruding from the surface of the die against the inner circumferential surface of the nut so as to concave a groove on a part of the inner circumferential surface. Preferably, the flange is made of a flowing groove depressed from the surface of the die arranged around the projection portion.

Moreover, preferably, the depth of the flowing groove is deeper as closer to the convex and shallower as farther therefrom.

Furthermore, preferably, only a bank portion arranged to surround the flowing groove and protruding from the surface of the die and the convex abuts the inner circumferential surface of the nut.

Additionally, a die according to the eighth embodiment is used for manufacturing a ball screw comprising: a threaded shaft having an outer circumferential surface on which a male thread groove is formed; a nut disposed to surround the threaded shaft and having an inner circumferential surface on which a female thread groove is formed; plural balls rotatably loaded in a rolling passage between both of the opposing thread grooves; and a ball circulation passage for returning the balls from an end point of the rolling passage to a start point thereof. The surface of the die is provided with: a convex for forming a concaved groove constituting the ball circulation passage by pressing against the inner circumferential surface of the nut for plastic deformation and concaving a groove on a part of the inner circumferential surface of the nut; and a flowing groove for forming a flange to protrude inwardly in the radial direction from the marginal edge of the ball circulation passage.

In the die according to the eighth embodiment, preferably, the depth of the flowing groove is deeper as closer to the convex and shallower as farther therefrom.

Furthermore, preferably, the surface of the die is provided with; the convex; the flowing groove; and a bank portion arranged to surround the flowing groove, so that only the convex and the bank portion abut the inner circumferential surface of the nut.

In a method for manufacturing the ball screw, according to the eighth embodiment, provided with: a threaded shaft having an outer circumferential surface on which a male thread groove is formed; a nut disposed to surround the threaded shaft and having an inner circumferential surface on which a female thread groove is formed; plural balls rotatably loaded in a rolling passage between both of the opposing thread grooves; and a ball circulation passage for returning the balls from an end point of the raceway to a start point of the rolling passage. The convex arranged on the die is pressed against the inner circumferential surface of the nut for plastic deformation to concave a groove on a part of the inner circumferential surface of the nut, so as to form the ball circulation passage constituting the concaved groove. The flowing groove is provided for forming a flange to protrude inwardly in the radial direction from the marginal edge of the ball circulation passage.

The ball screw according to the eighth embodiment has a ball circulation passage with high accuracy, and its life is long.

In addition, in the method for manufacturing the ball screw according to the eighth embodiment, the excess material generated at the formation of the ball circulation passage is used for forming a flange, thereby to suppress the deformation of the ball circulation passage caused by the excess material. Accordingly, it is made possible to manufacture the ball screw having a ball circulation passage with high accuracy without performing the operation for repairing process after the formation of the ball circulation passage.

Furthermore, the die according to the eighth embodiment is provided with a flowing groove in which the flange is provided by the excess material generated at the time of formation of the ball circulation passage. Therefore, the use of the die according to the eighth embodiment allows the ball screw having a ball circulation passage with high accuracy.

Examples of a ball screw, a method for manufacturing the same, and a die used for manufacturing the ball screw, according to the eighth embodiment will be described in detail, with reference to the drawings.

(First Example)

Figure 57A:
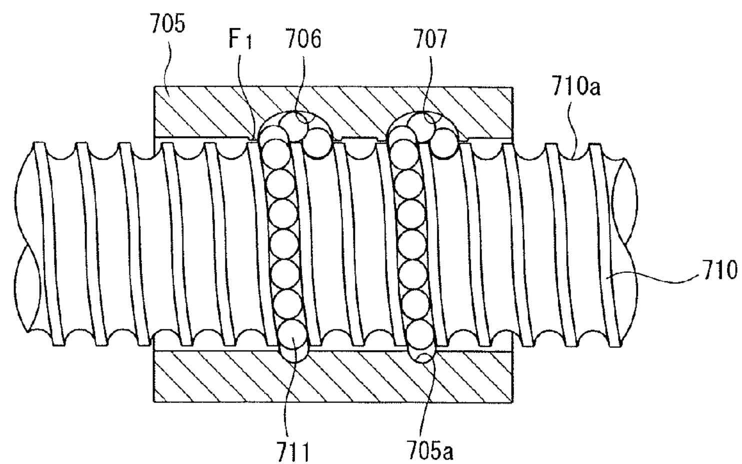
FIG. 57A is a cross-sectional view illustrative of a ball screw of a first example in accordance with an eighth embodiment.
Figure 57B:
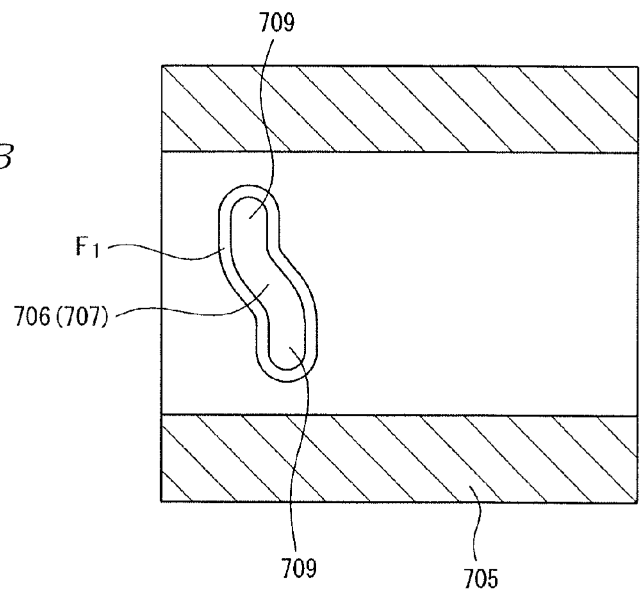
FIG. 57B is a cross-sectional view illustrative of a letter S shaped circulation passage in the inner circumferential surface of the nut.

FIG. 57 is a view illustrative of a configuration of a ball screw according to a first example of the eighth embodiment, FIG. 57A is a cross-sectional view (cross-sectional view taken along a plane in the axial direction), and FIG. 57B is a cross-sectional view illustrative of a letter S shaped circulation passage on an inner circumferential surface of a nut.

As illustrated in FIG. 57, the ball screw according to the first example is provided with: a threaded shaft 710 having a male thread groove 710*a* of a spiral shape at an outer circumferential surface; a nut 705 having on an inner circumferential surface a female thread groove 705*a* of a spiral shape facing the thread groove 710*a* of the threaded shaft 710, and arranged to surround the threaded shaft 710; balls 711 loaded to be capable of rolling in a ball rolling passage 708 having a spiral shape formed between both of the thread grooves 710*a* and 705*a*; and letter S shaped ball circulation passages 706 and 707 (hereinafter, sometimes referred to as letter S shaped circulation passage) for returning and circulating the balls 711 from the start point to the end point of a ball rolling passage 708.

That is to say, the balls 711 move in the ball rolling passage 708, pass around the threaded shaft 710, and reach the end point of the ball rolling passage 708. Then, the balls are scooped up from one end portion of the letter S shaped circulation passage 706 (707), and pass through the letter S shaped circulation passage 706 (707), and return to the start point of the ball rolling passage 708 from the other end portion of the letter S shaped circulation passage 706 (707).

In addition, the materials of the threaded shaft 710, the nut 705, and the balls 711 are not limited especially. A general material can be used, and examples are metal (steel or the like), sintered alloy, ceramic, and resin. The cross-sectional shape of the thread grooves 710*a* and 705*a* may be an arc or a gothic arc.

In such a ball screw, when the nut 705 screwed together with the threaded shaft 710 via the balls 711 and the threaded shaft 710 are relatively rotated, the threaded shaft 710 and the nut 705 are relatively moved in the axial direction via the rolling movement of the balls 711. Then, the ball passage with no end portion is formed of the ball rolling passage 708 and the letter S shaped circulation passage 706 (707) so that the balls 711 rolling in the ball rolling passage 708 circulate in the ball passage with no end portion endlessly. This allows the threaded shaft 710 and the nut 705 for relative movement consecutively.

In this situation, the letter S shaped circulation passages 706 and 707 will be described in detail with reference to the cross-sectional view (cross-sectional view taken along a plane perpendicular to the axial direction) of FIG. 57B. The letter S shaped circulation passages 706 and 707 are integrally formed on the inner circumferential surface of the nut 705. In more detail, a groove is concaved on a part of the inner circumferential surface of the nut 705 having a cylindrical surface shape by plastic working for forming the letter S shaped circulation passages 706 and 707.

Accordingly, the balls 711 that have rolled to the end point of the ball rolling passage 708, not illustrated in FIG. 57B, are scooped up from one end portion of the letter S shaped circulation passage 706 (707) and sunk into the inside (outwardly in the radial direction) of the nut 705. Then, the balls 711 pass through the letter S shaped circulation passage 706 (707), pass over a land portion (screw thread of the male thread groove 710*a*) of the threaded shaft 710, and return to the start point of the ball rolling passage 708 from the other end portion of the letter S shaped circulation passage 706 (707). Specifically, the cross-sectional shape of the letter S shaped circulation passages 706 and 707 may be an arc or gothic arc.

Moreover, in the case of the letter S shaped circulation passages 706 and 707 composed of concaved grooves, another member is not assembled for composing each of the letter S shaped circulation passages 706 and 707, unlike the case of the tube or deflector type of the ball circulation or the like. For this reason, since there is no step produced between the letter S shaped circulation passage 706 (707) and the female thread groove 705*a*, a smooth connection is achieved. As a result, when the balls 711 pass between the letter S shaped circulation passage 706 (707) and the female thread groove 705*a*, there is no unusual noise or change in the operation torque and the life is hardly shortened.

Next, a circulation passage working jig (die) used for forming the letter S shaped circulation passages 706 and 707 will be described. The circulation passage working jig (die) 704 is provided with a convex 702 for forming the concaved groove on the surface (arc surface) of a base portion 701 having a semicircle cross-sectional shape, and a flowing recess 703 that flows from the surface of the base portion 701. Specifically, the curvature radius of the surface (arc surface) of the base portion 701 is identical to that of the inner circumferential surface of the nut 705.

Figure 59A:
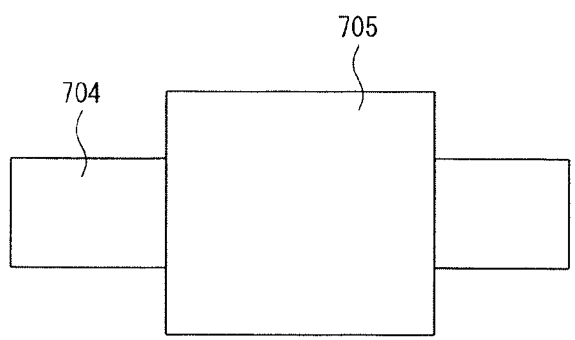
FIG. 59A is a side view illustrative of a relationship between the nut and the jig.
Figure 59B:
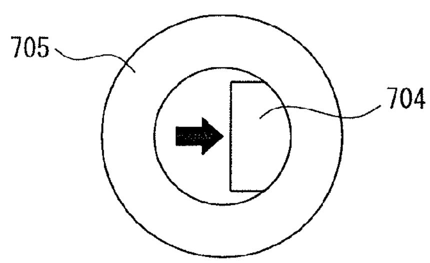
FIG. 59B is a front view illustrative of a relationship between the nut and the jig.

Referring now to FIG. 59A and FIG. 59B, after the circulation passage working jig 704 is inserted into the nut 705 that is a hollow blank, the circulation passage working jig 704 is pressed against the inner circumferential surface of the nut 705 as indicated by an arrow of FIG. 59B to form the first letter S shaped circulation passage 706. Next, the circulation passage working jig 704 is moved in the axial direction or the rotational direction of the nut 705 with an end surface of the nut 705 as a reference surface, and is pressed in the same manner as the first letter S shaped circulation passage 706 to form the second letter S shaped circulation passage 707. This plastically deforms the inner circumferential surface of the nut 705 pressed against by the convex 702 of the circulation passage working jig 704, and the letter S shaped circulation passages 706 and 707 are formed.

In this process, the excess material of the nut blank pressed by the convex 702 is moved into the flowing recess 703 arranged around the convex 702 of the circulation passage working jig 704. Flanges F1 protruding inwardly in the radial direction from marginal edge portions of the letter S shaped circulation passages 706 and 707 are formed around the first letter S shaped circulation passage 706 and the second letter S shaped circulation passage 707, thereby preventing the nut 705 from being damaged by the pressure of the excess material.

Then, the flange F1 integrally formed with the nut 705 serves as a ball guiding portion for smoothly guiding the balls 711 rolling from the ball rolling passage 708 to the letter S shaped circulation passage 706 (707) and the balls 711 rolling to the ball rolling passage 708 from the letter S shaped circulation passage 706 (707).

Figure 58A:
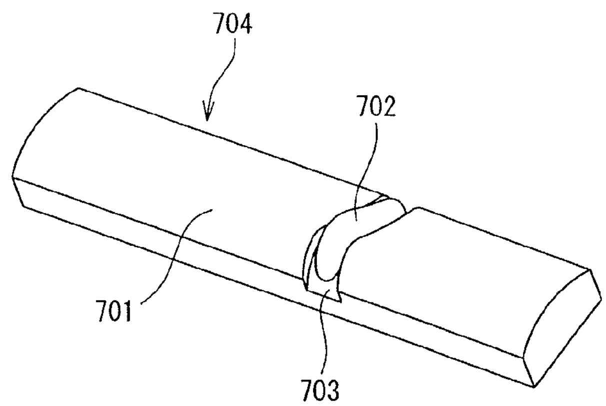
FIG. 58A is a perspective view illustrative of a jig constituting the letter S shaped circulation passage.
Figure 58B:
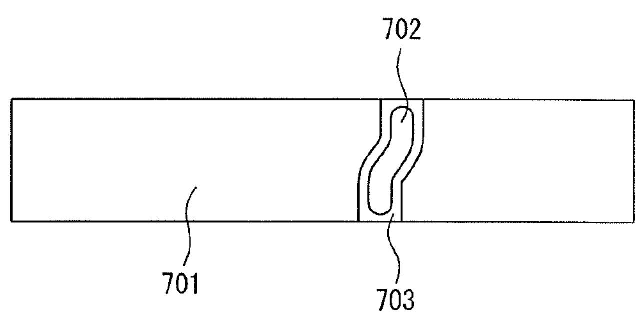
FIG. 58B is a top view of the jig.
Figure 58C:
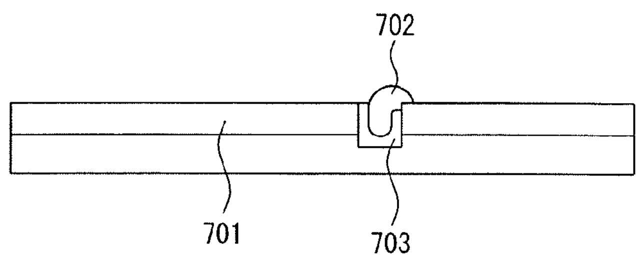
FIG. 58C is a side view of the jig.

Specifically, even in the method according to the first embodiment other than the method described with reference to FIG. 59, the same nut 705 can be formed. In such a case, the cam slider having the letter S shaped convex is used as illustrated in FIG. 58.

In addition, both end portions of the letter S shaped circulation passage 706 (707) that are connecting portions with the ball rolling passage 708 (the female thread groove 705*a*) are provided with a straight line groove, which forms a straight shaped entering portion 709. After the letter S shaped circulation passage 706 (707) is provided at the nut 705, the female thread groove 705*a* is provided by cutting and connected to the letter S shaped circulation passage 706 (707). In this process, however, the straight shaped entering portion 709 is allowed to absorb an error in the formation of the female thread groove 705*a*, thereby contributing to the smooth rolling of the balls 711.

Subsequently, the heat treatment such as high-frequency induction hardening or the like is performed on the inner circumferential surface of the nut 705 to enhance the durability of the letter S shaped circulation passage 706 (707).

According to the nut integrated with the circulation passage according to the first example, the excess material generated by forming the letter S shaped circulation passage 706 (707) can be used for forming the flange F1 that is a ball guiding portion. In addition, in the nut provided with the conventional deflector type of circulation passage, there is a problem in that the temperature locally increases at a through hole for deflector insertion in the quenching, occurrence of crack or deformation of the nut, or the like of the nut provided with the deflector hole. In the nut integrated with the circulation passage according to the first example, it is made possible to avoid the nut from being damaged by the locally increased temperature.

Furthermore, according to the first example, even in the nut having the letter S shaped circulation passage at the identical phase in the same manner as the related techniques illustrated in FIG. 65A to FIG. 65C, the excess material is moved into the flowing recess 703 of the circulation passage working jig 704. It is thus possible to suppress the deformation such as protrusion at the end surface of the nut 705 and the deformation of another letter S shaped circulation passage that has already been formed. This results in high accuracy of the letter S shaped circulation passages 706 and 707. It is therefore possible to manufacture a ball screw with high accuracy and improve the durability and eliminate the working for repairing the shape of the letter S shaped circulation passages 706 and 707 after they are provided. This avoids the manufacturing process from becoming complicated and reduces the manufacturing costs. Moreover, the flange F1 formed by the flowing recess 703 can be used for the ball guiding portion of the nut 705, thereby allowing the smooth rolling of the balls 711.

The application of such a ball screw according to the first example is not limited, especially. However, it is suited as a ball screw to be assembled into a general industrial machine, each of various types of vehicles, or an actuator.

(Second Example)

Figure 60:
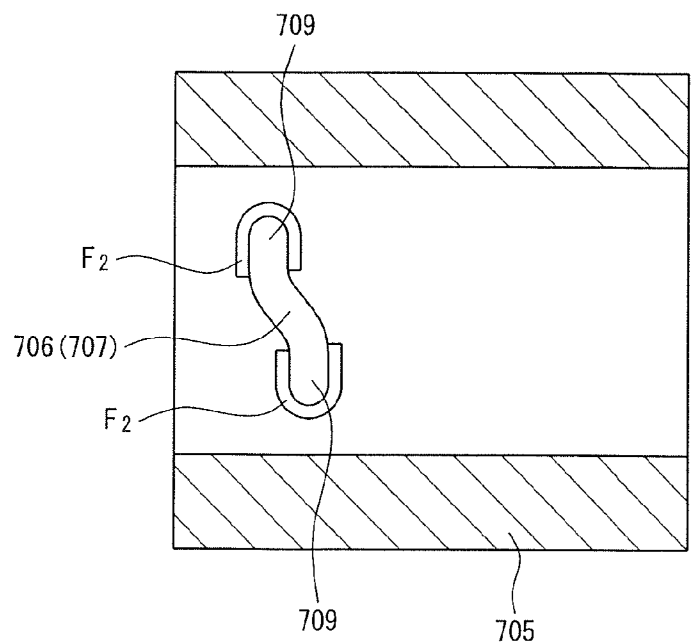
FIG. 60 is a cross-sectional view illustrative of a letter S shaped circulation passage on the inner circumferential surface of the nut in the ball screw in a second example of the eighth embodiment.

FIG. 60 and FIG. 61 are views illustrative of a configuration of a ball screw according to a second example of the eighth embodiment. FIG. 60 is a cross-sectional view illustrative of the letter S shaped circulation passage on the inner circumferential surface of the nut. FIG. 61 is a perspective view of a jig for forming the letter S shaped circulation passage. In addition, the operations and effects of the second example are almost same with those of the first example. Therefore, only the different points will be described and the same point will be omitted. Furthermore, in each of the drawings described hereinafter, the same or corresponding portions in FIG. 57 and FIG. 58 have the same reference numerals with those in FIG. 57 and FIG. 58.

In the ball screw according to the second example, the flanges F2 provided by the excess material at the time of forming the letter S shaped circulation passage 706 (707) of the nut 705 are arranged at marginal edge portions of the straight shaped entering portion 709. After the letter S shaped circulation passage 706 (707) is formed, the female thread groove 705*a* is cut and formed in the nut 705. However, the straight shaped entering portion 709 serves as a connection margin of the female thread groove 705*a* and absorbs an error in cutting the female thread groove 705*a* or the like. This contributes to smooth rolling of the balls 711.

Then, the circulation passage working jig 704 partially provided with the flowing recess 703 for receiving the excess material is pressed against the inner circumferential surface of the nut 705 for plastic working. Thus, the flanges F2 are provided at the marginal edge portions of the straight shaped entering portion 709. Therefore, in a case where the ball screw is assembled in combination with the threaded shaft, not illustrated, when the balls 711 roll in the ball rolling passage 708 and change their directions at the letter S shaped circulation passage 706 (707), the flanges F2 smoothly guide the balls 711 into the letter S shaped circulation passage 706 (707).

(Third Example)

FIG. 62 is a view illustrative of a configuration of a ball screw according to a third example of the eighth embodiment, and is a view illustrative of the relationship between the flange height of the nut and BCD. In addition, the operations and effects of the third example are almost same with those of the first and second examples. Therefore, only the different points will be described and the same points will be omitted.

As in the first and second examples, the flange F1 (F2) is arranged on the inner circumferential surface of the nut 705 by the excess material generated at the formation of the letter S shaped circulation passage 706 (707). The flange F1 (F2) has a ball guiding function. In the third example, however, the place where the flange F1 (F2) is formed by the flowing recess 703 of the circulation passage working jig 704 is locally aggregated. This ensures the height (radial length) of the flange F1 (F2) formed by pushing out as the excess material in a sufficient manner, thereby allowing guiding of the balls with certainty.

Specifically, a radial distance H from the radial center of the nut 705 to an end of the flange F1 (F2) is equal to or smaller than approximately ½ a ball circle diameter of the balls 711 (BCD: Ball Center Diameter) at least at the time of assembling the ball screw, and in addition, the end of the flange F1 (F2) is arranged not to be in contact with the outer circumferential surface of the threaded shaft 710. In this configuration, the flange F1 (F2) is in contact with the center of the ball 711, and guides the balls in an effective manner. This allows smoother circulation.

Moreover, the ball screw having the balls 711 with a small diameter has a shallow letter S shaped circulation passage 706 (707). In some cases, an enough height of the flange F1 (F2) is not obtained by only the excess material of a part corresponding to the letter S shaped circulation passage 706 (707) of the nut 705. In such a case, the inner diameter of the nut blank is same with BCD, and plastic working for forming the letter S shaped circulation passage 706 (707) causes the excess material to move to the marginal edge portion of the letter S shaped circulation passage 706 (707). In this case, the flange F1 (F2) can protrude on the center side in the radial direction of the nut 705 further than the central trajectory of the ball 711, thereby allowing guiding of the balls smoothly.

(Fourth Example)

FIG. 63 is a view illustrative of the ball screw according to a fourth example of the eighth embodiment, and is a view illustrative of a die for forming the letter S shaped circulation passage and the flange by plastic working. In addition, the operations and effects of the fourth example are almost same with those of the first to third examples. Therefore, only the different points will be described and the same points will be omitted.

Figures 63A, 63B, 63C:
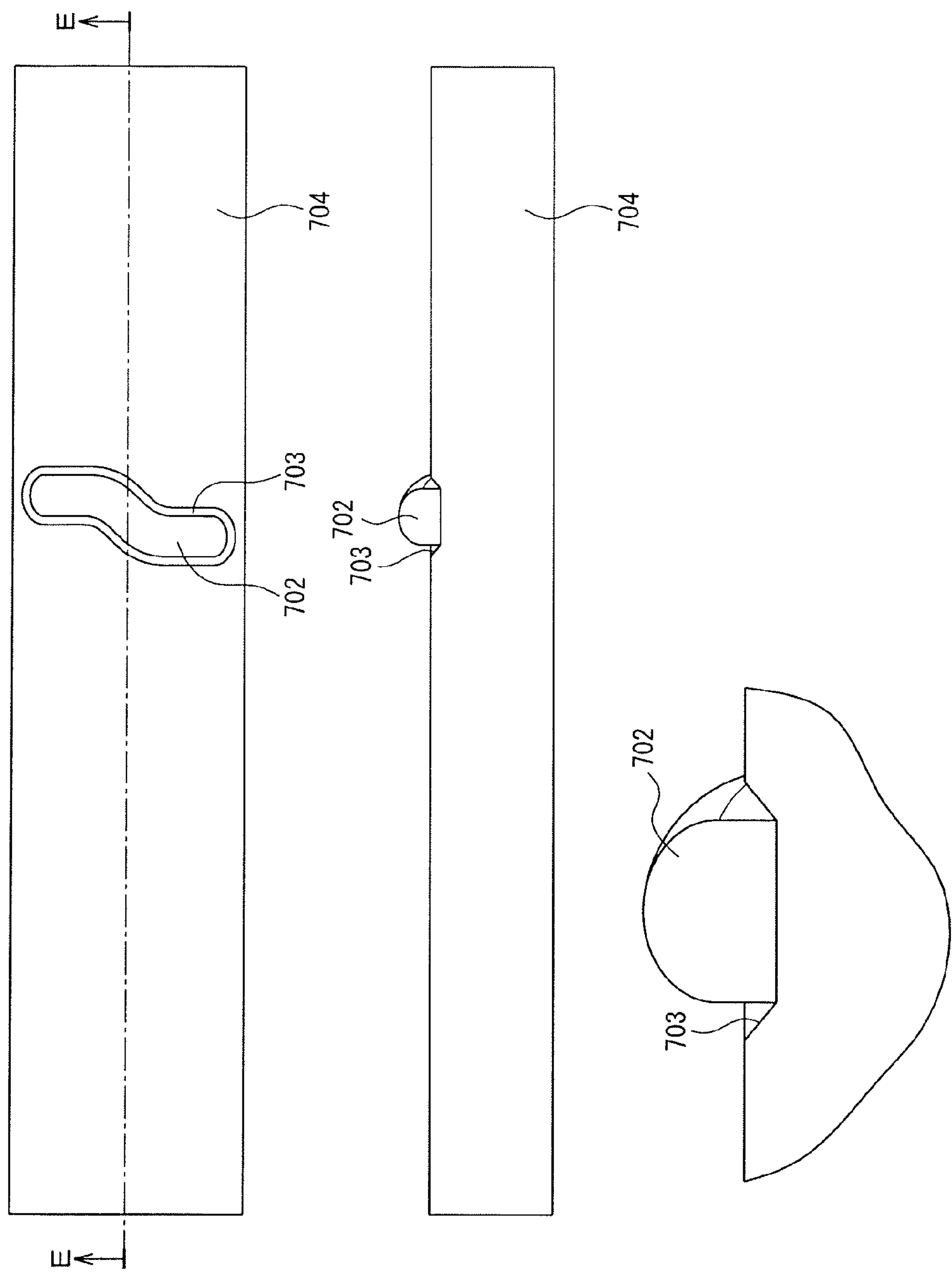
FIG. 63A is a top view illustrative of a jig constituting the letter S shaped circulation passage in the ball screw in a fourth example of the eighth embodiment.
FIG. 63B is a cross-sectional view taken along line E-E in FIG. 63A.
FIG. 63C is an enlarged cross-sectional view of substantial parts in FIG. 63B.

Referring to FIG. 63A to FIG. 63C, the shape of the flowing recess 703 formed in the die 704 is deeper on the near side of the convex 702 and shallower on the far side of the convex 702. This facilitates the excess material, generated at the time of forming the letter S shaped circulation passage 706 (707), to move into the flowing recess 703. Therefore, it is made easier to form the shape of flange and arrange the flange F1 (F2) in a more effective manner.

(Fifth Example)

FIG. 64 is a view illustrative of the ball screw according to a fifth example of the eighth embodiment, and is a view illustrative of a die for forming the letter S shaped circulation passage and the flange by plastic working. In addition, the operations and effects of the fifth example are almost same with those of the first to fourth examples. Therefore, only the different points will be described and the same points will be omitted.

As illustrated in FIG. 64A to FIG. 64D, the surface of the die 704 is provided with the convex 702 for forming the letter S shaped circulation passage 706 (707) and the flowing recess 703 for forming the flange F1 (F2). Moreover, a bank portion 712 formed to surround the flowing recess 703 protrudes from the surface. For this reason, when the die 704 is pressed against the inner circumferential surface of the nut 705, only the convex 702 and the bank portion 712 abut the inner circumferential surface of the nut 705.

The entire region of the surface of the die 704 does not abut the inner circumferential surface of the nut 705. Only the convex 702 and the bank portion 712 near the convex 702 abut the inner circumferential surface of the nut 705, the contact pressure is high to facilitate the movement of the excess material.

Specifically, the flowing recess 703 has a shape in which the near side of the convex 702 is deep and the far side thereof is shallow. This facilitates the excess material, generated at the time of forming the letter S shaped circulation passage 706 (707), to move into the flowing recess 703. Therefore, it is made easier to form the shape of flange and arrange the flange F1 (F2) in a more effective manner.

As described heretofore, the examples of the ball screw according to the eighth embodiment have been described. The ball screw according to the eighth embodiment, however, is not limited to the above-described first to fifth examples. It should be appreciated that modifications and changes are acceptable without departing from the proper meaning of the eighth embodiment.

An example is that each of the above examples has described the nut circulation type of the ball screw such that the letter S shaped circulation passage 706 and 707 for circulating the balls 711 from the start point of the ball rolling passage 708 to the end point thereof are provided at the nut. The eighth embodiment, however, is applicable to the threaded shaft circulation type of the ball screw such that the passages corresponding to the letter S shaped circulation passage 706 and 707 are provided at the threaded shaft.

(Ninth Embodiment)

A ninth embodiment relates to a ball screw.

A ball screw is provided with: a threaded shaft having an outer circumferential surface on which a thread groove is formed; a nut having an inner circumferential surface on which a thread groove is formed; and rollable balls loaded in a raceway between the thread groove of the nut and that of the threaded shaft. When the nut screwed together with the threaded shaft via the balls and the threaded shaft is relatively rotated, the threaded shaft and the nut are relatively moved in the axial direction via the rolling movement of the balls.

Such a ball screw is provided with a ball circulation passage constituting a ball passage with not end by communicating the start point and the end point of the ball rolling passage. That is, the balls rolls around the threaded shaft in the ball rolling passage and reach the end point of the ball rolling passage, the balls are scooped up from one end portion of the ball circulation passage, go through the ball circulation passage, and return to the start point of the ball rolling passage from the other end portion of the ball circulation passage. In this manner, the balls rolling in the ball rolling passage circulate in the ball circulation passage endlessly, thereby allowing the relative movement of the threaded shaft and the nut consecutively.

As a shape of the ball circulation passage in such a ball screw, for example, as disclosed in Patent Document 7, there is known a ball screw having a cross-section of a substantially letter U shape taken along a plane perpendicular to the longitudinal direction of the ball circulation passage.

However, in a case where a groove is concaved on a part of the inner circumferential surface of the nut by forging with the use of a die to form a concaved groove and the ball circulation passage is constituted with the concaved groove, there is a tendency of demanding a large energy for forging the ball circulation passage having the substantially letter U shaped cross-section. That is, a convex of the die is brought into contact with the inner circumferential surface of the nut blank and is strongly pressed against by plastic working to form a concaved groove. However, in a case where the ball circulation passage having the substantially letter U shaped cross-section is formed, there is a large abutting angle between the end portion of the convex of the die and the nut blank at the time of forging. There is a tendency of demanding a large energy.

Accordingly, there is a need for improvement of reducing the energy required for the formation of the ball circulation passage.

Therefore, an object of the ninth embodiment is to solve the above problem of the related technique and to provide a ball screw that needs a small energy at the time of manufacturing.

In order to achieve the above object, the ninth embodiment has a configuration, as follows. That is, a ball screw according to the ninth embodiment comprising: a threaded shaft having an outer circumferential surface on which a thread groove is formed; a nut having an inner circumferential surface on which a thread groove opposing the thread groove of the threaded shaft is formed; plural balls rotatably loaded in a spiral shaped ball rolling passage between both of the thread grooves composed of both thread grooves; and a ball circulation passage for returning the balls from an end point of the ball rolling passage raceway to a start point thereof. The ball circulation passage is composed of a concaved groove formed by concaving a groove on a part of the inner circumferential surface of the nut, and at least a part on the lengthwise direction of the ball circulation passage has a substantially letter V shaped cross-section when it is cut along a plane perpendicular to the lengthwise direction.

In such a ball screw according to the ninth embodiment, the ball circulation passage includes both end portions that are connecting portions with the ball rolling passage and a middle portion between both end portions. Preferably, at least one of the middle portion and end portions has a substantially letter V shaped cross-section when it is cut along a plane perpendicular to the lengthwise direction. In addition, preferably, there is provided a lubricant reservoir at the bottom of the concaved groove constituting the ball circulation passage.

According to the ball screw in the ninth embodiment, at least a part in the lengthwise direction of the ball circulation passage has a substantially letter V shaped cross-section when it is cut along a plane perpendicular to the lengthwise direction, whereby there is a small energy needed for manufacturing.

An example of the ball screw according to the ninth embodiment will be described with reference to the drawings.

(First Example)

FIG. 67 is a cross-sectional view (take along a plane perpendicular to the axial direction) illustrative of a configuration of a ball screw according to a first example of the ninth embodiment.

As illustrated in FIG. 67, the ball screw 801 is provided with: a threaded shaft 803 having a thread groove 803*a* of a spiral shape at an outer circumferential surface; a nut 805 having at an inner circumferential surface a thread groove 805*a* of a spiral shape facing the thread groove 803*a* of the threaded shaft 803; plural balls 809 loaded to be capable of rolling in a ball rolling passage 907 having a spiral shaped ball rolling passage formed between both of the thread grooves 803*a* and 805*a*; and a ball circulation passage 811 (ball return passage) for returning and circulating the balls 809 from the start point to the end point of a ball rolling passage 807.

That is to say, the balls 809 pass around the threaded shaft 803 while moving in the ball rolling passage 807, and reach the end point of the ball rolling passage 807. Then, the balls are scooped up from one end portion of the ball circulation passage 811, and return to the start point of the ball rolling passage 807 from the other end portion of the ball circulation passage 811.

Specifically, the cross-sectional shape (the cross-sectional shape taken along a plane perpendicular to the lengthwise direction) of the thread groove 803*a* and 805*a* may be an arc or a gothic arc. In addition, the materials of the threaded shaft 803, the nut 805, and the balls 809 are not limited, especially. A general material can be used. Examples are metal (steel or the like), sintered alloy, ceramic, and resin.

In such a ball screw 801, when the nut 805 screwed together with the threaded shaft 803 via the balls 809 and the threaded shaft 803 are relatively rotated, the threaded shaft 803 and the nut 805 are relatively moved in the axial direction via the rolling movement of the balls 809. Then, the ball passage with no end portion is formed of the ball rolling passage 807 and the ball circulation passage 711 so that the balls 809 rolling in the ball rolling passage 807 circulate in the ball passage with no end portion endlessly. This allows the threaded shaft 803 and the nut 805 for relative movement consecutively.

Figure 68:
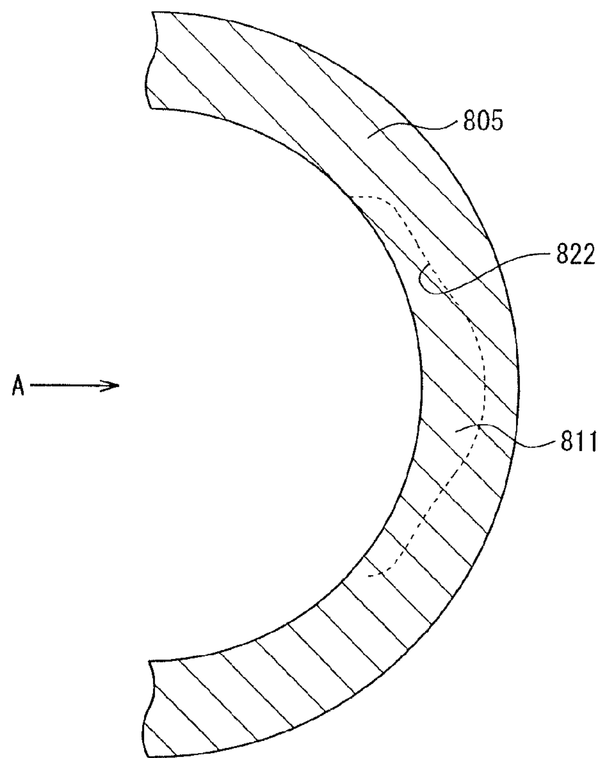
FIG. 68 is a cross-sectional view of substantial parts.

In this situation, the ball circulation passage 811 will be described in detail with reference to the cross-sectional views (cross-sectional views taken along a plane perpendicular to the axial direction) of FIG. 68 and FIG. 69. The ball circulation passage 811 is integrally formed on the inner circumferential surface of the nut 805. In more detail, a groove is concaved on a part of the inner circumferential surface of the nut 805 having a cylindrical surface shape by plastic working (for example, in a forging method with the use of a die to be described below) for forming a concaved groove 822, as the ball circulation passage 811. Moreover, another member constituting the ball circulation passage is not provided, unlike the case of the tube or deflector type of the ball circulation. Since another member is not provided, there is no possibility of generating a step with an edge portion at the boundary when another member is used.

Figure 69:
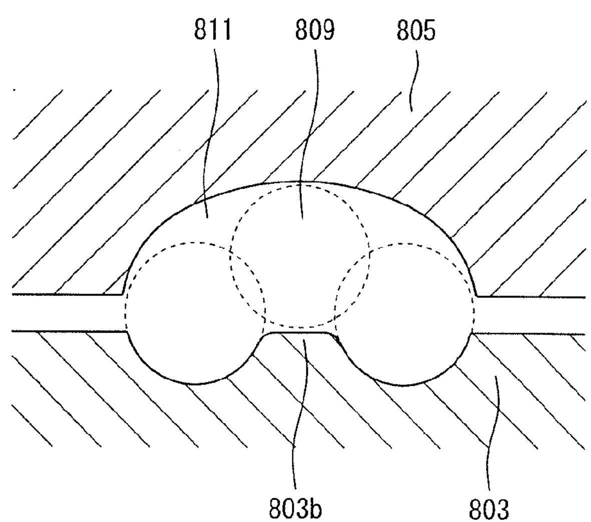
FIG. 69 is an enlarged cross-sectional view of the ball circulation passage.

As illustrated in FIG. 69, the balls 809 that have rolled to the end point of the ball rolling passage 807 are scooped up from one end portion of the ball circulation passage 811 and sunk into the inside (radially outside) of the nut 805. Then, the balls 809 pass through the ball circulation passage 811, pass over a land portion 803*b* (screw thread of the spiral groove 803*a*) of the threaded shaft 803, and return to the start point of the ball rolling passage 807 from the other end portion of the ball circulation passage 811.

Figure 70:
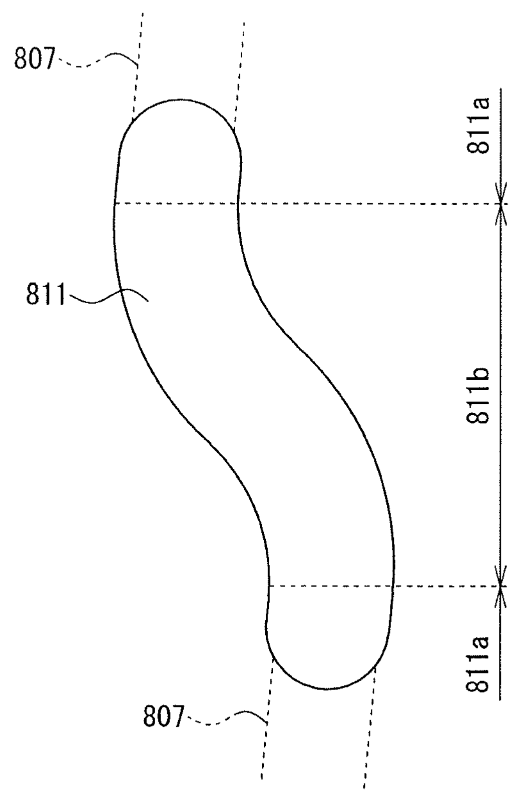
FIG. 70 is an enlarged view of a concaved groove of the nut in FIG. 68 when viewed in a direction of arrow A.

In addition, referring now to FIG. 70, the ball circulation passage 811 (the concaved groove 822) has straight shapes at both end portions 811*a*, 811*a* each being a connecting portion with the ball rolling passage 807 (the thread groove 805*a*), and has a curved shape at a middle portion 811*b* located between both of the end portions 811*a*, 811*a*. The both ends of the middle portion 811*b* and the both of the end portions 811*a*, 811*a* are smoothly connected to have a substantially letter S shape of the entire of the ball circulation passage 811 (the concaved groove 822) when viewed from the arrow A direction of FIG. 68. However, the entire shape of the ball circulation passage 811 is not limited to the substantially letter S shape as illustrated in FIG. 70.

The end portions 811*a* having the straight shape constitutes an introducing portion of the balls 809. The balls 809 that have entered the ball circulation passage 811 from the ball rolling passage 807 are guided by striking a curved portion of the middle portion 811*b* through the introducing portion, and the directions thereof are changed. Accordingly, the introducing portion is a part with which the balls intensely collide. Specifically, the ball circulation passage 811 and the ball rolling passage 807 are smoothly connected. That is, the trajectory of the contact between the balls 809 and the inner surface of the concaved groove 822 and that of the contact between the balls 809 and the inner surface of the thread groove 805*a* are connected in a smoothly continuous state. This results in smooth circulation of the balls 809.

Figure 71:
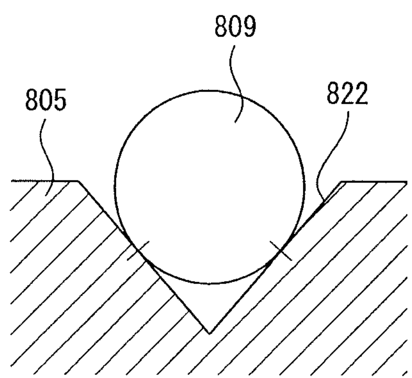
FIG. 71 is a cross-sectional view of a concaved groove illustrative of a cross-sectional shape of an end portion of the ball circulation passage.
Figure 72:
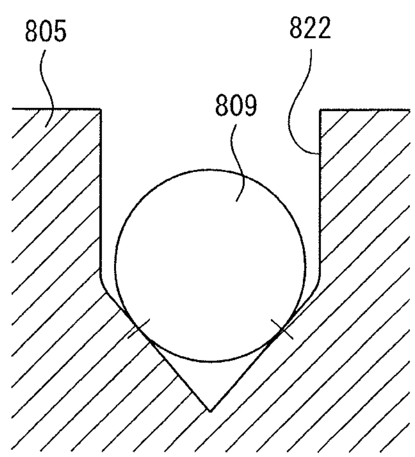
FIG. 72 is a cross-sectional view of a concaved groove illustrative of a cross-sectional shape of a middle portion of the ball circulation passage.
Figure 73:
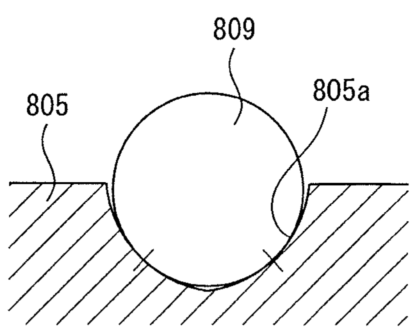
FIG. 73 is a cross-sectional view of a thread groove illustrative of a cross-sectional shape of the ball rolling passage.

Moreover, the shape of the ball circulation passage 811 will be described in detail with reference to FIG. 70 to FIG. 73. FIG. 71 is a cross-sectional view of the concaved groove 822 having a cross-sectional shape of the end portions 811*a* of the ball circulation passage 811. FIG. 72 is a cross-sectional view of the concaved groove 822 having a cross-sectional shape of the middle portion 811*b* of the ball circulation passage 811. Additionally, FIG. 73 is a cross-sectional view of the thread groove 805*a* having a cross-sectional shape of the ball rolling passage 807. Each of the cross-sectional views is taken along a plane perpendicular to the lengthwise direction of the ball circulation passage 811 or the ball rolling passage 807.

In the ball screw 801 according to the first example, the cross-sectional shape of the ball circulation passage 811 extending in the substantially circumferential direction of the nut 805 (cross-sectional shape taken along a plane perpendicular to the lengthwise direction of the ball circulation passage 811) has a letter V shape in the entire lengthwise direction. FIG. 71 illustrates an example of the cross-sectional shape of the end portions 811*a* of the ball circulation passage 811. As illustrated in FIG. 71, the cross-sectional shape of the end portions 811*a* is a letter V shape formed by two straight lines crossing each other.

In a case where the ball circulation passage 811 having a letter V shaped cross-section is formed, the abutting angle between the end portion of a convex (the end of the letter V shaped convex) in the die and the nut blank is smaller, at the time of forging, than those of cases where the ball circulation passage 811 having an arc shape or a substantially letter U shape are formed. Thus, it makes the cold forging easier, and thereby drastically reducing the energy necessary for forging. Accordingly, a small energy is needed for manufacturing the ball screw 801. In order to further enhance such an effect, the angle made by the letter V shaped portion (angle made by the two straight lines crossing each other) is preferably equal to or larger than 90 degrees.

However, the cross-section made by two straight lines extending from the bottom of the concaved groove 822 to the inner circumferential surface of the nut 805 does not necessarily have a letter V shape, and may have a pentagon shape in which the straight lines bend from the partway thereof. That is, the cross-section needs not have a letter V shape as a whole, and may have a letter V shaped cross-section only at the part near the bottom of the concaved groove 822. As an example, FIG. 72 illustrates the cross-sectional shape of the middle portion 811*b* of the ball circulation passage 811. The cross-sectional shape of FIG. 72 has a width smaller than that of the letter V shape of FIG. 71, thereby reducing the amount of the removed material in the forging. Thus, the energy needed for forging is made smaller. Specifically, the concaved groove 822 of FIG. 72 has a letter V shaped cross-section near the bottom portion and a rectangular cross-section near the opened portion, but may have a trapezoidal shape near the opened portion.

In addition, since the ball circulation passage 811 has a letter v shaped cross-section, the ball 809 is in contact with and supported by the inner surface at two points of the concaved groove 822 of the ball 809, as illustrated in FIG. 71 and FIG. 72.

This results in stable movements of the ball 809 in the ball circulation passage 811.

Furthermore, since the ball circulation passage 811 has a letter V shaped cross-section, a space surrounded by the inner surface of the concaved groove 822 and the balls 809 is made at the bottom of the concaved groove 822 constituting the ball circulation passage 811. This space is capable of holding a lubricant such as a lubricating oil, grease, or the like, and serves as a lubricant reservoir.

The lubricant held in the lubricant reservoir is supplied to the balls 809 as needed while the ball screw 801 is being used. The lubricant is applied to the surfaces of the balls 809 in the ball circulation passage 811, reaches the ball rolling passage 807 together with the balls 809, and is supplied for lubricating the thread groove 803*a* and 805*a* and the surfaces of the balls 809. Accordingly, the ball screw 801 is superior in lubricating capability and has a long life. Moreover, the ball screw 801 is lubricated by the lubricant held in the lubricant reservoir, thereby reducing the frequency of the maintenance operation of supplying the lubricant to the inside of the ball screw 801.

The application of the ball screw 801 according to the first example is not limited especially, but may be suitably applicable to automobile parts, positioning apparatuses, and the like.

Next, an example of the method of manufacturing the ball screw 801 according to the first example will be described with reference to FIG. 74 and FIG. 75. Firstly, a steel blank 820 having a cylindrical shape is processed by plastic working of cold forging or the like to obtain a blank 821 having a substantially identical shape (substantially cylindrical shape) to the nut 805 (rough forming process). In this situation, a flange 813 is arranged at an outer circumferential surface of the blank 821 by plastic working.

After that, a groove is concaved on a part of the inner circumferential surface of the blank 821 having a cylindrical surface shape by plastic working such as cold forging for forming the substantially letter S shaped concaved groove 822 constituting the ball circulation passage 811 communicating the end point of the ball rolling passage 807 and the start point thereof (ball circulation passage forming process).

As a specific example of forming the concaved groove 822 will be described as follows. That is, the die, not illustrated, having a convex of a shape corresponding to that of the concaved groove 822 is inserted into the blank 821. The convex of the die is brought into contact with the inner circumferential surface of the blank 821. The die is strongly pressed against the inner circumferential surface of the blank 821 for plastic working to form the concaved groove 822.

For example, the concaved groove 822 may be formed by use of the die of a cam mechanism provided with a cam driver, not illustrated, and a cam slider, not illustrated, having a shape corresponding to the concaved groove 822. In more detail, the can driver and the cam slider are inserted into the blank 821. In this situation, the cam slider is disposed between the blank 821 and the cam driver with the convex facing the inner circumferential surface of the blank 821. The cam slider and the cam driver disposed in the blank 821 are in contact with each other at an inclined surface extending in the substantially axial direction of the blank 821 (direction slightly inclined from the axial direction of the blank 821), so that both of the inclined surfaces constitute the cam mechanism of the die.

In this situation, the cam driver is moved in the axial direction of the blank 821, and then the cam mechanism (wedge effect) constituted by both of the inclined surfaces causes the cam slider to move outwardly in the radial direction of the blank 821. That is, a force is transmitted to the inclined surface of the cam slider from that of the cam driver, and the force of the cam driver in the axial direction is converted into a force of moving the cam slider outwardly in the radial direction. As a result, the convex of the cam slider strongly pushes the inner circumferential surface of the blank 821, whereby the concaved groove 822 is formed on the inner circumferential surface of the blank 821 by plastic working.

Subsequently, the thread groove 805*a* is formed on the inner circumferential surface of the nut 805 by common cutting to be connected to the endmost portion of the ball circulation passage 811 (the concaved groove 822) (thread groove forming process). In this situation, since the endmost portion of the concaved groove 822 (the ball circulation passage 811) has a spherical shape, an edge portion is not generated at the step between the thread groove 805*a* and a boundary portion 830, unlike the deflector type of ball screw. Hence, the step is smooth. As a result, when the balls 809 pass at the boundary portion 830, an unusual noise or an operation torque variation is hardly generated. Moreover, the life is hardly shortened.

Finally, the heat treatment such as quenching, tempering or the like at desired conditions is performed to obtain the nut 805. Examples of the heat treatment are carburization, carbonitriding, a induction hardening, and the like. In a case where the heat treatment is the carburization or carbonitriding, the material of the nut 805 is preferably chrome steel or chrome molybdenum (an example is SCM420) with the carbon content of 0.10 mass % to 0.25 mass %. In a case where the heat treatment is the induction hardening, the material of the nut 805 is preferably carbon steel (an example is 53C or SAE4150) with the carbon content of 0.4 mass % to 0.6 mass %.

The ball screw 801 is manufactured by assembling thus manufactured nut 805, the threaded shaft 803 manufactured in a common method, and the balls 809.

Additionally, the above-described rough forming process and the ball circulation passage forming process are performed by plastic working. Hence, the method of manufacturing the ball screw 801 has a high yield, and also the ball screws with high accuracy can be manufactured at low cost. Furthermore, since the nut 805 is manufactured by plastic working, the flow of metal (fiber flow) of the steel blank 820 is hardly cut. Moreover, together with the work hardening, the nut 805 with a high mechanical strength is obtainable.

The type of the plastic working is not limited especially. However, the forging is preferable and the cold forging is particularly preferable. Hot forging may be employed, however, the cold forging is good at high-accuracy finishing as compared to the hot forging. It is therefore possible to obtain the nut 805 with sufficient high accuracy, without the post working. Accordingly, it is possible to manufacture the ball screw 801 at low cost. Preferably, the cold forging is employed for the plastic working in the rough forming process and the ball circulation passage forming process. However, the cold forging may be employed for the plastic working at any one of the processes.

(Second Example)

The operation and effect of a second example of the ninth embodiment are almost same with those of the first example. Therefore, only the different points will be described and the same point will be omitted.

In the ball screw 801 according to the first example, the cross-sectional shape of the ball circulation passage 811 is a letter V shape in the entire lengthwise direction. However, a part of the cross-sectional shape of the ball circulation passage 811 may be a letter V shape in the lengthwise direction (partially a letter V shape in the lengthwise direction). In the ball screw 801 according to the second example, only the middle portion 811*b* has a letter V shaped cross-section, whereas the cross-sectional shapes of the end portions 811*a* and the middle portion 811*b* are an arc (single arc) or gothic arc shape. Since the middle portion 811*b* having the amount of the removed material most has a letter V shaped cross-section, the energy necessary for forging is drastically reduced.

(Third Example)

The operation and effect of a third example in the ninth embodiment are almost same with those of the first example. Therefore, only the different points will be described and the same point will be omitted.

In the ball screw 801 according to the third example, in contrast to the case of the second example, both of the end portions 811*a* have a letter V shaped cross-section, whereas the middle portion 811*b* has an arc (single arc) or gothic arc shaped cross-section.

The end portions 811*a* that is the introducing portion of the balls 809 is a part for the balls 809 to move from a load region to a non-load region, and is a part where the movements of the balls are most unstable. The cross-sectional shape of such a part is a letter V, and the ball 809 is in contact with the inner surface of the concaved groove 822 at two points, the movement of the balls 809 is stable.

In addition, when the cross-sectional shape of the middle portion 811*b* where the balls 809 move in a sliding manner is an arc shape or a substantially letter U shape in which the ball

809 is in contact with the inner surface of the concaved groove 822 at one point, the abrasion loss of the balls 809 can be reduced.

Specifically, the above first to third examples illustrate examples of the ninth embodiment, and the ninth embodiment is not limited to the above first to third examples. For example, in the ball screw 801 according to the first to third examples, an example of forming the concaved groove 822 by forging has been described. However, in another method other than forging, a concaved groove 822 may be formed by concaving a part of the inner circumferential surface, having a cylindrical surface shape, of the blank 821. Examples are cutting or grinding to concave a groove. Alternatively, the blank 821 having the concaved groove 822 at the inner circumferential surface is manufactured by forging, so that the concaved groove 822 may be the ball circulation passage 811. In a case where the concaved groove 822 is arranged in these methods, the effect of making small the energy necessary for manufacturing the ball screw 801 cannot be brought. However, the effect of the stable movements of the balls 809 in the ball circulation passage 811 can be brought.

In the ball screw 801 according to the first to third examples, a nut circulation type of ball screw having the nut 805 in which the ball circulation passage 811 for returning and circulating the balls 809 from the end point of the ball rolling passage 807 to the start point thereof has been described. The ninth embodiment, however, is applicable to a threaded shaft circulation type of ball screw having a threaded shaft in which the member corresponding to the ball circulation passage 811 is provided.

(Tenth Embodiment)

A tenth embodiment relates to a method of manufacturing a nut included in a ball screw.

A ball screw is provided with: a nut having an inner circumferential surface on which a spiral groove is formed; a threaded shaft having an outer circumferential surface on which a spiral groove is formed; balls loaded in a raceway between the spiral groove of the nut and that of the threaded shaft; and a ball return passage for returning the balls from an end point of the raceway to a start point thereof. The ball screw is a device such that the balls are rolling in the raceway to make the nut relatively move with respect to the threaded shaft.

Such ball screws are used in not only positioning devices of general industrial machinery but also electrical actuators mounted on vehicles such as automobiles, motorcycles, or vessels.

As to the ball return passage in the ball screw, there are a circulation tube type of the ball return passage and a deflector type thereof. In the case of the deflector type, a deflector having a concave included in the ball return passage is fitted in a through hole of the nut. In contrast to this, Patent Document 4 describes a ball screw having an inner circumferential surface on which a concave constituting a ball return passage (ball circulation groove) is directly provided.

Specifically, the nut member of the ball screw does not have a divided surface in the circumferential direction, and is integrally formed by cutting or forging. The inner circumferential surface is provided with a long letter S shaped circulation passage (ball circulation groove) having apart (outwardly protruding in the radial direction) deeper than the female spiral groove (ball rolling groove) so as to smoothly connect both ends of the female spiral groove. However, Patent Document 4 does not describe in what way the female spiral groove and the circulation passage are formed concretely.

Patent Document 5 proposes that a nut having the concave (returning groove) constituting a ball return passage, a spiral groove (inside screw groove), and a protruding portion of an outer circumferential surface (part forming an exterior surface) is integrally formed with sintered alloy.

Patent Document 6 describes a “screw apparatus” in which a load ball rolling groove having a spiral shape and a ball circulation groove for connecting one end load ball rolling groove to the other end thereof are arranged on the inner circumferential surface of the nut. As a method of forming the ball circulation passage, Patent Document 6 describes that it is possible to make it in a method of working an internal diameter groove, which is called “internal cam”.

Figure 19A:
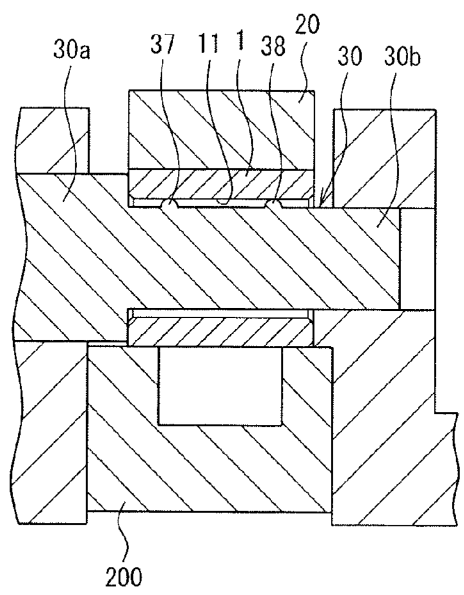
FIG. 19 is a view illustrative of a method of Patent Document 1.
Figure 19B:
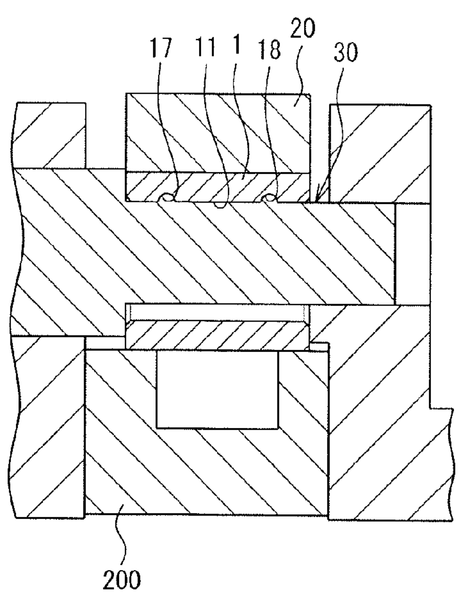

Patent Document 1 describes a method of directly forming the ball circulation groove on the inner circumferential surface of the nut blank by plastic working. As illustrated in FIG. 19, this method uses the die provided with the cylindrical working head 30 having the projection portions 37 and 38 each having a letter S shape to correspond to the shape of a circulation groove.

Then, the nut blank 1 is disposed on the table 200 transversely (with its axial direction set to the horizontal), the working head 30 is disposed inside the nut blank 1 with the projection portions 37 and 38 faced upwardly, and the pressure is pressed onto an upper member 20 of the die to move downward with the base end portion 30*a* and the front end portion 30*b* secured. Thus, the projection portions 37 and 38 are pushed against the inner circumferential surface 11 of the nut blank 1 to plastically deform the inner circumferential surface 11 of the nut blank 1.

As a method of forming ball circulation groove by plastically deforming the nut blank, but different from the method described in Patent Document 1, there is a method of disposing the cylindrical shaped nut blank (an example of this has been described in the first embodiment) with its axial direction set in the longitudinal direction, moving the punch inserted into the nut blank outwardly in the radial direction of the nut blank with the outer circumferential surface and one end surface in the axial direction retrained, and pressing the punch against the inner circumferential surface of the nut blank (the forging process with the use of the punch).

In this method, the inner circumferential surface of the nut blank is depressed by the pressing force of the punch to form the concave (ball circulation groove) corresponding to the projecting shape of the punch. Therefore, a strong bending stress acts on the punch depending on the working condition or restraining condition. Additionally, the flow of the material existing in the depressed portion in the same manner results in the lower accuracy in the shape of the ball circulation groove, in some cases. In particular, in a case where plural ball circulation passages are provided at a time, there is a tendency of easily generating variations in each shape of the ball circulation grooves with low accuracy in shape and low accuracy in axial and circumferential positions.

An object of the tenth embodiment is to provide a method of suppressing a material flow of the nut blank and reducing a bending stress to act on a punch, as a method of forming a ball circulation groove, having an arc-like cross-section and having a letter S shape in the moving direction of the balls, on the inner circumferential surface of the nut blank in a forging method with the punch.

In order to achieve the above object, according to the tenth embodiment, there is provided a method for manufacturing a nut for a ball screw. The nut composes the ball screw with the threaded shaft and the balls, and has the ball circulation groove having a circular cross-section and a letter S shape in the moving direction of the balls and provided on the inner circumferential surface as a ball return passage for returning the balls from the end point of the rolling raceway to the start point thereof. After a base concave to be included in the circular arc of cross-section of the ball circulation groove is formed at a position where the ball circulation groove is formed on the inner circumferential surface of the cylindrical nut blank, the ball circulation groove is formed by moving the punch inserted into the nut blank radially to the outside of the nut blank.

As a method of forming the base concave on the nut blank, there are turning, cutting process, electro-discharge machining, and the like.

According to the tenth embodiment, the ball circulation groove is formed by forging with the use of a punch on the nut blank in which the base concave is formed, so that the amount to be depressed by the pressing force of the punch on the inner circumferential surface of the nut blank can be reduced, as compared to the case where the ball circulation groove is formed by the forging with use of the punch on the nut blank in which the base concave is not formed. Thus, the flow amount of the material is made small, and it is possible to reduce the bending stress acting on the punch.

The base concave is formed to have a substantially letter V shaped cross-section and is as deep as the ball circulation groove, and the opening of the cross-section is same with the opening of the circular arc of cross-section of the ball circulation groove.

The base concave may be formed to have a substantially letter V shaped cross-section and is deeper than the ball circulation groove, and the opening of the cross-section is same with the opening of the circular arc of cross-section of the ball circulation groove, so that an end portion in the depth direction of the base concave may remain at the bottom portion of the ball circulation groove as an flowing groove, after the ball circulation groove is provided. In this case, the flowing groove can be used as a lubricant reservoir.

In addition, in this case, the part serving as the flowing groove of the base concave is located on the outside of the circular arc of cross-section of the ball circulation groove. However, the other parts are included in the circular arc of cross-section of the ball circulation groove.

According to the tenth embodiment, in the method of forming the ball circulation groove having a circular cross-section and a letter S shape in the moving direction of the balls on the inner circumferential surface of an axially end portion of the nut blank by forging with the use of a punch, it is made possible to suppress the material flow and reduce the bending stress to act on the punch.

Therefore, the accuracy in shape and accuracy in position are superior in the ball circulation groove, thereby extending the life of the punch.

Hereinafter, the tenth embodiment will be described.

(First Example)

In a first example of the tenth embodiment, referring now to FIG. 76, two processes are performed for forming a ball circulation groove 915 having an circular arc shaped cross-section and having a letter S shape in the ball moving direction, on an inner surface of a cylindrical nut blank 901.

Firstly, a base concave 913 having a substantially letter V shaped cross section to be included in a cross-sectional arc of the ball circulation groove 915 is formed by turning at a position where a ball circulation groove 915 is arranged, in the letter S shaped ball moving direction of the ball circulation groove 915. However, the base concave 913 may be formed by cutting process. Moreover, since the accuracy of the formed position of the base concave 913 is superior, the turning or cutting process is preferable. However, the plastic working such as pressing or the like can be employed. The base concave 913 has a depth same as that of the ball circulation groove 915, and an opening of the cross-section is same as an opening of an circular shaped cross-section of the ball circulation groove 915.

Next, the ball circulation groove 915 is formed, in the method illustrated in FIG. 77, at a position where the base concave 913 is formed on the inner circumferential surface 911 in the nut blank 901.

The die used in the method illustrated in FIG. 77 is same as that of the first embodiment, and is provided with: an outer circumference restraining block 902; a lower block 903 for restraining a lower end surface of the nut blank 901; and a cylindrical shaped pressing member 904 mounted on an upper end surface of the nut blank 901.

There are also provided with: a cylindrical shaped cam case 905 inserted into the nut blank 901; a cam driver 906 inserted into a center hole 951 of the cam case 905; and a punch (cam slider) 907 disposed in a through bore 952 in the radial direction of the cam case 905.

The cam case 905 is inserted into the nut blank 901 with the side on which the through bore 952 disposed on the upper side. The punch 907 is provided with a projection 971 corresponding to the shape of the ball circulation groove 915 (having a circular shaped cross-section and having a letter S shaped ball moving direction). The punch 907 has an inclined surface 972 same with an inclined surface 961 of the cam driver 906. These inclined surfaces 961 and 972 constitute a cam mechanism.

By using this die, the lower end surface of the nut blank 901 and the lower end surface (one end surface in the axial direction) of the cam case 905 are restrained by the lower block 903. In this state, by pressing the cam driver 906, the punch 907 is moved outwardly in the radial direction of the nut blank 901. A projection 971 of the punch 907 is pushed into the base concave 913 of the inner circumferential surface 911 in the nut blank 901, and the ball circulation groove 915 is formed. Thus, the depressed amount of the inner circumferential surface 911 of the nut blank 901 by the pressing force of the punch 907 is made smaller than the case where the ball circulation groove 915 is formed without the provision of the base concave 913 in the nut blank 901.

For this reason, the flow amount of the material is made smaller and the bending stress to be act on the punch 907 can be made smaller than the case where the ball circulation groove 915 is formed without the provision of the base concave 913 in the nut blank 901. As a result, the shape accuracy of the ball circulation groove 915 and axial and circumferential position accuracy are superior, and the life of the punch 907 is extended.

Figure 78:
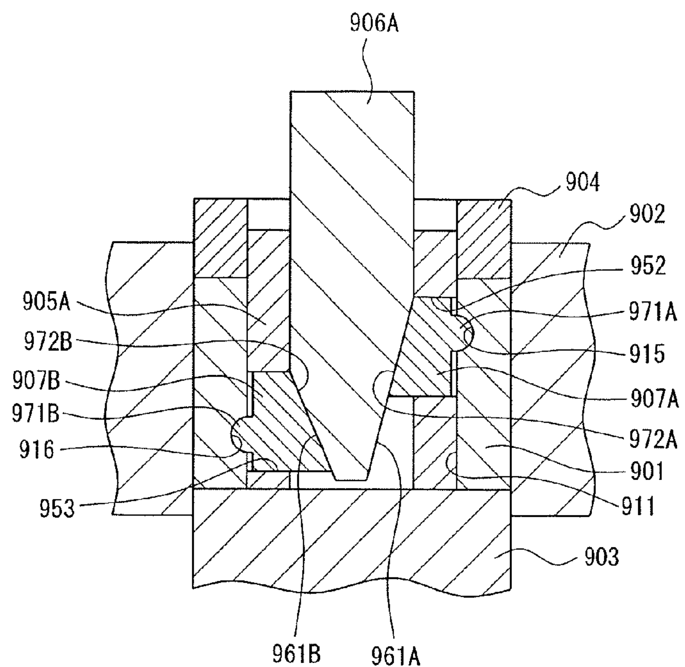
FIG. 78 is a view illustrative of the method of forming plural ball circulation grooves in the method of forging with a punch, in one shot employed in the first method in the tenth embodiment.

In addition, in a case where plural ball circulation grooves are formed on the inner circumferential surface 911 of the nut blank 901 at a time, the base concave 913 is arranged at plural corresponding positions, and the forging method with a punch is performed in the method illustrated in FIG. 78, for example.

The die used in the method illustrated in FIG. 78 is provided with: the outer circumference restraining block 902 for restraining the outer circumferential surface of the cylindrical nut blank 901; the lower block 903 for restraining the lower end surface of the nut blank 901; and the cylindrical pressing member 904 mounted on the upper end surface of the nut blank 901. There are also provided with: a cylindrical cam case 905A inserted into the nut blank 901; a cam driver 906A inserted into the center hole 951 of the cam case 905A; and punches (cam sliders) 907A and 907B respectively disposed in through bores 952 and 953 in the radial direction of the cam case 905A.

The punches 907A and 907B are provided with projections 971A and 971B corresponding to the shapes of the ball circulation grooves 915 and 916 (each having a circular arc shaped cross-section and having a letter S shaped ball moving direction), respectively. The cam driver 906A has an inclined surface 961A same with an inclined surface 972A of the punch 907A, and has an inclined surface 961B same with an inclined surface 972B of the punch 907B. The inclined surfaces 961A and 972A have angles of inclination smaller than the inclined surfaces 961B and 972B. The inclined surfaces 961A and 972A, and the inclined surfaces 961B and 972B respectively constitute a cam mechanism.

By using this die, the lower end surface of the nut blank 901 and the lower end surface (the other end surface in the axial direction) of the cam case 905A are restrained by the lower block 903. In this state, by pressing the cam driver 906A, the punches 907A and 907B are moved outwardly in the radial direction of the nut blank 901. Projections 971A and 971B of the punches 907A and 907B are pushed into the base concave 913 of the inner circumferential surface 911 in the nut blank 901, and the ball circulation grooves 915 and 916 are formed, respectively.

Thus, the depressed amounts of the inner circumferential surface 911 of the nut blank 901 by the pressing force of the punches 907A and 907B are made smaller than the case where the ball circulation grooves 915 and 916 are formed without the provision of the base concave 913 in the nut blank 901, respectively. For this reason, the flow amount of the material is made smaller and the bending stress to act on the punches 907A and 907B can be made smaller than the case where the ball circulation grooves 915 and 916 are formed without the provision of the base concave 913 in the nut blank 901, respectively.

As a result, the shape accuracy of the ball circulation grooves 915 and 916 and axial and circumferential position accuracy are superior, and the lives of the punches 907A and 907B is extended.

(Second Example)

Figure 79:
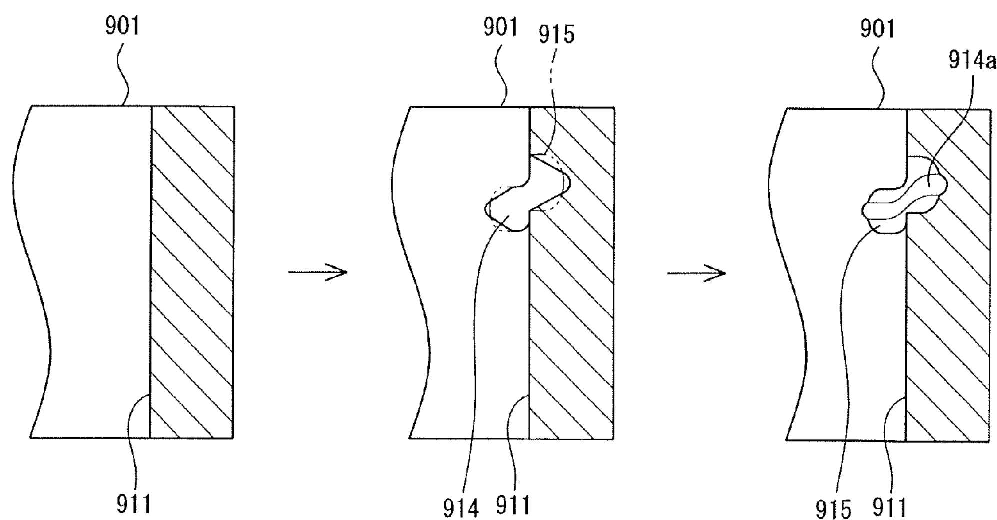
FIG. 79 is a view illustrative of a second method in the tenth embodiment.

In a second example of the tenth embodiment, referring now to FIG. 79, two processes are performed for forming the ball circulation groove 915 having a circular arc shaped cross-section and having a letter S shape in the ball moving direction, on an inner surface of the cylindrical nut blank 901.

Firstly, a base concave 914 having a substantially letter V shaped cross section and the entire base concave 914, except for an end portion in the depth direction, to be included in a cross-sectional arc of the ball circulation groove 915 is formed by turning at a position where the ball circulation groove 915 is arranged, in the letter S shaped ball moving direction of the ball circulation groove 915. However, the base concave 913 may be formed by cutting process. Moreover, since the accuracy of the formed position of the base concave 913 is superior, the turning or cutting process is preferable. However, the plastic working such as pressing or the like can be employed. The base concave 914 is deeper than that of the ball circulation groove 915, and an opening of the cross-section is same as an opening of a circular shaped cross-section of the ball circulation groove 915.

Next, in the same manner as the first example, the ball circulation groove 915 is arranged, in the same method with the die as illustrated in FIG. 77, at a position where the base concave 914 of the inner circumferential surface 911 in the nut blank 901. The end portion in the depth direction of the base concave 914 remains as a flowing groove 914*a* at the bottom of the ball circulation groove 915. Thus, the depressed amount of the inner circumferential surface 911 of the nut blank 901 by the pressing force of the punch 907 is made smaller than the case where the ball circulation groove 915 is formed without the provision of the base concave 914 in the nut blank 901.

For this reason, the flow amount of the material is made smaller and the bending stress to act on the punch 907 can be made smaller than the case where the ball circulation groove 915 is formed without the provision of the base concave 914 in the nut blank 901. As a result, the shape accuracy of the ball circulation groove 915 and axial and circumferential position accuracy are superior, and the life of the punch 907 is extended. In addition, the flowing groove 914*a* can be used as a lubricant reservoir and the lubricating performance is improved.

Furthermore, in a case where plural ball circulation grooves are formed on the inner circumferential surface 911 of the nut blank 901 at a time, the base concave 914 is formed at plural corresponding positions, and the forging method with the punches 907A and 907B is performed in the method illustrated in FIG. 78, for example. In this manner, the ball circulation grooves 915 and 916 are provided at positions where each of the base concave 914 is arranged on the inner circumferential surface 911 of the nut blank 901, and an end portion in the depth direction of each of the base concave 914 remains as flowing grooves at the bottom portions of the ball circulation grooves 915 and 916.

Thus, the depressed amount of the inner circumferential surface 911 of the nut blank 901 by the pressing forces of the punches 907A and 907B are made smaller than the case where the ball circulation grooves 915 and 916 are formed without the provision of the base concave 914 in the nut blank 901. For this reason, the flow amount of the material is made smaller and the bending stress to act on the punches 907A and 907B can be made smaller than the case where the ball circulation grooves 915 and 916 are formed without the provision of the base concave 914 in the nut blank 901.

As a result, the shape accuracy of the ball circulation grooves 915 and 916 and axial and circumferential position accuracy are superior, and the lives of the punches 907A and 907B are extended.

(Eleventh Embodiment)

An eleventh embodiment relates to a ball screw having a groove shaped ball return passage (ball circulation groove).

A ball screw is provided with: a nut having an inner circumferential surface on which a spiral groove is formed; a threaded shaft having an outer circumferential surface on which a spiral groove is formed; and rollable balls loaded in a raceway between the spiral groove of the nut and that of the threaded shaft; and a ball return passage for returning the balls from an end point of the raceway to a start point thereof. The ball screw is a device such that the balls are rolling in the raceway to make the nut relatively move with respect to the threaded shaft.

Such ball screws are used in not only positioning devices of general industrial machinery but also electrical actuators mounted on vehicles such as automobiles, motorcycles, or vessels.

As to the ball return passage in the ball screw, there are a circulation tube type of the ball return passage and a deflector type thereof. In the case of the deflector type, a deflector having a concave (groove shaped ball return passage) included in the ball return passage is fit in a through hole of the nut. In contrast to this, in a case where the groove shaped ball return passage (often referred to as "ball circulation groove") is directly formed on the inner circumferential surface of the nut, the labor or cost for assembling can be reduced and the improved reliability of the ball circulation can be expected.

Patent Document 1 describes cutting process of a female screw groove (ball rolling groove) after a circulation groove (ball circulation groove) is directly formed on the inner circumferential surface of the nut blank by plastic working, as a method of manufacturing the ball screw having the ball circulation groove directly arranged on the inner circumferential surface of the nut.

Patent Document 9 describes the provision of the ball circulation groove on a ball circulation portion having an annular shape and coaxially and integrally arranged with the nut on an end portion in the axial direction of the nut.

Patent Document 7 describes that the cross-section of the circulation groove (ball circulation groove), perpendicular to the ball moving direction and having a pair of side surfaces with the groove bottom, has a shape of widening its side surfaces in the direction of getting apart from the groove bottom. Thus, a gap between the circulation groove and the ball is set small, so that the meandering of the balls and the generation of the step between the circulation groove and the threaded shaft can be suppressed. Accordingly, Patent Document 7 also describes that unusual noises and vibration are suppressed to ensure an smooth operation.

Patent Document 10 describes that the ball circulation groove is provided with the threaded shaft and the entire of the ball circulation groove has a shape of gently curving in the radial direction. Together with this, a connecting portion of the threaded shaft and the threaded groove has a shape without an extremely sharp edge. This allows the balls to smoothly enter and exit between the threaded groove of the threaded shaft and the ball circulation groove.

The methods described in Patent Documents 1, 7, 9, and 10 leave much to be improved in the durability, the ball circulating performance, and the working performance of the ball screw having the groove shaped ball return passage (ball circulation groove).

An object of the eleventh embodiment is to further improve the durability, the ball circulating performance, and the working performance of the ball screw having the groove shaped ball return passage (ball circulation groove).

In order to achieve the above object, a ball screw according to the eleventh embodiment is provided with: a nut having an inner circumferential surface on which a spiral groove is formed; a threaded shaft having an outer circumferential surface on which a spiral groove is formed; balls loaded in a raceway between the spiral groove of the nut and that of the threaded shaft; and a ball circulation groove for returning the balls from the end point of the raceway to the start point thereof. In the ball screw, the balls are rolling in the raceway and the nut relatively moves with respect to the threaded shaft. A corner portion defined by both of side surfaces of the ball circulation passage and a surface axially extending and continuous with each of the side surfaces is rounded.

In the ball screw according to the eleventh embodiment, there is a rounded corner portion defined by both of side surfaces of the ball circulation passage and a surface axially extending and continuous with each of the side surfaces. Hence, as compared to the case where the corner portion is not rounded, scratch or dent is hardly generated on the ball surface and fracture of the corner of the ball circulation groove hardly occurs while the balls are circulating. Thus, the durability is enhanced.

In addition, when the moving ball passes over the land portion, it is capable of moving smoothly, whereby the ball circulating performance is improved. Furthermore, when the corner portion is not rounded, it is necessary to remove burr after the process. However, the rounded corner portion eliminates the process, and improves the working performance.

The ball screw according to the eleventh embodiment has superior durability, ball circulating performance, and working performance as a ball screw having a groove shaped ball return passage (ball circulation groove).

Hereinafter, the eleventh embodiment will be described.

Figure 80:
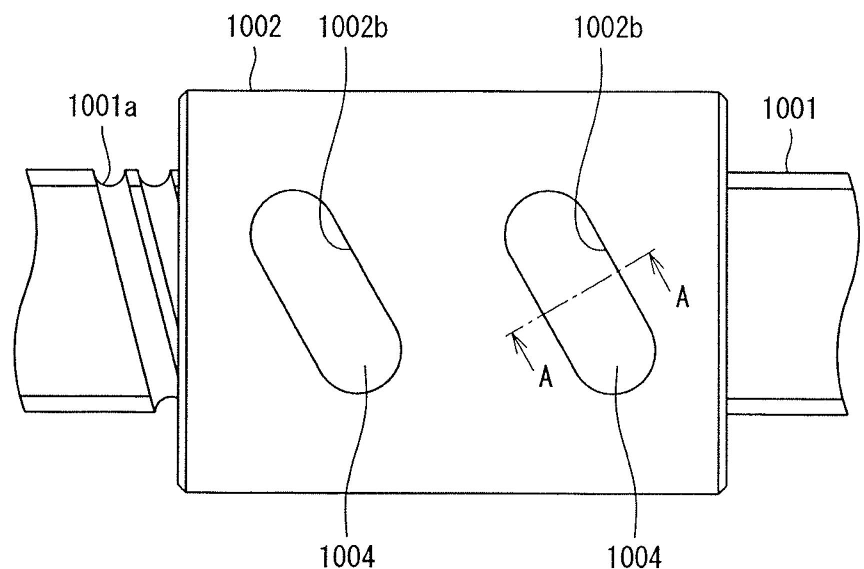
FIG. 80 is a side view illustrative of a ball screw in a first example of an eleventh embodiment.
Figure 81:
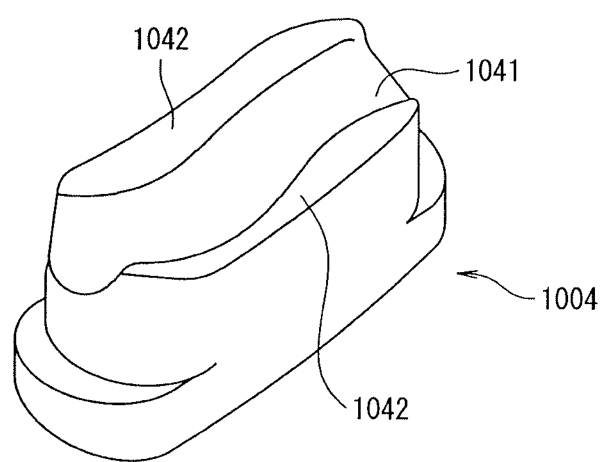
FIG. 81 is a perspective view illustrative of a deflector constituting the ball screw of FIG. 80.
Figure 82:
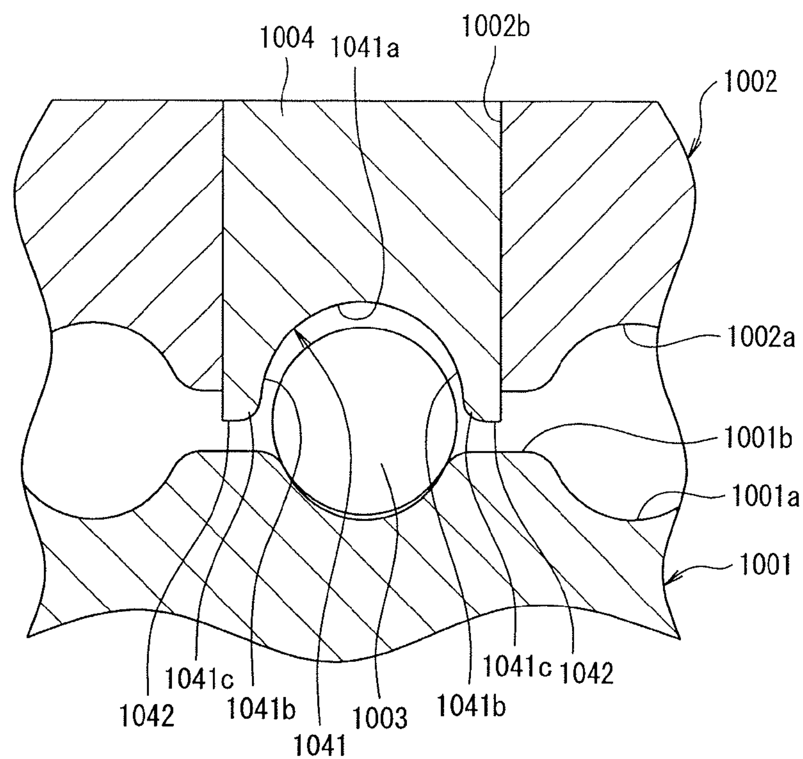
FIG. 82 is a cross-sectional view taken along line A-A of FIG. 80.

Referring now to FIG. 80 to FIG. 82, a first example of the eleventh embodiment is provided with: a threaded shaft 1001; a nut 1002; balls 1003; and a deflector 1004. A spiral groove 1001*a* is provided with an outer circumferential surface of the threaded shaft 1001. A spiral groove 1002*a* is provided with an inner circumferential surface of the nut 1002. The deflector 1004 is fit into a through hole spiral groove 1002*a* radially penetrating through the nut 1002. The ball 1003 is disposed in the raceway formed with the spiral groove 1002*a* of the nut 1002 and the spiral groove 1001*a* of the threaded shaft 1001.

As illustrated in FIG. 81 and FIG. 82, the deflector 1004 is provided with a ball circulation groove 1041 returning the balls 1003 from the end point of the raceway to the start point thereof. The ball circulation groove 1041 arranged at the deflector 1004 has a groove bottom 1041*a*, and a pair of side surfaces 1041*b* continuous with the groove bottom 1041*a*, as illustrated in FIG. 82. A corner portion 1041*c*, defined by the both side surfaces 1041*b* of the ball circulation groove 1041 and a surface 1042 axially extending and continuous with each of the side surfaces 1041*b*, is formed to have a round shape.

Figure 83:
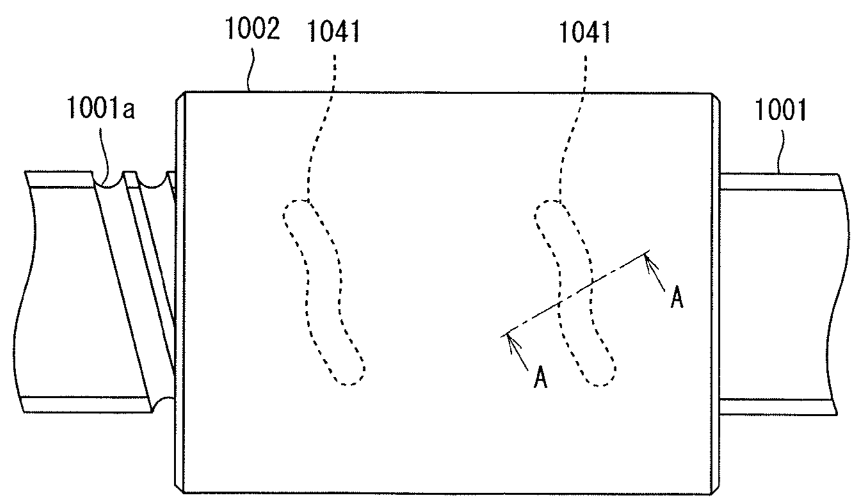
FIG. 83 is a side view illustrative of a ball screw in a second example of the eleventh embodiment.

Referring now to FIG. 83 and FIG. 84, the ball screw according to a second example of the eleventh embodiment has the ball circulation groove 1041 directly arranged on an inner circumferential surface 1002*d* of the nut 1002, whereas a through hole 1002*b* as illustrated in FIG. 80 is not provided at the nut 1002 and the deflector 1004 is not provided, either.

As illustrated in FIG. 84, the ball circulation groove 1041 arranged at the inner circumferential surface 1002*d* of the nut 1002 has the groove bottom 1041*a*, and the pair of side surfaces 1041*b* which are continuous with the groove bottom 1041*a*. The corner portion 1041*c*, defined by the both side surfaces 1041*b* of the ball circulation groove 1041 and a surface 1002*d* (inner circumferential surface of the nut 1002) axially extending and continuous with each of the side surfaces 1041*b*, is formed to have a round shape.

According to the ball screws of the first and second examples, the corner portion 1041*c* of the ball circulation groove 1041 is formed to have a round shape. Therefore, as compared to the corner portion without having a round shape, scratch or dent on the ball surface is hardly generated and fracture of the corner portion 1041*c* of the ball circulation groove 1041 hardly occurs while the balls 1003 are circulating. Accordingly, the durability is improved.

In addition, the balls 1003 moving through the ball circulation groove 1041 are capable of smoothly moving when passing over an outer circumferential surface (land portion) 1001*b* of the threaded shaft 1001, thereby improving the ball circulating performance. Furthermore, the corner portion 1041*c* of the ball circulation groove 1041 is formed to have a round shape, thereby hardly generating burr at the corner portion 1041*c*. This eliminates the following processes of eliminating burr, whereby the working performance is improved.

As illustrated in FIG. 84, in the nut 1002 in which the ball circulation groove 1041 is directly formed with the round shaped corner portion 1041*c*, for example, the ball circulation groove is formed by plastic working by use of a die 1005, as illustrated in FIG. 85A, on an inner circumferential surface of a cylindrical blank produced with the nut blank. After that, it is possible to form and produce the ball rolling groove by a cutting process for connecting both ends of the ball circulation groove. The die 1005 illustrated in FIG. 85A is provided with convexes 1052 and 1053 on a surface of a base portion to correspond to the ball circulation groove 1041. The first convex 1052 forms the groove bottom 1041*a* and the side surfaces 1041*b* of the ball circulation groove 1041, and the second convex 1053 forms the roundness of the corner portion 1041*c*.

As another method of directly forming the ball circulation groove 1041 having the round shaped corner portion 1041*c* in the nut 1002, there is a method of directly forming the ball circulation groove 1041 having a sharp corner portion on the nut 1002 in the conventional method, and then the sharp corner portion is rounded in the media projecting method such as shot blasting or the like. As illustrated in FIG. 85B, there is further another method of rounding the corner portion by use of plastic flow with the die 1005 without the second convex 1053.

Figure 86:
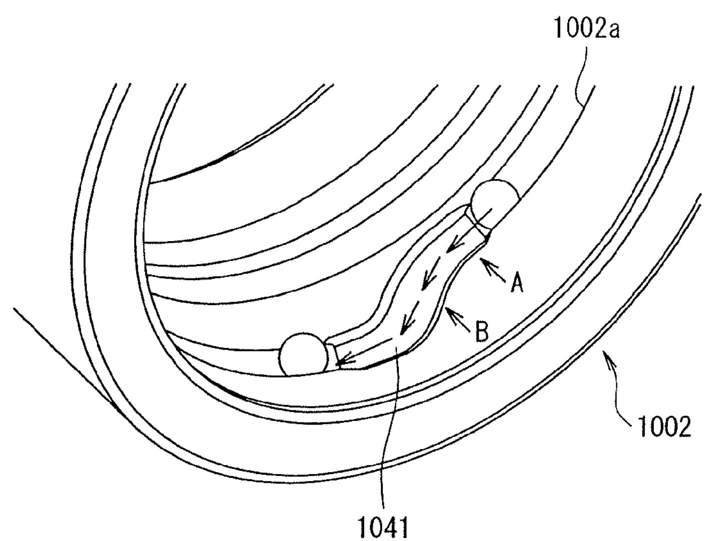
FIG. 86 is a view illustrative of functions of a ball circulation groove.
Figure 87:
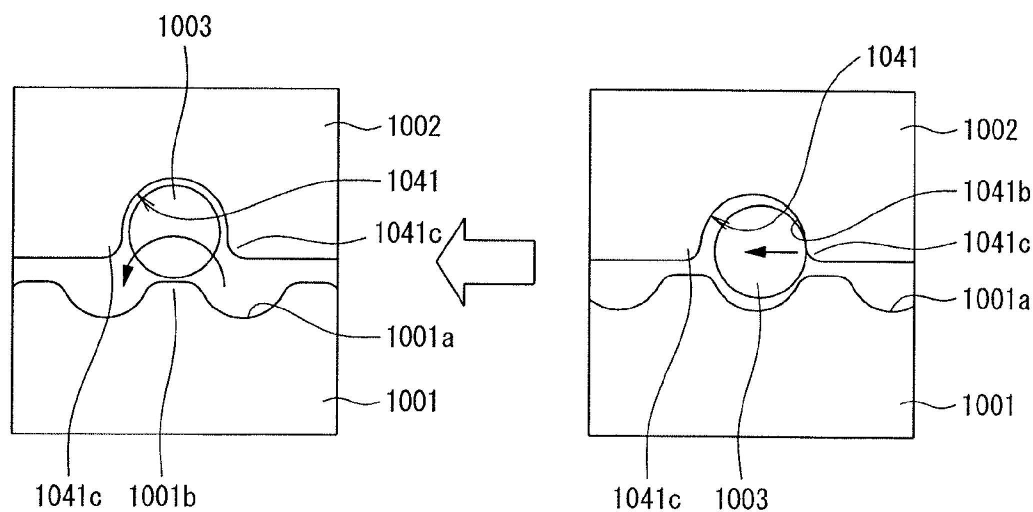
FIG. 87 is a view illustrative of movements of the balls at part A and part B of FIG. 86.

Referring now to FIG. 86, the ball circulation groove 1041 is connected to the spiral groove 1002*a* of the nut 1002. On the ball entering side (Part A) of the ball circulation groove 1041, the balls 1003 that has entered the ball circulation groove 1041 from the spiral groove 1002*a* come into touch with the side surfaces 1041*b* of the ball circulation groove 1041 and receive a force of direction of the arrow, as illustrated in the drawing on the right side of FIG. 87. The balls 1003 that have received this force pass over the outer circumferential surface (land portion) 1001*b* of the threaded shaft 1001 at the central portion (Part B) of the ball circulation groove 1041, and move to an adjacent spiral groove 1002*a*, as illustrated in the drawing on the left side of FIG. 87. Therefore, the roundness degree of the corner portion 1041*c* needs to be set within a range to which the force of allowing the ball 1003 to pass over the outer circumferential surface 1001*b* of the threaded shaft 1001 smoothly is applied.

In addition, as in Patent Document 9, the ball circulation portion having an annular shape is arranged integrally and coaxially with the nut on one end portion of the axial direction of the nut. The ball circulation groove is arranged in the ball circulation portion, and the corner portion, defined by both side surfaces of the ball circulation groove and the surface axially extending and continuous with each of the side surfaces, may be formed to have a round shape. Thus, the durability of the ball screw, the ball circulating performance, and the working performance can be further improved.

Furthermore, as described in Patent Document 7, the cross-section, of the circulation groove (ball circulation groove), perpendicular to the ball moving direction and having a pair of side surfaces with the groove bottom has a shape of widening its side surfaces in the direction of getting apart from the groove bottom. Then, the corner portion, defined by both side surfaces of the ball circulation groove and the surface continuous with each side surface and axially extending, may be formed to have a round shape. Thus, the durability, the ball circulating performance, and the working performance of the ball screw can be further improved.

When the ball circulation groove is formed by plastic working by use of a die on the inner circumferential surface of the cylindrical blank produced with the nut blank, the corner portion defined by both side surfaces of the ball circulation groove (flange in the flange formed position) and the surface continuous with each side surface and axially extending, may be formed to have a round shape, in the ball screw having a protruded flange around the ball circulation groove on the inner circumferential surface (Japanese Patent Application Number 2009-226241). Thus, the durability, the ball circulating performance, and the working performance of the ball screw can be further improved.

Moreover, in a case where the ball circulation groove is arranged on the threaded shaft, instead of the nut, the same effect is obtainable by rounding the corner portion defined by both side surfaces of the ball circulation groove and the surface continuous with each side surface and axially extending.

(Twelfth Embodiment)

A twelfth embodiment relates to a ball screw.

A ball screw is provided with: a threaded shaft having an outer circumferential surface on which a spiral thread groove is formed; a nut having an inner circumferential surface on which a thread groove opposing the thread groove of the threaded shaft is formed; and plural balls rotatably loaded in a spiral ball rolling passage formed by both of the thread grooves. Then, when the nut screwed with the threaded shaft and the threaded shaft are relatively rotated via the balls, the threaded shaft and the nut are relatively moved in the axial direction via the rolling movement of the balls.

Such a ball screw is provided with a ball circulation passage constituting a ball passage with no end by communicating the start point of the ball rolling passage and the end point thereof. That is to say, when the balls move around the threaded shaft while moving in the ball rolling passage and reach the end point of the ball rolling passage, the balls are scooped up from one end portion of the ball circulation passage, pass through the ball circulation passage, and return to the start point of the ball rolling passage from the other end portion of the ball circulation passage. In such a manner, since the balls rolling in the ball rolling passage circulate in the ball circulation passage endlessly, the threaded shaft and the nut relatively move consecutively.

As a method of improving the lubricity of the ball screw, there is known a technique of providing an oil reservoir for holding a lubricant such as lubricating oil, grease, or the like. For example, Patent Document 11 discloses a ball screw provided with an oil reservoir in the ball rolling passage of a resin nut manufactured in the injection molding method. That is to say, a dented portion constituting the oil reservoir is formed on the surface of the thread groove of the nut, so that the lubricant is filled in the oil reservoir.

In many cases, however, the nut is made of metal. Therefore, in order to provide the oil reservoir in the ball rolling passage, the thread groove is formed and then the dented portion needs to be formed on its threaded surface by cutting process or the like. For this reason, there is a problem that the working costs for manufacturing the ball screw are increased. In addition, the provision of the dented portion in the thread groove may decrease the load capacity and the life of the ball screw.

Accordingly, the twelfth embodiment has been made to solve the problem of the conventional technique and has an object of providing the ball screw in which the lubricity is improved without decreasing the load capacity or the life or increasing the manufacturing costs.

In order to achieve the above object, the twelfth embodiment has a configuration as follows. According to a ball screw in the twelfth embodiment, comprising: a threaded shaft having an outer circumferential surface on which a spiral thread groove is formed; a nut having an inner circumferential surface on which a thread groove is formed to oppose the thread groove of the threaded shaft; balls rotatably loaded in a spiral ball rolling passage between the thread groove of the nut and that of the threaded shaft; a ball circulation passage, for returning the balls from an end point of the ball rolling passage to a start point thereof. The ball circulation passage is composed of concaved groove by concaving a grove on a part of the inner circumferential surface of the nut. There is also provided with a lubricant reservoir for holding a lubricant.

The lubricant reservoir is composed of a dented portion by concaving a groove on a part of the inner surface of the concaved groove.

In the ball screw according to the twelfth embodiment, preferably, the ball circulation passage includes both of end portions that are connecting portions with the ball rolling passage and a middle portion between both of the end portions, and a cross-sectional area of the lubricant reservoir cut along a plane perpendicular to a lengthwise direction of the ball circulation passage is greater in a part adjacent to the middle portion than in a part adjacent to each of the end portions.

In addition, preferably, the ball circulation passage is curved, and a cross-sectional area of the lubricant reservoir cut along a plane perpendicular to a lengthwise direction of the ball circulation passage is greater in the lubricant reservoir arranged on the inside in a radial direction of a curve of the ball circulation passage than in the lubricant reservoir arranged on the outside in the radial direction of the curve of the ball circulation passage.

Furthermore, preferably, the concaved groove constituting the ball circulation passage and the dented portion constituting the lubricant reservoir are formed at the same time by forging.

The ball screw according to the twelfth embodiment is provided with the lubricant reservoir on the ball circulation passage of the nut. Thus, superior lubricating property is achieved without decreasing the load capacity and life and increasing the manufacturing cost.

An example of the ball screw according to the twelfth embodiment and a method for manufacturing the same will be described in detail with reference to the drawings.

(First Example)

FIG. 67 is a cross-sectional view illustrative of a configuration of a ball screw according to a first example of the twelfth embodiment (cross-sectional view cut along a plane in the axial direction).

Referring now to FIG. 67, the ball screw 801 is provided with: a threaded shaft 803 having a thread groove 803*a* of a spiral shape at an outer circumferential surface; a nut 805 having at an inner circumferential surface a thread groove 805*a* of a spiral shape facing the thread groove 803*a* of the threaded shaft 803; plural balls 809 loaded to be capable of rolling in a ball rolling passage 907 having a spiral shape formed between both of the thread grooves 803*a* and 805*a*; and a ball circulation passage 811 (ball return passage) for returning and circulating the balls 809 from the start point to the end point of a ball rolling passage 807.

That is to say, the balls 809 pass around the threaded shaft 803 while moving in the ball rolling passage 807, and reach the end point of the ball rolling passage 807. Then, the balls are scooped up from one end portion of the ball circulation passage 811, pass through the ball circulation passage 811, and return to the start point of the ball rolling passage 807 from the other end portion of the ball circulation passage 811.

Specifically, the cross-sectional shape of the thread grooves 803*a* and 805*a* may be an arc (a single arc shape) or a gothic arc. In addition, the materials of the threaded shaft 803, the nut 805, and the balls 809 are not limited especially. A general material can be used. Examples are metal (steel or the like), sintered alloy, ceramic, and resin.

In such a ball screw 801, when the nut 805 screwed together with the threaded shaft 803 via the balls 809 and the threaded shaft 803 are relatively rotated, the threaded shaft 803 and the nut 805 are relatively moved in the axial direction via the rolling movement of the balls 809. Then, the ball passage with no end portion is formed of the ball rolling passage 807 and the ball circulation passage 711 so that the balls 809 rolling in the ball rolling passage 807 circulate in the ball passage with no end portion endlessly. This allows the threaded shaft 803 and the nut 805 for relative movement consecutively.

In this situation, the ball circulation passage 811 will be described in detail with reference to the cross-sectional views (cross-sectional views taken along a plane perpendicular to the axial direction) of FIG. 68 and FIG. 69. The ball circulation passage 811 is, for example, integrally formed on the inner circumferential surface of the nut 805. In more detail, a groove is concaved on a part of the inner circumferential surface of the nut 805 having a cylindrical surface shape by plastic working or cutting for forming a concaved groove 822, as the ball circulation passage 811. Moreover, another member constituting the ball circulation passage is not provided, unlike the case of the tube or deflector type of the ball circulation. Since another member is not provided, there is no possibility of generating a step with an edge portion at the boundary when another member is used.

As illustrated in FIG. 69, the balls 809 that have rolled to the end point of the ball rolling passage 807 are scooped up from one end portion of the ball circulation passage 811 and sunk into the inside (radially outside) of the nut 805. Then, the balls 809 pass through the ball circulation passage 811, pass over a land portion 803*b* (screw thread of the thread groove 803*a*) of the threaded shaft 803, and return to the start point of the ball rolling passage 807 from the other end portion of the ball circulation passage 811. The cross-sectional shape of the ball circulation passage 811 may be an arc (singular arc shape) or a gothic arc.

Referring now to FIG. 88, a concaved groove 1122 constituting the ball circulation passage 811 has a straight line shape at both end portions that are connecting portions with the ball rolling passage 807 (the thread groove 805*a*), and a middle portion 1124 disposed between the both end portions has a curved shape curved at substantially a letter S shape. In addition, the straight-shaped end portion is provided with an entering portion 1125 of balls 1109, and the endmost portion of the straight-shaped end portion has an arc shape. The entire shape of the concaved groove 1122 is not limited to the substantially letter S as illustrated in FIG. 88.

Additionally, a nut 1105 is provided with a lubricant reservoir capable of holding the lubricant. This lubricant reservoir is composed of a dented portion 1131 formed by concaving a groove on a part of the inner surface of the concaved groove 1122 (See FIG. 89). The lubricant such as grease, lubricating oil, or the like is held in the lubricant reservoir, so as to be supplied to the ball circulation passage 811 while the ball screw 801 is being used, as necessary. Then, the lubricant is applied to the surface of the balls 809 in the ball circulation passage 811, and reaches the ball rolling passage 807 together with the balls 809. The lubricant is used for lubricating the thread grooves 803*a* and 805*a* and the surfaces of the balls 809. Accordingly, the ball screw 801 is superior in the lubricity. Moreover, since the lubricant held in the lubricant reservoir lubricates the ball screw 801, it is possible to reduce the frequency of maintenance operation of supplying the lubricant to the inside of the ball screw 801.

A part where the dented portion 1131 is formed is not limited in particular, as long as it is on the inner surface of the concaved groove 1122. As illustrated in FIG. 88, for example, it is better to form the dented portion 1131 at a part (substantially bow shaped shaded area in FIG. 88) surrounded by the common tangent of the curved portion of the middle portion 1124 having a substantially letter S shape and the endmost portion having an arc shape, and an edge portion of the concaved groove 1122. Then, as illustrated in FIG. 89, the inner circumferential surface side of the dented portion 1131 may be opened. In other words, the inner circumferential surface of the nut 1105 may be concaved a groove, so that the dented portion 1131 continuous with the concaved groove 1122 is formed.

Additionally, the concave 1131 is smoothly connected with the concaved groove 1122. That is, as seen in the cross-sectional view of FIG. 89, from the inner circumferential surface of the nut 1105 through the dented portion 1131 to the concaved groove 1122, its surface has a gradually changing curvature to be smoothly continuous. For this reason, the lubricant in the dented portion 1131 is easily supplied to the concaved groove 1122.

Furthermore, as to the depth of the dented portion 1131 (the length in radial direction of the nut 1105), it is the deepest at the middle of the lengthwise direction of the concave 1131. In any part, however, it is shallower than the curvature radius (½ of groove width t of the middle portion 1124) of the concaved groove 1122.

Moreover, the balls 1109 that have entered the ball circulation passage 811 from the ball rolling passage 807 pass through the entering portion 1125 and hit the curved portion of the middle portion 1124 to be guided to change the travelling directions. As seen in FIG. 88 and FIG. 89, in the entering portion 1125 of the ball circulation passage 811, the dented portion 1131 is not arranged on the outside in the radial direction of the curve (the part hit by the balls 1109) in the curved portion of the entering portion 1125 of the ball circulation passage 811. Hence, the circulating property of the ball circulation passage 811 (guiding performance for the balls 1109) will not be degraded.

The dented portion 1131 may be arranged on radially outside of the curve of the ball circulation passage 811, but is preferably smaller than the dented portion 1131 arranged on radially inside of the curve in the same consideration. In detail, if it is assumed that the lubricant reservoir (the dented portion 1131) is cut along a plane perpendicular to the lengthwise direction of the ball circulation passage 811 (the concaved groove 1122), preferably, the area of the cross-section of the dented portion 1131 arranged on radially outside of the curve is smaller than that of the dented portion 1131 arranged on radially inside of the curve.

With such a configuration, the ball screw 801 according to the first example of the twelfth embodiment has superior lubricity. Additionally, since the lubricant reservoir is arranged in the ball circulation passage 811 instead of the ball rolling passage 807, the load capacity or the life of the ball screw 801 is hardly reduced. The application of such ball screw 801 according to the first example is not limited in particular, but preferably, it is usable for automobile parts, positioning apparatuses, and the like.

An example of the method of manufacturing the ball screw 801 according to the twelfth embodiment will be described with reference to FIG. 74 and FIG. 75. Firstly, a steel blank 820 having a cylindrical shape is worked by plastic working of cold forging or the like to obtain a blank 821 having a substantially identical shape (substantially cylindrical shape) to the nut 805 (rough forming process). In this situation, a flange 813 is arranged at an outer circumferential surface of the blank 821 by plastic working.

After that, a groove is concaved on a part of the inner circumferential surface of the blank 821 having a cylindrical surface shape by plastic working such as cold forging (or may be cutting process) for forming the substantially letter S shaped concaved groove 822 (1122) constituting the ball circulation passage 811 communicating the end point of the ball rolling passage 807 and the start point thereof (ball circulation passage forming process). In addition, the dented portion 1131 constituting the oil reservoir is formed by plastic working (or cutting process).

A specific example of forming the concaved groove 1122 and the dented portion 1131 will be described as follows. That is, the die, not illustrated, having a convex of a shape corresponding to that of the concaved groove 1122 and another convex of a shape corresponding to that of the dented portion 1131 are inserted into the blank 821. Both of the convexes of the die are brought into contact with the inner circumferential surface of the blank 821. The die is strongly pressed against the inner circumferential surface of the blank 821 for plastic working to arrange the concaved groove 1122 and the dented portion 1131. The concaved groove 1122 and the dented portion 1131 may be arranged separately. However, when they are formes at the same time in one process, it is possible to suppress the manufacturing costs of the ball screw 801 at low cost.

For example, the concaved groove 1122 and the dented portion 1131 may be formed by use of the die of the cam mechanism having a cam driver, not illustrated, and cam sliders, not illustrated, having a convex of a shape corresponding to the concaved groove 1122 and another convex of a shape corresponding to the dented portion 1131. In more detail, the cam driver and the cam sliders are inserted into the blank 821. In this situation, the cam sliders are disposed between the blank 821 and the cam driver with both of the convexes facing the inner circumferential surface of the blank 821. The cam slider and the cam driver disposed in the blank 821 are in contact with each other at an inclined surface extending in the substantially axial direction of the blank 821 (direction slightly inclined from the axial direction of the blank 821), so that both of the inclined surfaces constitute the cam mechanism of the die.

In this situation, the cam driver is moved in the axial direction of the blank 821, and then the cam mechanism (wedge effect) constituted by both of the inclined surfaces causes the cam sliders to move outwardly in the radial direction of the blank 821. That is, a force is transmitted to the inclined surface of the cam slider from that of the cam driver, and the force of the cam driver in the axial direction is converted into a force of moving the cam sliders outwardly in the radial direction. As a result, both of the convexes of the cam sliders strongly push the inner circumferential surface of the blank 821, whereby the concaved groove 1122 and the dented portion 1131 are arranged on the inner circumferential surface of the blank 821 by plastic working.

Subsequently, the thread groove **805*a* is formed on the inner circumferential surface of the nut 805 by common cutting to be connected to the endmost portion of the ball circulation passage 811 (the concaved groove 1122) (thread groove forming process). In this situation, since the endmost portion of the concaved groove 1122 (the ball circulation passage 811) has a spherical shape, an edge portion is not generated at the step of a boundary portion between the thread groove 805*a* and the concaved groove 1122, unlike the deflector type of ball screw. Hence, the step is smooth. As a result, when the balls 809 pass at the boundary portion 830**, an unusual noise or operation torque fluctuation is hardly generated. Moreover, the life is hardly shortened.

Finally, the heat treatment such as quenching, tempering or the like at desired conditions is performed to obtain the nut 805. Examples of the heat treatment are carburization, carbonitriding, a induction heat treatment, and the like. In a case where the heat treatment is carburization or carbonitriding, preferably, the material of the nut 805 is SCM420. In a case where the heat treatment is the induction heat treatment, preferably, the material of the nut 805 is S53C or SAE4150.

The ball screw 801 is manufactured by assembling thus manufactured nut 805, the threaded shaft 803, and the balls 809 manufactured in a common method.

Additionally, the above-described rough forming process and the ball circulation passage forming process are performed by plastic working. Hence, the method of manufacturing the ball screw 801 has a high yield, and also the ball screws with high accuracy can be manufactured at low cost. Furthermore, since the ball screw 801 is manufactured by plastic working, the flow of metal (fiber flow) of the steel blank 820 is hardly cut. Moreover, together with the work hardening, the nut 805 with a high mechanical strength is obtainable.

The type of the plastic working is not limited especially. However, the forging is preferable and the cold forging is particularly preferable. Hot forging may be employed, however, the cold forging is good at high-accuracy finishing as compared to the hot forging. It is therefore possible to obtain the nut 805 with sufficient high accuracy without the following processing. Accordingly, it is possible to manufacture the ball screw 801 at low cost. Preferably, the cold forging is employed for the plastic working in the rough forming process and the ball circulation passage forming process. However, the cold forging may be employed for the plastic working at any one of the processes.

(Second Example)

Figure 90:
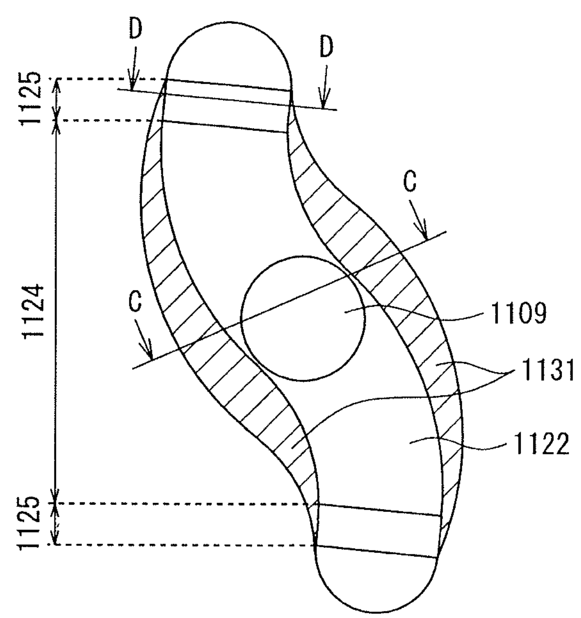
FIG. 90 is an enlarged view when the concaved groove and the concave in a second example of the twelfth embodiment are viewed in arrow A of FIG. 68.

FIG. 90 to FIG. 92 are views illustrative of a configuration of a ball screw according to a second example of the twelfth embodiment. FIG. 90 is a view illustrative of a concaved groove and a dented portion of the inner circumferential surface of the nut, and FIG. 91 and FIG. 92 are cross-sectional views of the concaved groove and the dented portion. Specifically, the operation and effect of a second example are almost same with those of the first example of the twelfth embodiment. Therefore, only the different points will be described and the same point will be omitted. In each of the drawings referenced to hereinafter, the same or corresponding parts in FIG. 67 to FIG. 69 and FIG. 88 and FIG. 89 have the same reference numerals with those in FIG. 67 to FIG. 69 and FIG. 88 and FIG. 89.

In the ball screw according to the second example of the twelfth embodiment, the part in which the dented portion 1131 is formed is arranged at a part (oblique line portion in FIG. 90) along the entering portion 1125 and the middle portion 1124, in the edge portion of the concaved groove 1122, as illustrated in FIG. 90. Then, as illustrated in FIG. 91 and FIG. 92, the dented portion 1131 is formed to have a part along the middle portion 1124 larger than apart along the entering portion 1125. In detail, if it is assumed that the lubricant reservoir (the dented portion 1131) is cut along a plane perpendicular to the lengthwise direction of the ball circulation passage 811 (the concaved groove 1122), the cross-sectional area of the part along the entering portion 1125 is small, and that of the part along the middle portion 1124 is larger than that. In addition, the cross-sectional area along the entering portion 1125 is the smallest, and becomes gradually larger as getting closer to the middle in the lengthwise direction of the concaved groove 1122, and is the largest at the middle in the lengthwise direction of the concaved groove.

Furthermore, as to the depth of the dented portion 1131 (length in the radial direction of the nut 805), the middle in the lengthwise direction of the concaved groove 1122 is the deepest. In any part, however, it is shallower than the curvature radius (½ of groove width t of the middle portion 1124) of the concaved groove 1122.

Moreover, the balls 809 (1109) that have entered the ball circulation passage 811 from the ball rolling passage 807 pass through the entering portion 1125 and hit the curved portion of the middle portion 1124 to be guided to change the moving directions. The balls 1109 hit the entering portion 1125. As seen from FIG. 92, the cross-sectional area of the dented portion 1131 is smaller in the inside of the radial direction of the curve (right side in FIG. 92) than in the outside of the radial direction of the curve (left side in FIG. 92). Hence, the circulating property of the ball circulation passage 811 (guiding performance for the balls 1109) will not be degraded.

(Third Example)

Figure 93:
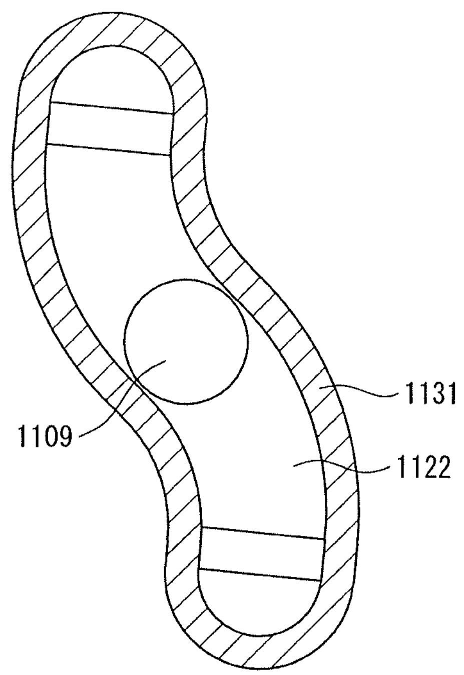
FIG. 93 is an enlarged view when a concaved groove and a concave in a third example of the twelfth embodiment are viewed in arrow A of FIG. 68.
Figure 96:
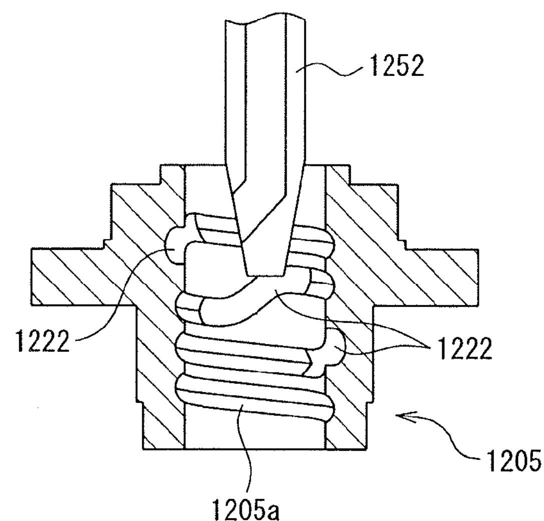
FIG. 96 is a view illustrative of a burr removing process by blasting.

FIG. 93 is a view illustrative of a configuration of a ball screw according to a third example of the twelfth embodiment, and illustrates a concaved groove and a dented portion of the inner circumferential of the nut. Specifically, the operation and effect of the third example are almost same with those of the first and second examples of the twelfth embodiment. Therefore, only the different points will be described and the same point will be omitted.

In the ball screw according to the third example of the twelfth embodiment, referring now to FIG. 93, the dented portion 1131 (oblique line portion) is formed along the entire edge portion of the concaved groove 1122. Specifically, if it is assumed that the lubricant reservoir (the dented portion 1131) is cut along a plane perpendicular to the lengthwise direction of the ball circulation passage 811 (the concaved groove 1122), the cross-sectional area of any part in the lubricant reservoir (the dented portion 1131) is almost identical such that the dented portion 1131 is formed in a uniform manner along the entire edge portion of the concaved groove 1122. Since the lubricant reservoir is formed at the endmost portion (arc shaped portion) of the concaved groove 1122 as well, a more amount of the lubricant can be held at the lubricant reservoir. Accordingly, the lubricity of the ball screw 801 is more superior.

Specifically, the above first to third examples show examples of the twelfth embodiment, and the twelfth embodiment is not limited to the first to third examples. For example, as the ball screw 801 according to the first to third examples, the description has been given of the nut circulation type of ball screw in which the nut 805 is provided with the ball circulation passage 811 for returning and circulating the balls 809 to the start point of the ball rolling passage 807 from the endpoint thereof. However, the twelfth embodiment is applicable to a threaded shaft circulation type of the ball screw in which a part corresponding to the ball circulation passage 811 is formed at the threaded shaft.

(Thirteenth Embodiment)

A thirteenth embodiment relates to a method for manufacturing a ball screw.

A ball screw is provided with: a threaded shaft having an outer circumferential surface on which a spiral thread groove is formed; a nut having an inner circumferential surface on which a thread groove opposing the thread groove of the threaded shaft is formed; and plural balls rotatably loaded in a spiral ball rolling passage formed by both of the thread grooves. Then, when the nut screwed with the threaded shaft via the balls and the threaded shaft are relatively rotated, the threaded shaft and the nut are relatively moved in the axial direction via the rolling movement of the balls.

Such a ball screw is provided with a ball circulation passage constituting a ball passage with no end by communicating the start point of the ball rolling passage and the end point thereof. That is to say, when the balls move around the threaded shaft while moving in the ball rolling passage and reach the end point of the ball rolling passage, the balls are scooped up from one end portion of the ball circulation passage, pass through the ball circulation passage, and return to the start point of the ball rolling passage from the other end portion of the ball circulation passage. In such a manner, since the balls rolling in the ball rolling passage circulate in the ball circulation passage endlessly, the threaded shaft and the nut relatively move consecutively.

Figure 97:
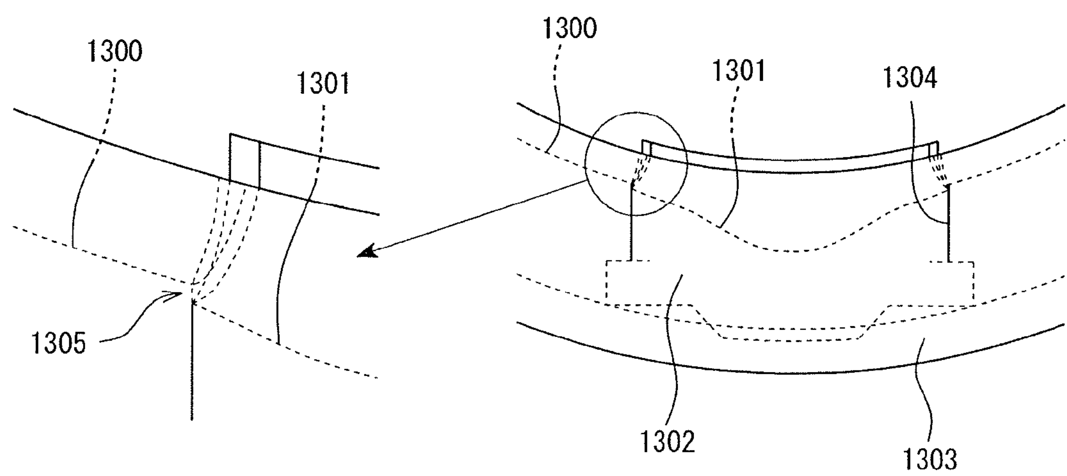
FIG. 97 is an enlarged view illustrative of a step generated at a boundary portion between the nut and the deflector in a conventional deflector type of ball screw.

A tube type and a deflector type of the ball circulation system with the use of the ball circulation passage are common. In the deflector type of ball screw, referring to FIG. 97, a deflector 1302 provided with a circulation groove 1301 constituting the ball circulation passage is inserted into a deflector hole 1304 arranged in a nut 1303. Such a nut 1303 in the deflector type is manufactured by cutting a cylindrical blank for performing hole opening working or working on an inner or outer circumferential surface. Hence, the material yield is inferior. In addition, since the nut 1303 and the deflector 1302 are separate members, the varied dimensions in the nut 1303 and the deflector 1302 may generate a step 1305 having an edge portion at the boundary therebetween. (See FIG. 97, which illustrates the magnification in the periphery of the deflector 1302 and the deflector hole 1304 and the periphery of the step. Specifically, the reference numeral 1300 is the ball rolling passage)

If a step having an edge portion is generated at the boundary between the nut and the deflector, an unusual noise or operation torque fluctuation may be produced when the ball passes the boundary portion. This causes a problem that the life is shortened and its maintenance cost is increased. Then, machining is performed by use of a grind stone, end mill, or the like, in order to make the step smooth, abrasive grain, chips may remain between the deflector and the deflector hole.

As a related technique for solving these problems, there is Patent Document 12. In Patent Document 12, before the deflector is assembled into the nut, shot peening is performed at a part adjacent to the deflector hole in the threaded groove of the nut. Additionally, the shot peening is also performed for the circulation groove of the deflector. However, since the shot peening is high in cost, there is a problem that the working cost increases.

For that reason, in Patent Document 5, the nut is made of a sintered alloy, so that the return groove constituting the ball circulation passage is integrally formed on the inner circumferential surface of the nut. That is, since the nut and the ball circulation groove are integrally formed instead of being separate members, there is no step portion having the above-described edge portion.

However, the nut of the ball screw described in Patent Document 5 is composed of the sintered alloy, thereby posing a problem of a low density. Besides, the generation of a gas pocket makes the strength of the nut insufficient as a nut for the ball screw, in some cases.

Accordingly, the thirteenth embodiment has been made to solve the above problem of the conventional technique, and has an object of providing a method for manufacturing the ball screw in which an unusual noise or the operation torque fluctuation is hardly generated and which is long in life and inexpensive.

In order to achieve the above object, the thirteenth embodiment has a configuration as follows. According to a method for manufacturing a ball screw in the thirteenth embodiment, the ball screw comprising: a threaded shaft having an outer circumferential surface on which a spiral thread groove is formed; a nut having an inner circumferential surface on which a thread groove is formed to oppose the thread groove of the threaded shaft; balls rotatably loaded in a spiral ball rolling passage between the thread groove of the nut and that of the threaded shaft; a ball circulation passage, for returning the balls from an end point of the ball rolling passage to a start point thereof. There are provided: a ball circulation passage forming process of forming a circulation passage constituted by a concaved groove by concaving a part of the inner circumferential surface; a thread groove forming process of forming the thread groove to be in contact with end portions of the ball circulation passage, on the inner circumferential surface of the nut; and a burr removing process of removing burr by performing at least one of brushing and blasting at a boundary between the ball circulation passage and the ball rolling passage.

In the method for manufacturing ball screw according to the thirteenth embodiment, a groove is concaved on a part of the inner circumferential surface of the nut by forging, and the ball circulation passage may be composed of a concaved groove, in the ball circulation passage forming process.

In the method for manufacturing ball screw according to the thirteenth embodiment, the burr removing process is provided for removing burr generated at the boundary between the ball circulation passage and the ball rolling passage. Hence, an unusual noise or operation torque fluctuation hardly occurs when the balls pass through the boundary, thereby making it possible to manufacture the long-life ball screw at low cost.

An embodiment of a method for manufacturing a ball screw according to the thirteenth embodiment will be described in detail with reference to the drawings. FIG. 67 is a cross-sectional view (taken along the axial direction) illustrative of a ball screw according to an example of the thirteenth embodiment.

As illustrated in FIG. 67, the ball screw 801 is provided with: a threaded shaft 803 having a thread groove 803*a* of a spiral shape on an outer circumferential surface; a nut 805 having on an inner circumferential surface a thread groove 805*a* of a spiral shape facing the thread groove 803*a* of the threaded shaft 803; plural balls 809 loaded to be capable of rolling in a ball rolling passage 807 having a spiral shape formed between both of the thread grooves 803*a* and 805*a*; and a ball circulation passage 811 for returning and circulating the balls 809 from the start point to the endpoint of a ball rolling passage 807.

That is to say, the balls 809 pass around the threaded shaft 803 while moving in the ball rolling passage 807, and reach the end point of the ball rolling passage 807. Then, the balls are scooped up from one end portion of the ball circulation passage 811, pass through the ball circulation passage 811, and return to the start point of the ball rolling passage 807 from the other end portion of the ball circulation passage 811.

The cross-sectional shape of the thread grooves 803*a* and 805*a* may be an arc or a gothic arc. In addition, the materials of the threaded shaft 803, the nut 805, and the balls 809 are not limited especially. A general material can be used. Examples are metal (steel or the like), ceramic, and resin. For example, in a case where the nut 805 is made of a sintered alloy, there is a problem of low density. Besides, there may be a problem that the strength of the nut 805 is insufficient as a nut for the ball screw due to the generation of a gas pocket. In a case where the nut 805 is made of a metal such as a steel or the like, it is possible to apply a sufficient strength as a nut for the ball screw.

In such a ball screw 801, when the nut 805 screwed together with the threaded shaft 803 via the balls 809 and the threaded shaft 803 are relatively rotated, the threaded shaft 803 and the nut 805 are relatively moved in the axial direction via the rolling movement of the balls 809. Then, the ball passage with no end portion is formed of the ball rolling passage 807 and the ball circulation passage 811 so that the balls 809 rolling in the ball rolling passage 807 circulate in the ball passage with no end portion endlessly. This allows the threaded shaft 803 and the nut 805 for relative movement consecutively.

In this situation, the ball circulation passage 811 will be described in detail with reference to the cross-sectional views (cross-sectional views taken along a plane perpendicular to the axial direction) of FIG. 68 and FIG. 69. The ball circulation passage 811 is integrally formed on the inner circumferential surface of the nut 805. In more detail, a groove is concaved on a part of the inner circumferential surface of the nut 805 having a cylindrical surface shape by plastic working or cutting for forming a concaved groove 822, as the ball circulation passage 811. Moreover, another member constituting the ball circulation passage is not provided, unlike the case of the tube or deflector type of the ball circulation. Since another member is not provided, there is no possibility of generating a step with an edge portion at the boundary when another member is used.

As illustrated in FIG. 69, the balls 809 that have rolled to the end point of the ball rolling passage 807 are scooped up from one end portion of the ball circulation passage 811 and sunk into the inside (radially outside) of the nut 805. Then, the balls 809 pass through the ball circulation passage 811, pass over a land portion 803*b* (screw thread of the thread groove 803*a*) of the threaded shaft 803, and return to the start point of the ball rolling passage 807 from the other end portion of the ball circulation passage 811. The cross-sectional shape of the ball circulation passage 811 may be an arc or a gothic arc.

The application of such ball screw 801 according to the present example of the thirteenth embodiment is not limited in particular, but preferably, it is usable for automobile parts, positioning apparatuses, and the like.

An example of the method of manufacturing the ball screw 801 according to the thirteenth embodiment will be described with reference to FIG. 74, FIG. 75, and FIG. 94 to FIG. 96. Firstly, the steel blank 820 having a cylindrical shape is processed by plastic working of cold forging or the like to obtain a blank 821 having a substantially identical shape (substantially cylindrical shape) to the nut 805 (rough forming process). In this situation, a flange 813 is arranged at an outer circumferential surface of the blank 821 by plastic working.

After that, a groove is concaved on a part of the inner circumferential surface of the blank 821 having a cylindrical surface shape by plastic working such as cold forging (or may be cutting process) for forming the substantially letter S shaped concaved groove 822 constituting the ball circulation passage 811 communicating the end point of the ball rolling passage 807 and the start point thereof (ball circulation passage forming process (ball return passage forming process)). A specific example of forming the concaved groove 822 will be described as follows. That is, the die, not illustrated, having a convex of a shape corresponding to that of the concaved groove 822 is inserted into the blank 821. The convex of the die is brought into contact with the inner circumferential surface of the blank 821. The die is strongly pressed against the inner circumferential surface of the blank 821 for plastic working to form the concaved groove 822.

For example, the concaved groove 822 may be formed by use of the die of a cam mechanism provided with a cam driver, not illustrated, and a cam slider, not illustrated, having the convex of a shape corresponding to the concaved groove 822. In more detail, the cam driver and the cam slider are inserted into the blank 821. In this situation, the cam slider is disposed between the blank 821 and the cam driver with the convex facing the inner circumferential surface of the blank 821. The cam slider and the cam driver disposed in the blank 821 are in contact with each other at an inclined surface extending in the substantially axial direction of the blank 821 (direction slightly inclined from the axial direction of the blank 821), so that both of the inclined surfaces constitute the cam mechanism of the die.

In this situation, the cam driver is moved in the axial direction of the blank 821, and then the cam mechanism (wedge effect) constituted by both of the inclined surfaces causes the cam slider to move outwardly in the radial direction of the blank 821. That is, a force is transmitted to the inclined surface of the cam slider from that of the cam driver, and the force of the cam driver in the axial direction is converted into a force of moving the cam slider outwardly in the radial direction. As a result, the convex of the cam slider strongly pushes the inner circumferential surface of the blank 821, whereby the concaved groove 822 is formed on the inner circumferential surface of the blank 821 by plastic working.

Subsequently, the thread groove 805*a* is formed on the inner circumferential surface of the nut 1205 by common cutting to be connected to the endmost portion of the ball circulation passage 1211 (the concaved groove 1222) (thread groove forming process (spiral groove forming process)). In this situation, since the endmost portion of the concaved groove 1222 (the ball circulation passage 1211) has a spherical shape, an edge portions is not generated at the step of the boundary portion between the thread groove 1205*a* and the concaved groove 1222, unlike the deflector type of ball screw. Hence, the step 1227 is smooth (see FIG. 94 which illustrates the magnification in the periphery of the concaved groove 1222 and the periphery of the step).

However, minute burr may be generated by cutting process at a boundary portion 830 (see FIG. 75) between the concaved groove 822 (the ball circulation passage 811) and the thread groove 805*a* (the ball rolling passage 807). The generation of such burr may generate an unusual noise or operation torque fluctuation when the balls 809 pass over the boundary portion, thereby shortening the life. Therefore, in order to remove the burr, at least one of brushing (See FIG. 95. The reference numeral 1251 is a brush) and blasting (See FIG. 96. The reference numeral 1252 is a blast nozzle) is performed for the boundary portion (burr removing process).

Since there is no burr at the boundary portion 830, the ball circulation passage 811 and the ball rolling passage 807 are smoothly connected. As a result, when the balls 809 pass over the boundary portion 830, no unusual noise or no operation torque fluctuation is generated and the life is hardly shortened. In addition, the brushing or blasting increases the fatigue strength due to the compressive residual stress on the surface. Furthermore, since the brushing or blasting is lower in cost than the shot peening, the ball screw 801 can be manufactured inexpensively. Moreover, the brushing or blasting eliminates the burr at the boundary portion 830, and has a deburred surface shape. These effects allow the balls 809 to circulate more smoothly. Specifically, the deburred surface shape denotes a chamfered shape of a curved surface.

Additionally, in the conventional deflector type of ball screw, the brushing or blasting may make abrasive grains, media, chips, or the like remain between the deflector and the deflector hole, as will be described later. In the ball screw 801 according to the present example of the thirteenth embodiment, however, since the nut 805 and the ball circulation passage 811 are integrated, there is no possibility of a drawback of making the above-described abrasive grains, media, chips, or the like remain.

In the brushing, a brush made of steel, stainless, polyamide resin (nylon), or the like can be used. This brush may include abrasive grains. The type of the abrasive grains is not limited in particular. However, alumina, silicon carbide, diamond, or the like is preferable. In addition, the blasting is a process of blowing the media to the boundary portion 830 from a blast nozzle. The type of media is not limited, in particular. Steel, glass, alumina, plastic such as polyamide resin (nylon) or the like is preferable. Furthermore, the time for blowing the media is not limited, in particular. Preferably, two seconds to five seconds. More preferably, approximately three seconds. Moreover, the surface roughness of the boundary portion 830 after the burr removing process is finished is preferably 1.6 μmRa or less.

Finally, the heat treatment such as quenching, tempering or the like at desired conditions is performed to obtain the nut 805. Examples of the heat treatment are carburization, carbonitriding, a induction heat treatment, and the like. Such a heat treatment may be performed before the burr removing process. The brushing or blasting after the heat treatment further improves the effect of improving the fatigue strength due to the compressive residual stress on the surface. In a case where the heat treatment is carburization or carbonitriding, preferably, the material of the nut 805 is SCM420. In a case where the heat treatment is the induction heat treatment, preferably, the material of the nut 805 is S53C or SAE4150.

The ball screw 801 is manufactured by assembling thus manufactured nut 805, the threaded shaft 803 and the balls 809 manufactured in a common method.

Since the above-described rough die process and the ball circulation passage forming process are performed by plastic working. Hence, the method of manufacturing the ball screw 801 has a high yield, and also the ball screws with high accuracy can be manufactured at low cost. Furthermore, since the nut 805 is manufactured by plastic working, the flow of metal (fiber flow) of the steel blank 820 is hardly cut. Moreover, together with the work hardening, the nut 805 with a high mechanical strength is obtainable.

The type of the plastic working is not limited especially. However, the forging is preferable and the cold forging is particularly preferable. Hot forging may be employed, however, the cold forging is good at high-accuracy finishing as compared to the hot forging. It is therefore possible to obtain the nut 805 with sufficient high accuracy, without the following processing. Accordingly, it is possible to manufacture the ball screw 801 at low cost. Preferably, the cold forging is employed for the plastic working in the rough forming process and the ball circulation passage forming process. However, the cold forging may be employed for the plastic working at any one of the processes.

Specifically, the present example is an example of the thirteenth embodiment, and the thirteenth embodiment is not limited to the present example. For example, as the ball screw of the present example, the description has been give of the nut circulation type of ball screw in which the nut 805 is provided with the ball circulation passage 811 for returning and circulating the balls 809 from the end point of the ball rolling passage 807 to the start point thereof. The thirteenth embodiment is applicable to the threaded shaft circulation type of ball screw in which the part corresponding to the ball circulation passage 811 is formed in the threaded shaft.

Specifically, the method of manufacturing the nut for ball screw and the ball screw described in each example of the second to thirteen embodiments are also applicable to the method of manufacturing the nut for ball screw and the ball screw described in the first embodiment.

In addition, in the fourth to thirteenth embodiments, the punch and the jig for working the circulation passage may be a part of the cam slider. Furthermore, the heat treatment and the materials described in each of the first to thirteenth embodiments applicable to another embodiment. Moreover, the method of lubricating the ball screw described in the first to thirteenth embodiments may use grease or oil. Additionally, the ball screw nut according to the first to thirteenth embodiments is preferably manufactured by plastic working (forging) only, but can be manufactured by plastic working (forging) in combination of another working method. Examples of another working method are cutting process such as grinding, turning or the like, electro-discharge machining, and shot blasting. Further, the preferably plastic working is cold forging, but hot forging can be employed.

Figure 98:
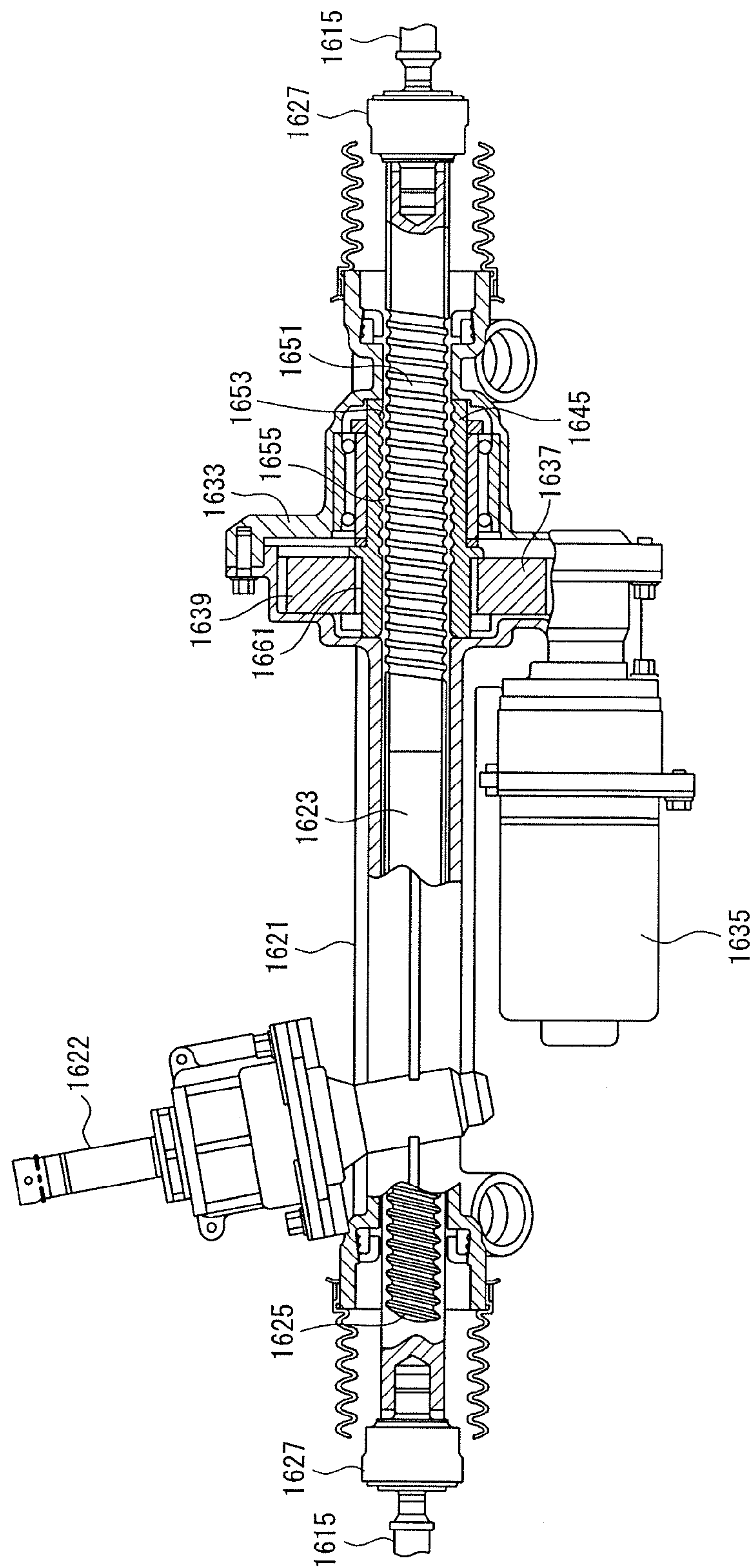
FIG. 98 is a partial cross-sectional view of a steering gear of an electric power steering apparatus.

Moreover, the ball screw described in the first to thirteenth embodiments can be suitably used for an electric power steering apparatus (particularly, a rack type of electric power steering apparatus). FIG. 98 is a cross-sectional view illustrative of a part of an electric power steering apparatus.

In FIG. 98, in a rack and pinion housing 1621 constituting a steering gear case, a rack shaft 1623 constituting a rack and pinion mechanism and a pinion, not illustrated, are installed, and the pinion is coupled to a lower shaft 1622. The rack shaft 1623 is formed with a rack 1625 meshed with the pinion on the left side of the drawing, and is secured with a spherical joint 1627 for swingingly supporting a tie rod 1615 at both end portions. The threaded shaft of the ball screw is used for the rack shaft 1623.

The rack and pinion housing 1621 is attached with a ball screw housing 1633 at a right end portion. In the ball screw housing 1633, the front end of the electric motor 1635 is secured at the lower portion of the ball screw housing 1633 with a bolt, and the ball screw housing 1633 houses a drive gear 1637 secured to the shaft of the electric motor 1635 and a driven gear 1639 meshed with the drive gear 1637. In addition, the ball screw housing 1633 rotatably holds a ball nut 1645 via a double-row angular contact ball bearing.

The ball nut 1645 is housed in an inner diameter of the driven gear 1639. Then, a spline fitting portion 1661 is arranged between the shaft center inner periphery of the driven gear 1639 and the outer periphery of the ball nut 1645. This allows the driven gear 1639 and the ball nut 1645 to relatively slide freely.

A male ball screw groove (screw portion) 1651 is formed on, the right side in the drawing of, the rack shaft 1623. On the other hand, the ball nut 1645 is formed with a female ball screw groove 1653, and plural steel balls 1655 constituting the circulation balls are disposed between the male ball screw groove 1651 and the female ball screw groove 1653. In addition, the ball nut 1645 is attached with a circulation groove, not illustrated, for circulating the steel balls 1655.

In this electric power steering apparatus, when the driver steers the steering wheel, its steering force is transmitted from the lower shaft 1622 to the pinion, the rack shaft 1623 moves in any one of the left and right directions in the drawing in accordance with the rack 1625 meshed with the pinion, and the wheels turn via the left and right tie rods. Simultaneously, based upon an output from a steering torque sensor, not illustrated, an electric motor 1635 rotates with a given rotation torque in any one of forward or reverse directions, and the rotation torque is transmitted to the ball nut 1645 via the drive gear 1637 and the driven gear 1639. Then, the rotation of the ball nut 1645 exerts a thrust force to the male ball screw groove 1651 of the rack shaft 1623 via the steel balls 1655 engaged with the female ball screw groove 1653, thereby realizing a steering assist torque.

REFERENCE SIGNS LIST

1 nut blank
11 inner circumferential surface of nut blank
11*a* circle constituting inner circumferential surface of nut blank
15, 16 letter S shaped concave constituting ball return passage
15*a*, 16*a* letter S shaped concave constituting ball return passage
2 blank holder
21 concave
22 through hole
22*a* wall surface of through hole (load receiving surface)
22*b* wall surface of through hole (load receiving surface)
3 cam slider
3A, 3B cam slider
33 inclined surface of cam slider (cam mechanism)
34 concave
35, 36 letter S shaped convex
35*a*, 36*a* letter S shaped convex
4 cam driver
4A cam driver
41 wedge portion
41*a* inclined surface of cam slider (cam mechanism)
42 plate shaped portion
42*a* parallel surface (load receiving surface)
43 side plate portion
43*a* end surface in plate width direction (load receiving surface)
44 step surface
5 cylindrical member (cam slider holding member)
5A, 5B divided body (cam slider holding member)
51 center hole of cylindrical member
51*a* parallel surface (load receiving surface)
51*b* parallel surface
51*c* parallel surface (load receiving surface)
51*d* parallel surface (load receiving surface)
51*e* parallel surface
52, 53 through hole (cam slider holding member)
52*a*, 53*a* through hole (cam slider holding member)
54 incision
6 cam driver
60 cam driver
61 main body
61*a* first parallel surface (load receiving surface)

The invention claimed is:

1. A method for manufacturing a nut for a ball screw, the ball screw comprising: the nut having an inner circumferential surface on which a spiral groove is formed; a threaded shaft having an outer circumferential surface on which a spiral groove is formed; balls loaded in a raceway between the spiral groove of the nut and that of the threaded shaft; and a ball return passage arranged as a concave on the inner circumferential surface of the nut for returning the balls from an end point of the raceway to a start point of the raceway, the balls being rolling in the raceway to make the nut relatively move with respect to the threaded shaft, wherein the concave is formed on the inner circumferential surface of the nut blank by plastic working in a pressing method by use of a die of a cam mechanism, the cam mechanism comprising: a cam driver inserted into a cylindrical nut blank and moving in an axial direction of the nut blank at the time of processing; and a cam slider disposed between the nut blank and the cam driver and provided with a convex corresponding to the concave, a movement of the cam driver causing the convex to move in a radial direction of the nut.

2. The method for manufacturing the nut for the ball screw according to claim 1, wherein a plurality of the concaves are formed on the inner circumferential surface of the nut, and at least one of a plurality of the convexes corresponding to the plurality of the concaves is formed on the cam slider.

3. The method for manufacturing the nut for the ball screw according to claim 1, wherein, as the die, the cam driver includes a load receiving surface parallel to the axial direction of the nut, and pressing is performed by use of the die having another member, other than the cam driver, provided with a load receiving surface to be in contact with the load receiving surface.

4. The method for manufacturing the nut for the ball screw according to claim 3, wherein, as the die, the cam slider is held by a holding member, disposed between the cam driver and the nut blank, and pressing is performed by use of the die in which the holding member is provided with the load receiving surface.

5. The method for manufacturing the nut for the ball screw according to claim 2, wherein the plurality of the concaves are formed in a uniform manner by changing a movement amount of the plurality of the convexes, formed on a plurality of the cam sliders, moving outwardly in the radial direction of the nut.

6. The method for manufacturing the nut for the ball screw according to claim 1, wherein by pressing method by use of the die of the cam mechanism including the cam driver, the cam slider, and a restraining member for restraining both end surfaces in the axial direction and an outer circumferential surface of the nut blank and having a depressed portion to correspond to the convex on an inner circumferential surface that receives the outer circumferential surface, the concave is formed on the inner circumferential surface of the nut blank by pressing the inner circumferential surface of the nut blank with the convex to protrude the outer circumferential portion of the nut into the depressed portion of the restraining member.

7. The method for manufacturing the nut for the ball screw according to claim 1, wherein a part of an outer circumferential surface of the nut is formed at a position having a distance from a central axis of the nut to be shorter than a radius of another part having a circular shape on the outer circumferential surface of the nut, wherein the convex is pressed into the inner circumferential surface of the nut blank to form a concave so as to form a projection projecting on the outer circumferential of the nut on the part of the outer circumferential surface of the nut, and wherein in the part of the outer circumferential surface, the projection is arranged such that the distance from the central axis of the nut to be shorter than a radius of said another part having a circular shape.

8. The method for manufacturing the nut for the ball screw according to claim 1, wherein forming of the concave permits a material in the nut to flow and flowing of the material is adjusted in accordance with a shape of the concave.

9. The method for manufacturing the nut for the ball screw according to claim 8, wherein the flowing of the material to an outer circumference side is adjusted in accordance with the shape of the concave.

10. The method for manufacturing the nut for the ball screw according to claim 8, wherein flowing of the material to an end portion side in the axial direction of the nut is adjusted in accordance with the shape of the concave.

11. The method for manufacturing the nut for the ball screw according to claim 1, wherein the convex is pressed into the inner circumferential surface of the nut blank to form the concave, and a concave for shear droop for reducing the shear droop in the concave generated by plastic working with the convex is formed around the concave in the inner circumferential surface of the nut.

12. The method for manufacturing the nut for the ball screw according to claim 11, wherein the concave for shear droop is formed adjacent to a part where the concave curves.

13. The method for manufacturing the nut for the ball screw according to claim 11, wherein a shape and a depth of the concave for shear droop are determined in accordance with an amount of the shear droop.

14. The method for manufacturing the nut for the ball screw according to claim 1, wherein an excess material portion for reducing shear droop of the concave is provided to protrude from the inner circumferential surface having a circular shape of the nut blank, and the convex is pressed into the excess material portion to form the concave.

15. The method for manufacturing the nut for the ball screw according to claim 14, wherein the excess material portion has a shape corresponding to that of the concave.

16. The method for manufacturing the nut for the ball screw according to claim 1, wherein after a base concave to be included in a cross-sectional arc of the concave is formed at a position where the concave is to be formed on the inner circumferential surface of the cylindrical nut blank, the cam slider inserted into the nut blank is moved outwardly in the radial direction of the nut with restraining the outer circumferential surface and an end surface in the axial direction of the nut blank to form the concave.

17. A method for manufacturing the nut for the ball screw, the method comprising:
- a ball return passage forming process of forming the concave in the method according to claim 1;
- a spiral groove forming process of forming the spiral groove to be in contact with an end portion of the concave on the inner circumferential surface of the nut; and
- a burr removing process of removing burr by performing at least one of brushing and blasting at a boundary portion between the concave and the spiral groove.

18. A ball screw comprising the nut for the ball screw manufactured in the method according to claim 6, wherein a projection is arranged at a position corresponding to the concave of the outer circumferential surface of the nut.

19. A ball screw comprising:
- a nut having an inner circumferential surface on which a spiral groove is formed;
- a threaded shaft having an outer circumferential surface on which a spiral groove is formed;
- balls loaded in a raceway between the spiral groove of the nut and that of the threaded shaft; and a ball circulation groove for returning the balls from an end point of the raceway to a start point of the raceway, the balls being rolling in the raceway to make the nut relatively move with respect to the threaded shaft,
- wherein the nut is manufactured in the method for manufacturing the nut according to claim 1, and
- wherein at least one of corner portions defined by both of side surfaces of the ball circulation passage and a surface axially extending and continuous with each of the side surfaces is rounded.

20. A ball screw comprising:
- a threaded shaft having an outer circumferential surface on which a spiral groove is formed;
- a nut having an inner circumferential surface on which a spiral groove opposing the spiral groove of the threaded shaft is formed;
- a plurality of balls rotatably loaded in a ball rolling passage having a spiral shape provided by both of the spiral grooves; and
- a ball circulation passage for returning the balls from an end point of the ball rolling passage to a start point of the ball rolling passage,
- wherein the nut is manufactured in the method for manufacturing the nut according to claim 1,
- wherein the ball circulation passage includes a concaved groove formed by concaving a groove on a part of the inner circumferential surface of the nut, and a lubricant reservoir capable of holding a lubricant, and
- wherein the lubricant reservoir is made of a dented portion by concaving a groove on a part of an inner surface of the concaved groove.

21. The ball screw according to claim 20,
- wherein the ball circulation passage includes both of end portions that are connecting portions with the ball rolling passage and a middle portion between both of the end portions, and
- wherein as to a cross-sectional area of the lubricant reservoir cut along a plane perpendicular to a lengthwise direction of the ball circulation passage, the cross-sectional area of a part adjacent to the middle portion is larger than that of a part adjacent to each of the end portions.

22. The ball screw according to claim 20,
- wherein the ball circulation passage is curved, and
- wherein as to a cross-sectional area of the lubricant reservoir cut along a plane perpendicular to a lengthwise direction of the ball circulation passage, the cross-sectional area of the lubricant reservoir arranged on the inside in a radial direction of a curve of the ball circulation passage is larger than that of the lubricant reservoir arranged on the outside in the radial direction of the curve of the ball circulation passage.

23. The ball screw according to claim 20, wherein the concaved groove constituting the ball circulation passage and the dented portion constituting the lubricant reservoir are formed at the same time by forging.

24. A ball screw comprising the nut manufactured in the method for manufacturing the nut for the ball screw according to claim 1, wherein at least a part of a lengthwise direction of the ball return passage has a substantially letter V shaped cross-section, when the ball return passage is cut along a plane perpendicular to the lengthwise direction.

25. A ball screw comprising the nut manufactured in the method for manufacturing the nut for the ball screw according to claim 1, wherein a flange protruding inwardly in the radial direction from a marginal edge portion of the concave at a connecting part of the spiral groove of the nut and the concave is provided.

26. The ball screw according to claim 25,
- wherein both end portions of the concave that is a connecting part with the spiral groove of the nut constitutes a straight shaped ball entering portion, and
- wherein the flange is arranged at least at a marginal edge portion of the straight shaped ball entering portion.

27. The ball screw according to claim 25, wherein a distance H between an end of the flange and a radial center of the nut is equal to or smaller than ½ of ball circle diameter (BCD), and wherein the flange is arranged not to be in contact with the outer circumferential surface of the threaded shaft.

* * * * *